United States Patent [19]
Tabuchi

[11] Patent Number: 5,909,524
[45] Date of Patent: Jun. 1, 1999

[54] OPTICAL COUPLING STRUCTURE AND A FABRICATION PROCESS THEREOF

[75] Inventor: Haruhiko Tabuchi, Kawasaki, Japan

[73] Assignee: Fujitsu Limited, Kawasaki, Japan

[21] Appl. No.: 08/847,594

[22] Filed: Apr. 25, 1997

[30] Foreign Application Priority Data

May 20, 1996 [JP] Japan .................................... 8-148572

[51] Int. Cl.[6] ...................................................... G02B 6/30
[52] U.S. Cl. .................................. 385/49; 385/14; 385/52; 385/65
[58] Field of Search .................................... 385/49, 39, 41, 385/50, 9, 14, 15, 31, 42, 52, 55, 58, 59, 65, 66

[56] References Cited

FOREIGN PATENT DOCUMENTS 60-068301   4/1985   Japan .

*Primary Examiner*—Phan T. H. Palmer

[57] ABSTRACT

An optical coupling structure includes a common substrate carrying a pair of parallel ridges as a first engagement structure, a first sub-carrier mounted on the common substrate, the first sub-carrier carrying a second engagement structure including a plurality of groove pairs such that one of the groove pairs engage with the ridges forming the first engagement structure, and a second sub-carrier mounted on the common substrate. The second sub-carrier carrys a third engagement structure including a plurality of groove pairs such that one of the groove pairs engage with the ridges. The groove pairs are selected such that an optical component held by the first sub-carrier aligns optically to an optical component held by the second sub-carrier.

65 Claims, 135 Drawing Sheets

FIG. 6A
PRIOR ART
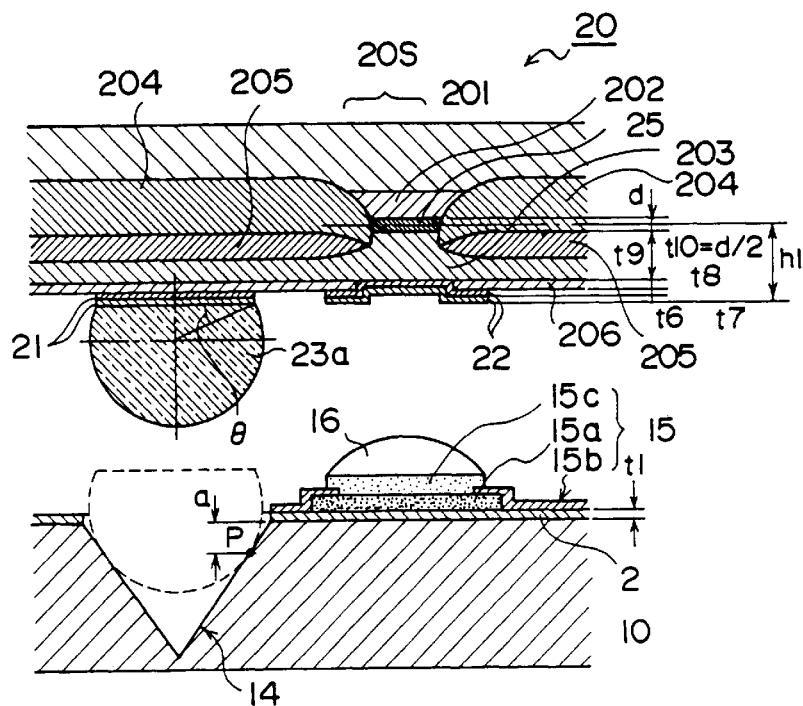
FIG. 6B
PRIOR ART
FIG. 6C
PRIOR ART
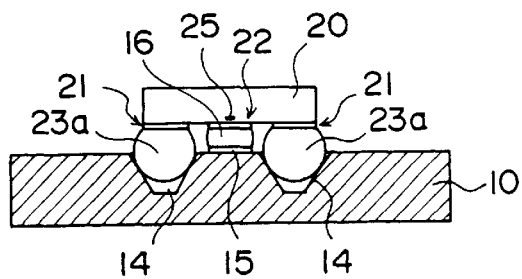

FIG. 9A
PRIOR ART
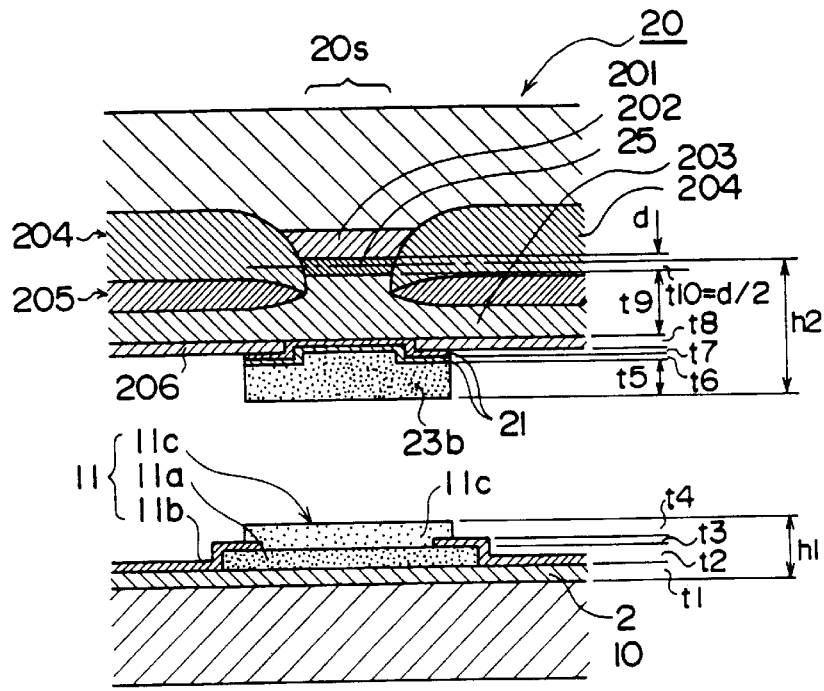
FIG. 9B
PRIOR ART
FIG. 9C
PRIOR ART
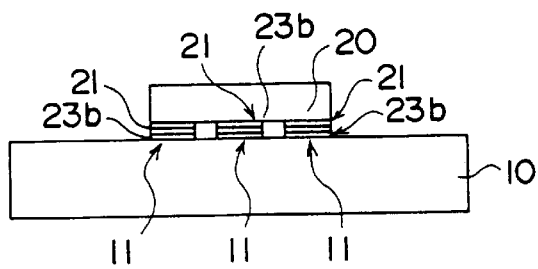

FIG.11A
PRIOR ART
FIG.11B
PRIOR ART
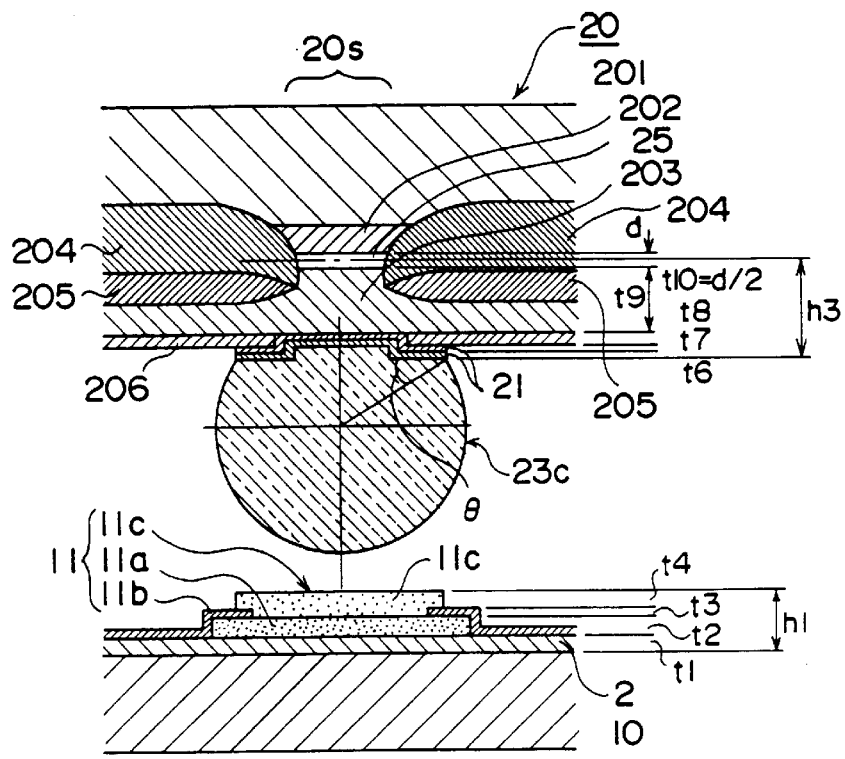
FIG.11C
PRIOR ART
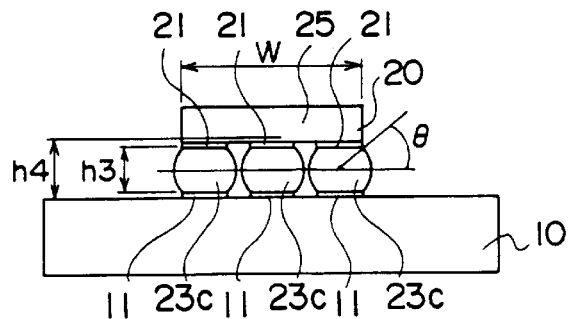

H = (1+root(3)) R
W = root(2) (1+root(3)) R

REFRACTIVE
INDEX

ELECTRIC FIELD
STRENGTH

REFRACTIVE
INDEX

ELECTRIC FIELD
STRENGTH

OPTICAL COUPLING STRUCTURE AND A FABRICATION PROCESS THEREOF

BACKGROUND OF THE INVENTION

The present invention relates to an optical coupling structure for optically coupling a plurality of optical components and a fabrication process of such an optical coupling structure. More particularly the present invention relates to an optical coupling structure carrying a plurality of optical components on a plurality of flat sub-mounts with an exact optical alignment between the optical components, which plurality of flat sub-mounts in turn being mounted on a flat substrate in an exact optical alignment.

In optical-fiber telecommunication networks or optical information processing systems, various optical apparatuses are constructed by assembling various optical components. For example, an optical source used in an optical fiber network includes a laser diode and a lens provided in an optical alignment with an optical fiber for injecting an optical beam produced by the laser diode into the optical fiber. On the other hand, there are optical systems for use in laser beam printers or optical disk drives, in which a laser diode is optically coupled to a lens or other optical components. Thus, there exists a persisting demand for a simple fabrication process of such optical apparatuses.

Generally, there are two known types of optical coupling structures for achieving a desired optical coupling of optical components on a flat slab member, which will be referred to hereinafter as a "substrate."

PRIOR ART

Prior Art Type 1

In the optical coupling structure of this type, optical components are mounted directly on a substrate that is used as an optical bench.

Prior Art Type 2

In the optical coupling structure of this type, a plurality of flat slab members called hereinafter as a "sub-mount," each carrying thereon an optical component, are mounted on another common, flat slab member called hereinafter as a "common substrate."

Examples of Prior Art Type 1

FIGS. 1A and 1B show a typical optical coupling structure according to PRIOR ART TYPE 1 in which a laser diode and an optical fiber are coupled optically on a Si substrate, wherein FIG. 1A shows the optical coupling structure in an oblique view, while FIG. 1B shows the same optical coupling structure in a cross-sectional view taken along a z—z cross-section indicated in FIG. 1A.

Referring to FIGS. 1A and 1B the optical coupling structure includes a Si substrate 10 carrying thereon a conductor pattern 11, and a laser diode 240 is flip-chip mounted on the substrate 10 in contact with the pattern 11. Further, the Si substrate 10 carries thereon a V-shaped groove 12 in which an optical fiber 250 is mounted. By guiding the optical fiber 250 in the guide groove 125 the optical fiber 250 establishes an optical coupling with the laser diode 240 properly. Hereinafter, the foregoing conductor pattern 11 will be referred to as a "bonding pad," while the groove 12 will be referred to as a "guide groove."

FIGS. 2A–2E show the fabrication process of the optical coupling structure of FIGS. 1A and 1B.

Referring to FIG. 2A, a silicon oxide film is formed on a (100)-oriented surface of the Si substrate 10 as a mask.

Next, in a step of FIG. 2B, a rectangular window 12W is formed on the silicon oxide mask thus formed.

Further, an anisotropic etching process is applied to the exposed part of the Si substrate 10 to form the foregoing guide groove 12 as indicated in FIG. 2C.

Next, the bonding pads 11 are formed on the Si substrate 10 by a photolithographic process in a step of FIG. 2D, and the substrate 10 is diced along a line X—X in the next step of FIG. 2E.

After the Si substrate 10 is thus formed, the laser diode 240 is mounted thereon in contact with the foregoing bonding pads 11, and the optical fiber 250 is fitted into the guide groove 12 as indicated in FIGS. 1A and 1B. As the bonding pads 11 and the guide groove 12 are aligned precisely by the photolithographic process, the laser diode 240 establishes an efficient optical coupling with the optical fiber 250 held in the groove 12.

Examples of Prior Art Type 2

FIG. 3 shows the construction of an optical coupling structure 100G according to PRIOR ART TYPE 2 disclosed in the Japanese Laid-open Patent Publication 7-151940.

Referring to FIG. 3, the optical coupling structure 100G includes a common substrate 100 on which a sub-carrier 30 and another sub-carrier 40 are mounted commonly, wherein the sub-carrier 30 carries thereon a spherical lens 230 in a groove 31 formed thereon, while the sub-carrier 40 carries thereon a laser diode 240.

It should be noted that the common substrate 100 carries thereon a rail structure including ridges 101, and the optical alignment between the laser diode 240 and the lens 230 is achieved by engaging grooves 32 and 42 provided respectively on the sub-mounts 30 and 40, with the corresponding ridges 101 when the sub-mounts 30 and 40 are mounted on the common substrate 100. The grooves 32 and 42 on the sub-mount will be referred to hereinafter as "engagement groove structure." In the example of FIG. 3, it should be noted that the grooves 32 and the grooves 42 are formed to have different widths so as to enable an adjustment of the relative height of the sub-mounts 30 and 40.

The optical coupling structure of PRIOR ART TYPE 2 is assembled in optical alignment according to the processes shown in FIGS. 4A–4I, wherein those parts corresponding to the parts described previously are designated by the same reference numerals and the description thereof will be omitted.

Referring to FIGS. 4A and 4B respectively showing a top side and a bottom side of a Si substrate 1 having a (100)-oriented principal surface, it will be noted that silicon oxide films 2 are provided on the respective top side and bottom side of the Si substrate 1 typically by a thermal oxidation process. The silicon oxide film 2 thus formed on the top surface of the Si substrate 1 is formed with square-shaped windows 31 W by a photolithographic process in correspondence the guide grooves 31 to be formed on the sub-mount 30 for accepting the lens 230. Further, the silicon oxide film 2 covering the bottom surface of the Si substrate 1 is formed with parallel elongating windows 2 W in correspondence to the parallel grooves 32 and 42. It should be noted that either of the windows 31 W and 2 W expose the surface of the Si substrate 1.

Next, in the step of FIGS. 4C and 4D, the Si substrate 1 thus masked by the oxide films 2 at both sides is subjected to an anisotropic etching process using a KOH aqueous solution as an etchant. Thereby, grooves corresponding to the guide grooves 31, as well as grooves corresponding to the grooves 32 and 42, are formed on the top and bottom surfaces of the Si substrate 1. It should be noted that FIG. 4C shows the top surface of the substrate 1 while FIG. 4D shows the bottom surface of the substrate 1.

Further, in the step of FIG. 4E, a bonding pad structure including a plurality of bonding pads 41 are formed on the silicon oxide film 2 covering the top surface of the Si
} substrate 1, and the substrate 1 thus processed is then diced in the step of FIGS. 4F and 4G into a chip forming the sub-carrier 30 and a chip forming the sub-carrier 40, respectively.

Further, in the step of FIG. 4H, the laser diode 240 is mounted on the bonding pad structure 41 on the sub-mount 40, and the spherical lens 230 is mounted on the groove 31 formed on the sub-mount 30 in the step of FIG. 4I. The lens 230 may be secured in the groove 31 by a low melting glass or an adhesive Next, the sub-mount 30 and the sub-mount 40 are mounted on the common substrate 100 such that the grooves 42 on the bottom surface of the sub-mount 40 engages with the ridges 101 formed on the substrate 100 and such that the grooves 32 on the bottom surface of the sub-mount 30 engages also with the same ridges 101 at a part adjacent to the part where the sub-mount 40 is mounted. Thereby, the laser diode 41 and the lens 230 are aligned optically as indicated in FIG. 3.

As the position of the sub-mount 30 and the position of the sub-mount 40 on the support substrate 100 are restricted by the engagement of the ridges 101 with the corresponding grooves 32 or 42, the optical alignment between the laser diode 41 and the spherical lens 230 is achieved automatically by merely mounting the sub-mounts 30 and 40 on the common substrate 100.

Further, the construction of FIG. 3 has an advantageous feature in that the relative height of the sub-mount 30 with respect to the sub-mount 40 can be adjusted by adjusting the width of the V-shaped grooves 32 with respect to the width of the V-shaped grooves 42 or by adjusting the width of the ridges 101. As the width of the grooves 32 or 42 or the width of the ridges 101 can be easily and precisely controlled at the time of the photolithography the optical coupling structure 100G allows a precise adjustment of the optical axes of the two optical components in terms of the height.

Vertical Optical Adjustment in Prior Art Type 1 Vertical Adjustment of Laser Diode On the other hand, the foregoing optical coupling structure of PRIOR ART TYPE 1 has a drawback in that the adjustment of the optical components with respect to the height thereof is generally difficult. Further, it is difficult to form a fine, precise pattern on the surface of the substrate 1 by a fine lithographic process due to the existence of the guide groove 12 on the substrate 10. Because of this, the component that can be mounted on the optical coupling structure of this prior art has been limited to a specific component such as a laser diode or an optical fiber.

Hereinafter, the difficulty of adjusting the height of the optical axis for the optical coupling structure of this type will be examined in detail.

FIG. 5 shows a typical example of mounting an edge-emission type laser diode 20 on the substrate 10 of an optical coupling structure belonging to PRIOR ART TYPE 1. It should be noted that the optical coupling structure of FIG. 5 is disclosed in the Japanese Laid-open Patent Publication 7-159141.

Referring to FIG. 5 as well as to FIGS. 6A–6C, the mounting of the laser diode 20 is achieved by forming bump-shaped projections 23a on a bottom surface of the laser diode 20 at respective predetermined locations, and the laser diode 20 is mounted on the substrate 10 such that the bump-shaped projections 23a engage with corresponding depressions 14 formed on the substrate 10.

As indicated in FIG. 6A, the laser diode 20 itself has a known construction and is provided on a single crystal device substrate 201 of n-type InP on which a lower cladding layer 202 of n-type InGaAsP is provided. Further, an active layer 25 of undoped InGaAs is provided on the lower cladding layer 202, and an upper cladding layer 203 of p-type InGaAsP is provided on the active layer 25. Further, an electrode 22 is provided in contact with the upper cladding layer 203 via a contact hole provided in an insulation film 206 covering a bottom surface of the cladding layer 203. Further, a pair of current confinement structures 204 of p-type InP are provided at both sides of a mesa structure 20s carrying the active region of the laser diode, so as to restrict a current path of the driving current, which is injected by the electrode 22 into the active layer 25 at the foregoing active regions and an n-type region 205 is formed in the current confinement structure 206 for blocking the current path other than the foregoing path of the driving current.

It should be noted that the laser diode 20 carries, on the exposed bottom surface of the insulation film 206, a conductor pattern 21, and a bump 23a is formed on such a conductor pattern 21 with a predetermined size.

In correspondence to the foregoing bump 23a, the Si substrate 10 is formed with a V-shaped depression or etch pit 14 as indicated in FIG. 6B for accepting the bump 23a when the laser diode 20 is mounted on the Si substrate 10. As indicated in FIG. 6B by a dotted line, the bump 23a engages with the depression 14 at a point P separated from a top surface of the substrate 10 by a distance a. Thus, the distance a can be changed by changing the size of the bump 23a with respect to the size of the depression 14. In order to secure a reliable engagement of the bump 23a with the depression 14, it is preferable to set the distance a to be at least about 5 $\mu$m.

It should be noted that the Si substrate 10 carries, on the oxide film 2 covering the surface thereof, an electrode structure 15 including a conductor pattern 15b in contact with an electrode pad 15a also provided on the oxide film 2, wherein the conductor pad 15a supports thereon a dome-shaped conductive bump 16 via an intervening conductor pad 15c. The conductive bump 16 may be formed of a conductive adhesive resin.

Thus, upon mounting of the laser diode 20 on the substrate 10, the laser diode 20 is properly positioned as a result of the engagement of the bump 23a with the corresponding V-shaped etch pit 14 as indicated in FIG. 6C. Thereby, the conductive bump 16 develops an intimate contact with the corresponding electrode 22 on the bottom surface of the laser diode 20.

FIGS. 7A–7E show the process of forming the bump 23a.

Referring to FIG. 7A the laser diode 20 is formed with the foregoing conductor pattern 21 at a predetermined location on the bottom surface of the device. In the illustrated state of FIG. 7A in which the laser diode 20 is represented upside down as compared to the state of FIG. 7A, the bottom surface is illustrated at the top side. The conductor pattern 21 is formed of a material that forms an intimate contact with the material used for the bump 23a. Further, the pattern 21 formed on the insulation film 206 may be an isolated pattern. In a representative example, the insulation film 206 is formed of SiN.

Next, in the step of FIG. 7B, a low melting metal 23p is deposited on the pattern 21. Thereby, the deposition is made such that the low melting metal forms a cylindrical pattern having a predetermined diameter and a predetermined volume.

Further, the structure of FIG. 7B is heat treated in the step of FIG. 7C to cause a deformation in the low temperature metal 23p to form the desired generally spherical or dome-shaped bump 23a.

The laser diode thus formed is then mounted on the substrate 10 formed with the foregoing groove 14 and the electrode structure 15 in the step of FIG. 7D. It should be noted that the conductor pattern 15b is formed of a material that develops an intimate contact with the material forming the electrode bump 16. The electrode bump 16, in turn, may be formed of a low melting metal and is subjected to a heat treatment process to cause a melting therein. As a result of the melting, the electrode bump 16 takes the desired dome-shaped form.

The laser diode 20 is mounted on the substrate 10 in the state that the electrode bump 16 experiences the foregoing melting. Thus, upon cooling, the electrode bump 16 establishes a firm mechanical as well as electrical contact with the electrode 22 of the laser diode 20, which laser diode 20 being mounted on the substrate 10 in the state that the bumps 23a engage with the corresponding grooves 14 as indicated in FIG. 7E. It is also possible to use a conductive resin for the electrode bump 16.

The adjustment of the relative height of the laser diode 20 on the substrate 10 is conducted for the optical coupling structure of this prior art as follows.

Assuming that the insulation film 206 has a thickness of 0.2 $\mu$m, the conductor pattern 21 has a thickness of 0.3 $\mu$m, the bump 23a has a diameter of 40 $\mu$m, the groove 14 has a size of 50 $\mu$m at the top part thereof, the oxide film 2 has a thickness of 1 $\mu$m, the cladding layer 203 has a thickness of 1.5 $\mu$m, and the active layer 25 has a thickness of 0.14 $\mu$m, and further assuming that an angle $\theta$, which is defined between the principal surface of the pattern 21 and a line connecting a center of the bump 23a and an edge of the pattern 21, is set to 30°, it is derived that a relative height $h_1$ of the optical axis, which represents the distance as measured from the top surface of the Si substrate 10 (interface between the Si substrate 10 and the oxide film 2) to the center of the active layer 25, becomes about 12 $\mu$m.

Further, by adjusting the size of the groove 14 or the size of the bump 23a, it becomes possible to change the relative height of the laser diode 20. For example, the relative height $h_1$ may be reduced to 5 $\mu$m when the size of the groove 14 is increased to 59 $\mu$m at the top part thereof. On the other hand, the distance a is reduced to about 5 $\mu$m when the size of the groove 14 is reduced to 40 $\mu$m at the top part thereof. In this case, the relative height $h_1$ of the optical axis becomes about 19 $\mu$m. Thus, the optical coupling structure of this prior art can adjust the relative height of the optical axis within the range of about 5 $\mu$m and 18 $\mu$m.

On the other hands there are other optical coupling structures also belonging to PRIOR ART TYPE 1 as indicated in FIG. 8, which shows a structure disclosed in IEEE Transactions Photonics Technology Letters, vol. 3, no. 11, November 1991, pp. 985–987. Further, FIGS. 9A and 9B show the laser diode 20 and the substrate 10 respectively forming a part of the optical coupling structure of FIG. 8, wherein those parts corresponding to the parts described previously are designated by the same reference numerals and the description thereof will be omitted.

Referring to FIG. 8 as well as FIG. 9A, the laser diode 20 carries bonding pads 23b of a low melting metal on the bottom surface thereof in place of the metal bumps 23a of FIG. 6A, and the laser diode 20 thus formed is mounted on the substrate 10 such that the bonding pads 23b engage with corresponding bonding pads 11c provided on the top surface of the substrate 10 as a part of the conductor pattern 11, together with a wiring pattern 11a and an insulation film 11b covering the part of the oxide film 2 not covered by the wiring patter 11a. See FIG. 9B.

It should be noted that the laser diode 20 carries the bonding pad 23b in correspondence to the bonding pad 11b on the Si substrate 10, wherein the bonding pad 23b is provided on the laser diode 20 in correspondence to the mesa region 20S and injects a drive current to the active layer 25 in the mesa region 20S as indicated in FIG. 9A, similarly to the construction of FIG. 6A. For this purpose, the bonding pad 23 achieves an electrical contact with the cladding layer 203 via the electrode 21 across a contact hole provided on the insulation film 206.

In a typical example, the insulation film 206 has a thickness of 0.2 $\mu$m, the electrode 21 has a thickness of 0.5 $\mu$m and the bonding pad 23b has a thickness of 2.5 $\mu$m in the laser diode 20, while the oxide film 2 on the substrate 10 has a thickness of 1 $\mu$m. Further, the wiring pattern 11a has a thickness of 0.3 $\mu$m, and the bonding pad 11c has a thickness of 0.25 $\mu$m. Further, the cladding layer 203 of the laser diode 20 has a thickness of 1.5 $\mu$m, while the active layer 25 has a thickness of 0.14 $\mu$m. In the optical coupling structure of the foregoing specification, a relative height $h_2$ of the optical axis of the laser diode 20 with respect to the substrate 10 as represented by the distance from the top surface of the Si substrate 10 (interface between the substrate 10 and the oxide film 2) to the center of the active layer 25 is set to about 6.52 $\mu$m in the assembled state shown in FIG. 9C.

In the optical coupling structure of FIGS. 9A–9C, it will be understood that there is no way to adjust the foregoing relative height $h_2$, except by changing the thickness of the bonding pads 23b or 11c. However, the effect of such an approach is limited, and the adjustment can be possible only in the range between about 6 $\mu$m and about 10 $\mu$m for the relative height $h_2$.

FIGS. 10A–10C show a third example of the optical coupling structure according to PRIOR ART TYPE 1.

Referring to FIG. 10A, the laser diode 20 carrying bumps 23c of a low-melting metal on the bottom surface thereof is placed on the substrate 10 that in turn carries the conductor patterns 11 on the top surface thereof. Thereby, the laser diode 20 is placed in a face-down state such that the bumps 23c contact with the corresponding conductor patterns 11.

Next, the assembly of FIG. 10A is applied with a thermal annealing process in the step of FIG. 10B such that the bumps 23c experience a melting, and each of the molten bumps 23c develops an intimate contact with the corresponding conductor pattern 11 as indicated FIG. 10B.

In FIG. 10B, it should be noted that the molten bumps 23c experiences a substantial deformation when the alignment between the laser diode 20 and the substrate 10 is improper. Thus, the molten bumps 23c experience a force, caused by surface tension, to recover a proper shape thereof, in which the surface area is minimum. As a result of restoration of the proper shape of the molten bumps 23c, the laser diode 20 is aligned properly and automatically with respect to the substrate 10. By cooling the assembly of FIG. 10B in such a self-aligned process, it is possible to obtain an optical coupling structure in which the laser diode 20 is connected firmly on the substrate 10 mechanically as well as electrically in a state that the laser diode 20 is aligned properly with respect to the substrate 10. A more detailed description for such a self-alignment mounting process is described in IEEE Transactions on Components Hybrids and Manufacturing Technology, vol. 15, no. 2, April 1992, pp. 225–230.

FIGS. 11A and 11B show a part of the foregoing optical coupling structure in an enlarged scale, wherein those parts corresponding to the parts described previously are designated by the same reference numerals and the description thereof will be omitted.

Referring to FIG. 11A, the laser diode 20 has a construction substantially identical with the construction of the laser diode 20 of FIG. 6A, except that the bump 23a and hence the conductor pattern or electrode pattern 21 underneath is provided in alignment with the mesa structure 20s where the active region of the laser diode is formed. Further, the substrate 10 carries the conductor pattern 11 in correspondence to the foregoing bump 23a.

In a typical example, the assembled structure of FIG. 11C includes the insulation film 206 with a thickness of 0.2 $\mu$m, the electrode pattern 21 with a thickness of 0.5 $\mu$m and the bump 23c with a diameter of 40 $\mu$m, wherein the angle θ formed between the principal surface of the pattern 21 and the line connecting the center and the top edge of the bump 23c is set to 30°. The oxide film 2 on the substrate 10, on the other hand, has a thickness of 1 $\mu$m, the wiring pattern 11a has a thickness of 0.3 $\mu$m, the insulation film 11b has a thickness of 0.2 $\mu$m, and the thickness of the pattern 11c of the bonding pad has a thickness of 0.25 $\mu$m. Further, the cladding layer 203 of the laser diode 20 has a thickness of 1.5 $\mu$m, and the active layer 25 has a thickness of 0.14 $\mu$m.

When the optical coupling structure of FIG. 11C is formed according to the foregoing specification, it should be noted that a height $h_3$, which indicates a distance between a middle point of the active layer 25 and the top surface of the Si substrate 10 (interface between the substrate 10 and the oxide film 2 thereon), takes a value of about 22 $\mu$m, wherein this value of the height $h_3$ can be adjusted in the range between about 17 $\mu$m and about 22 $\mu$m, by adjusting the diameter of the bump 23c in the range between 30 $\mu$m and 40 $\mu$m.

FIG. 12 shows a further example of the optical coupling structure according to PRIOR ART TYPE 1, wherein those parts corresponding to the parts described previously are represented by the same reference numerals and the description thereof will be omitted.

Referring to FIG. 12, the laser diode 20 used in the optical coupling structure of this example includes a projection 21p of a trapezoidal shape at a bottom side thereof formed by an anisotropic etching process, and the laser diode 20 thus formed with the projection 21p is mounted on the substrate 10 such that the projection 21p engages with a corresponding groove 11g of a trapezoidal shape formed on the substrate 10.

FIG. 13 shows the cross-section of the laser diode 20 as mounted on the substrate 10.

Referring to FIG. 13, the laser diode 20 is mounted such that the oblique surfaces defining the trapezoidal projection 21p contact with corresponding oblique surfaces of the groove 11g. As a result of such an engagement of the oblique surfaces, the position of the laser diode 20 is restricted on the substrate 1 laterally as well as vertically, and the optical axis is adjusted with respect to the substrate 10 vertically as well as laterally.

In the construction of FIG. 13, it should be noted that the trapezoidal projection 21p carries an electrode 21a on a top part thereof, wherein the electrode 21a is connected to the conductor pattern 11a provided at the bottom of the trapezoidal groove 11g by way of a low melting bump similar to the metal bump 23c or a conductive adhesive. The low melting bump or the conductive adhesive thereby connects the laser diode 20 to the substrate 10 mechanically as well as electrically. Similarly as before, the electrode 21a establishes an ohmic contact with the semiconductor crystal forming the part of the laser diode 20 to which the electrode 21a is provided.

In the optical coupling structure of FIG. 13, the relative height of the optical axis of the laser diode 20 can be adjusted with respect to the substrate. 10 as follows. In the explanation hereinafter, it will be assumed that the trapezoidal projection 21p has a width of 100 $\mu$m at the top part while the trapezoidal groove 11g has a width of 121 $\mu$m at the top surface, the cladding layer of the laser diode 20 has a thickness of 1.5 $\mu$m, and the thickness of the active layer 25 has a thickness of 0.14 $\mu$m.

Assuming the foregoing specification of the parameters, it is derived that the center of the active layer of the laser diode 20 is located at a height $h_4$ of about −8 $\mu$m as measured from the top surface of the substrate 10 (part of the top surface where there is no groove 11g). The negative sign of the height $h_4$ indicates that the optical axis is located below the top surface of the substrate 10.

It will be easily understood that the construction of FIG. 13 provides only a very limited possibility of adjustment of the optical axis. Further, the construction of FIG. 13 has a drawback in that it is difficult to set the optical axis above the top surface of the substrate 10.

In the foregoing prior art examples explained heretofore, it should be noted that the laser diode 20 is mounted on the substrate 10 in a face-down state in which the electrode 21 at the top side of the laser diode 20 is located at the bottom side and connected to the electrode 11 or 15 on the top surface of the substrate 10, by mounting the laser diode 20 in a turned-over state. By doing so, the precision of alignments including the precision of the height of the active layer, is improved substantially.

The reason of this is explained as follows.

Concerning the precision of the positioning, it should be noted that the electrode 21 of the laser diode 20 is formed by a photolithographic patterning process conducted while using the stripe region 20S, more precisely the projection or depression associated with the stripe region 20S, as an alignment mark. The mesa structure 20S, which includes therein the active layer 25, is used also as a marker when forming the bonding pad pattern 21 of FIG. 5 or an alignment marker 27 of FIG. 8. It should be noted that the alignment marker 27 of FIG. 8 is used for achieving an alignment of the laser diode 20 with respect to a corresponding alignment marker 17 formed on the substrate 10.

Obviously, the precision or accuracy of the alignment of the pattern 21 or the marker 27 with respect to the active region 20S of the laser diode 20 is much better in the case of forming the pattern 21 or the marker 27 on the top side of the laser diode 20 and mounting the laser diode 20 upside down in the face-down state as explained above, than in the case in which the pattern 21 or the marker 27 is provided at the bottom side of the laser diode 20 (top side in the face-down state of the laser diode 20).

Concerning the precision with respect to the height, it should be noted that the height of the optical axis such as the height $h_1$ of FIG. 6A includes the contribution of the thickness of the device substrate 201 when the laser diode 20 is mounted on the support substrate 1 upright in a face-up state. However, precise control of the substrate thickness is substantially difficult because of the reasons noted below.

When fabricating the laser diode 20, the thickness of the device substrate such as the InP substrate 201 of FIG. 6A is set to about 300 $\mu$m so as to secure a sufficient mechanical strength during the fabrication process of the device. After the laser diode 20 is formed, the device substrate 201 is subjected to a polishing process for reducing the substrate thickness to about 100 $\mu$m, followed by a cleaving process for forming the optical cavity as a result of the cleavage of the InP substrate thus polished. Typically, the optical cavity length of the laser diode 20 is set to 200–300 $\mu$m, while the substrate used in the final finishing step of the polishing process has a very small size typically of 20 mm×20 mm or less.

It should be noted that the polishing of such a small substrate with high precision is extremely difficult. The maximum precision attainable in such a polishing process is limited to about ±10 μm at best. On the other hand it is required to align the laser diode 20 with other optical components within the error of ±2.5 μm in order to achieve an efficient optical coupling. Thus, when the laser diode 20 is mounted on the substrate 10 in the usual, face-up state, the necessary precision of optical alignment is not attained.

Vertical Adjustment of Photodiode

Next a conventional process of mounting a photodiode on a substrate as well as the adjustment of the optical axis with respect to the substrate will be explained.

Generally, a photodiode is classified either to an edge reception type or a planar reception type, wherein the edge reception type photodiode is mounted on the photodiode similarly to an edge emission type laser diode, except that the optical axis is located slightly higher than the optical axis of the laser diode 20 by about 4 μm due to the increased thickness of the photoreception layer, which typically has a thickness of 1–10 μm.

FIGS. 14A and 14B show the construction of an optical coupling structure that includes a planar-type photodiode 60 as disclosed in Electronic Letters, vol. 24, no. 5, pp. 918–919, 1988, wherein FIG. 14A shows the optical coupling structure in an elevational cross section, while FIG. 14B shows the optical coupling structure in a plan view.

Referring to FIGS. 14A and 14B, the optical coupling structure includes the Si substrate 10 similarly as before, wherein the photodiode 60 is provided on the Si substrate 10 such that a mirror surface 18 formed at a tip end of the V-shaped groove 12 formed on the Si substrate 10, reflects an optical beam guided along an optical fiber 250, which is fitted into the groove 12. Thereby, the optical beam emitted at an edge surface of the optical fiber 250 is reflected by the mirror surface 18 and establishes an efficient optical coupling with a photoreception part 65 of the photodiode 60.

Vertical Adjustment of Optical Fiber

FIGS. 15A–15C show the adjustment of the optical axis in the conventional optical coupling structure of FIGS. 14A and 14B, wherein FIG. 15A shows the optical coupling structure in a plan view while FIG. 15B shows the optical coupling structure in an elevational cross-sectional view. Further, FIG. 15C shows the optical coupling structure in an end view.

Referring to FIG. 15A, the substrate 10 is formed with the groove 12 accepting an optical fiber having a diameter of 100 μm, wherein the substrate 10 carries on the upper major surface thereof bonding pads 11 and 61 for connecting the photodiode 60 to the substrate 10. In order to receive the optical beam emitted from the edge surface of the optical beam and reflected by the mirror surface 18 at the photoreception region 65 of the photodiode 60, it is necessary that the photodiode 60 has a substantial size as indicated in the plan view of FIG. 15A. In FIG. 15A it will be noted that each of the pads 11 and 61 has a diameter of 40 μm and is separated from the outer periphery of the circular photoreception region 65, which may have a diameter of 100 μm, by a distance of 50 μm. The photodiode 60 itself has a size of 310 μm×310 μm, in order that the bonding pads 11 or 61 are formed without interfering the optical groove 12 or the optical path of the optical beam emitted at the edge surface of the optical fiber 250. In the illustrated example, the optical axis of the optical fiber that optically aligns with the center of the photoreception region 65 upon reflection by the mirror surface 18, is located at a height of about –47 μm from the top surface of the substrate 10 as indicated in FIG. 15B. By changing the diameter of the photoreception region 65 or by changing the location of the bonding pads 11 and 61 relative to the substrate 10, the optimum height of the optical axis changes also.

Hereinafter, the conventional process for mounting the optical fiber 250 on the substrate 10 will be examined particularly with reference to the FIG. 16.

Referring to FIG. 16, the V-shaped groove 12 formed on the Si substrate 10 has a depth H as measured from the (100)-oriented top surface of the substrate 10 and a width 2 W on the foregoing top surface. Thereby, the height H is given by the width W multiplies with √2 (H=√2 W), assuming that the side walls defining the V-shaped groove 12 intersect at the angle of 60° at the bottom of the groove 12.

When the optical fiber 250 having a diameter D is mounted on the substrate 12 in engagement with the V-shaped groove 12 as indicated in FIG. 16, it should be noted that the distance or level a of the point P where the outer periphery of the optical fiber 250 contacts with the side walls of the V-shaped groove 12 as measured from the foregoing (100)-oriented top surface, changes depending on the lateral size W of the groove 12. In response to the change of the level a, a height $h_6$ of the optical axis of the optical fiber 250 as measured from the top surface of the substrate 10 changes such that the height $h_6$ decreases when the level a decreases and increases when the level a decreases.

As will be apparent from FIG. 16, the height $h_6$ becomes maximum when the level a is zero. However, such a state is mechanically unstable and it is necessary to secure a value of at least about 10 μm for the level a. When the level a is set to 10 μm, the height $h_6$ of the optical fiber is about 26 μm.

The foregoing analysis indicates that the height $h_6$ of the optical axis of the optical fiber 250 cannot be increased beyond 26 μm in the construction of FIG. 16.

Vertical Adjustment of Lens

Next, the adjustment of a spherical lens on a substrate will be examined.

In an optical coupling structure of PRIOR ART TYPE 1, a spherical lens similar to the lens 230 of FIG. 3 is used, although the optical coupling structure of FIG. 3 is of the type belonging to PRIOR ART TYPE 2, for converting an output beam of a laser diode into a parallel optical beam It should be noted that such a parallel optical beam produced by the spherical lens in fact causes a beam divergence more or less as it propagates along the optical axis of the lens as a result of diffraction, wherein the degree of divergence depends on the beam spot size. Thus, the divergence tends to be pronounced when the beam spot size is small.

FIG. 17 shows the diffraction of a parallel optical beam.

Referring to FIG. 17, an initial beam spot size $\omega_0$ of an optical beam 7 changes to $\omega(z)$ after traveling a distance z, according to the relationship $$\omega(z)=\omega_0\times[1+(\lambda z/\pi\omega_0)^2]^{1/2}$$

wherein λ stands for the wavelength of the optical beam.

The foregoing relationship indicates that the divergence of the beam spot size decreases with increasing initial beam spot size $\omega_0$.

FIG. 18 shows examples of the calculation of the beam divergence for various initial beam spot sizes $\omega_0$, wherein curves (a)–(d) represent the beam divergence respectively for the initial beam spot sizes $\omega_0$ of 50 μm, 75 μm, 100 μm and 150 μm. FIG. 18 clearly indicates that the beam divergence increases steeply with decreasing initial beam spot size $\omega_0$. Thus, it is desired to increase the beam spot size as much as possible in order to suppress the beam divergence of a parallel optical beam. For example, it is necessary to secure a size of about 100 μm for the initial beam spot size $\omega_0$ in order to suppress the beam divergence to 10% or less after traveling a distance z of 10 mm.

In actual optical systems, it is generally practiced to use two lenses, $L_1$ and $L_2$, such that there is formed a beam waist between the lenses $L_1$ and $L_2$. For example, it is possible to set the optical beam spot $\omega_1$ at the lens $L_1$ to be generally equal to the optical beam spot $\omega_3$ at the lens $L_2$ of FIG. 19, by setting the height of the optical axes of the lenses $L_1$ and $L_2$ to be 110 μm or more and by setting the beam spot size to be 110 μm or more. Here, the length L is set to 20 mm.

The foregoing analysis indicates that, while the required beam spot size may depend on the optical system, it is desired to set the optical beam spot to be about 100 μm or more. This, in turn, means that it is required to increase a height $h_7$ of the optical axis of the optical system also to about 100 μm or more.

Vertical Adjustment of Optical Waveguide

Next, the adjustment of an optical waveguide on the substrate for the optical coupling structure according to the PRIOR ART TYPE 1 will be examined.

FIG. 20 shows a conventional optical waveguide known as PLC as described in Electronic Letters, vol. 29, no. 5, pp. 444–446, 1993.

Referring to FIG. 20 showing the optical waveguide in a cross sectional view taken perpendicularly to the optical axis thereof, it will be noted that the optical waveguide includes a lower cladding layer 267 formed on the Si substrate 10, and a core layer 268 is provided on the lower cladding layer 267 such that the core layer 268 is buried under an upper cladding layer 269 provided on the lower cladding layer 267. The core layer 268 has a refractive index chosen so as to provide an optimum refraction index difference Δn with respect to the lower as well as upper cladding layers 267 and 269, wherein the refractive index difference Δn is defined as $$\Delta n = [(n_2 - n_1)/n_1] \times 100\%$$

wherein $n_1$ stands for the refractive index of the cladding layer 267 or 269 while $n_2$ stands for the refractive index of the core 268.

In a typical example, the refractive index difference Δn is set to 0.75%, while the core layer 268 has a cross-sectional size of 6 μm×6 μm. Further, the lower cladding layer 267 has a thickness of 30 μm.

The optical waveguide 133 having such a specification has the optical axis at a height $h_8$ of 33 μm. As long as Si is used for the substrate and the refractive index difference Δn is set similarly as above, the height $h_8$ of the optical axis becomes about 8 μm even when other material such as a fluorine-contained polyimide is used for the optical waveguide. An example of the optical waveguide formed of such a fluorine-contained polyimide is described in Electronic Letters vol. 29, no, 24, pp. 2107–2109, 1993.

Further, the foregoing reference, Electronic Letters, vol. 29, no. 5, pp. 444–446, 1993 also disclose a PLC waveguide structure in which a groove is formed on the substrate. A similar structure is disclosed also in Technical Digest of Fifth optoelectronic Conference, pp. 326–237, 1994. By forming a groove on the substrate, it is possible to reduce the height $h_8$ of the optical axis to 2–5 μm. However, the structure disclosed in these references has a drawback in that the construction of the optical coupling structure becomes substantially complex as compared with the case of using a flat substrate. The optical coupling structure proposed in these references will be referred to hereinafter as "PLC on a substrate carrying a terrace structure."

Problem of Prior Art Type 1

As noted previously, the height of the optical axis of the laser diode falls in the range of 5–18 μm when the first construction is used for the laser diode 20. This height can be adjusted in the range of 6–10 μm when the second construction is used for the laser diode 20. Further, the height of the optical axis can be adjusted in the range of 17–22 μm when the third construction is used, while the height of the optical axis becomes to be about −8 μm when the fourth construction is used for the laser diode 20.

About the edge reception type photodiode, the optical axis has a height approximately same or slightly larger (about 5 μm) than the optical axis of the laser diode. On the other hand, the optical axis of the planar reception type photodiode is formed at a level of about −47 μm.

On the other hand, the optical fiber has the optical axis at the height of 26 μm or less, while the spherical lens has the optical axis at the height of 100 μm or more. Further, the optical waveguide has the optical axis at the height of about 33 μm.

Thus, it is clear that the optical coupling structure of PRIOR ART TYPE 1 encounters, except for the one that uses the foregoing PLC structure formed on a substrate that carries a terrace structure, a substantial difficulty of achieving an alignment of the optical axes of the various optical components mounted on the substrate. This difficulty of optical alignment will be referred to hereinafter as "FIRST PROBLEM."

Furthers the optical coupling structure of PRIOR ART TYPE 1 suffers from the difficulty of forming a pattern or an optical waveguide an the substrate due to the projection or depression formed on the surface of the substrate. Hereinafter, the problem of forming a pattern or a guide groove on the substrate will be examined.

When forming the optical coupling structure of FIG. 1A, for examples it is necessary to form the guide groove 12 of the optical fibers followed by the formation of the bonding pads 11. Thereby, the existence of the guide groove 12 on the substrate 10 makes it substantially difficult to apply a photolithographic process for forming the bonding pads on the substrate 10.

For examples a V-shaped groove having a width of about 140 μm and a depth of about 100 μm may be formed on the substrate 10 as the guide groove 12 by an etching process, wherein it should be noted that the etching process has to be conducted prior to the formation of the bonding pads 11 in order to avoid the corrosion of the bonding pads 11 by the etchant used for such an etching process. This, in turns means that the photolithographic process has to be conducted on the structure that is already formed with a deep and wide groove.

In such a photolithographic process, a photoresist is applied on the structure to be exposed, typically by a spin coating process. When the structure on which the photoresist is applied is already formed with such a deep and wide groove, it should be noted that the distribution of the photoresist on the substrate becomes inevitably inhomonegous, leading to a substantial fluctuation in the thickness of the photoresist layer. When an optical exposure is made on such a photoresist layer of which thickness is not uniform, there arises various problems such as poor or excessive exposure, optical diffraction or refraction, and the like. Thereby, there is a substantial risk that the exposed pattern exposed on the photoresist is deformed severely. Further, some of the resist patterns may remain on the substrate even after a development process.

FIGS. 21A–21C show the effect of such a groove 12 formed on the Si substrate 10 on the thickness of a photoresist layer.

Referring to FIG. 21A, the Si substrate 10 is formed with the V-shaped groove 12 similarly as before, wherein a resist layer 8 is formed on the structure of FIG. 21A in the step of FIG. 21B by a spin coating process. As indicated in FIG. 21B, the resist layer 8 thus formed tend show an increased thickness in the vicinity of the V-shaped groove 12. Thus, the patterning of the bonding pads 11 by exposing the resist layer 8 tends to induce the problem of deformation of the patterned bonding pads 11. This problem becomes particularly serious when forming the bonding pads 11 as close to the groove 12 as possible for reducing a distance d between the laser diode 20 and the optical fiber 250. This problem of deformation of the bonding pad pattern due to the non-uniform thickness of the resist layer will be referred to hereinafter as "SECOND PROBLEM."

Vertical Optical Adjustment in Prior Art Type 2

PRIOR ART TYPE 2 is proposed for eliminating the FIRST PROBLEM discussed above.

In the case of the optical coupling structure of FIG. 3 where the sub-carrier 30 and the sub-carrier 40 are formed from the same, common mother substrate 1, the sub-carrier 30 and the sub-carrier 40 have a common thickness. On the other hand, the relative height of the sub-carrier 30 with respect to the sub-carrier 40 on the common substrate 100 can be adjusted by forming the engagement groove structures 32 and 42 to have respective, predetermined sizes and shapes. For example, it is possible to align the height of the optical components 230 and 240 by adjusting the width of the grooves 32 and 42 appropriately with respect to the width of the ridges 101. Thus, the foregoing FIRST PROBLEM can be eliminated by the construction of FIG. 3.

Further, it is also possible to eliminate the SECOND PROBLEM, by using separate mother substrates or wafers, one for the sub-carrier 40 carrying the bonding pads 41 and one for the sub-carrier 30 carrying the groove 310 However, this approach, using different wafers for the sub-carrier 30 and the sub-carrier 40, raises the problem that it is necessary to select the wafers for the sub-carrier 30 and the sub-carrier 40 with respect to the wafer thickness.

Generally, a Si wafer shows a substantial wafer-to-wafer variation for the thickness, which can reach as much as ±5 μm. Thus, in order to achieve the desired optical alignment between the optical components, it is essential to select the wafers such that the thickness of the wafer for the sub-carrier 30 matches the thickness of the wafer for the sub-carrier 40. However, such a selection process necessitates to stock a large amount of Si wafers, some of which may be not used at all.

In order to avoid this problem, it is necessary to change the width of the grooves 32 or 42 at the bottom side of the sub-carriers or the width of the ridges 101 on the common substrate 100. This approach, however, neccesitates to prepare a large number of photomask and select one of them for the exposure in correspondence to the thickness of the substrate. Thereby, the cost of the mask pattern increases substantially. Further, changing the photomask in the exposure process for each wafer is tedious and increases the cost of the produced optical coupling structure. This problem will be referred to as "THIRD PROBLEM."

Obviously, the third problem is avoided by using the same wafer for the sub-carrier 30 and the sub-carrier 40. In this case, however, the elimination of the SECOND PROBLEM becomes difficult. When forming the bonding pads 41 on the substrate 1 as indicated in FIG. 4H, it should be noted that it is necessary to conduct the photolithographic process on the substrate 1 on which the grooves 31 for the lens are already formed for avoiding the corrosion of the bonding pads 41, similarly to the case of forming the structure of FIG. 1A.

In addition, the optical coupling structure of PRIOR ART TYPE 2 suffers from the problem of optical misalignment caused between an optical component and an optical waveguide. The optical waveguide typically has the structure shown in FIG. 20, wherein the exact control of the height of the lower cladding layer 267 is difficult due to the large thickness of the layer 267. When there is an error of 10% in the thickness of the cladding layer 267, for example, there appears an error of as much as 3 μm in the height of the core layer 268 formed on the cladding layer 267. This problem of the alignment error caused by the error in the thickness of the lower cladding layer 267 will be referred to hereinafter as "FOURTH PROBLEM."

Thus, even when the optical coupling structure according to PRIOR ART TYPE 2 is used, the foregoing FIRST through FOURTH PROBLEMS are not eliminated except for the SECOND PROBLEM.

SUMMARY OF THE INVENTION

Accordingly, it is a general object of the present invention to provide a novel and useful optical coupling structure and a fabrication process thereof wherein the foregoing problems are eliminated Another and more specific object of the present invention is to provide an optical coupling structure that achieves an efficient optical coupling between various optical components easily and with low cost.

Another object of the present invention is to provide an optical coupling structure including a plurality of sub-carriers each carrying an optical component and a common substrate carrying the foregoing sub-carriers, wherein each of the sub-carriers includes a mechanism for adjusting a height of an optical axis of the optical component thereon.

Another object of the present invention is to provide an optical coupling structure comprising:

a common substrate carrying a first engagement structure on a principal surface thereof;

a first sub-carrier having a first principal surface and a second, opposing principal surface and mounted on said common substrate in a state that said second principal surface faces said principal surface of said common substrate, said first sub-carrier carrying a second engagement structure including a plurality of engagement elements on said second principal surface, such that one of said engagement elements engages with said first engagement structure when said first sub-carrier is mounted on said common substrate, said first sub-carrier carrying an optical component on one of said first and second principal surfaces; and a second sub-carrier having a third principal surface and a fourth, opposing principal surface and mounted on said common substrate in a state that said fourth principal surface faces said principal surface of said common substrate, said second sub-carrier carrying a third engagement structure on said fourth principal such that said third engagement structure engages with said first engagement structure when said second sub-carrier is mounted on said common substrate, said second sub-carrier carrying a second optical component on one of said third and fourth principal surfaces;

said plurality of engagement elements forming said second engagement structure having respective, mutually different heights with respect to said second principal surface, such that a distance between said principal surface of said common substrate and said second principal surface is changed by selecting said engagement element from said second engagement structure for engagement with said first engagement groove structure.

said engagement element being selected such that said first optical component aligns optically with said second optical component.

Another object of the present invention is to provide an optical coupling structure, comprising:

a substrate carrying a first engagement structure on a principal surface thereof; and a sub-carrier having a first principal surface and a second, opposing principal surface and mounted on said substrate in a state that said second principal surface faces said principal surface of said substrate, said sub-carrier carrying a second engagement structure including a plurality of engagement elements on said second principal surface, such that one of said engagement elements engages with said first engagement structure when said sub-carrier is mounted on said substrate, said sub-carrier carrying an optical component on one of said first and second principal surfaces;

said plurality of engagement elements forming said second engagement structure having respective, mutually different sizes such that a distance between said principal surface of said common substrate and said second principal surface is changed by selecting said engagement element from said second engagement structure for engagement with said first engagement structure.

Another object of the present invention is to provide an optical coupling structure, comprising:

a substrate carrying a first engagement structure on a principal surface thereof; and a sub-carrier having a first principal surface and a second, opposing principal surface and mounted on said substrate in a state that said second principal surface faces said principal surface of said substrate, said sub-carrier carrying a second engagement structure for engagement with said first engagement structure when said sub-carrier is mounted on said substrate;

a mounting structure provided on one of said first and second principal surfaces of said sub-carrier in the form of depressions having mutually different sizes; and an optical component mounted on one of said depressions.

Another object of the present invention is to provide a method of fabricating an optical coupling structure including a substrate carrying a first engagement structure on a principal surface thereof and a sub-carrier having a first principal surface and a second, opposing principal surface, said sub-carrier being mounted on said substrate in a state that said second principal surface faces said principal surface of said substrate, said sub-carrier carrying a plurality of groove pairs each formed of a pair of parallel grooves on said second principal surface as a second engagement structure for engagement with said first engagement structure said grooves of different pairs having mutually different widths, said method comprising the steps of:

defining a plurality of blocks on a mother substrate, each of said blocks including groove pairs corresponding to said groove pairs forming said second engagement structure, said blocks being defined in a mutually overlapping relationship such that such that a groove constituting a groove pair of an adjacent block is formed between a groove constituting a groove pair in a block under consideration and an adjacent groove also constituting an adjacent groove pair in said block under consideration;

measuring a thickness of said mother substrate; and dicing said mother substrate to form a sub-carrier such that a selected groove pair is included in said sub-carrier thus obtained, said selected groove pair being selected as a result of measurement of said thickness of said mother substrate.

Another object of the present invention is to provide a method of fabricating an optical coupling structure including: a common substrate carrying a pair of parallel ridges on a principal surface thereof as a first engagement structure; a first sub-carrier having a first principal surface and a second, opposing principal surface and mounted on said common substrate in a state that said second principal surface faces said principal surface of said common substrate, said first sub-carrier carrying a second engagement structure including a plurality of groove pairs each formed of a pair of parallel grooves on said second principal surface such that one of said groove pairs forming said second engagement structure engages with said ridges forming said first engagement structure when said first sub-carrier is mounted on said common substrate, said first sub-carrier carrying a first optical component on one of said first and second principal surfaces; and a second sub-carrier having a third principal surface and a fourth, opposing principal surface and mounted on said common substrate in a state that said fourth principal surface faces said principal surface of said common substrate, said second sub-carrier carrying a third engagement structure including a plurality of groove pairs each formed of a pair of parallel grooves on said fourth principal such that one of said groove pairs forming said third engagement structure engages with said ridges forming said first engagement structure when said second sub-carrier is mounted on said common substrate, said second sub-carrier carrying a second optical component on one of said third and fourth principal surfaces; said grooves forming said groove pairs of said second engagement structure having respective sizes different in each groove pair, such that a distance between said principal surface of said common substrate and said second principal surface is changed by selecting said groove pair from said second engagement structure for engagement with said first engagement groove structure;

said method comprising the steps of:

defining a plurality of blocks on a first mother substrate such that each of said blocks includes said plurality of groove pairs forming said second engagement structure;

defining a plurality of blocks on a second mother substrate such that each of said blocks includes said plurality of groove pairs forming said third engagement structure;

measuring a thickness of said first mother substrate;

measuring a thickness of said second mother substrate;

dicing said first mother substrate to form said first sub-carrier, such that said first sub-carrier includes a selected groove pair as said second engagement structure, dicing said second mother substrate to form said second sub-carrier, such that said second sub-carrier includes a selected groove pair as said third engagement structure;

said selected groove pair forming said second engagement structure and said selected groove pair forming said third engagement structure being selected based upon a result of measurement of said thickness of said first mother substrate and a result of measurement of said thickness of said second mother substrate, such that said first optical component aligns optically to said second optical component.

Another object of the present invention is to provide a method of fabricating an optical coupling structure including: a common substrate carrying a pair of parallel ridges on a principal surface thereof as a first engagement structure; a first sub-carrier having a first principal surface and a seconds opposing principal surface and mounted on said common substrate in a state that said second principal surface faces said principal surface of said common substrate, said first sub-carrier carrying a second engagement structure including a plurality of groove pairs each formed of a pair of parallel grooves on said second principal surface such that one of said groove pairs forming said second engagement structure engages with said ridges forming said first engagement structure when said first sub-carrier is mounted on said common substrate, said first sub-carrier carrying a first optical component on one of said first and second principal surfaces; and a second sub-carrier having a third principal surface and a fourth opposing principal surface and mounted on said common substrate in a state that said fourth principal surface faces said principal surface of said common substrate, said second sub-carrier carrying a third engagement structure including a plurality of groove pairs each formed of a pair of parallel grooves on said fourth principal surface such that one of said groove pairs forming said third engagement structure engages with said ridges forming said first engagement structure when said second sub-carrier is mounted on said common substrate, said second sub-carrier carrying a second optical component on one of said third and fourth principal surfaces; said grooves forming said groove pairs of said second engagement structure having respective sizes different in each groove pair, such that a distance between said principal surface of said common substrate and said second principal surface is changed by selecting said groove pair from said second engagement structure for engagement with said first engagement groove structure;

said method comprising the steps of:

defining a plurality of first blocks and a plurality of second blocks on a mother substrate having an area larger than a sum of an area of said first sub-carrier and an area of said second sub-carrier, such that each of said first blocks includes a plurality of groove pairs constituting said second engagement structure and such that each of said second blocks includes a plurality of groove pairs constituting said third engagement structure; and dicing said mother substrate to form said first sub-carrier and said second sub-carrier, such that said first sub-carrier includes a selected groove pair for said second engagement structure and such that said second sub-carrier includes a selected groove pair fro said third engagement structure, said selected groove pair of said first sub-carrier and said selected groove pair of said second sub-carrier being selected such that said first optical component aligns optically to said second optical component.

According to the present invention, it is possible to eliminate the foregoing FIRST through FOURTH PROBLEMS by selecting a suitable engagement element from the second engagement structure for engagement with the first engagement structure. By suitably selecting the engagement element, it is possible to adjust the height of the first sub-carrier and hence the first optical element thereon with respect to the height of the second sub-carrier and hence the second optical element thereon. In the present invention, no problem of optical misalignment occurs even when the first sub-carrier and the second sub-carrier are formed from separate wafers having different thicknesses. Thus, the patterning of the bonding structure on the first principal surface of the first sub-carrier can be carried out independently to the process of forming a groove on the second sub-carrier for holding a lens, and the like.

Other objects and further features of the present invention will become apparent from the following detailed description when read in conjunction with the attached drawings

BRIEF DESCRIPTION OF THE DRAWINGS

FIGS. 6A–6C are diagrams showing a part of the optical coupling structure of FIG. 5 in detail;

FIGS. 9A–9C are diagrams showing a part of the optical coupling structure of FIG. 8 in detail;

FIGS. 11A–11C are diagrams showing the details of the conventional optical coupling structure that uses the alignment process of FIGS. 10A–10C;

FIGS. 25A–25H are further diagrams showing the principle of the present invention;

FIGS. 56A–56K are diagrams showing a fabrication process of the optical coupling structure of the sixteenth embodiment;

DETAILED DESCRIPTION OF THE PREFERRED EMBODIMENTS

First, the principle of the present invention will be explained in brief

Figure 22A:
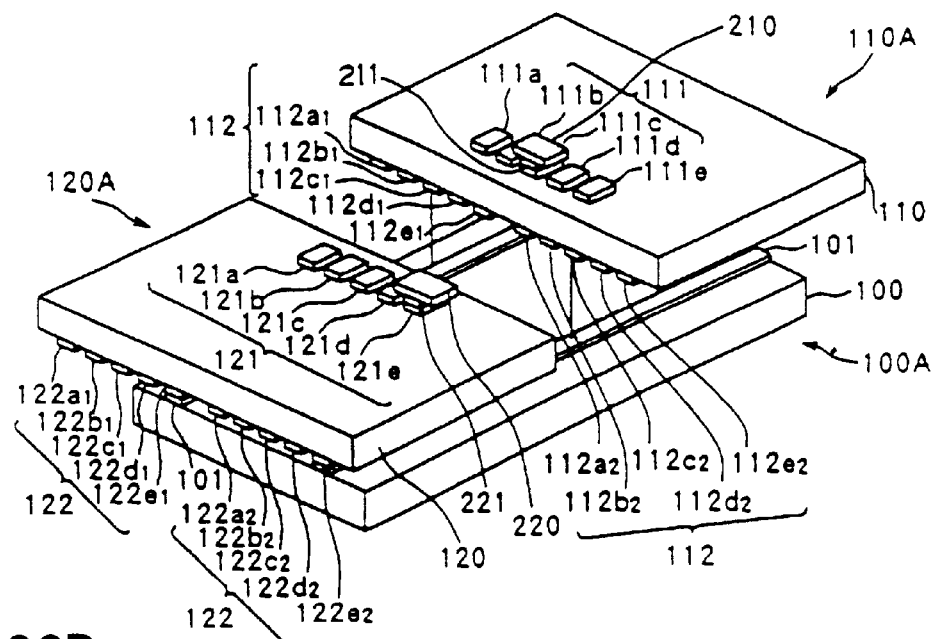
FIGS. 22A–22C are diagrams showing the principle of the present invention.
Figure 22B:
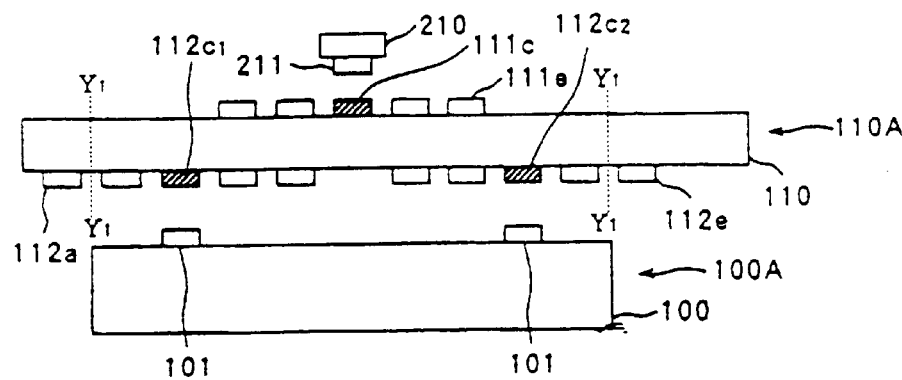
Figure 22C:
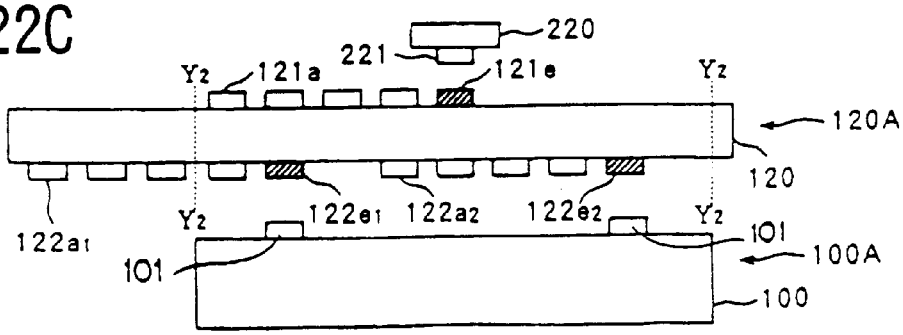

FIGS. 22A–22C shows the principle of the optical coupling structure of the present invention, wherein those parts corresponding to the parts described previously are designated by the same reference numerals and the description thereof will be omitted Referring to FIG. 22A, the optical coupling structure includes sub-carriers 110A and 120A on a common substrate 100A, wherein the common substrate 100A is formed of a single crystal slab 100 of Si and carries, on an upper major surface thereof, the guide ridges 101.

The sub-carrier 110A is also formed of a single crystal slab 110 of Si and carries, on a lower principal surface thereof, an engagement groove structure 112 for engagement with the ridges 101 on the common substrate 100, wherein the engagement groove structure 112 includes a plurality of engagement elements $112a_1$–$112e_1$ and $112a_2$–$112e_2$ such that the elements $112a_1$ and $112a_2$ form a pair $112a$, the elements $112b_1$ and $112b_2$ form a pair $112b$, . . . . Similarly, the sub-carrier 120A of a single crystal slab 120 of Si carries, on a lower principal surface thereof, an engagement groove structure 122 for engagement with the ridges 101 on the common substrate 100, wherein the engagement groove structure 122 includes a plurality of engagement elements $122a_1$–$122e_1$ and $122a_2$–$122e_2$ such that the elements $122a_1$ and $122a_2$ form a pair $122a$, the elements $122b_1$ and $122b_2$ form a pair $122b$, . . . .

Further, the sub-carrier 110A carries, on an upper principal surface thereof, a mounting structure 111 including a plurality of mounting elements $111a$–$111e$, and an optical component 210 such as a laser diode is provided on one of the mounting elements, the element $111c$ in the illustrated example. Similarly, the sub-carrier 120A carries, on an upper principal surface thereof, a mounting structure 121 including a plurality of mounting elements $121a$–$121e$, and an optical component 210 is provided on one of the mounting elements, the elements $121e$, in the illustrated example.

It should be noted that each element pair of the engagement groove structure such as the engagement groove structure 112 has a height different from the height of other element of the engagement groove structure 112. Thus, by appropriately selecting the element pair of the engagement groove structure 112 as indicated in FIG. 22B, it is possible to adjust the level of the top surface of the substrate 110 forming the sub-carrier 110A with respect to the level of the top surface of the common substrate 100. In other words, it is possible to adjust the height of the optical axis of the optical element 210 with respect to the common substrate 100A. In the example of FIG. 22B, it should be noted that the engagement elements $112c_1$ and $112c_2$ are used for engagement with the corresponding ridges 101 of the common substrate 100A. In the state of FIG. 22B, the both lateral edges of the substrate 100 are aligned with markers designated by $Y_1$—$Y_1$ of the sub-carrier 110A.

Similarly, each element pair of the engagement groove structure 122 has a height different from the height of other element of the engagement groove structure 122. Thus, by appropriately selecting the element pair of the engagement groove structure 122 as indicated in FIG. 22C, it is possible to adjust the level of the top surface of the substrate 120 forming the sub-carrier 120A with respect to the level of the top surface of the common substrate 100. In other words, it is possible to adjust the height of the optical axis of the optical element 220 with respect to the common substrate 100A. In the example of FIG. 22C, the engagement elements $122e_1$ and $122e_2$ are used for engagement with the corresponding ridges 101 on the common substrate 100A. In the state of FIG. 22C, the both lateral edges of the substrate 100 are aligned with markers designated by $Y_2$—$Y_2$ of the sub-carrier 120A.

Thus, by mounting the sub-carrier 110A and 120A on the common substrate 100A adjacent to each other, and by selecting the element pair of the engagement groove structure 112 or 122 appropriately, it is possible to achieve an excellent optical alignment between the optical component 210 and the optical component 220.

Figure 23:
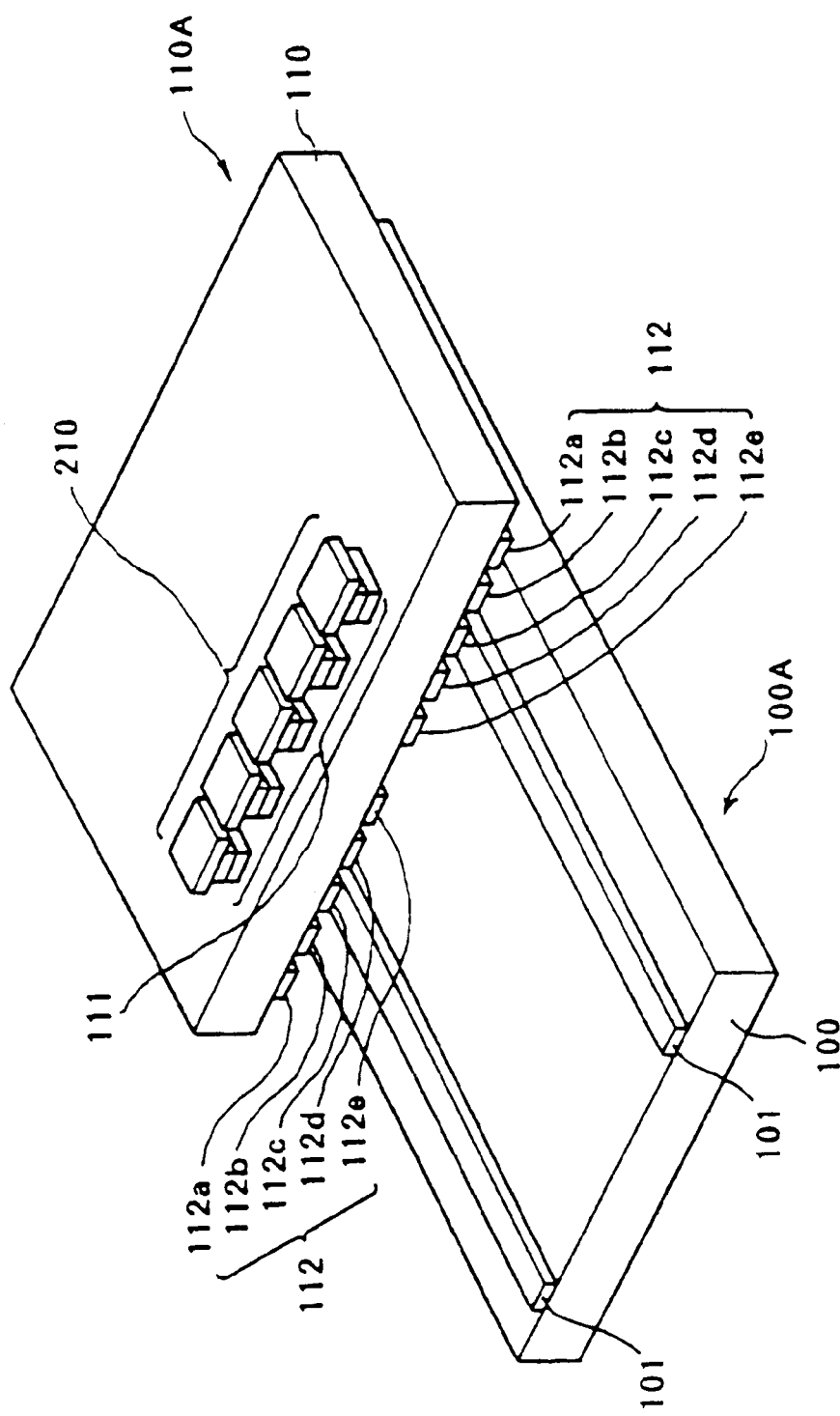
FIG. 23 is another diagram showing the principle of the present invention.

FIG. 23 shows a part of the optical coupling structure explaining that each of the optical components 210 is provided at the same level with respect to the top surface of the substrate 110, irrespective of on what mounting element the optical component 210 is provided. It is not necessary to provide the optical component on all of the mounting elements 111a–111e that form the mounting structure 111, although the process of selectively mounting the optical component 210 on a particular, selected mounting element such as the element 111c may be eliminated by providing the optical component 210 on all of the mounting elements 111a–111e. Even when the height of the optical component 210 on the sub-carrier 110A is fixed and constant, the present invention allows the vertical optical alignment of the optical component 210 by selective the appropriate engagement element forming the engagement groove structure 112. Thereby, it is no longer necessary to adjust the height of the optical component by trimming the mounting structure 112. A similar arguments holds also for the sub-carrier 120A.

Figure 24A:
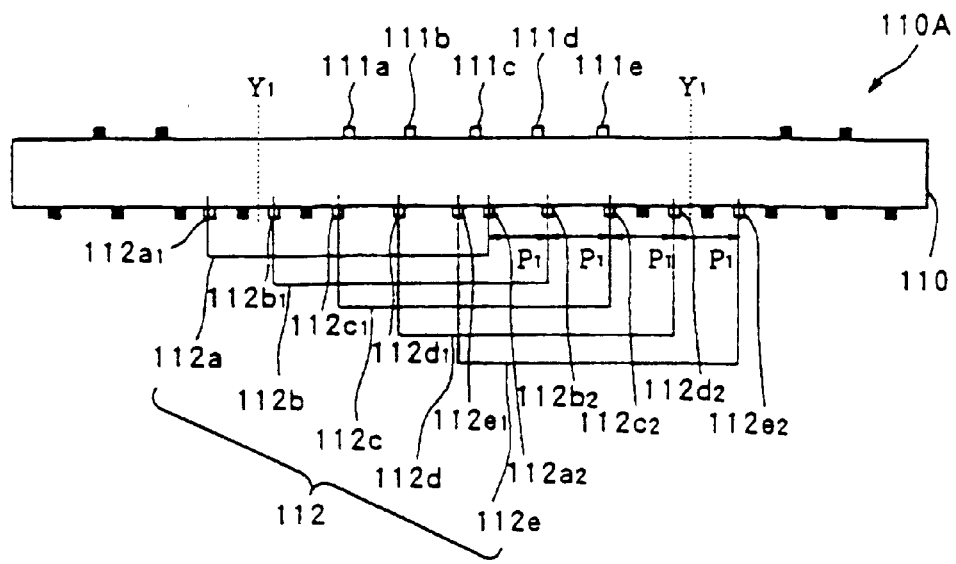
FIGS. 24A and 24B are further diagrams showing the principle of the present invention.
Figure 24B:
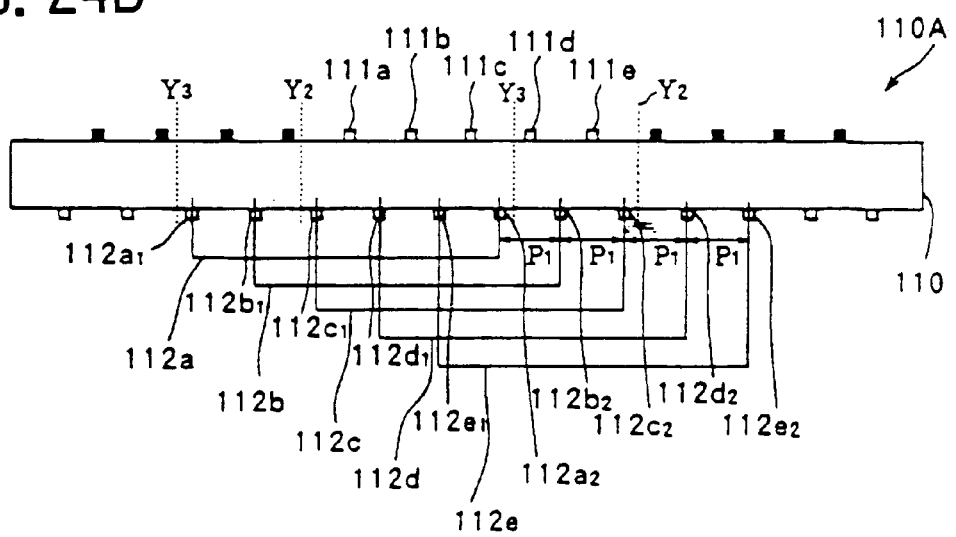

FIGS. 24A and 24B show the examples of the arrangement of the engagement elements $112a_1$–$112e_1$ and $112a_2$–$112e_2$ forming the pairs 112a–112e.

Referring to FIG. 24A, the elements $112a_1$–$112e_1$ are disposed with a uniform pitch $P_1$. Similarly, the elements $112a_2$–$112e_2$ are disposed with the same uniform pitch $P_1$. Thus, the engagement element pairs 112a–112e are disposed also with the pitch $P_1$. Further, the mounting elements 111a–111e are provided on the top surface of the substrate 110 with the same pitch $P_1$, such that the relative position of a mounting element such as the element 111a with respect to a corresponding pair such as the pair 112a, is identical for all of the mounting elements 111a–111e. Thus, whenever the sub-carrier 110A is mounted on the common substrate 100A by selecting an appropriate engagement element pair such as the pair 112a, the optical component 210 mounted on the corresponding mounting element such as the mounting element 111a assumes a predetermined lateral as well as vertical position with respect to the common substrate 100A.

FIG. 24B shows a modification of FIG. 24A, in which all of the engagement elements $112a_1$–$112e_2$ are disposed with the pitch $P_1$. By forming the engagement elements $112a_1$–$112e_2$ as such, it is possible to choose any of the suitable element pairs as long as the engagement elements forming the pair are separated by a predetermined distance corresponding to the distance between the ridges 101 on the common substrate 100A.

Particularly, in the arrangement of FIG. 24A, the engagement elements forming a pair, such as the elements $112a_1$ and $112a_2$, are separated from each other by a distance given by $[k+(m-0.5/n)\times P_1]$, wherein k represents the number of the element pairs included in the engagement groove structure 112, m is a natural number including zero, and n is an integer equal to or larger than one. By setting the mutual distance as such, the distance between the element $111e_1$ and the element $111a_2$ is reduced below the pitch $P_1$, and the overall lateral size of the engagement groove structure 112 is reduced. This in turn means that the number of the engagement groove structure and hence the sub-carriers 110A formed on the substrate 110 side by side is increased, as compared with the arrangement of FIG. 24B. Thereby, a large number of the sub-carriers 110A are formed by dicing the substrate 110.

Figure 25A:
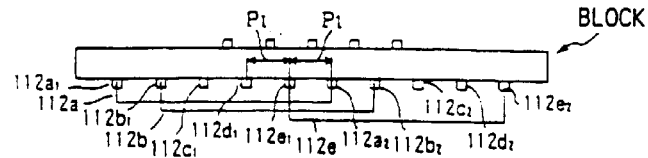
Figure 25B:
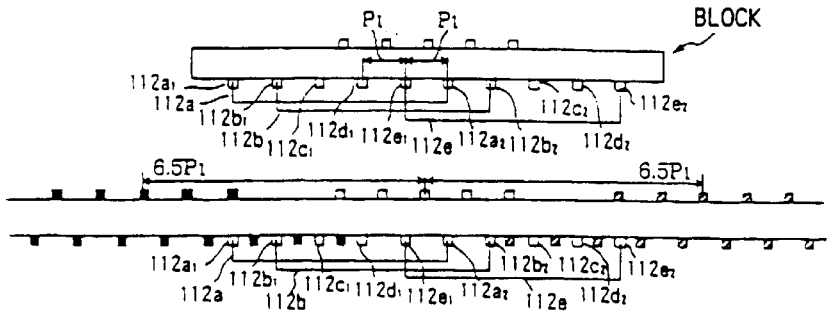

FIG. 25A shows an example of a block or unit formed on a wafer in correspondence to a sub-carrier while FIG. 25B shows the wafer on which the block of FIG. 25A are formed together with adjacent blocks.

Referring to FIG. 25A, the elements $112a_1$–$112e_2$ forming the engagement groove structure 112 are provided with a uniform pitch $P_1$ such that the element $112e_1$ is separated from the element $112a_2$ by a distance equal to the pitch $P_1$ similarly to the construction of FIG. 24B, while it will be noted that the engagement elements of an adjacent block adjacent to the block under consideration at the left side thereof and designated by solid squares, are interposed between some of the engagement elements, the elements $112a_1$–$112d_1$. Further, the engagement elements of an adjacent block adjacent to the block under consideration at the right side thereof and designated by hatched squares, are interposed between some of the engagement elements, the elements $112b_2$–$112e_2$.

By doing so, it is possible to form the blocks on the wafer in a partially overlapped relationship with a mutual separation of $6.5P_1$ for the adjacent blocks, and the number of the blocks formed on the wafer is increased substantially. When forming a sub-carrier from the wafer, all that is necessary is to dice the wafer such that the diced sub-carrier includes the desired element pair.

Figure 25D:
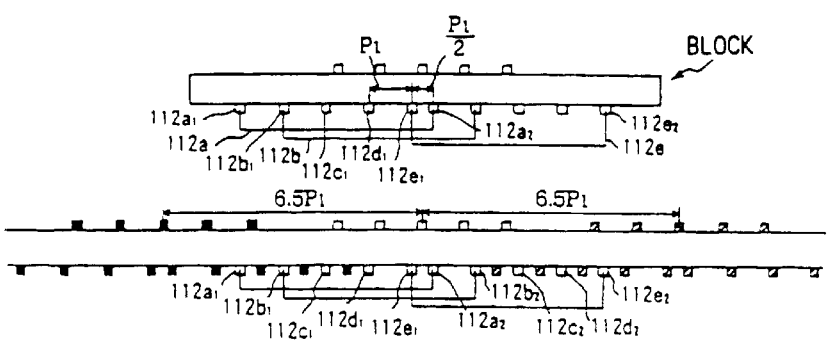

FIG. 25C shows the construction corresponding to FIG. 24A in which the mutual separation between the engagement element $112e_1$ and the engagement element $112a_2$ is $\frac{1}{2}P_1$, while FIG. 25D shows the wafer on which the blocks of FIG. 25C are formed. In this case, too, the engagement elements of an adjacent block adjacent to the block under consideration at the left side thereof and designated by solid squares, are interposed between some of the engagement elements, the elements $112a_1$–$112d_1$. Further, the engagement elements of an adjacent block, adjacent to the block under consideration at the right side thereof and designated by hatched squares, are interposed between some of the engagement elements, the elements $112b_2$–$112e_2$. Thereby, the separation between adjacent blocks on the wafer becomes $6.5P_1$, similarly to the case of FIG. 25B.

Figure 25F:
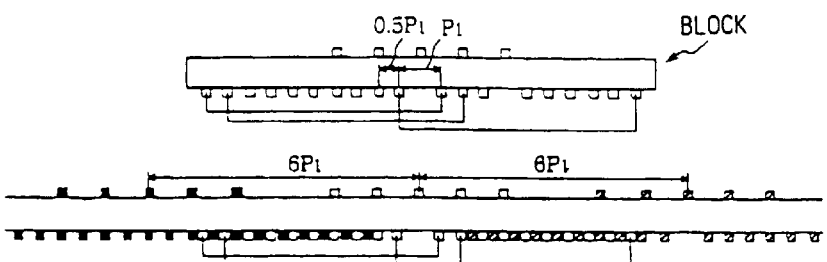

Further, FIG. 25E shows the construction of a block in which the engagement elements $112a_1$–$112e_1$ are formed with a pitch of $0.5P_1$, the engagement elements $112a_2$–$112e_2$ are formed with the same pitch of $0.5P_1$, while the element $112e_1$ and the adjacent element $112a_1$ are separated from each other by a distance of $P_1$. Thereby, the mutual separation between the adjacent blocks becomes $6P_1$ as indicated in FIG. 25F.

Figure 25G:
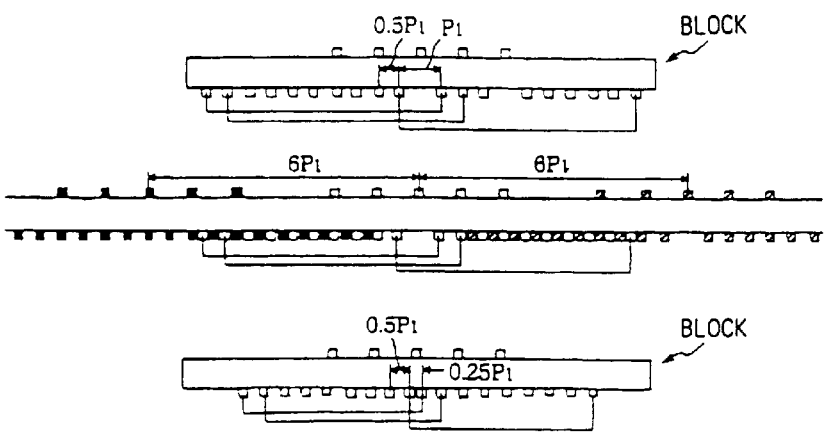

FIG. 25G, on the other hand, shows the construction of a block in which the engagement elements $112a_1$–$112e_1$ are formed with the pitch of $0.5P_1$ and the engagement elements $112a_2$–$112e_2$ are formed with the same pitch of $0.5P_1$ similarly to the case of FIG. 25E, except that the mutual separation between the element $112e_1$ and the element $112a_2$ is set to $0.25P_1$. In this case, too, the mutual separation between the adjacent blocks becomes $6P_1$.

It should be noted that the relationship of FIGS. 25A and 25B or FIGS. 25E and 25F is realized by setting the mutual separation between the elements forming a pair, such as the elements $112a_1$ and $112a_2$, to satisfy the relationship of $\{k+(m/n) \times P_1\}$ and by setting the mutual separation between the adjacent blocks to be equal to a product represented by $\{I+0.5/n) \times P_1\}$, where k, m and n are defined previously while I is an integer equal to or larger than k+m. In the example of FIG. 25B, k is set to 5, n is set to 1 and m is set to 0, while in the example of FIG. 25F, k is set to 5, n is set to 2, and m is set to 0. In both cases, the mutual separation between adjacent blocks becomes $6.5 \times P_1$ as noted above.

In the case of FIGS. 25C and 25D or FIGS. 25G and 25D, on the other hand, the mutual separation between the elements forming a pair, such as the elements $112a_1$ and $112a_2$, is set to satisfy the already described relationship $\{k+(m-0.5/n) \times P_1\}$. Further, the mutual separation between the adjacent blocks is set to satisfy a relationship $M \times P_1$, where M is an integer equal to or larger than k+m. In the example of FIGS. 25C and 25D, k is set to 5, n is set to 1 and m is set to 0. In the example of FIGS. 25G and 25H, on the other hand, k is set to 5, n is set to 2 and m is set to 0. Thereby, the mutual separation between adjacent blocks becomes $6 \times P_1$ in both cases as noted above.

FIRST EMBODIMENT

Figure 26A:
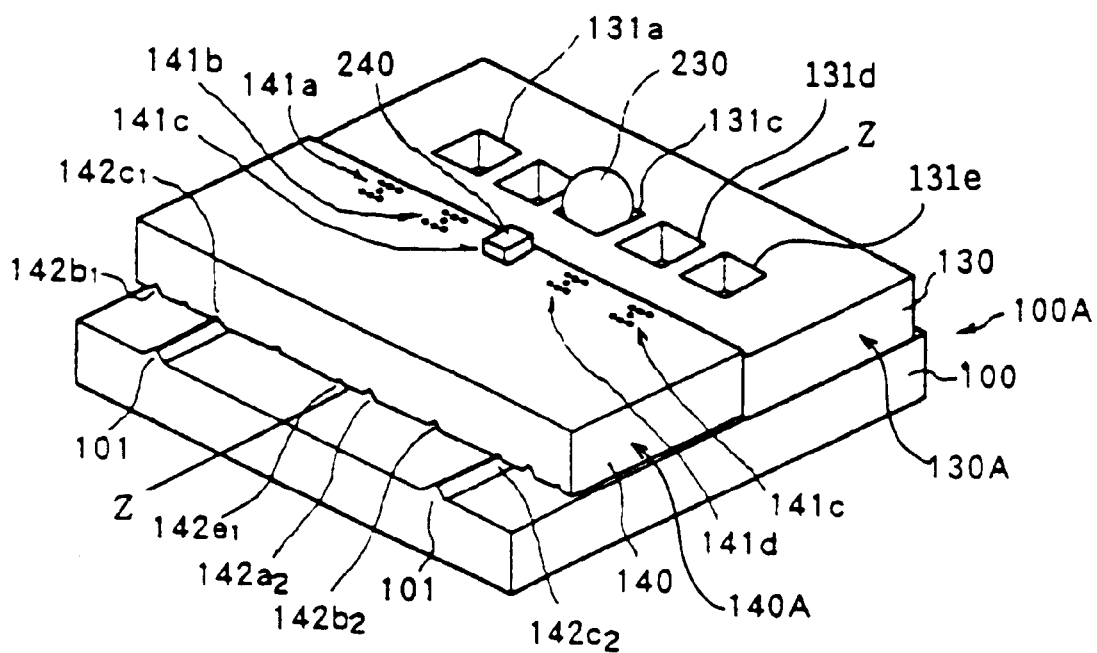
FIGS. 26A and 26B are diagrams showing the construction of an optical coupling structure according to a first embodiment of the present invention.
Figure 26B:
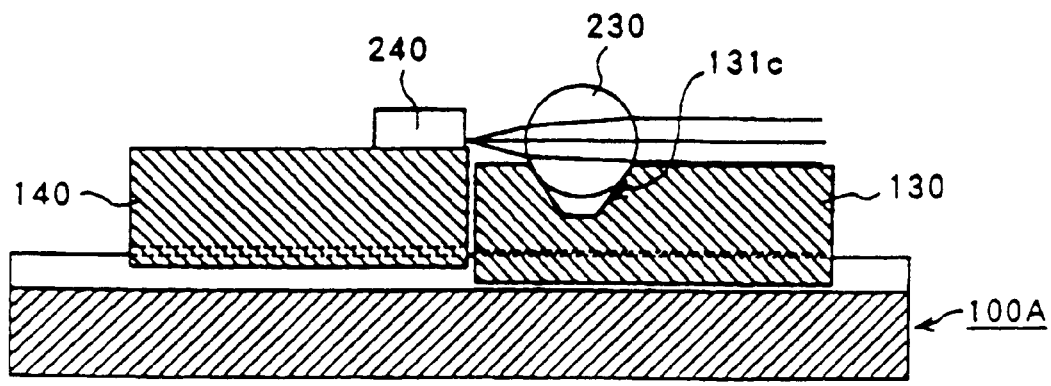

FIGS. 26A and 26B show the construction of an optical coupling structure according to a first embodiment of the present invention respectively in an oblique view and a cross-sectional view taken along a line z—z of FIG. 26A, wherein those parts corresponding to the parts described previously are designated by the same reference numerals and the description thereof will be omitted.

Referring to FIGS. 26A and 26B, the common substrate 110A carries thereon a first sub-carrier 140A in a state that the trapezoidal ridges forming the engagement groove structure 101 are engaged with a corresponding engagement groove structure 142 formed on the bottom surface of the sub-carrier 140A. Similarly, the common substrate 110A carries thereon a second sub-carrier 130A in a state that the trapezoidal ridges forming the engagement groove structure 101 are engaged with a corresponding engagement groove structure 132 (not shown) which engagement groove structure 132 being formed on the bottom surface of the sub-carrier 130A similarly to the engagement groove structure 142, wherein the second sub-carrier 130A is mounted adjacent to the first sub-carrier 140A. The sub-carrier 140A carries thereon the laser diode 240, while the sub-carrier 130A carrier thereon the spherical lens 230 in one of the depressions $131a$–$131e$ formed on a top surface of the sub-carrier 130A. In the illustrated example, the spherical lens 230 is accommodated in the depression 131c.

As noted above, the engagement groove structure 101 is actually formed of a pair of the ridges each having a trapezoidal cross-section, formed by an anisotropic etching process applied to a Si wafer from which the common substrate 100A is obtained. It should be noted that the Si substrate 100 forms a part of the Si wafer. On the other hand, the engagement groove structure 142 includes V-shaped grooves $142a_1$–$142e_1$ and $142a_2$–$142e_2$ formed on the bottom surface of a Si substrate 140 forming the sub-carrier 140A, wherein the groove $142a_1$ (not shown in FIG. 26A) and the groove $142a_2$ form together a pair, the groove $142b_1$ and the groove $142b_2$ form a pair, . . . .

It should be noted that the sub-carrier 140 carries on a top surface thereof a plurality of bonding pad structures 141, and the laser diode 240 is mounted on one of the bonding pad structures, the bonding pad 141c in the illustrated example. Although not illustrated the top surface of the sub-carrier 140A is covered by the oxide film 2 similarly to the construction of FIG. 9B with a thickness of about 1 μm, and the oxide film 2 carries thereon the insulation film 11b and the wiring pattern 11a. See FIG. 9B. In the illustrated example, the laser diode 240 has the optical axis at the height of 6.52 μm as measured from the top surface of the Si substrate 140 forming the sub-carrier 140A.

The second sub-carrier 130A, on the other hand, carries the depressions $131a$–$131e$ on a Si substrate 130 forming the sub-carrier 130A in an array with a pitch of 1–3 mm. As noted previously, the spherical lens 230 is mounted into one of such depressions the depression 131c in the illustrated example.

Each of the depressions $131a$–$131e$ has an inverted pyramidal shape having a square-shaped opening at the top surface of the Si substrate 130, with a length of 806.6 μm for each edge of the square-shaped opening. Assuming that the lens 230 has a diameter of 800 μm, it is derived that the optical axis of the lens 230 thus mounted is located at the height of exactly 100 μm. Each of the depressions $131a$–$131e$ can be formed easily and precisely by applying a wet etching process to the Si substrate 130 and is defined by crystal surfaces having a predetermined orientation.

The grooves 142 and 132 are formed also by applying a wet etching process to the Si substrate 140 or the Si substrate 130 forming the sub-carriers 140A or 130A, and has a width of 20 μm at the upper horizontal edge of the trapezoid and a height of 155 μm.

It should be noted that each of the first and second sub-carriers 140A and 130A carries, on the bottom surface thereof five pairs of the grooves as the engagement groove structure 142 or 132, such that the width of the grooves is changed in each pair. For example, the grooves $142e_1$ and $142e_2$ have a common width of 85.0 μm at the bottom surface of the substrate 140, the grooves $142d_1$ and $142d_2$ have a common width of 87.9 μm, the grooves $142c_1$ and $142c_2$ have a common width of 90.7 μm, the grooves $142b_1$ and $142_2$ have a common width of 93.5 μm, and the grooves $142a_1$ and $142a_2$ have a common width of 96.3 μm. Similarly, the grooves $132e_1$ and $132e_2$ have a common width of 217.2 μm at the bottom surface of the substrate 130, the grooves $132d_1$ and $132d_2$ have a common width of 220.1 μm, the grooves $132c_1$ and $132c_2$ have a common width of 222.9 μm, the grooves $132b_1$ and $132_2$ have a common width of 225.7 μm, and the grooves $132a_1$ and $132a_2$ have a common width of 228.5 μm.

When a Si substrate having a thickness of 525±5 μm is used for the substrate 140 or the substrate 130, the grooves $142e_1$ and $142e_2$ may be used in combination with the grooves $132e_1$ and $132e_2$ for mounting the sub-carriers 140A and 130A on the common substrate 100A, when the foregoing Si substrate has a thickness of 521±1 µm. By doing so, it is possible to achieve an optical alignment between the laser diode 240 on the sub-carrier 140A and the spherical lens 230 on the sub-carrier 130A within ±1 µm. When the thickness of the Si substrate forming the substrate 140 or 130 is 523±1 µm on the other hand, the grooves $142d_1$ and $142d_2$ may be used in combination with the grooves $132d_1$ and $132d_2$ for mounting the sub-carriers 140A and 130A on the common substrate 100A. When the thickness of the Si substrate forming the substrate 140 or 130 is 525±1 µm, on the other hand, the grooves $142c_1$ and $142c_2$ may be used in combination with the grooves $132c_1$ and $132c_2$ for mounting the sub-carriers 140A and 130A on the common substrate 100A, When the thickness of the Si substrate forming the substrate 140 or 130 is 527±1 µm, on the other hand, the grooves $142b_1$ and $142b_2$ may be used in combination with the grooves $132b_1$ and $132b_2$ for mounting the sub-carriers 140A and 130A on the common substrate 100A. Further, when the thickness of the Si substrate forming the substrate 140 or 130 is 529±1 µm, on the other hand, the grooves $142a_1$ and $142a_2$ may be used in combination with the grooves $132a_1$ and $132a_2$ for mounting the sub-carriers 140A and 130A on the common substrate 100A.

Thus, by selecting or choosing the engagement groove structure 142 and 132 appropriately in response to the thickness of the substrates 140 and 130 forming the sub-carriers 140A and 130A, it is possible to achieve an optical alignment within ±1 µm between the laser diode 240 and the lens 230, even when the thickness of the substrates 140 and 130 variates as much as ±5 µm. This, in turn means that it is no longer necessary to select an appropriate Si wafer from a large number of the stock of the wafer. Thereby, the cost of the optical coupling structure is reduced substantially.

FIGS. 27A–27J show the process of forming a sub-carrier 140B and a sub-carrier 130B respectively corresponding to the sub-carrier 140A and 130A, wherein FIGS. 27A, 27C, 27F, 27H and 27I show the process of forming the sub-carrier 140B while FIGS. 27B, 27D, 27E, 27G and 27J show the process of forming the sub-carrier 130B.

Figure 27A:
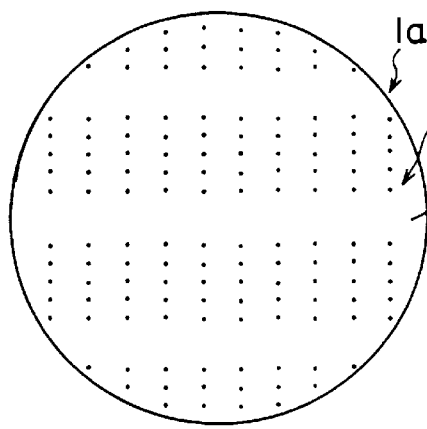
FIGS. 27A–27J are diagrams showing a fabrication process of the optical coupling structure of the first embodiment.
Figure 27B:
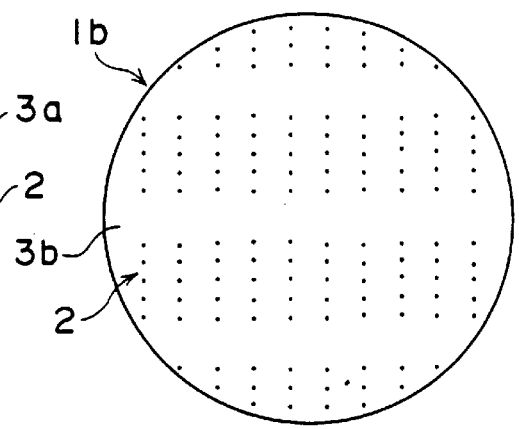

Referring to FIGS. 27A and 27B, a Si wafer 1a used for the substrate of the sub-carrier 140B and a Si wafer 1b used for the substrate of the sub-carrier 130B are subjected to a thermal oxidation process to form the Si oxide film 2 at both sides of the wafers 1a and 1b. Further, a number of alignment marks 3a are formed on the oxide film 2 by a photolithographic process.

Figure 27C:
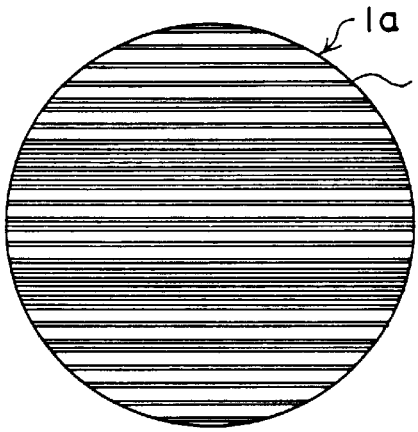
Figure 27D:
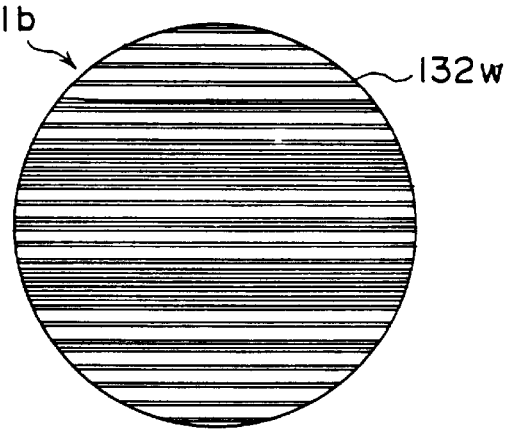

Next, in the step of FIGS. 27C and 27D, each of the wafers 1a and 2a is formed, at a rear surface thereof, an etching mask such that the etching mask covering the rear surface of the wafer 1a includes a number of elongated mask windows 142 W extending parallel to each other and such that the etching mask covering the rear surface of the wafer 1b includes a number of elongated mask windows 132 W extending also parallel to each other.

Figure 27E:
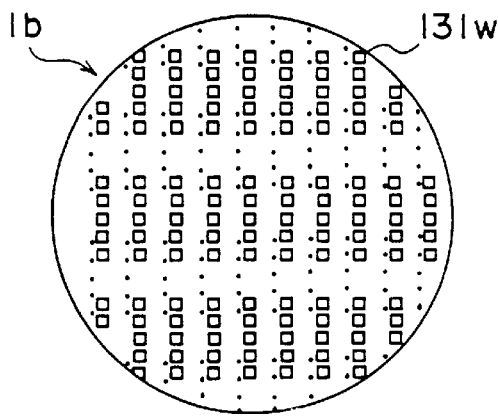

Further, the wafer 1b is formed, in a step of FIG. 27E, another etching mask at a front surface thereof such that the etching mask exposes, at a mask window 131 W, the foregoing front surface in correspondence to the part where the depressions 131 are to be formed, in alignment with the alignment marks 3b.

Figure 27F:
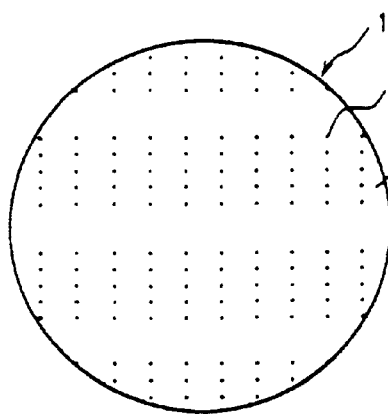
Figure 27G:
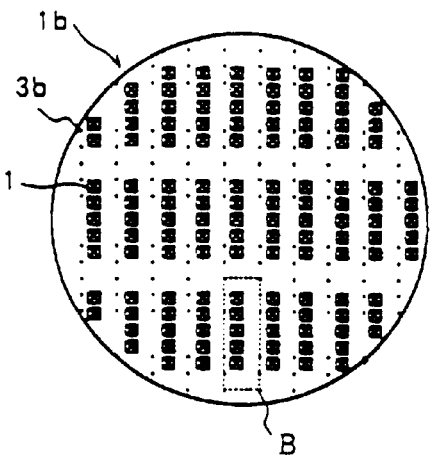

Next, the wafers 1a and 1b thus masked are immersed in an aqueous solution of KOH to form the V-shaped grooves 142 and 132 respectively on the rear surface of the wafers 1a and 1b by a wet etching process. Further, such an immersion into the KOH etchant also causes a wet etching process on the front surface of the wafer 1b and the pyramidal depressions 131 are formed on the front surface in correspondence to the foregoing etching windows 131 W, as indicated in FIGS. 27F and 27G. It should be noted that both of FIGS. 27F and 27G show the front side of the wafers 1a and 1b, and thus, the grooves 142 and 132 cannot be seen in these drawings.

Figure 27H:
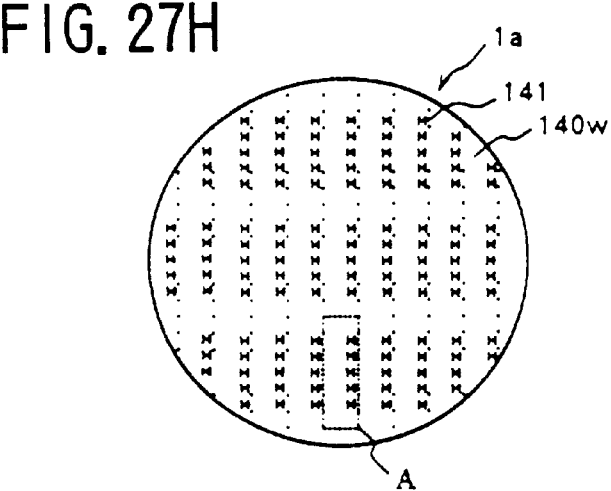

Next, in the step of FIG. 27H, the bonding pad structures 141 are formed on the front surface of the wafer 6a while using a mask pattern 140 W including various wiring patterns (not shown). It should be noted that each of the bonding pad structures 141 includes a plurality of bonding pads. As the bonding pad structures 141 are formed after the etching process of the grooves 142 and 132, the problem of corrosion of the bonding pads by the KOH etchant is successfully avoided.

Figure 27I:
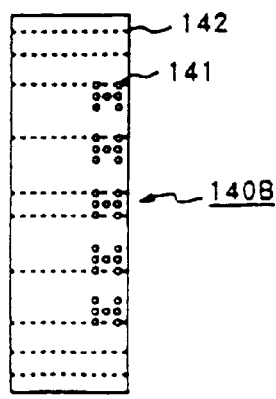
Figure 27J:
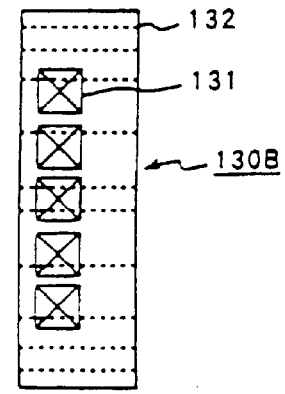

After the bonding pad structures 141 are thus formed each of the wafers 1a and 1b is diced along dicing lines into the sub-carriers 140B and the sub-carriers 130B as indicated in FIGS. 27I and 27J. In FIGS. 27I and 27J, it should be noted that the grooves 142 or 132 on the rear surface are indicated by dotted lines.

Figure 28A:
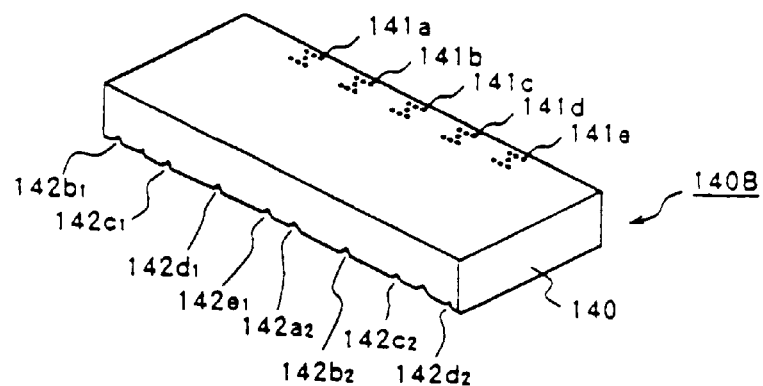
FIGS. 28A–28C are diagrams showing an assembling process of the assembling process of the optical coupling structure of the first embodiment.
Figure 28B:
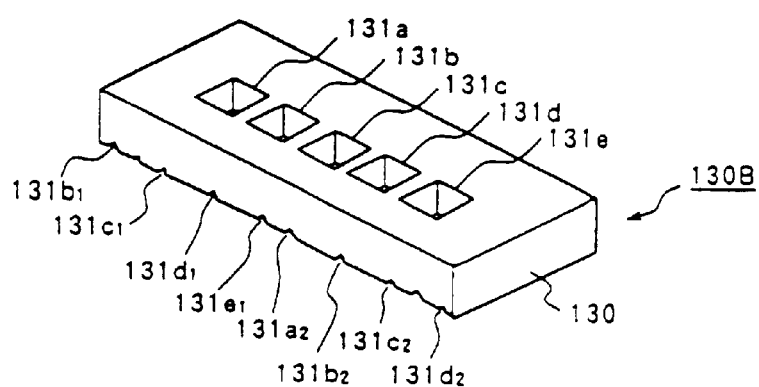
Figure 28C:
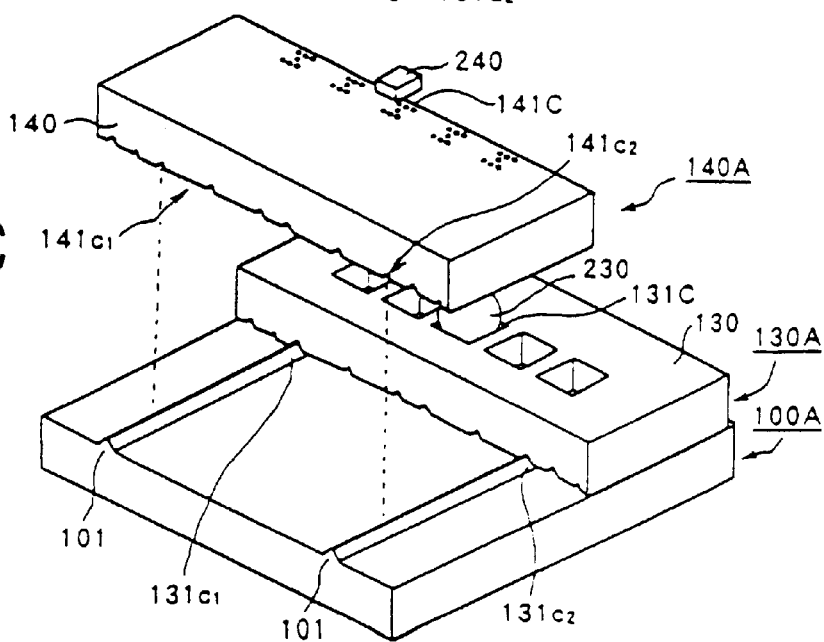

FIGS. 28A–28C show the assembling process of the optical coupling structure of the present embodiment, wherein FIGS. 28A and 28B show the sub-carriers 140B and 130B thus obtained separately.

The sub-carriers 140B and 130B are mounted on the common substrate 100A in the assembling process of FIG. 28C, such that a selected groove pair, such as the grooves $142c_1$ and $142c_2$, engages with the ridges 101 on the common substrate. The sub-carrier 130A, on the other hand, is mounted on the common substrate 100A in the state that the grooves $132c_1$ and $132c_2$ engage with the ridges 101. The sub-carriers 140B and 130B are thereby held on the common substrate 100A in an abutting relationship, and the laser diode 240 on the sub-carrier 140B mounted on the bonding pad structure 141c aligns optically with the spherical lens 230 held in the depression 131C on the sub-carrier 130B.

Figure 29A:
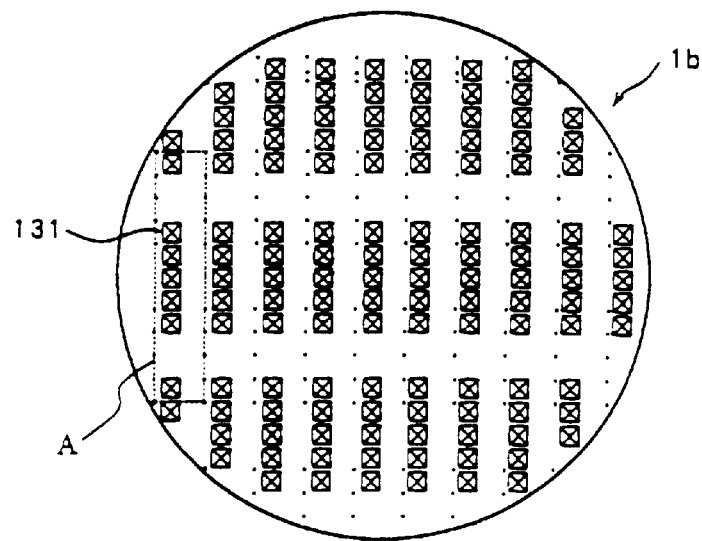
FIGS. 29A and 29B are diagrams showing the process of forming a sub-carrier from a wafer according to a first modification of the first embodiment.
Figure 29B:
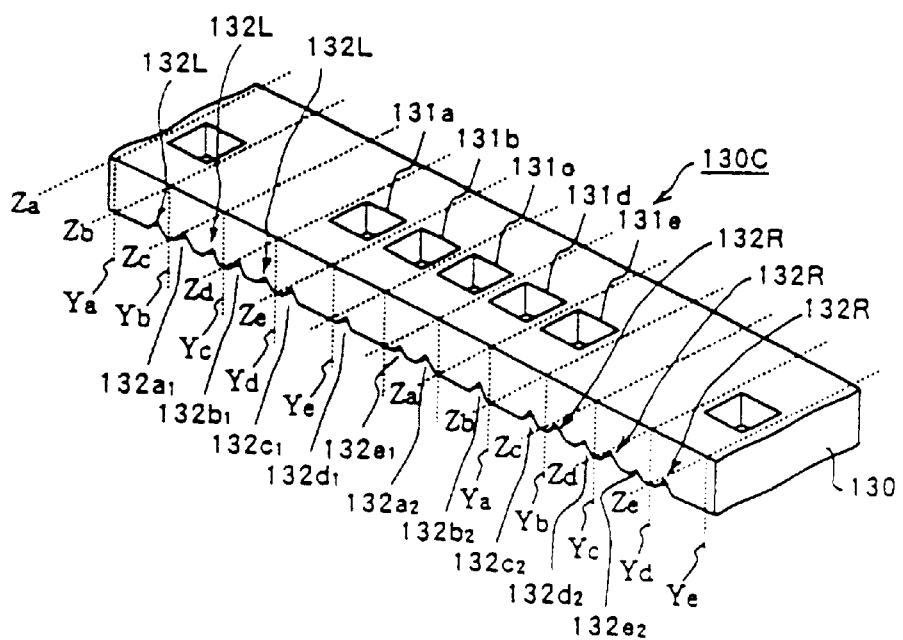

Next, a modification of the present embodiment for reducing the waste of the material of the Si substrate at the dicing process for forming a sub-carrier 130C, which corresponds to the sub-carrier 130A or 130B, will be described with reference to FIGS. 29A and 29B, wherein FIG. 29A shows the layout of the lens-holding depressions 131 formed on the front surface of the Si substrate 1b, while FIG. 29B shows a part of the structure of FIG. 29A surrounded by a dotted line.

Referring to FIG. 29A, the wafer 1b carries the lens-holding depressions 131 arranged in the form of blocks each including the depressions 131a–131e, such that the blocks are arranged vertically in the illustration of FIG. 29A with a mutual separation of 3 mm and laterally with a mutual separation of about 2.5 mm.

In order that each of the blocks works properly as an adjustable component of the optical coupling structure of the present invention it is necessary that each block include five guide groove pairs 132a–132e for the engagement groove structure 132 in correspondence to the five lens-holding depressions 131a–131e provided on the top surface of the wafer 1b for each block. As each of the guide groove pairs 132a–132e includes two guide grooves, such as the guide grooves $132a_1$ and $132a_2$, a given block on the wafer 1b should have a length, or vertical size in the illustration of FIG. 29A, such that each block includes the entire grooves $132a_1$–$132e_2$. In the case that the grooves $132a_1$–$132e_1$ and the grooves $132a_2$–$132e_2$ are formed with a mutual pitch of 1 mm except for the groove $132e_1$ and the groove $132a_2$ that are formed at both lateral sides of the central lens guide depression $131c$ with a mutual separation of 0.5 mm (0.25 mm offset to the right and to the left with respect to the depression $131c$), the block has to have an overall length of 8.5 mm.

Thus, it is necessary to arrange the blocks on the wafer $1b$ such that the blocks are repeated in the vertical direction in the illustration of FIG. 29A or in the elongating direction of the blocks, with a pitch of at least 8.5 mm.

In view point of mass-producing the sub-carriers 130C, however, it is desired to form the blocks with a number as large as possible on the wafer $1b$ and minimize the waste of the material of the Si wafer $1b$. For example, it is desired to arrange the blocks on the wafer $1b$ with a pitch of 7 mm, rather than the foregoing pitch of 8.5 mm.

Thus, as indicated in FIG. 29B, the engagement grooves 132L of the block immediately at the left of the block 130C under consideration are formed with an overlapping relationship with the engagement grooves $132a_1$–$132e_2$ of the block 130C. Similarly, the engagement grooves 132R of the block immediately at the right of the block 130C under consideration are formed with an overlapping relationship with the engagement grooves $132a_1$–$132e_2$ of the block 130C. It should be noted that the grooves 132L are located between the grooves $132a_1$ and $132b_1$ and between the grooves $132b_1$ and $132c_1$. Similarly, the grooves 132R are located between the grooves $132c_2$ and $132b_2$ and between the grooves $132b_2$ and $132a_2$.

As the blocks are overlapped on the Si wafer $1b$ in the state of FIG. 29A, the dicing of the wafer $1b$ has to be made depending on the thickness of the wafer $1b$.

Thus, when the thickness of the wafer $1b$ is within the range of ±1 μm with respect to the ideal thickness, the dicing may be made along a dotted dicing line Zc shown in FIG. 29B, such that the engagement grooves $132c_1$ and $132c_2$ forming the engagement groove structure $132c$ engage with the ridges 101 of the common substrate 100A. When the thickness of the wafer $1b$ is larger than the ideal thickness by 4 μm, on the other hand, the dicing of the wafer $1b$ is made along a dicing line Za shown in FIG. 29B, such that the engagement grooves $132a_1$ and $132a_2$ forming the engagement groove structure $132a$ engage with the ridges 101 of the common substrate 100A. When the thickness of the wafer $1b$ is larger than the ideal thickness by 2 μm, the dicing of the wafer $1b$ is made along a dicing line Zb shown in FIG. 29B, such that the engagement grooves $132b_1$ and $132b_2$ forming the engagement groove structure $132b$ engage with the ridges 101 of the common substrate 100A. When the thickness of the wafer $1b$ is smaller than the ideal thickness by 2 μm, the dicing of the wafer $1b$ is made along a dicing line Zd shown in FIG. 29B, such that the engagement grooves $132d_1$ and $132d_2$ forming the engagement groove structure $132d$ engage with the ridges 101 of the common substrate 100A. Further, when the thickness of the wafer $1b$ is smaller than the ideal thickness by 4 μm, the dicing of the wafer $1b$ is made along a dicing line Ze shown in FIG. 29B, such that the engagement grooves $132e_1$ and $132e_2$ forming the engagement groove structure $132e$ engage with the ridges 101 of the common substrate 100A.

More specifically, the dicing of the wafer $1b$ may be made along the dicing line Ze when the thickness of the wafer $1b$ falls in the range of 521±1 μm. The dicing, on the other hand, may be made along the dicing line Zd when the thickness of the wafer $1b$ falls in the range of 523±1 μm. Further, the dicing may be made along the dicing line Zc when the thickness of the wafer $1b$ falls in the range of 525±1 μm or along the dicing line Zb when the thickness of the wafer $1b$ falls in the range of 527±1 μm When the thickness of the wafer $1b$ is in the range of 529±1 μm, on the other hand, the dicing may be made along the dicing line Za. Each block and hence the sub-carrier 130C thus diced generally has a length or longitudinal size of 7 mm. Thereby, the waste of the material of the wafer $1b$ at the time of the dicing is minimized.

The spherical lens 230 is mounted on one of the lens-hold depressions $131a$–$131e$ of the sub-carrier 130C corresponding to the selected engagement groove. For example, the lens 230 may be mounted on the depression $131b$ when the engagement groove $132a$ is used for mounting the sub-carrier 130C on the common substrate 100A.

A similar argument holds also for the sub-carrier carrier 140A or 140B carrying the laser diode 240. In this case, too, the engagement grooves $142a_1$–$142e_1$ and $142a_2$–$142e_2$ are formed with a pitch of 1 mm on the wafer $1a$, similarly to the construction of FIG. 29B.

Figure 30:
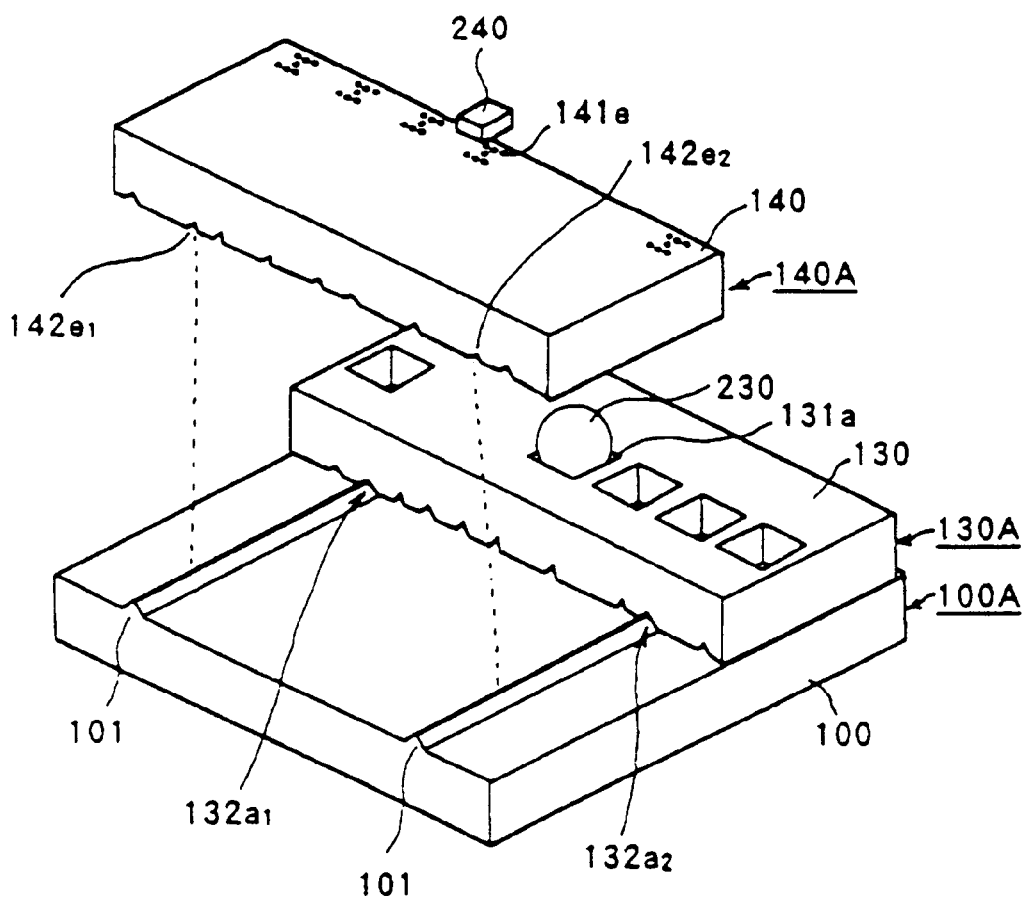
FIG. 30 is a diagram showing the assembling process of the optical coupling structure that uses the sub-carrier formed in the process of FIGS. 29A and 29B.

In the sub-carrier 140B, too, the engagement grooves are selected depending on the thickness of the wafer $1a$. Thus, in the case of FIG. 26A and 26B in which the ideal thickness of the wafer is 525 μm and the actual thicknesses of the sub-carrier 140A and the sub-carrier 130A are 525±1 μm and 525±1 μm, respectively, the engagement grooves $132c_1$ and $132c_2$ are used for mounting the sub-carrier 130A on the common substrate 100A and the engagement grooves $142c_1$ and $142c_2$ are used for mounting the sub-carrier 140A on the common substrate 100A. Similarly, when the sub-carrier 140A has the foregoing thickness of 525±1 μm and the sub-carrier 130A has a thickness of 529±1 μm, the grooves $132a_1$ and $132a_2$ are used for supporting the sub-carrier 130A on the common substrate 100A and the grooves $142a_1$ and $142a_2$ are used for supporting the sub-carrier 140A on the common substrate 100A. See the construction of FIG. 30 indicating the sub-carriers 140A and 130A diced from the Si wafers $1a$ and $1b$.

As long as the thickness of the Si wafer $1a$ or $1b$ is within the range of 525±5 μm, the optical coupling structure of the present invention can successfully achieve the desired optical coupling between the optical components held on the respective sub-carriers, within the precision of ±1 μm.

The amount of the error in the thickness of the wafer that the optical coupling structure can successfully compensate for can be increased readily by increasing the size or width of the grooves forming the engagement groove structure 132 or 142, or by increasing the number of the grooves. For example, it is possible to reduce the optical alignment error to ±2 μm or less for the case in which there is an error in thickness of the wafer $1a$ or $1b$ of as much as ±10 μm. In this case, five of such engagement grooves may be provided with a mutual difference in the groove width of 5.65 μm. While the step of the adjustment may become somewhat rough when the grooves are formed to have an increased difference in the groove widths as in the case noted above, the problem of the decrease of the precision of the fine adjustment of the optical axis may be maintained by merely increasing the number of the engagement grooves in each of the engagement groove structures 132 and 142.

Figure 31:
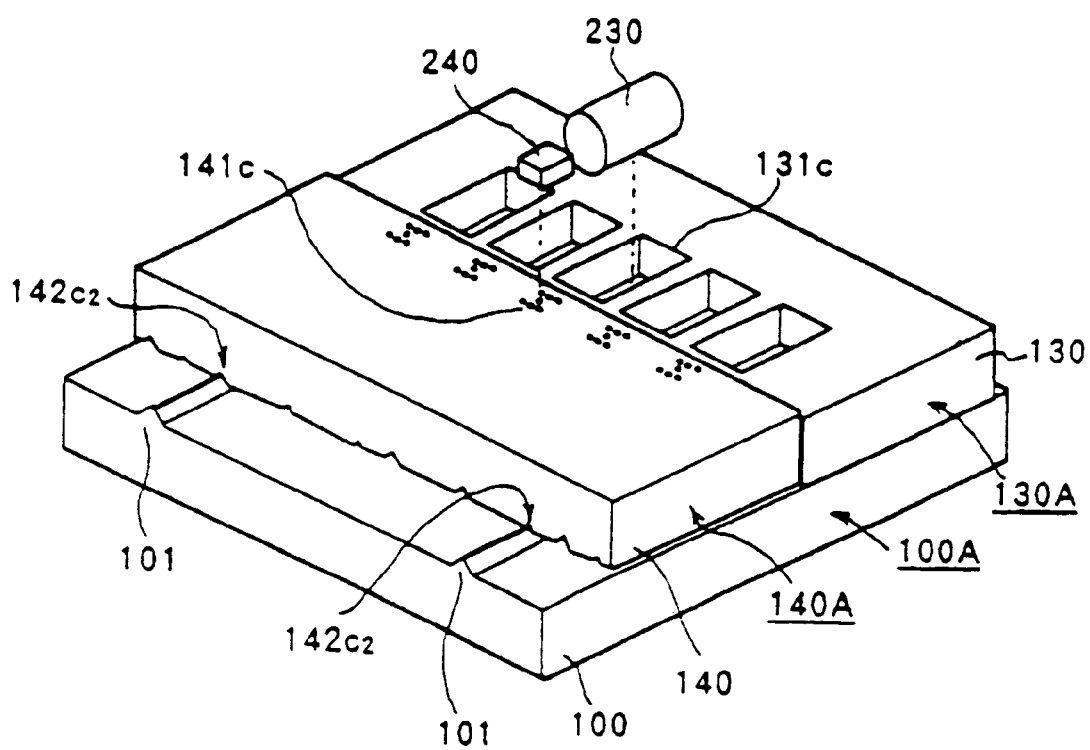
FIG. 31 is a diagram showing the construction of an optical coupling structure according to a second modification of the first embodiment.

FIG. 31 shows a second modification of the first embodiment wherein those parts corresponding to the parts described previously are designated by the same reference numerals and the description thereof will be omitted.

Referring to FIG. 31, the optical coupling structure has a structure similar to that of FIG. 26A, except that a cylindrical lens is used for the lens 230 in place of the spherical lens, wherein the cylindrical lens 230 has a cylindrical distribution of refractive index. In correspondence to this, the lens-hold depressions 131 are formed with a rectangular shape rather than the inverted pyramid shape.

As other aspects of this modification are obvious from the description heretofore, further description thereof will be omitted.

SECOND EMBODIMENT

Figure 32:
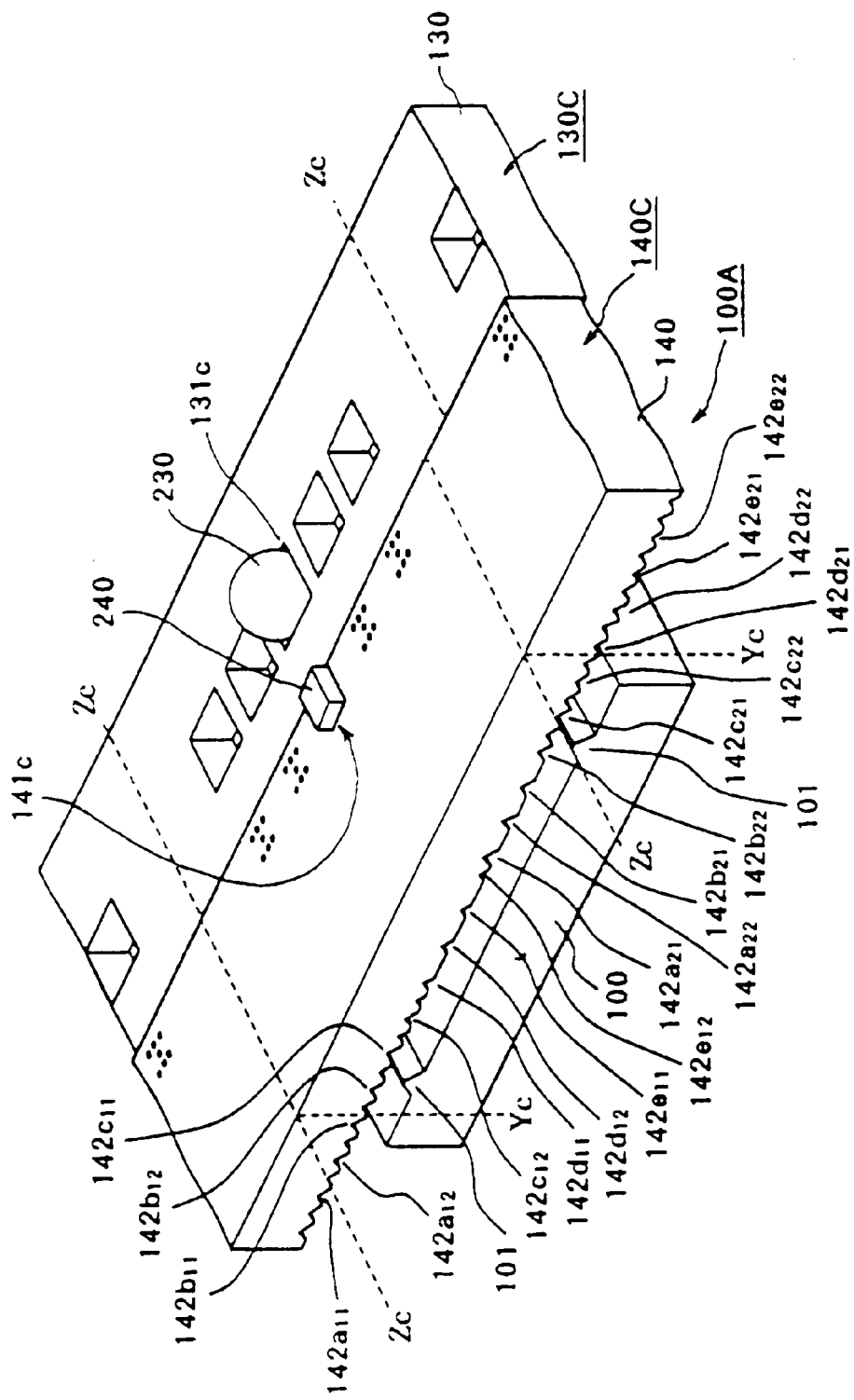
FIG. 32 is a diagram showing the construction of an optical coupling structure according to a second embodiment of the present invention.

FIG. 32 shows an optical coupling structure according to a second embodiment of the present invention, wherein those parts corresponding to the parts described previously are designated by the same reference numerals and the description thereof will be omitted.

Referring to FIG. 32, the optical coupling structure includes an increased number of the grooves $142a_{11}$, $142a_{12}$. $142b_{11}$. $142b_{12}$, ... and $132a_{11}$, $132a_{12}$. $132b_{11}$. $132b_{12}$, ... for the engagement groove structure 142 as well as for the engagement groove structure 132 for improving the precision of the optical alignment It should be noted that the foregoing grooves $142a_{11}$, $142a_{12}$. $142b_{11}$. $142b_{12}$, ... and $132a_{11}$, $132a_{12}$. $132b_{11}$. $132b_{12}$, ... are formed with a mutual pitch of 0.5 mm, which is one-half the pitch used in the first embodiment In correspondence to this, the width of the grooves change with a step of 2.82 $\mu$m. The dicing is made along the dicing line Zc.

It should be noted that the bonding pad structure 141 of the laser diode 240 or the lens-hold depression 131 of the lens 230 are provided with the pitch of 1 mm in the present embodiment, similarly as before. Thus, there occurs a case in which the alignment between the laser diode 240 and the lens 230c is lost even when the proper selection is made for the engagement grooves of the engagement groove structures 142 and 132.

Figure 33A:
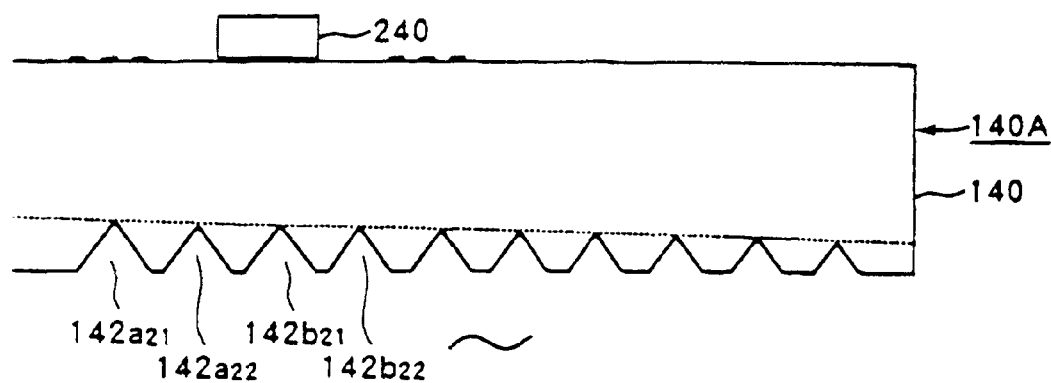
FIGS. 33A and 33B are diagrams showing the optical coupling structure of FIG. 32 in detail.
Figure 33B:
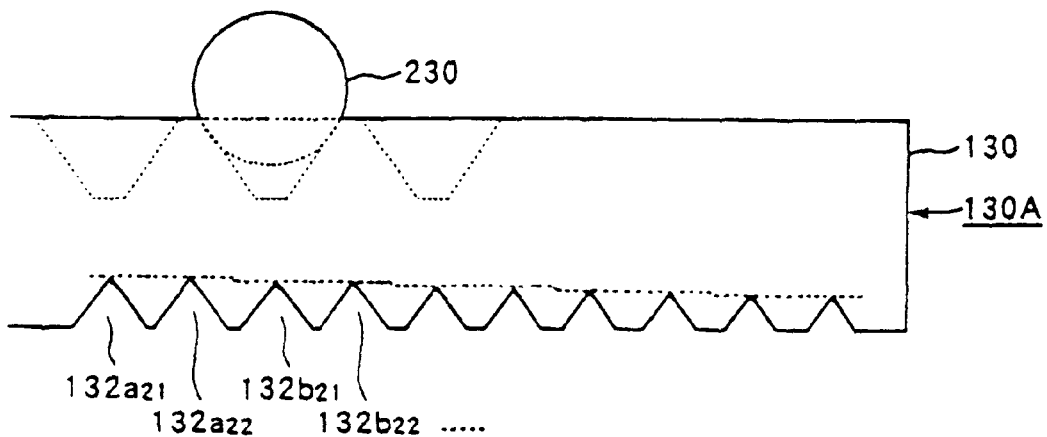

In order to avoid this problem, the present invention modifies the engagement groove structures 142 or 132 as represented in FIGS. 33A and 33B.

Referring to FIG. 33A showing the engagement groove structure 142 for the sub-carrier 140A, it will be noted that the depth of the V-shaped grooves $142a_{21}$, $142a_{22}$, $142b_{21}$, $142b_{22}$, ... changes gradually and monotonously from one end of the substrate 140 to the other end, while adjacent grooves such as the grooves $132a_{21}$ and $132a_{22}$, $132b_{21}$ and $132b_{22}$, ... of the engagement groove structure 132 are formed to have the same groove depth. Thus, the lateral deviation of the lens 230 with respect to the laser diode 240 by a half-pitch of the lens array on the sub-carrier 130A is successfully eliminated by selecting one of the adjacent grooves such as the groove $132a_{21}$ or $132a_{22}$ for the engagement with the guide ridge 101 of the common substrate 100A.

Due to the increased number of the engagement grooves in the engagement groove structures 132 and 142, the optical coupling structure of the present embodiment can achieve the desired optical alignment of the laser diode 240 and the lens 230 within the precision of ±1 $\mu$m for the case in which the wafer used for the sub-carriers 140A and 130A has a thickness deviated from an ideal thickness by as much as ±11 $\mu$m.

In the construction of FIGS. 33A and 33B, it is obvious that the groove pattern can be interchanged.

THIRD EMBODIMENT

Figure 34A:
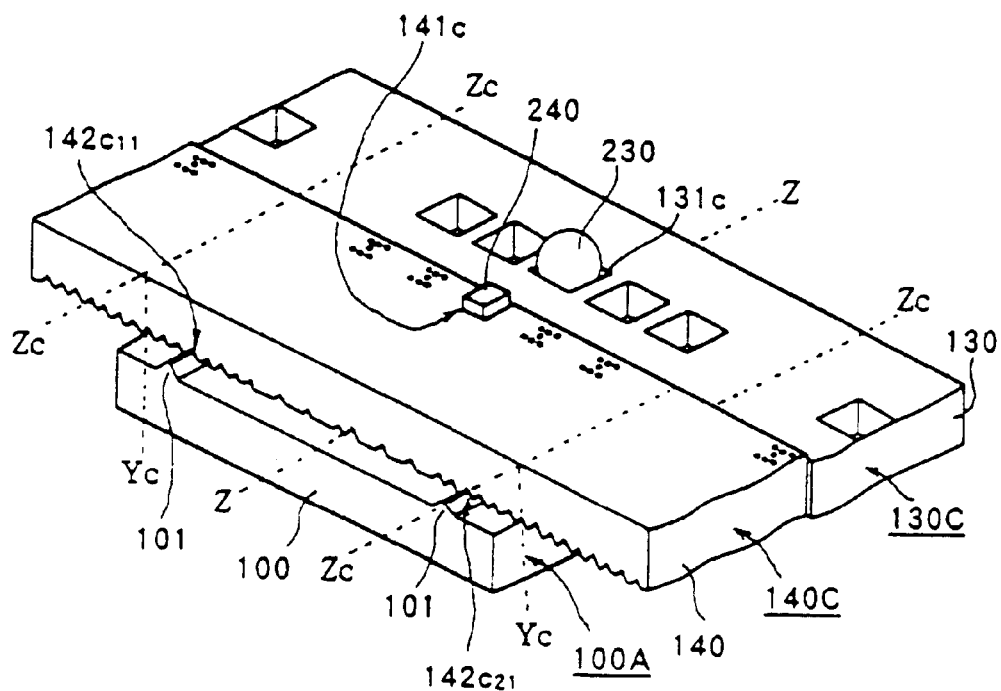
FIGS. 34A and 34B are diagrams showing the optical coupling structure according to a third embodiment of the present invention.
Figure 34B:
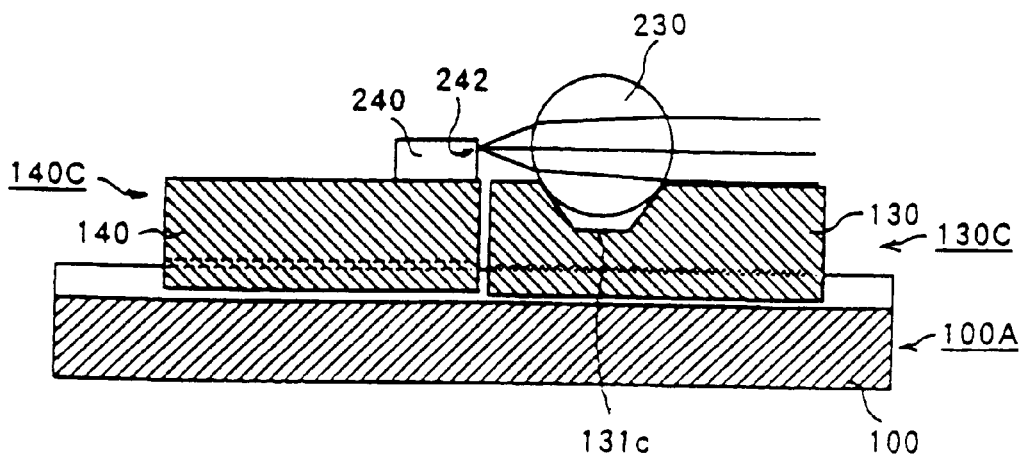

FIGS. 34A and 34B show the optical coupling structure according to a third embodiment of the present invention, wherein those parts corresponding to the parts described previously are designated by the same reference numerals and the description thereof will be omitted.

Referring to FIGS. 34A and 34B, the optical coupling structure has a construction similar to that of FIG. 32, except that the laser diode 240 is mounted on the sub-carrier 140C in a face-up state. Thus, the laser diode 240 is electrically connected by way of bonding wires (not shown) that connects a pattern on the sub-carrier 140C with a corresponding electrode at the top surface of the laser diode 240.

Figure 35A:
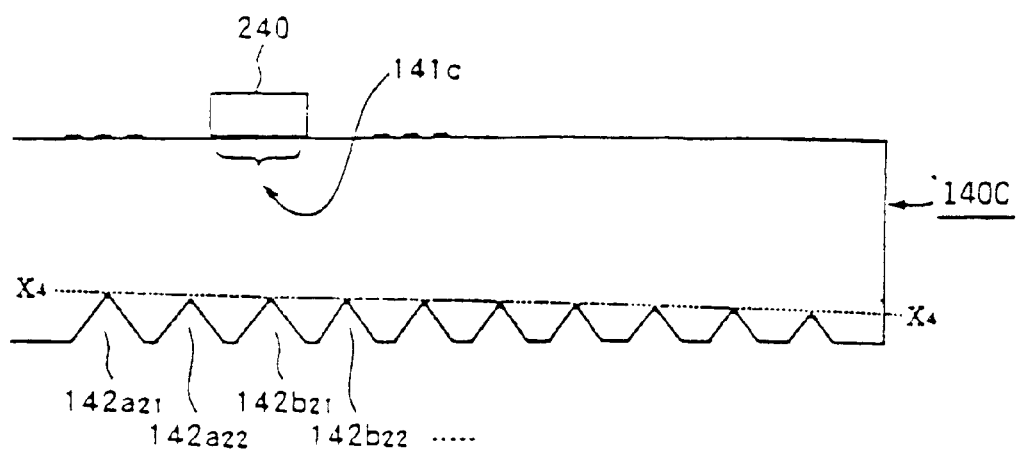
FIGS. 35A and 35B are diagrams showing the optical coupling structure of FIGS. 34A and 34B in detail.
Figure 35B:
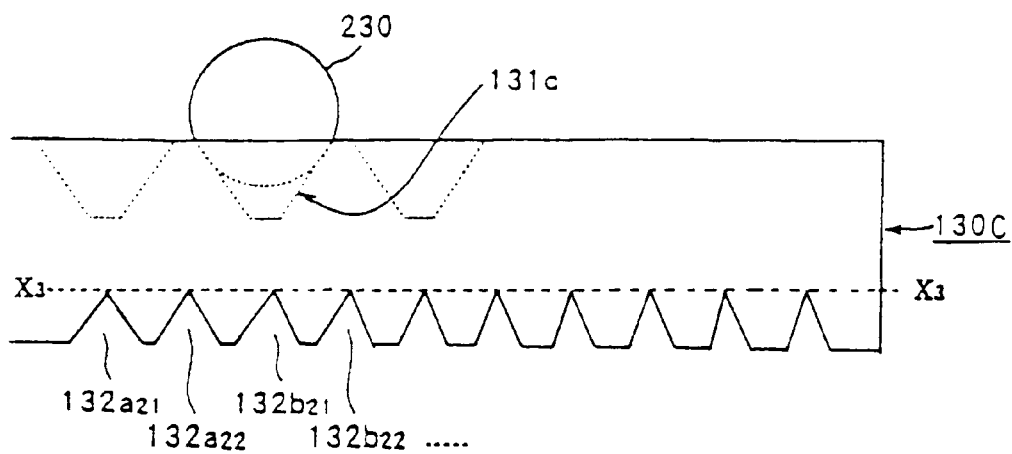

As indicated in FIGS. 35A and 35B, the sub-carriers 140C and 130C have the construction substantially identical with those of FIGS. 33A and 33B. Thus, the optical coupling structure of the present embodiment provides the precision of optical alignment of ±1 $\mu$m even when the deviation of the thickness of the Si wafer used to form the subs carriers 140C and 130C reaches as much as ±11 $\mu$m, similarly to the previous embodiment.

It should be noted that the present embodiment enables a precise control of the height of the optical axis of the laser diode 240 even when the laser diode 240 is mounted in the face-up state. As already noted, such a face-up mounting of the laser diode tends to cause an error in the height of the optical axis due to the error in the thickness of the device substrate such as the InP substrate 201. In the present embodiment the thickness of the device substrate is measured and a suitable bonding pad is selected from the bonding pad structure 141 in response to the result of the measurement. As the thickness of the device substrate of a laser diode is controlled within about ±10 $\mu$m by way of polishing, the optical coupling structure of the present embodiment is effective for compensating for the vertical deviation of the optical axis of the laser diode.

FOURTH EMBODIMENT

Figure 36A:
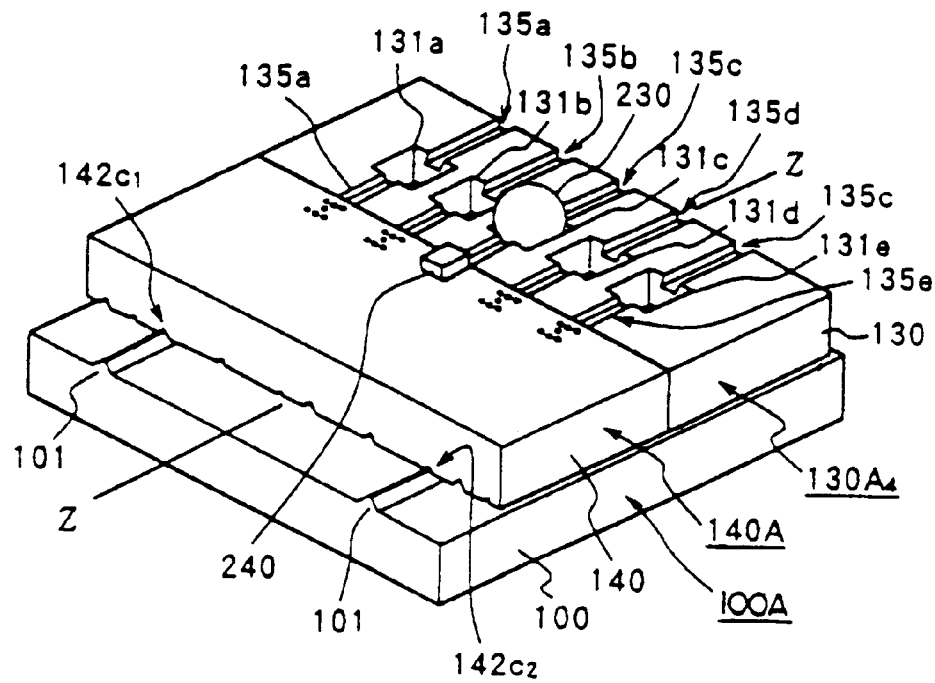
FIGS. 36A and 36B are diagrams showing the construction of an optical coupling structure according to a fourth embodiment of the present invention.
Figure 36B:
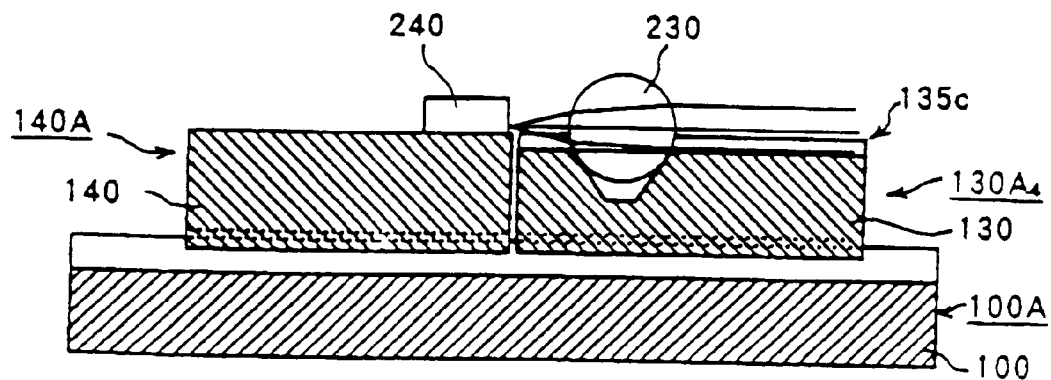

FIGS. 36A and 36B show the construction of an optical coupling structure according to a fourth embodiment of the present invention respectively in an oblique view and a cross-sectional view taken along a z—z line of FIG. 36A, wherein those parts corresponding to the parts described previously are designated by the same reference numerals and the description thereof will be omitted.

Referring to FIGS. 36A and 36B, the optical coupling structure includes the sub-carrier 140A and a sub-carrier $130A_4$ on the common substrate 100A similarly to the previous embodiments except that the sub-carrier 140A and the sub-carrier 130A are formed from separate Si wafers. Furthers the sub-carrier $130A_4$ carries thereon a groove structure 135 including a plurality of grooves $135a$–$135e$ in continuation with the lens-hold depressions $131a$–$131e$ for the lens 230, as a passage of the optical beam passed through the lens 230.

In the present embodiments each of the lens-hold depressions $131a$–$131e$ may have a size of 968.5 $\mu$m at the top edge of the substrate 130 and the optical axis at the height of 6.52 $\mu$m. On the other hand, each of the foregoing grooves $135a$–$135e$ for the optical beam has a width of 200 $\mu$m and a depth of 100 $\mu$m and formed by using a dicing saw. The engagement grooves $132a$–$132e$ of the present embodiment are formed identically to the engagement grooves $132a$–$132e$ of the previous embodiments.

According to the present embodiments it is possible to increase the number of the engagement grooves forming the engagement groove structures 132 and 142, by reducing the width of the engagement grooves therein. Thereby, it is possible to expand the range of compensation of the wafer thickness variation.

FIFTH EMBODIMENT

Figure 37:
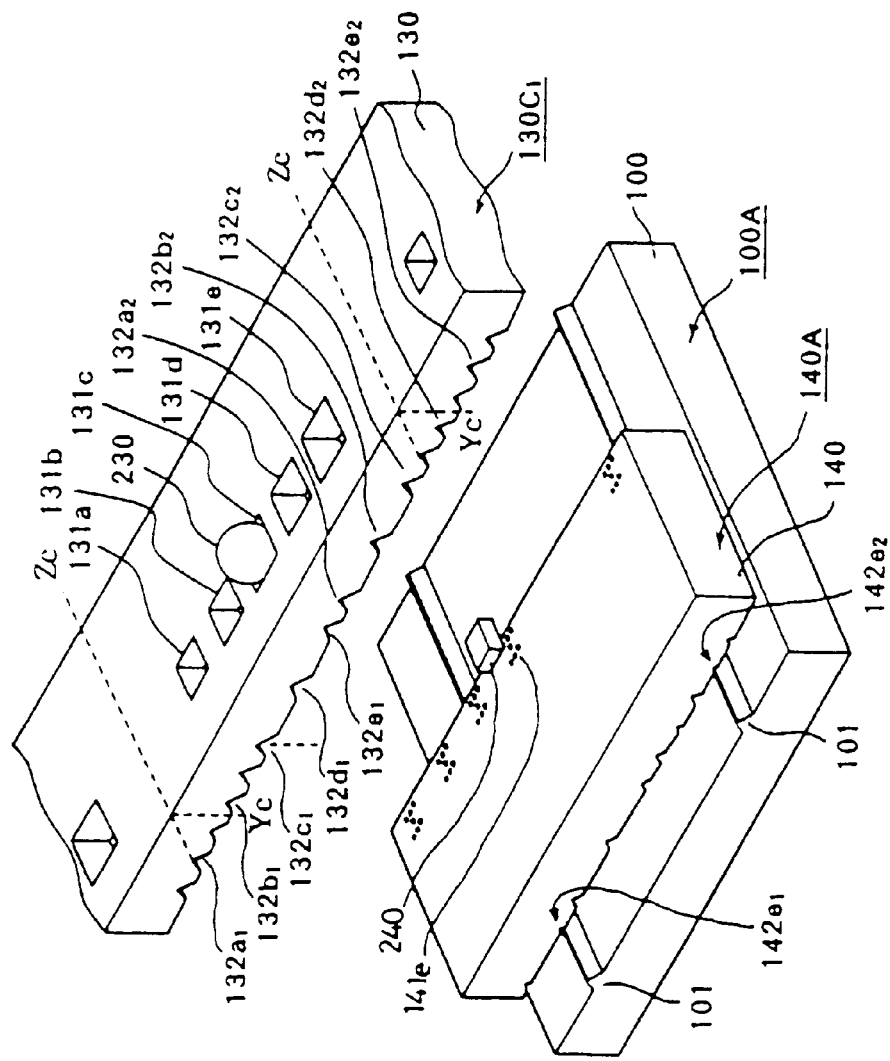
FIG. 37 is a diagram showing the construction of an optical coupling structure according to a fifth embodiment of the present invention.

FIG. 37 shows the construction of an optical coupling structure according to a fifth embodiment of the present inventions wherein those parts corresponding to the parts described previously are designated by the same reference numerals and the description thereof will be omitted.

Referring to FIG. 37, a sub-carrier $130C_1$ is used for carrying the spherical lens 230, in place of any of the sub-carriers 130A–130C, wherein it should be noted that the engagement grooves forming the engagement groove structure 132 and 142 on the sub-carrier $130C_1$ or the sub-carrier 140A have the same, common width, contrary to the previous embodiment. On the other hand, the size of the lens-hold depressions 131a–131e on the sub-carrier $130C_1$ changes from the depression 131a to the depression 131e consecutively or monotonously. For example, the depressions 131a–131e have respective edge lengths such that the edge length of the depression 131a is 799.6 μm, the edge length of the depression 131b is 803.1 μm, the edge length of the depression 131c is 806.1 μm, the edge length of the depression 131d is 810.0 μm, and the edge length of the depression 131e is 813.52 μm, Thus, the present embodiment successfully reduces the alignment error of the optical axis between the laser diode 240 and the lens 230 within ±1 μm, provided that the variation in the thickness of Si wafer used for the substrate 130 is within ±5 μm.

It should be noted that the present embodiment for changing the size of the lens-hold depressions 131 in place of changing the width of the engagement grooves is by no means limited to the case as described for holding a spherical lens on the sub-carrier $130C_1$, but is applicable also to the case of holding a cylindrical lens 230 or an optical waveguide on the sub-carrier $130C_1$.

SIXTH EMBODIMENT

Figure 38A:
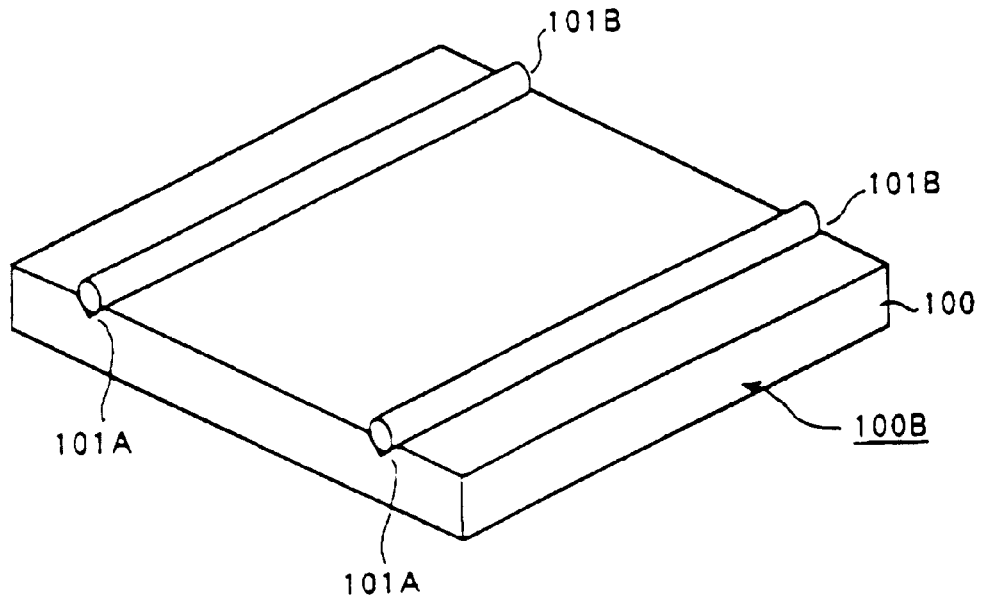
FIGS. 38A and 38B are diagrams showing a part of an optical coupling structure according to a sixth embodiment of the present invention.
Figure 38B:
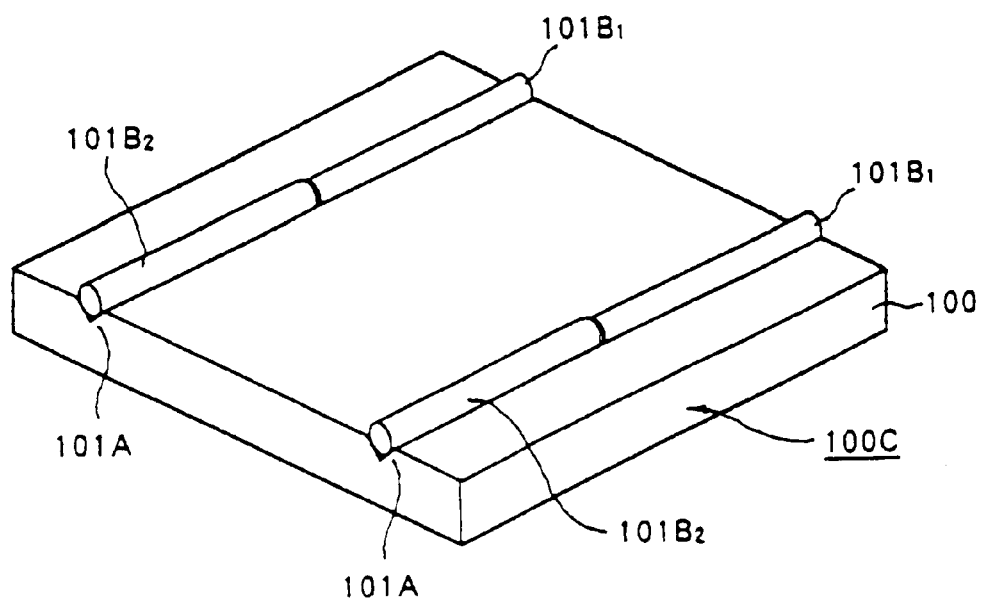

FIGS. 38A and 38B show the construction of an optical coupling structure according to a sixth embodiment of the present invention, wherein those parts corresponding to the parts described previously are designated by the same reference numerals and the description thereof will be omitted.

Referring to FIG. 38A, the present embodiment provides a substrate 100B in place of the common substrate 100A, wherein the common substrate 100B carries thereon a pair of cylindrical rods 101B in place of the ridges 101. In order to hold the rods 101B, the substrate 100B is formed with a pair of V-shaped grooves 101A, and the relative height of the rods 101B with respect to the substrate 100A can be adjusted either by changing the diameter of the cylindrical rods 101B or the width of the grooves 101A.

In the modification of FIG. 38B on the other hand, two pairs of the rods, the rods $101B_1$ and $101B_2$, are used in place of the rods 101B of FIG. 38A, such that the rod $101B_1$ is in alignment with the rod $101B_2$. Thereby, it is possible to adjust the height of the rod pair $101B_1$ used for supporting the sub-carrier 130A with respect to the height of the rod pair $101B_2$, which is used for supporting the sub-carrier 140A, independently. Thereby, the height of the sub-carrier 140A and hence the height of the optical axis of the laser diode 240 held thereon is adjusted with respect to the height of the sub-carrier 130A and hence the height of the optical axis of the lens 230.

SEVENTH EMBODIMENT

Figure 39:
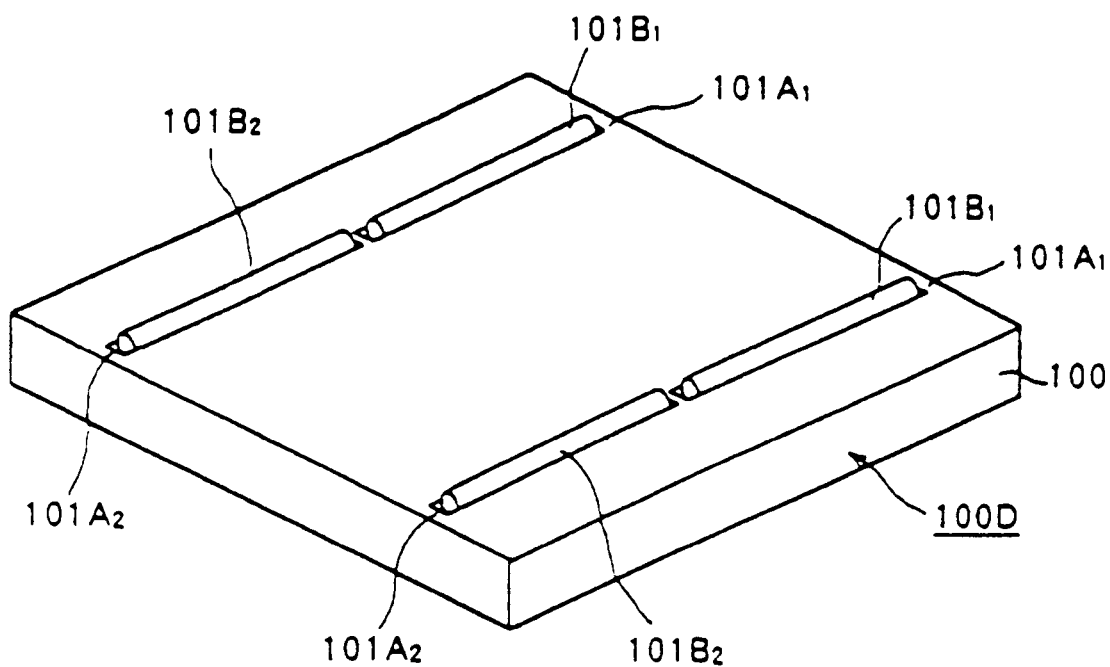
FIG. 39 is a diagram showing a part of an optical coupling structure according to a seventh embodiment of the present invention.

FIG. 39 shows the construction of an optical coupling structure according to a seventh embodiment of the present invention, wherein those parts corresponding to the parts described previously are designated by the same reference numerals and the description thereof will be omitted.

Referring to FIG. 39, the optical coupling structure uses a common substrate 100D in place of the common substrate 100C of the previous embodiment, wherein the common substrate 100C is formed with a pair of V-shaped grooves $101A_1$ and another pair of V-shaped grooves $101A_2$, such that each of the grooves forming the pair $101A_1$ is aligned in the elongating direction thereof with a corresponding V-shaped groove of the pair $101A_2$. The grooves forming the pair $101A_1$ accommodate therein the cylindrical rods $101B_1$ used in the previous embodiment, while the grooves forming the pair $101A_2$ accommodate therein the cylindrical rods $101B_2$ used also in the previous embodiment.

In the present embodiment, it is possible to adjust the height of the sub-carrier 130A held by the rods $101B_1$ on the common substrate 100D with respect to the height of the sub-carrier 140A, which is held by the rods $101B_2$ on the same common substrate 100D, by merely adjusting the width of the grooves $101A_1$ with respect to the width of the grooves $101A_2$.

EIGHTH EMBODIMENT

Figure 40A:
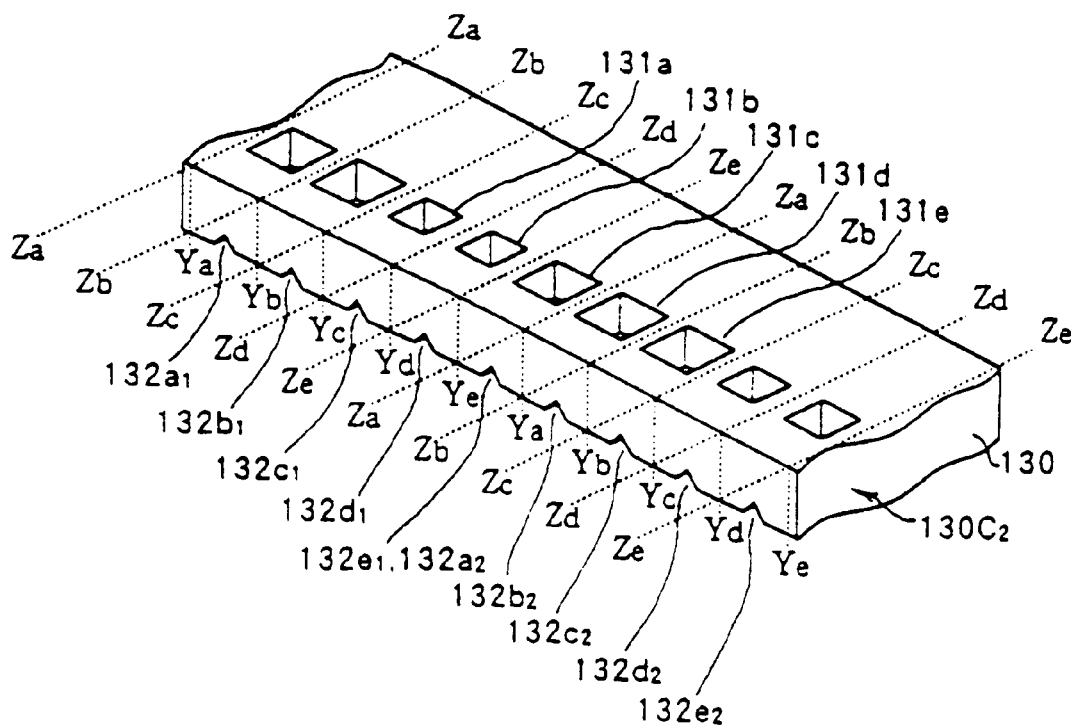
FIGS. 40A and 40B are diagrams showing a sub-carrier used in an optical coupling structure according to an eighth embodiment of the present invention.

FIG. 40A shows the construction of a sub-carrier $130C_2$ used for carrying the lens 230, wherein those parts corresponding to the parts described previously are designated by the same reference numerals and the description thereof will be omitted.

Referring to FIG. 40A, the sub-carrier $130C_2$ is formed, at the bottom surface thereof, with the engagement grooves $132a_1$–$132e_2$ as the engagement groove structure 132 similarly to the previous embodiments except that the engagement grooves $132a_1$–$132e_2$ have a common width and are formed with a uniform mutual separation. Thus, in order to achieve the desired compensation of the variation of the height of the optical axis, the lens-hold depressions 131a–131e are formed to have respective, different sizes, similarly to the fifth embodiment.

Figure 40B:
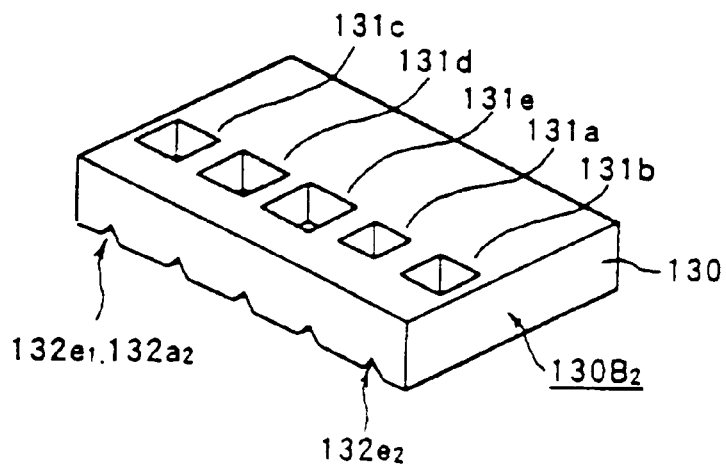

Thus, when the substrate 130 has a thickness larger than the ideal thickness by 4 μm, for example, due to the error in the thickness of the wafer from which the substrate 130 and hence the sub-carrier $130C_2$ is formed, the structure of FIG. 40A is diced at the line Ze shown in FIG. 36A to form a sub-carrier $130B_2$ shown in FIG. 40B, The lens 230 is thereby mounted on the depression 131e. When the thickness of the substrate 130 coincides the ideal thickness, on the other hand, the dicing of the substrate 130 is carried out at the line Zc, and the lens 230 is mounted on the depression 131c.

As the engagement grooves $132a_1$–$132e_2$ have the same width throughout, it is possible to choose any of the suitable groove pairs for engagement with the corresponding ridges 101 on the common substrate 100A. This means that the lateral size of the chip of FIG. 40B may be increased or decreased as desired.

It should be noted that the width of the ridges 101 used for supporting the sub-carrier $130B_2$ may be different from the width suitable for the ridges 101 supporting the sub-carrier 140A. It should be noted that the sub-carrier 140A lacks a mechanism to adjust the height of the laser diode 240 mounted on the top surface thereof.

Figure 41A:
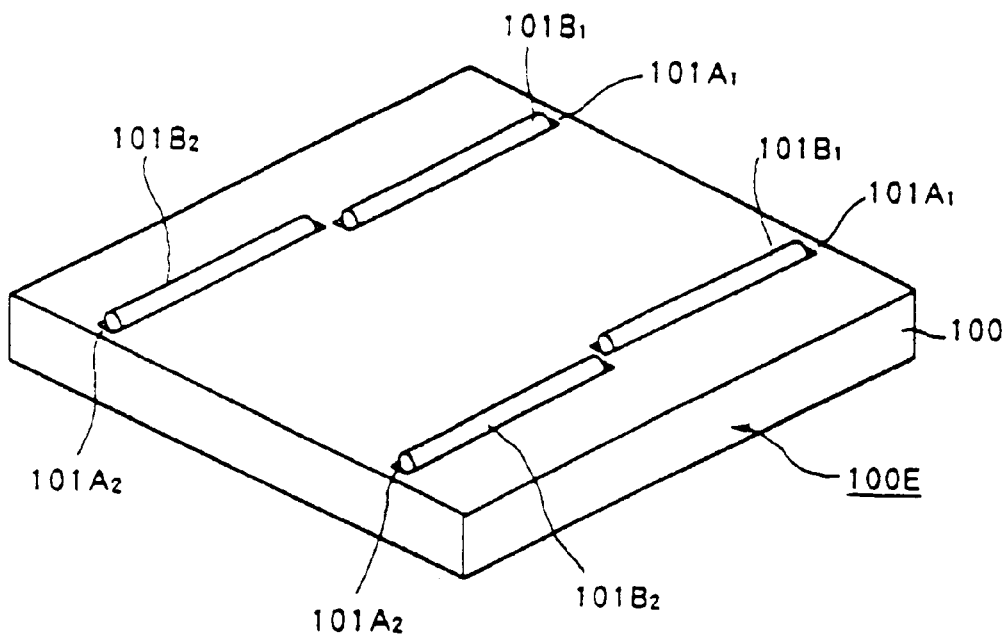
FIGS. 41A and 41B are diagrams showing a common substrate used in the optical coupling structure of the eighth embodiment.

Thus, the optical coupling structure of the present embodiment uses a common substrate 100E indicated in FIG. 41A in place of the common substrate 100A.

Referring to FIG. 41A, the common substrate 100E is formed with the V-shaped groove pairs $101A_1$ and $101A_2$ similarly to the common substrate 100D of FIG. 39, except that the lateral separation of the grooves forming the pair 101A$_1$ is different from the lateral separation of the grooves forming the pair 101A$_2$.

Figure 41B:
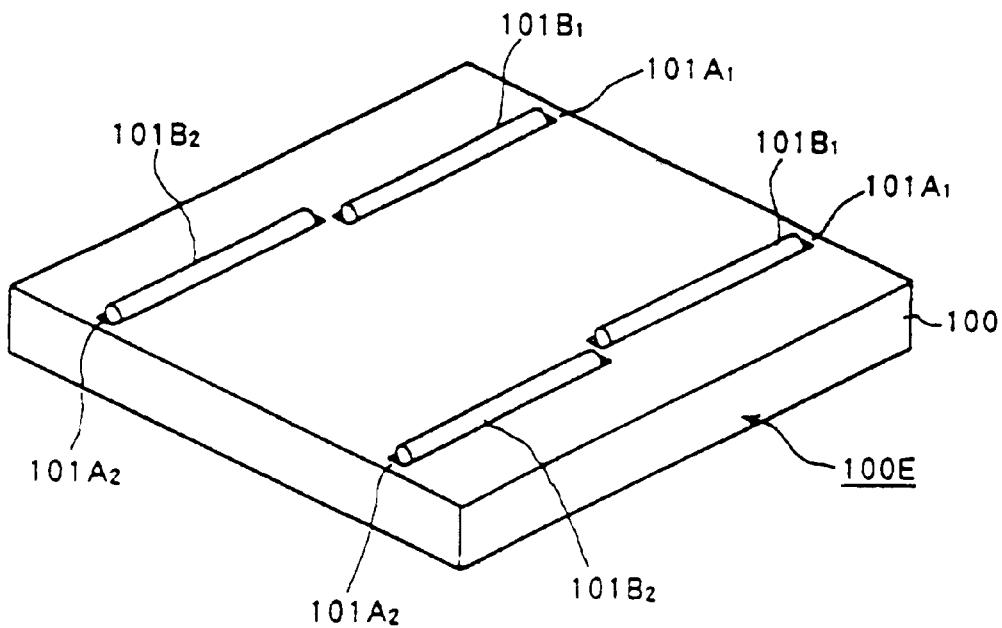

Further, FIG. 41B shows a modification of the structure of FIG. 41A in which the diameter of the rods 101B$_1$ is changed with respect to the diameter of the rods 101B$_2$. By changing the diameter of the rods as such, it is possible to adjust the height of the sub-carrier 130B$_2$ held by the rods 101B$_1$ with respect to the sub-carrier 140A hold by the rods 101B$_2$ on the common substrate 100E. Of course, the same adjustment is possible by changing the width of the grooves 101A$_2$ with respect to the width of the grooves 101A$_1$.

Figure 42:
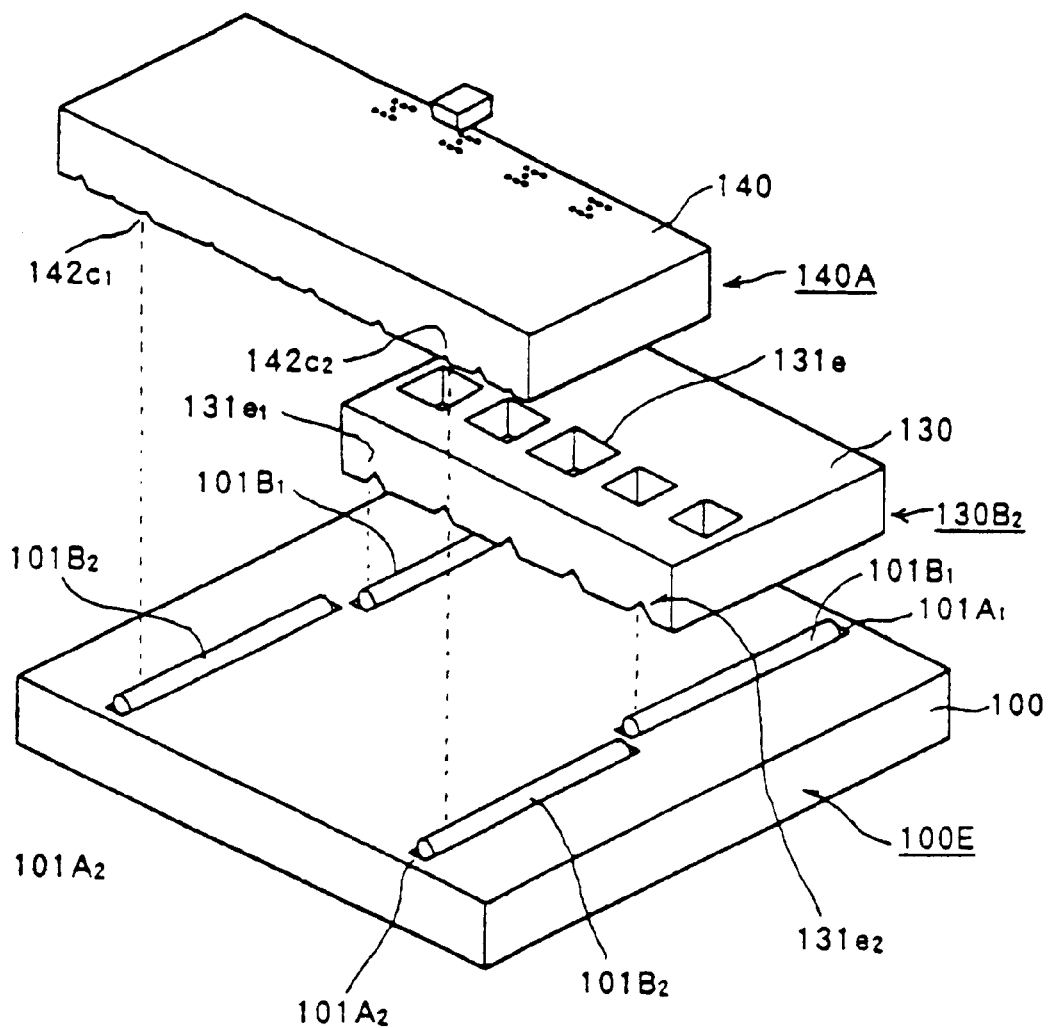
FIG. 42 is a diagram showing the construction of the optical coupling structure of the eighth embodiment.

FIG. 42 shows the mounting of the sub-carrier 140A and the sub-carrier 130B$_2$ on the common substrate 100E. In the optical coupling structure of FIG. 42, it should be noted that the any of the groove pairs may be chosen for the engagement with the rods 101B$_1$ forming the ridge structure on the substrate 100E. Thus, it is always possible to find the lens-hold depression 131 in which the lens 230 achieves an optical coupling with the laser diode 240 vertically as well as laterally.

In relation to the latter feature, it should be noted that the sub-carrier 130C$_2$ of the present invention shown in FIG. 40A may be formed with the blocks each including the depressions 131a–131e, without forming a large space between adjacent blocks. Thus, the lens-hold depression 131a of a selected block may be formed adjacent to a lens hold depression 131e belonging to an adjacent block at the left of the selected block with a separation identical with the separation formed between the depression 131a and the depression 131b of the same selected block. Similarly, the depression 131e of the selected block may be formed adjacent to a depression 131a belonging to an adjacent block at the right of the selected block with a separation identical with the separation formed between the depression 131e and the depression 131d of the same selected block. Thereby, it is possible to define a large number of the blocks on the common wafer (see FIG. 29A), and the waste of the material of the wafer at the time of the dicing process is minimized.

NINTH EMBODIMENT

Figure 43A:
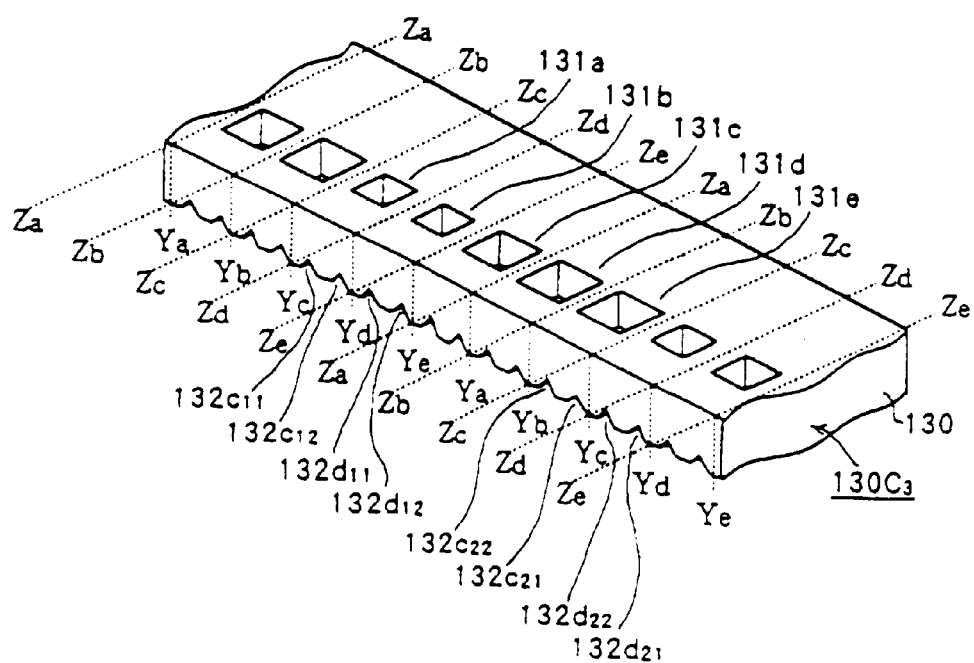
FIGS. 43A and 43B are diagrams showing a sub-carrier used in an optical coupling structure according to a ninth embodiment of the present invention.
Figure 43B:
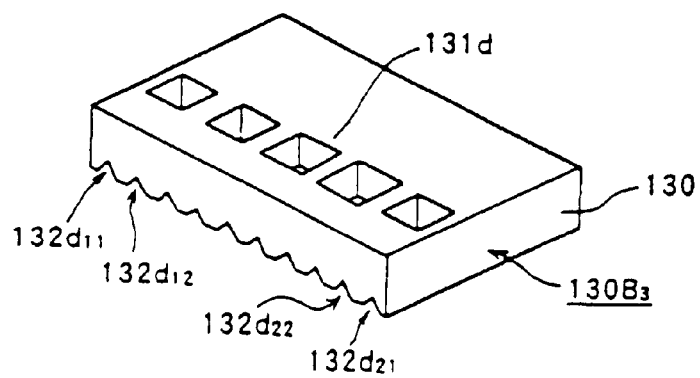

FIGS. 43A and 43B show a part of the optical coupling structure according to a ninth embodiment of the present invention, wherein those parts corresponding to the parts described previously are designated by the same reference numerals and the description thereof will be omitted.

Referring to FIG. 43A showing a sub-carrier 130C$_3$ prior to the diced state, the sub-carrier 130C$_3$ carries the engagement groove structure 132 in the state that the number of the grooves included therein is increased twice as compared with the case of FIGS. 36A and 36B. Further, FIG. 43B shows a sub-carrier 130B$_3$ obtained as a result of the dicing of the sub-carrier 130C$_3$.

Figure 44:
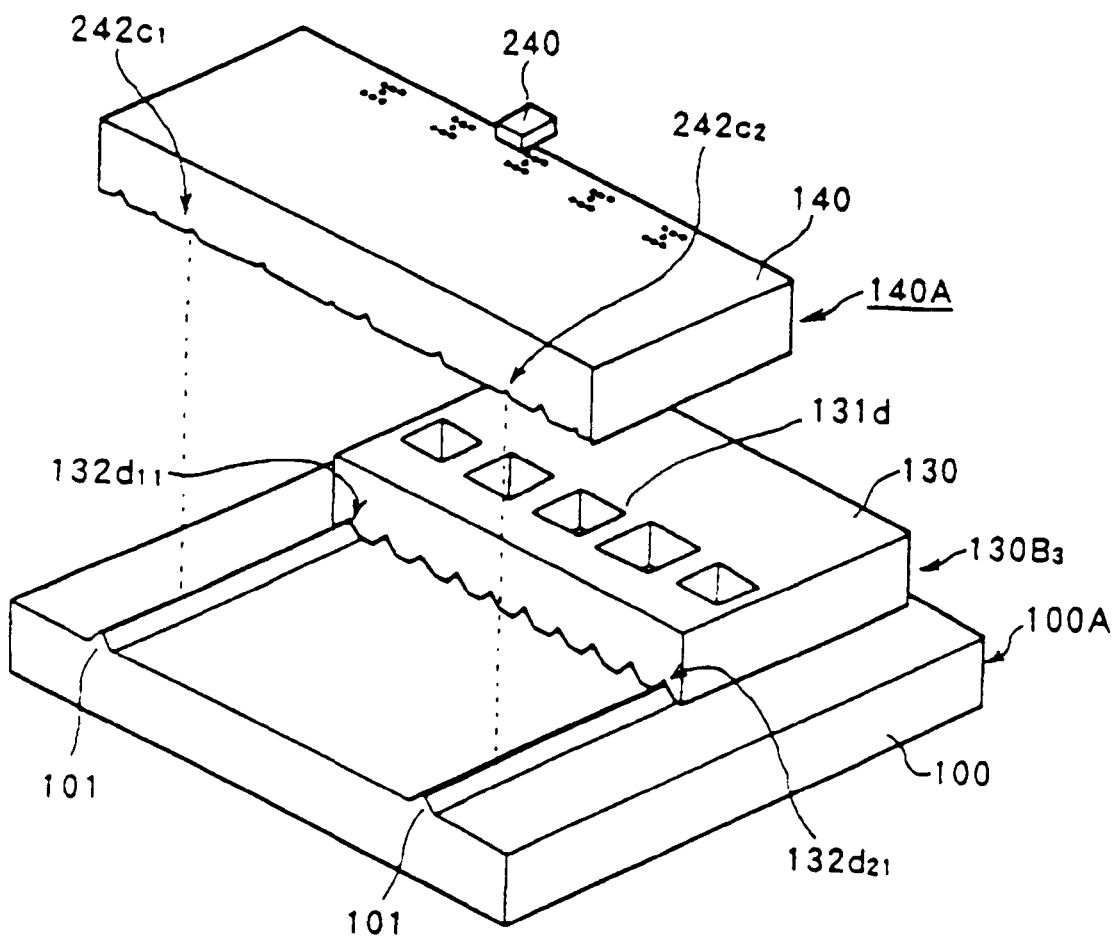
FIG. 44 is a diagram showing the construction of the optical coupling structure of the ninth embodiment.

FIG. 44 shows the mounting of the sub-carriers 140A and 130B$_3$ on the common substrate 100A, wherein it should be noted that a proper alignment can be achieved for the lens 230 held in any of the depressions 131a–131e with respect to the laser diode 240 held on the sub-carrier 140A, by merely selecting a set of grooves from the grooves formed on the substrate 130 with a pitch smaller than the pitch of the depressions 130 by one-half. See the description relating to FIGS. 33A and 33B before.

In the foregoing first through ninth embodiments describing the optical coupling between a laser diode and a spherical lens, it should be noted that the [SECOND PROBLEM] examined with reference to the prior art with regard to the corrosion of the bonding pads 141 at the time of formation of the engagement grooves is successfully avoided by using separate wafers 1a and 1b for the source of the sub-carriers.

TENTH EMBODIMENT

Figure 45A:
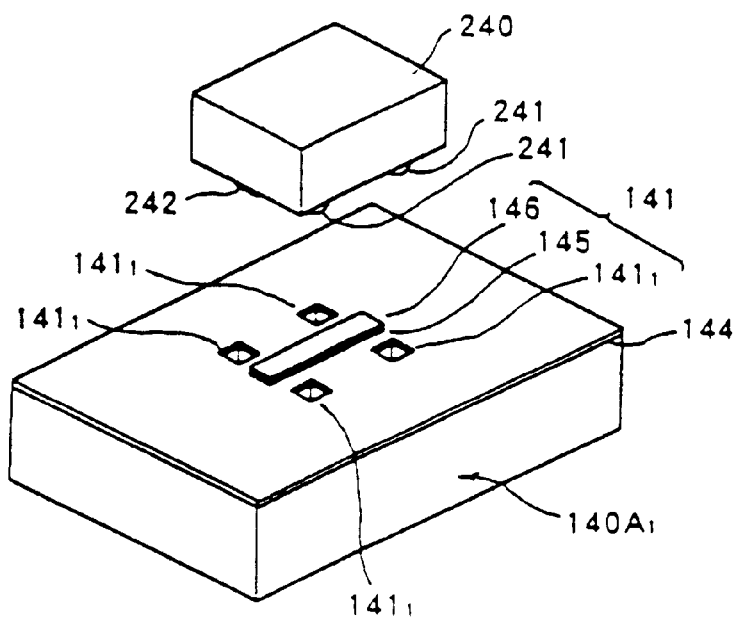
FIGS. 45A and 45B are diagrams showing the construction of an optical coupling structure according to a tenth embodiment of the present invention.
Figure 45B:
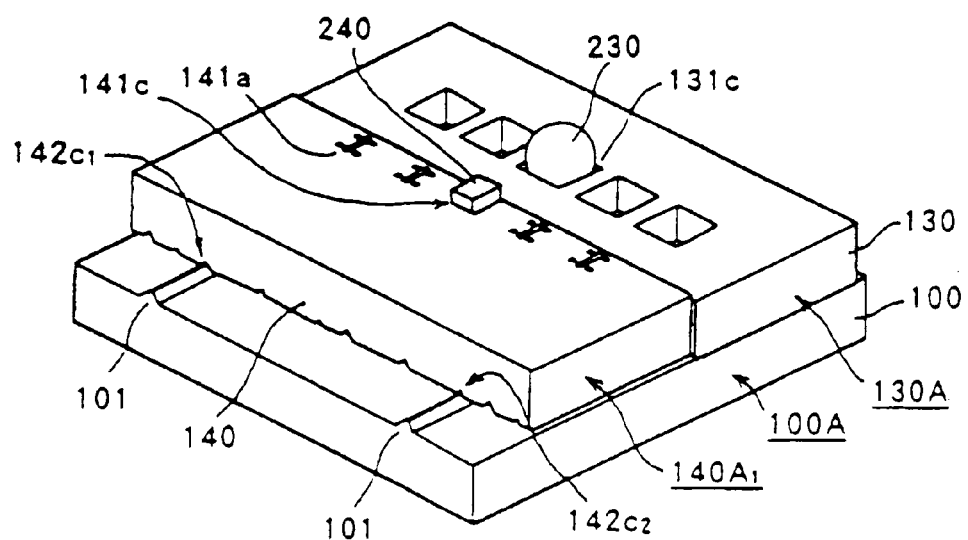

FIGS. 45A and 45B show the construction of an optical coupling structure according to a tenth embodiment of the present invention, wherein those parts corresponding to the parts described previously are designated by the same reference numerals and the description thereof will be omitted.

Figure 1A:
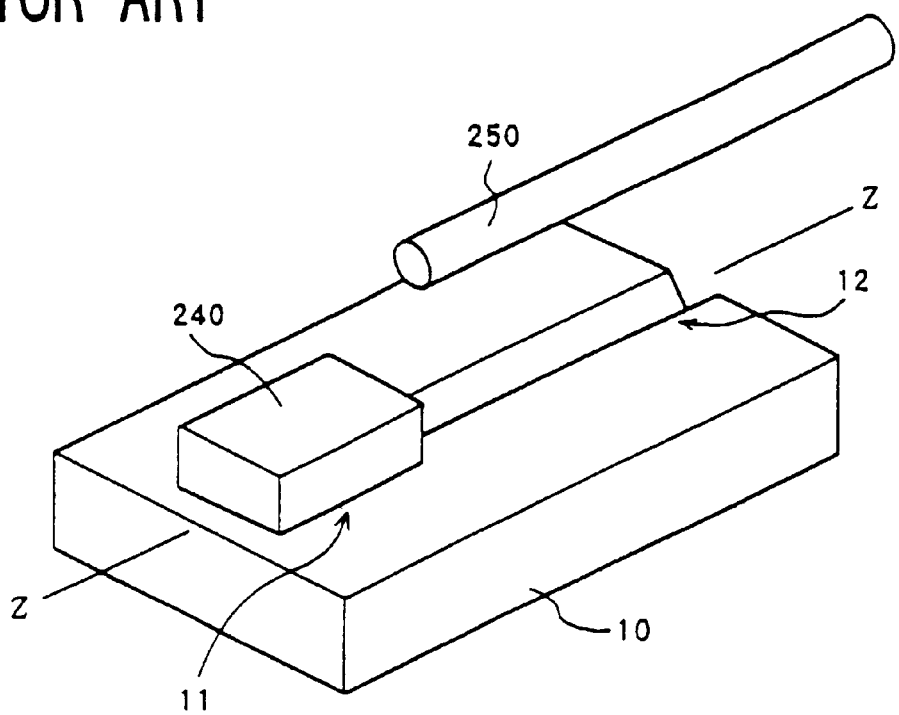
FIGS. 1A and 1B are diagrams showing the construction of a conventional optical coupling structure.
Figure 1B:
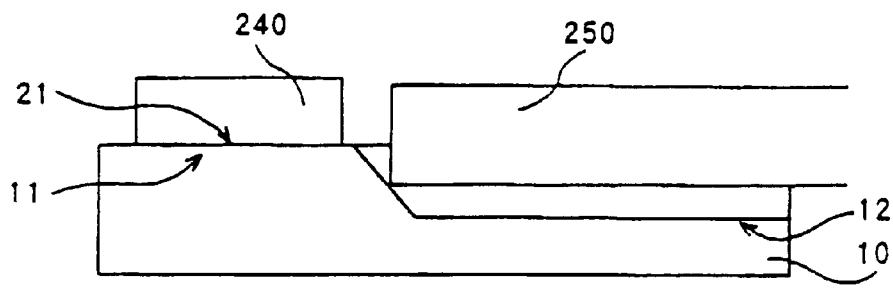
Figure 2A:
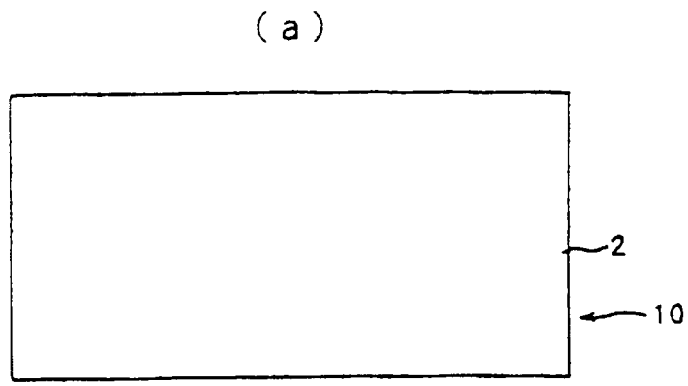
FIGS. 2A–2E are diagrams showing a fabrication process of the optical coupling structure of FIGS. 1A and 1B.
Figure 2B:
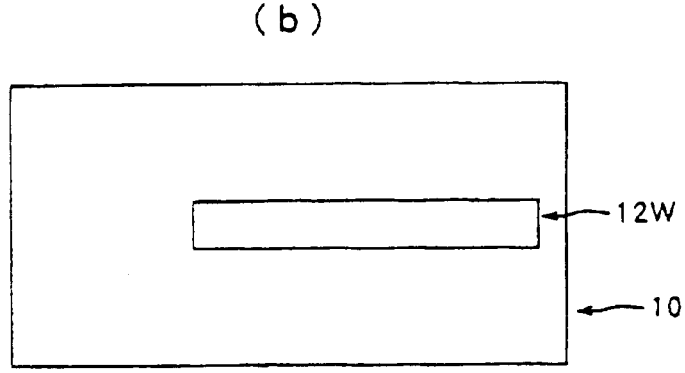
Figure 2C:
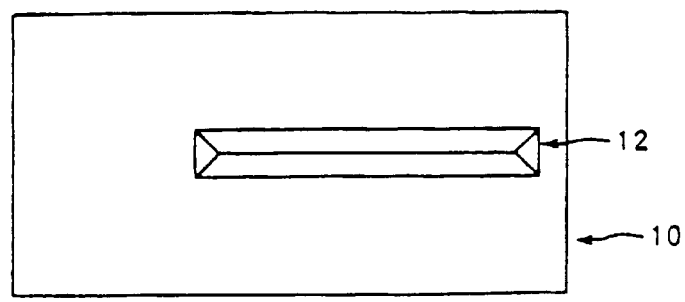
Figure 2D:
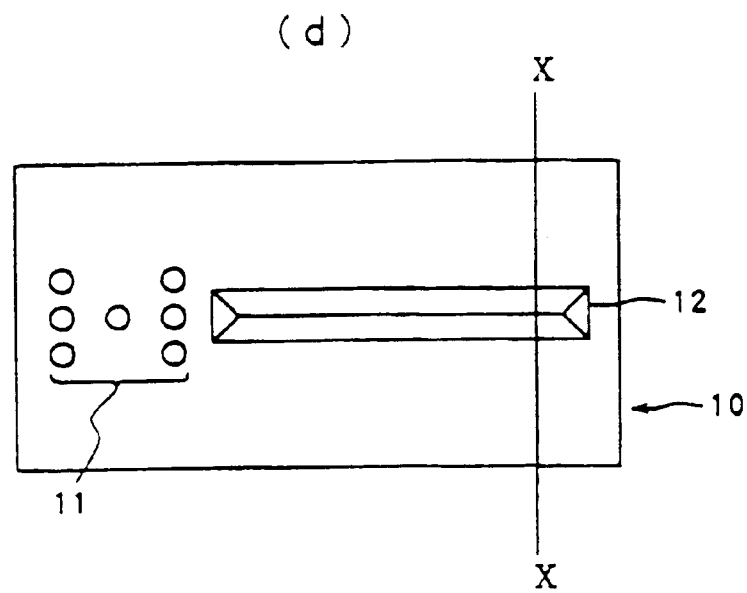
Figure 2E:
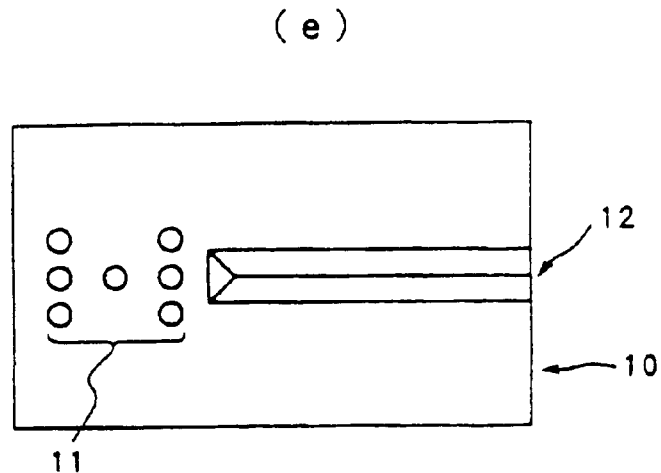
Figure 3:
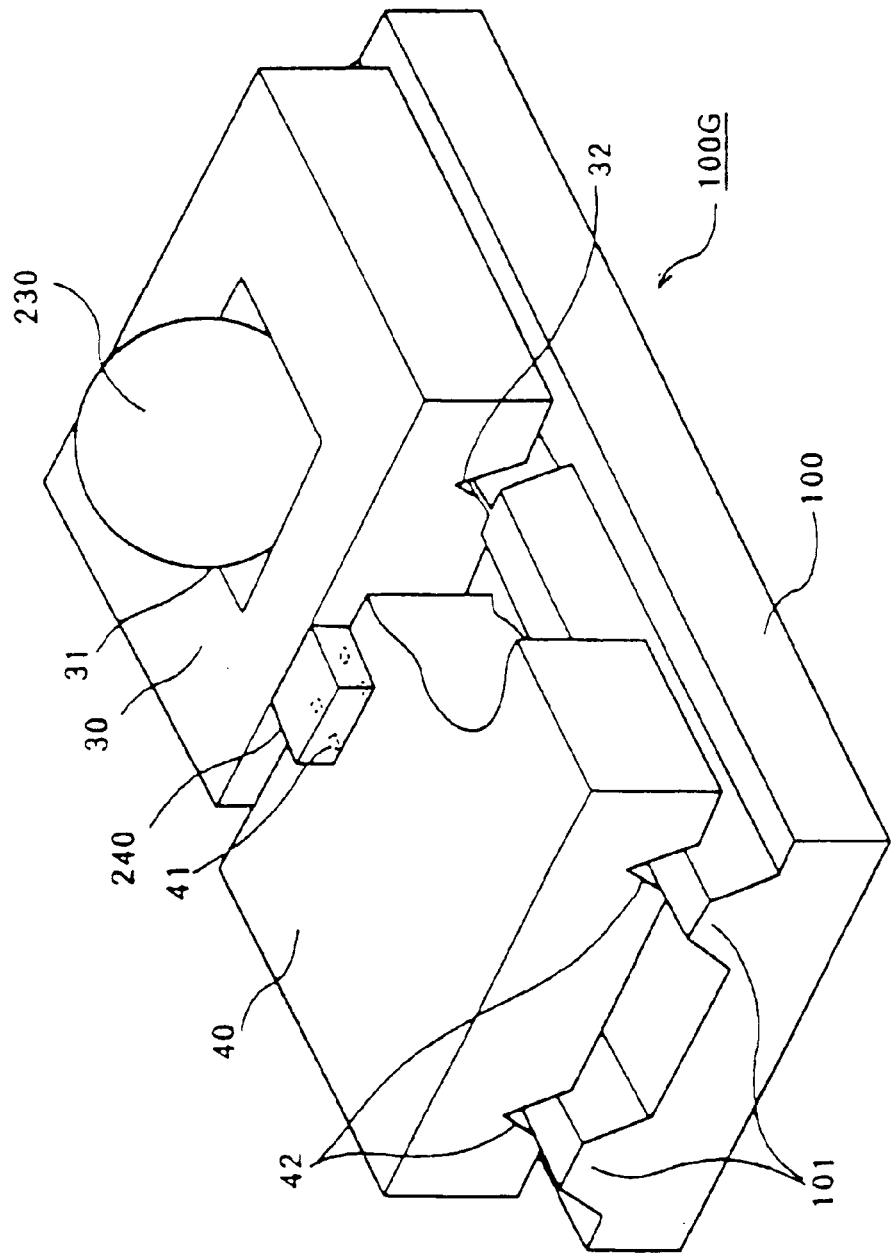
FIG. 3 is a diagram showing the construction of another conventional optical coupling structure.
Figure 4A:
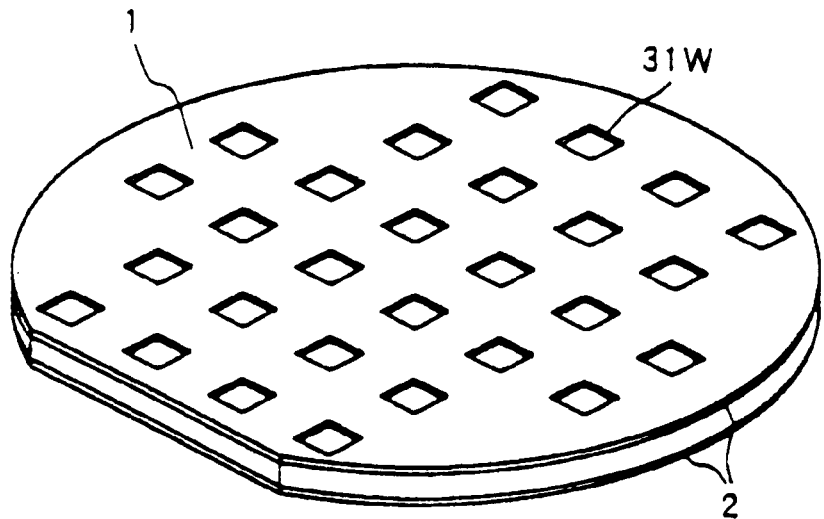
FIGS. 4A–4I are diagrams showing the construction of the optical coupling structure of FIG. 3.
Figure 4B:
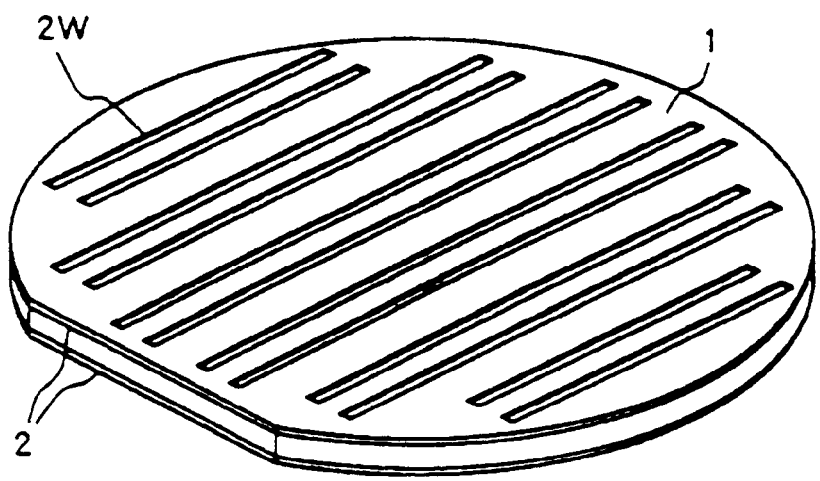
Figure 4C:
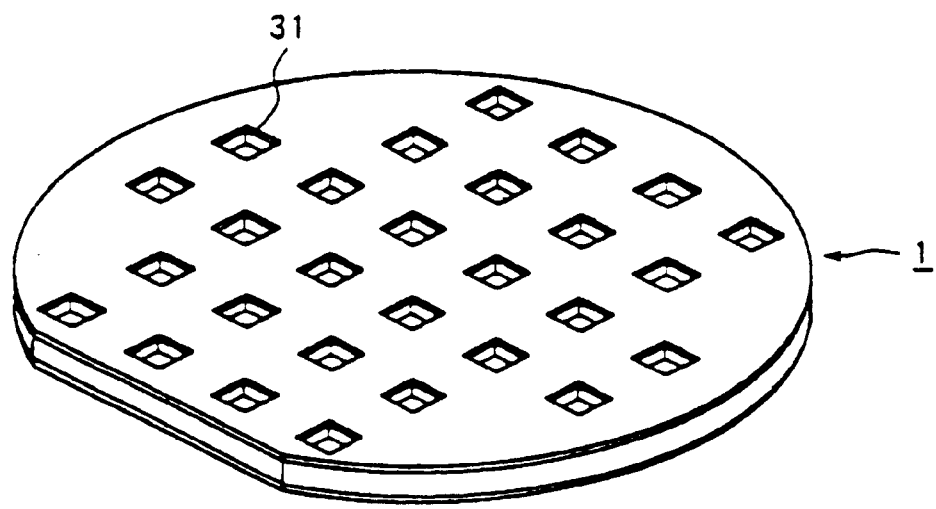
Figure 4D:
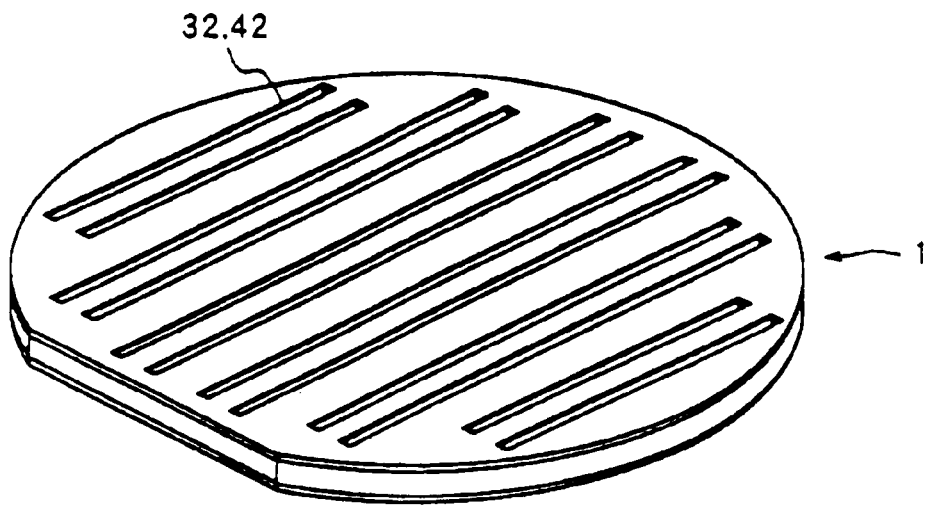
Figure 4E:
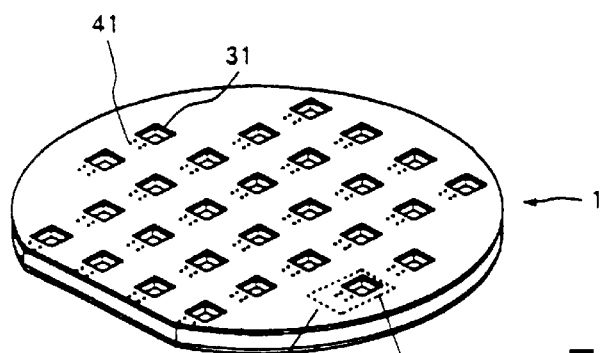
Figure 4F:
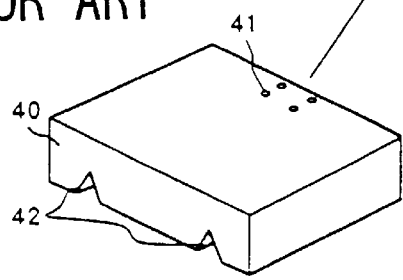
Figure 4G:
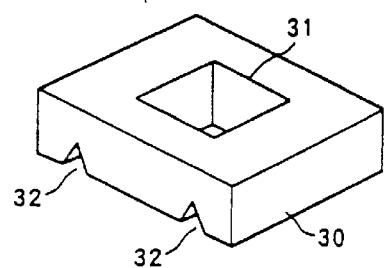
Figure 4H:
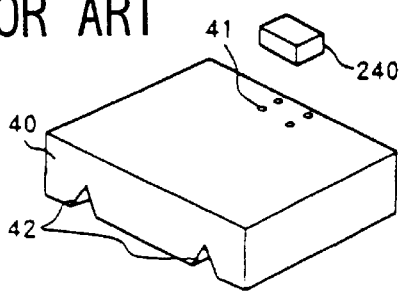
Figure 4I:
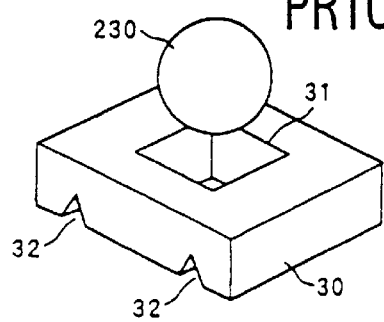
Figure 5:
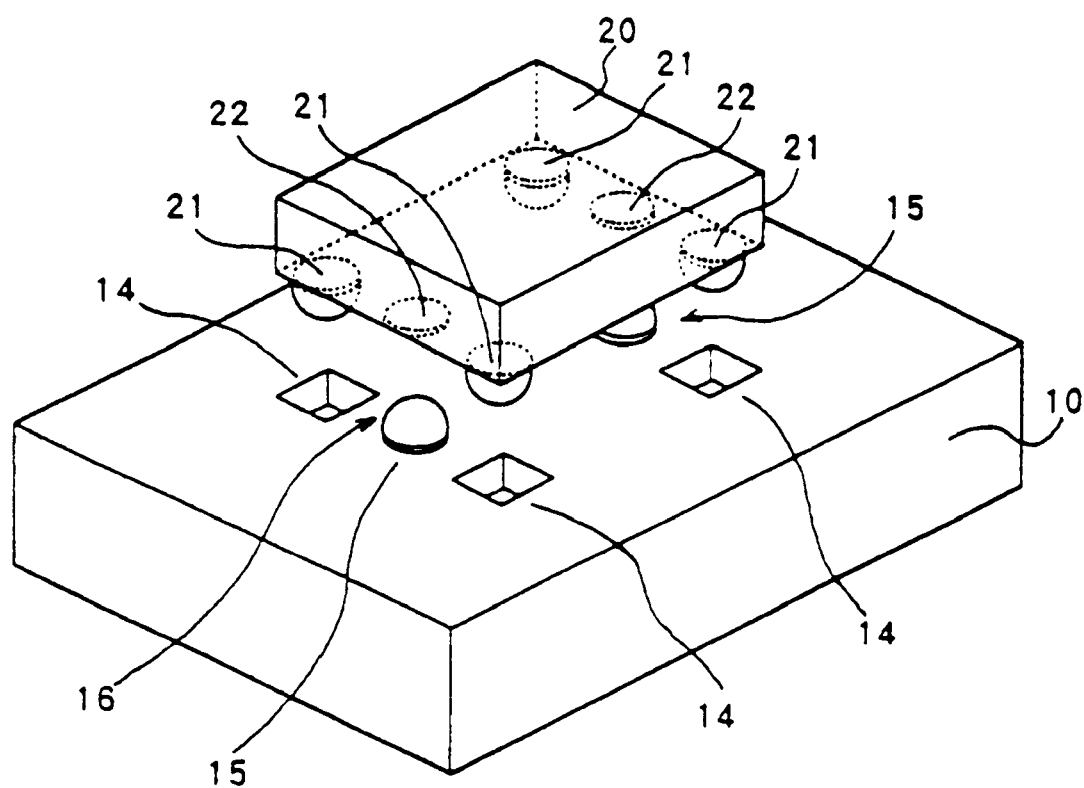
FIG. 5 is a diagram showing a further example of a conventional optical coupling structure.
Figure 7A:
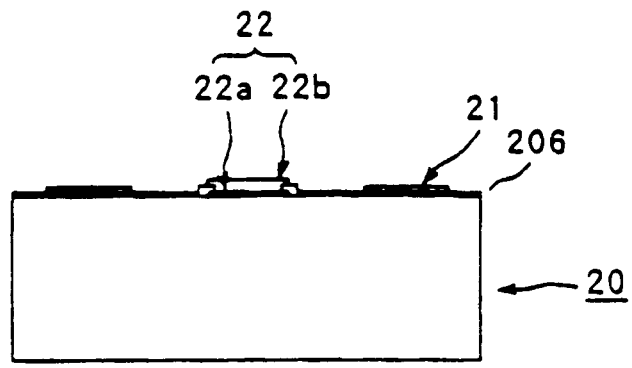
FIGS. 7A–7E are diagrams showing a fabrication process of the optical coupling structure of FIG. 5.
Figure 7B:
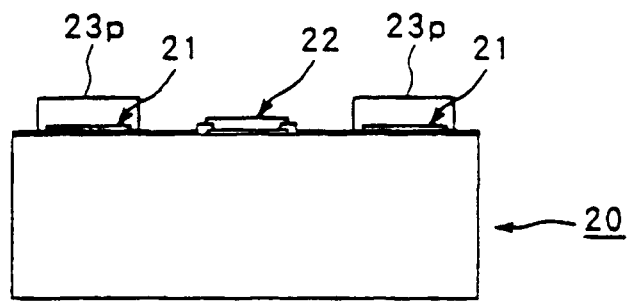
Figure 7C:
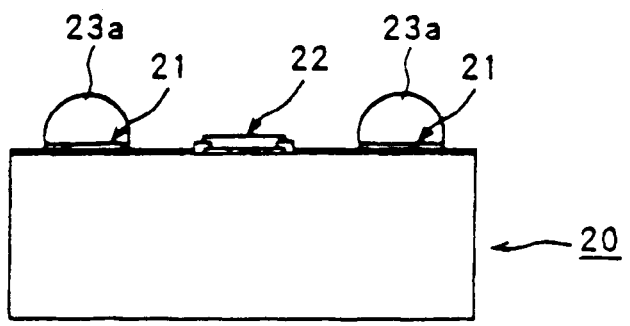
Figure 7D:
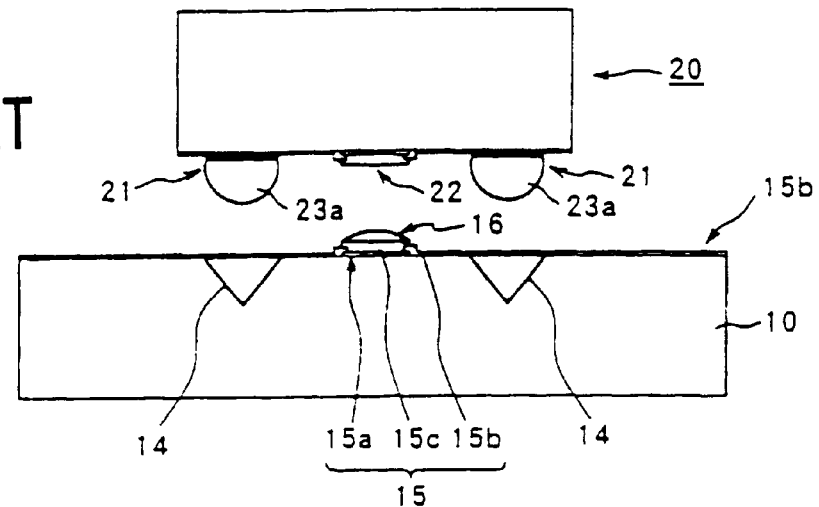
Figure 7E:
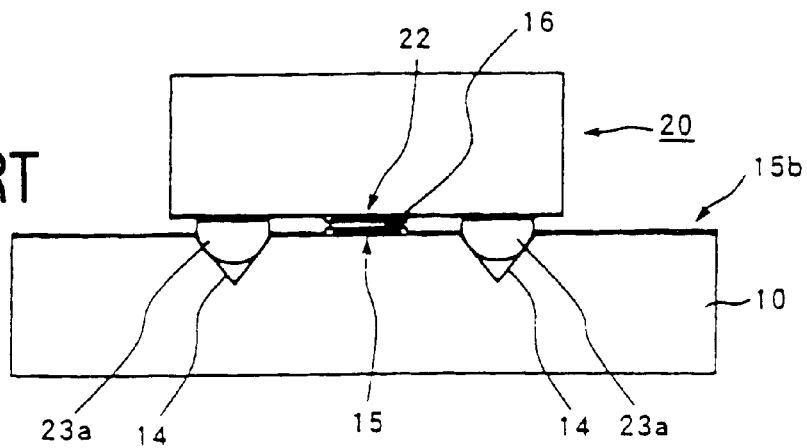
Figure 8:
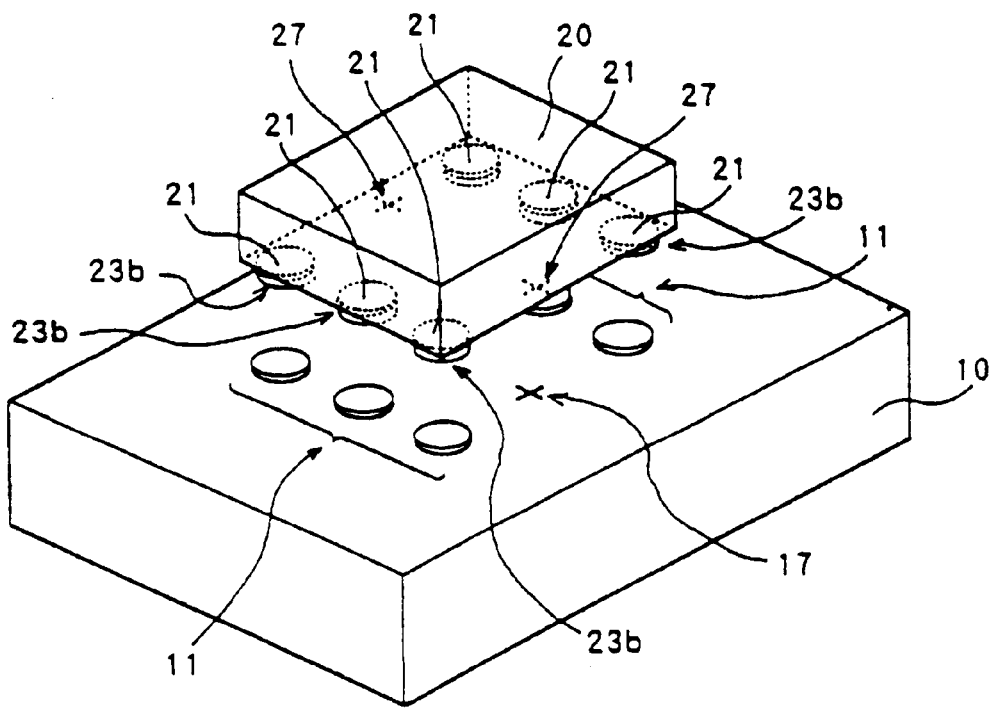
FIG. 8 is a diagram showing a further example of a conventional optical coupling structure.
Figure 10A:
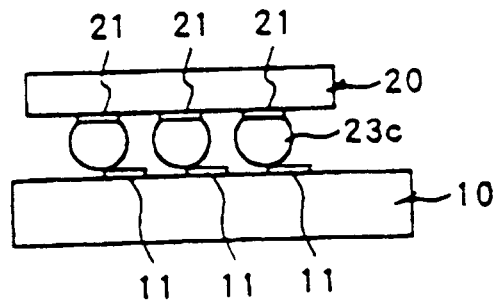
FIGS. 10A–10C are diagrams showing an alignment process used in a conventional optical coupling structure.
Figure 10B:
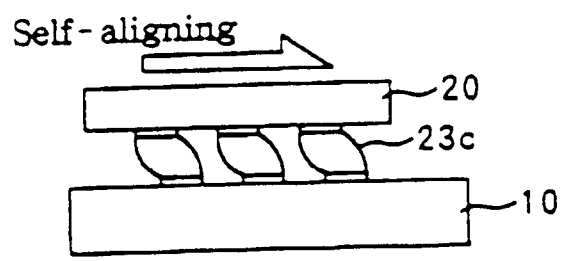
Figure 10C:
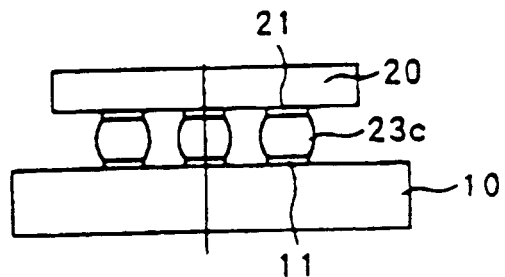
Figure 12:
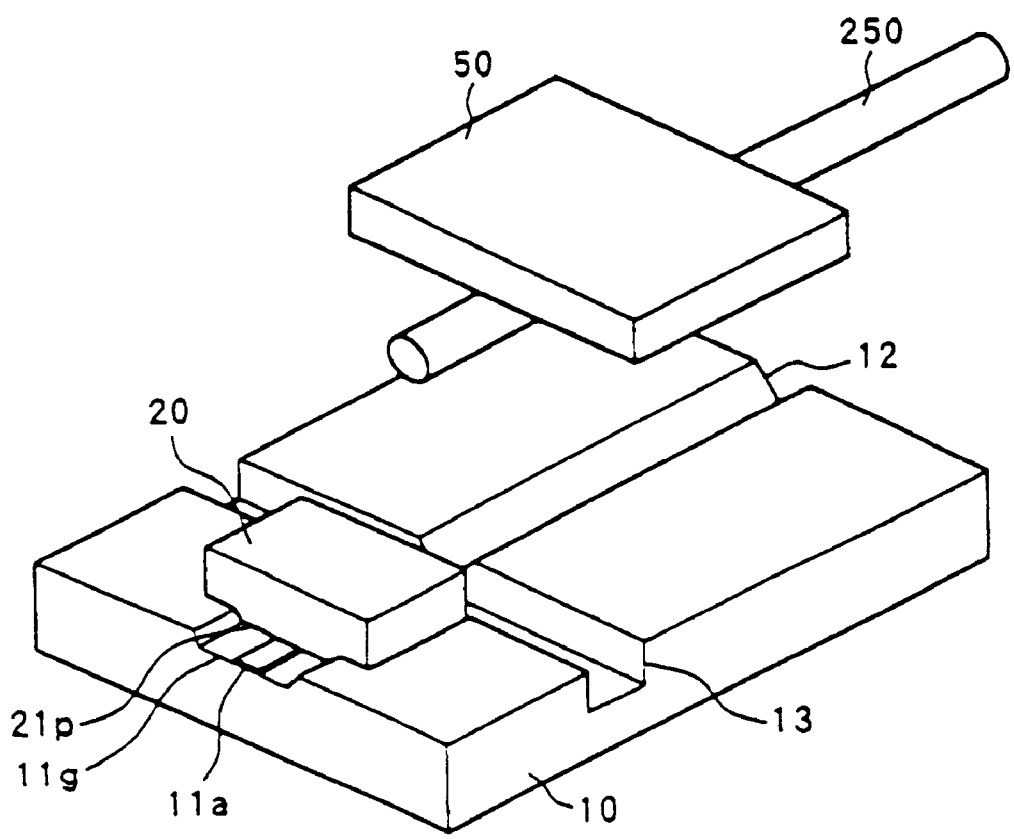
FIG. 12 is a diagram showing a further example of a conventional optical coupling structure.
Figure 13:
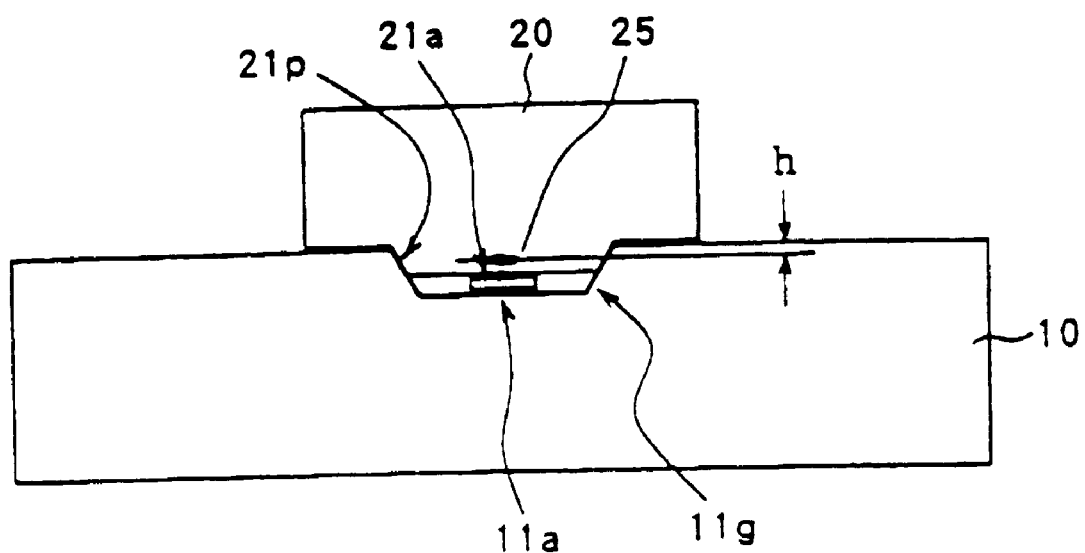
FIG. 13 is a diagram showing a further example of a conventional optical coupling structure.

Referring to FIG. 45A showing a mounting process of the laser diode 240 on a sub-carrier 140$_1$ used in the present embodiment, it should be noted that the sub-carrier 140A$_1$ is formed with pyramidal depressions 141$_1$ as the bonding structure 141, and the laser diode 240 is mounted in the state that spherical projections or bumps 241 formed at the bottom of the laser diode 240 engage with the foregoing pyramidal depressions 140$_1$. Thereby, the position of the mounted laser diode 240 is restricted by the engagement of the bumps 241 and the corresponding depressions 141$_1$. In this respect, the present embodiment is somewhat similar to the prior art structure explained with reference to FIG. 5.

FIG. 45B shows the optical coupling structure of the present embodiment.

Referring to FIG. 45B, the optical coupling structure includes the sub-carrier 140A$_1$ of FIG. 45A together with the sub-carrier 130A of the previously described construction on the common substrate 100A, similarly to the previous optical coupling structures.

It should be noted that the present embodiment enables the formation of the sub-carrier 140A, and the sub-carrier 130A of FIG. 45B from the same Si wafer as follows.

Figure 46A:
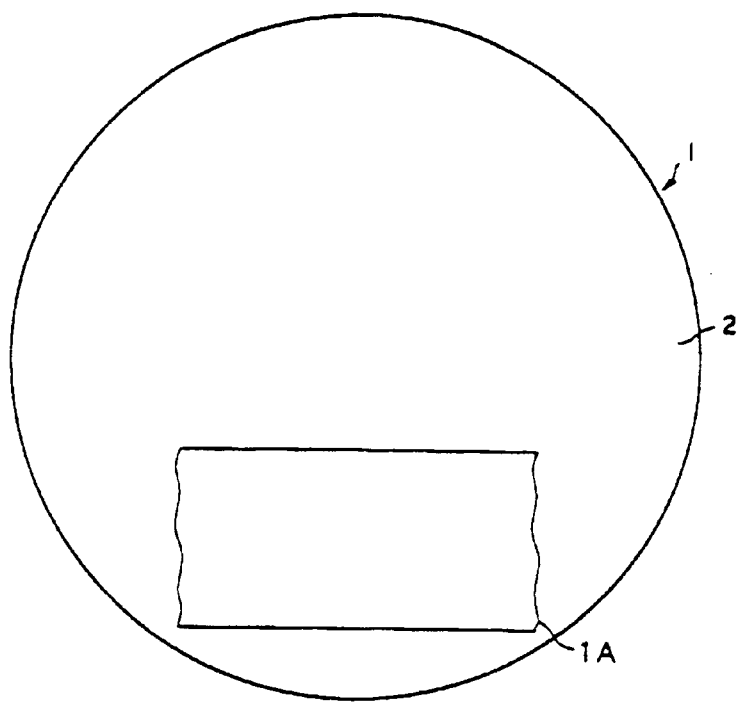
FIGS. 46A–46I are diagrams showing a fabrication process of the optical coupling structure of the tenth embodiment.

Referring to FIG. 46A, a Si wafer having (100)-oriented upper and lower principal surfaces is prepared as the Si wafer 1, and the oxide film 2 is formed on the foregoing (100)-oriented principal surfaces by a thermal oxidation process.

Figure 46B:
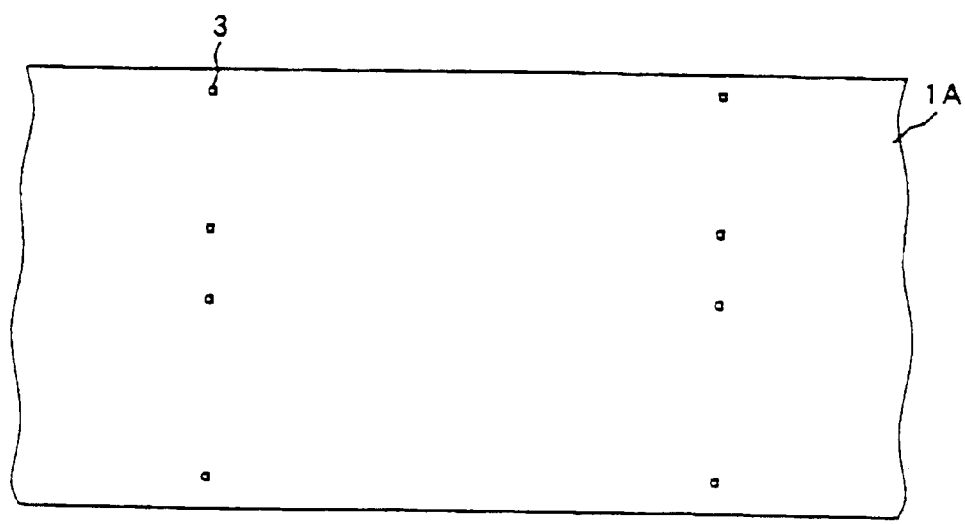

Next, in the step of FIG. 46B, which shows a part of the wafer 1 indicated in FIG. 46A by a numeral 1A in an enlarged scale, alignment marks 3 are formed on the oxide film 2 covering the upper principal surface of the Si wafer 1.

Figure 46C:
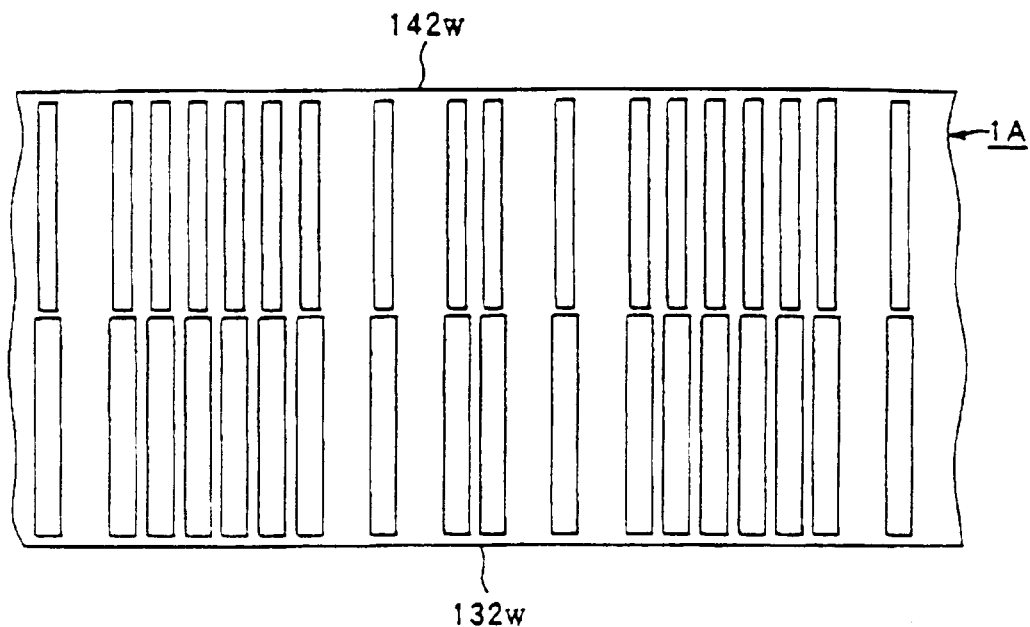

Next, mask windows 132w and 142w are formed on the thermal oxide film 2 covering the lower principal surface of the Si wafer 1 in the step of FIG. 46C respectively in correspondence to the region where the sub-carriers 130A are to be formed and the region where the sub-carriers 140A are to be formed.

Figure 46D:
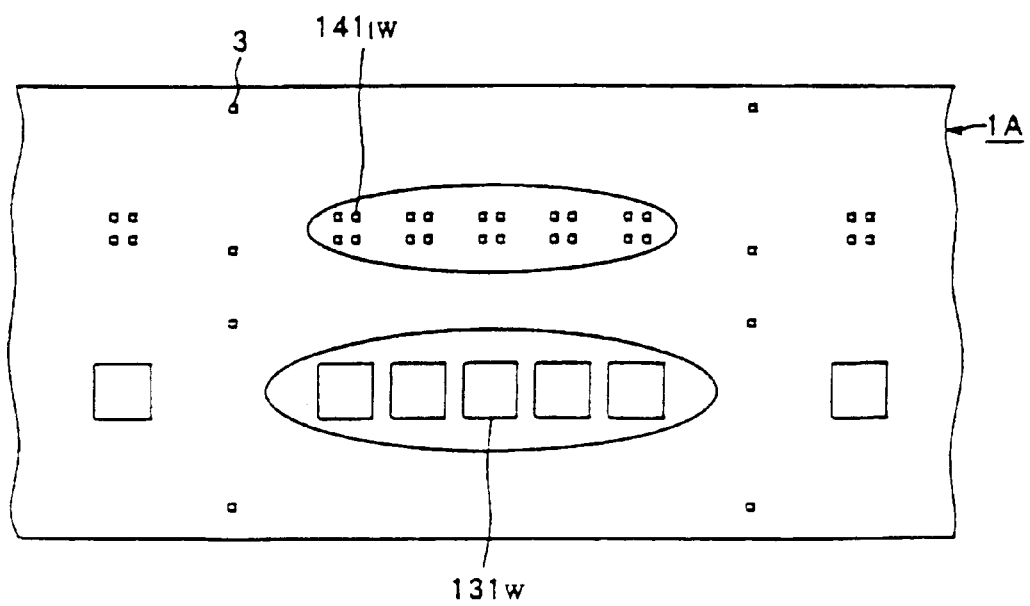

Further, a step of FIG. 46D is carried out for forming mask openings 141$_1$w in correspondence to the depressions 141$_1$ and mask openings 131w in correspondence to the depressions 131 to be formed. It should be noted that the mask openings 141$_1$w and 131w are formed on the oxide film 2 covering the upper principal surface of the Si wafer 1.

Figure 46E:
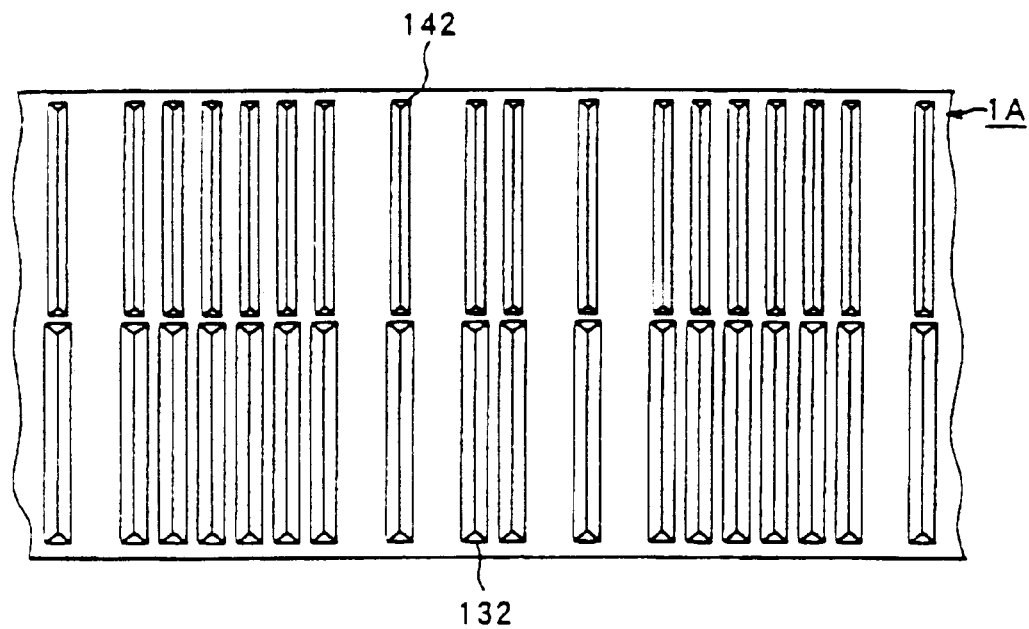
Figure 46F:
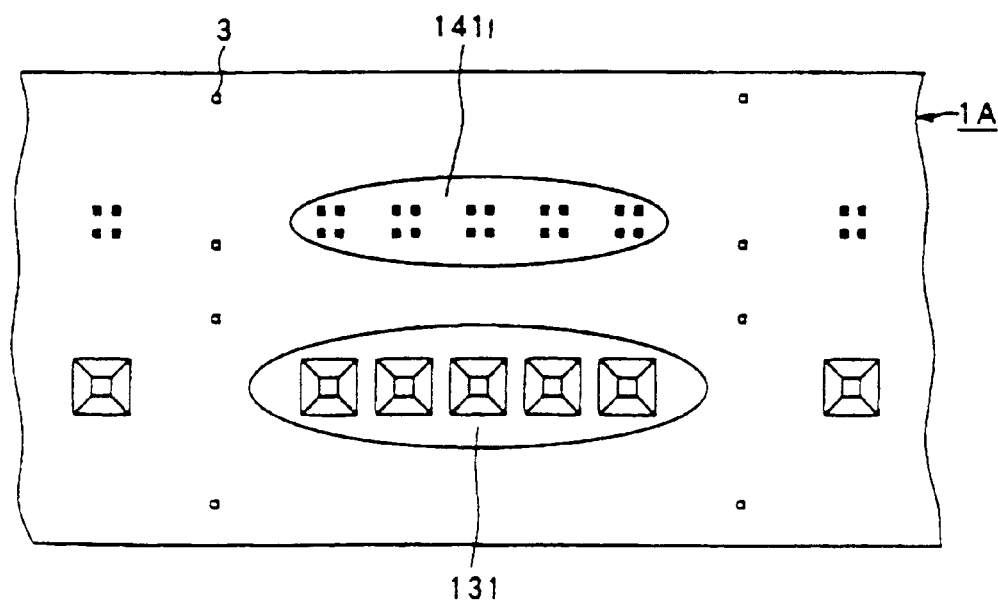

Next, the Si wafer 1 thus carrying the oxide film 2 formed with the windows is subjected to a wet etching process to form the grooves corresponding to the engagement groove structures 132 and 142 on the lower principal surface of the wafer 1 in correspondence to the windows 132w and 142w as indicated in FIG. 46E. Further, the etching process forms simultaneously the depressions 141$_1$ and the depressions 131 on the upper principal surface of the wafer 1 as indicated in FIG. 46F.

Figure 46G:
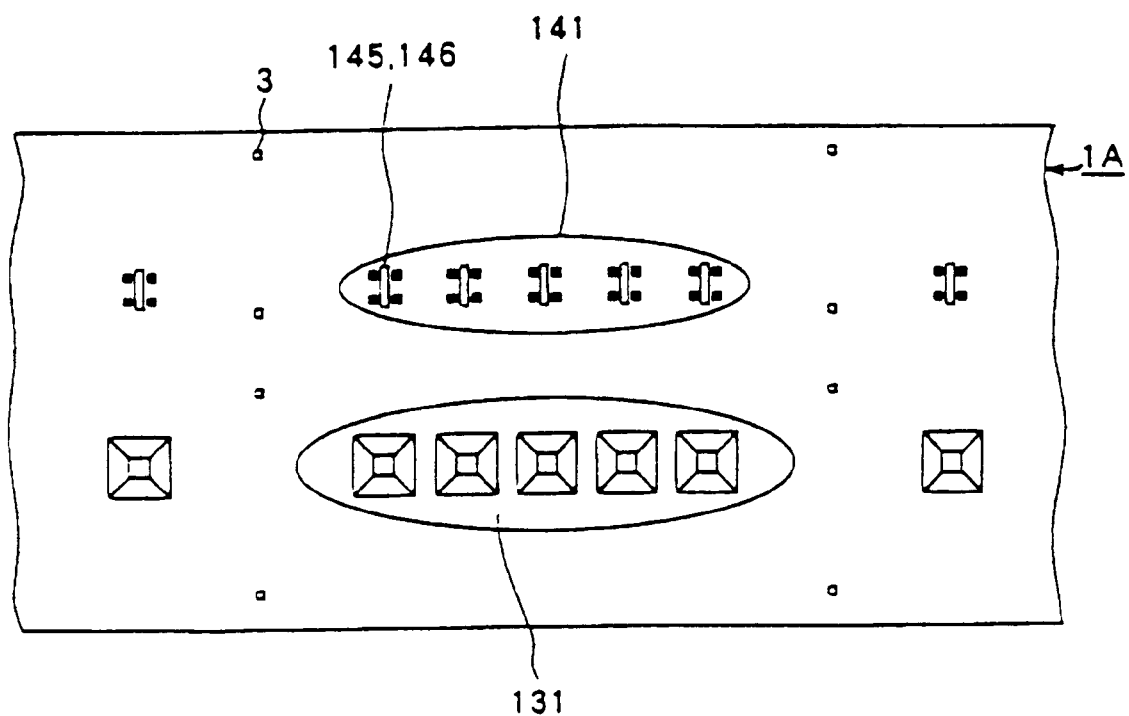

Further, in the step of FIG. 46G, conductor patterns 145 and 146 are formed in the vicinity of the depressions $141_1$ as a part of the bonding structure 141. It should be noted that the patterns 145 and 146 are shown in FIG. 45A and may represent respectively a conductor pattern and a bonding pad provided thereon.

Figure 46H:
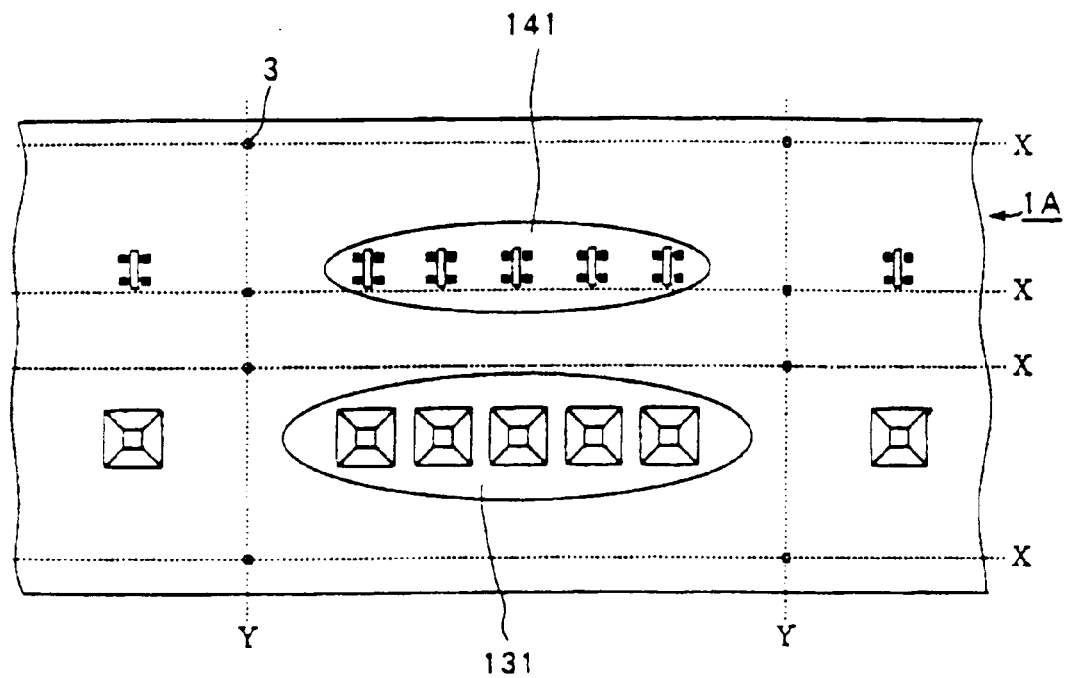
Figure 46I:
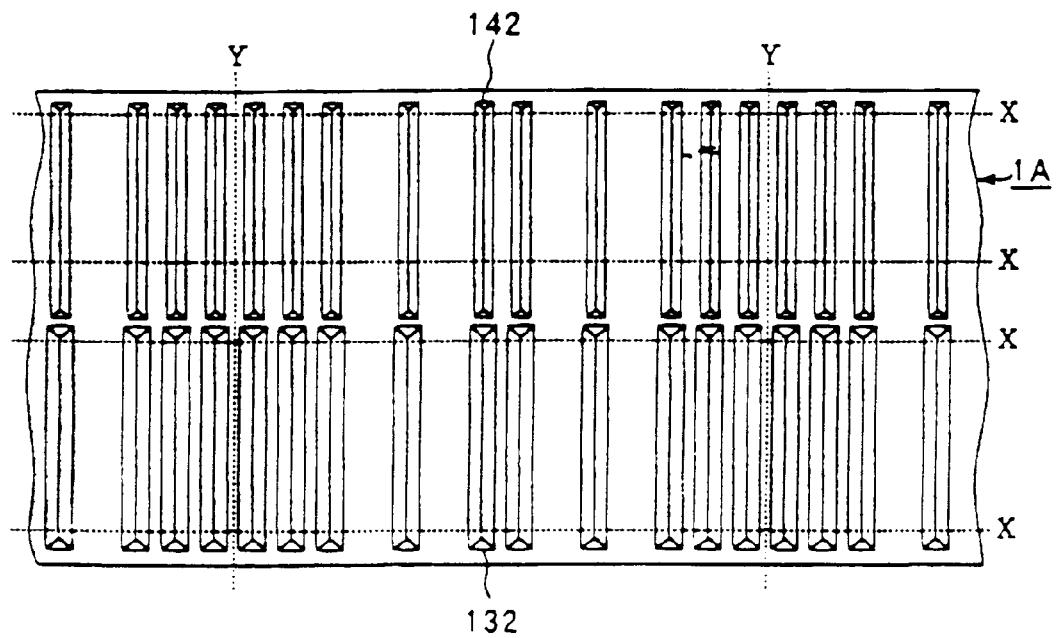

The wafer 1 thus formed with the patterns 145 and 146 is then subjected to a dicing process in a step of FIGS. 46H and 46I along the dicing lines X and Y, wherein FIG. 46H shows the upper principal surface of the wafer 1 while FIG. 46I shows the lower principal surface of the wafer 1.

After the dicing, the optical coupling structure is assembled as indicated in FIGS. 45A and 45B. In the construction of FIG. 45B showing the completed optical coupling structure it is possible to dispose a substrate adjacent to the sub-carrier 130A such that an optical waveguide or an optical fiber carried by such a substrate achieved an optical coupling with the lens 230 on the sub-carrier 130A.

It should be noted that the present embodiment for engaging the bumps 241 of the laser diode 240 with the corresponding depressions of the sub-carrier used for supporting the laser diode 240 can be combined with any of the first through fifth embodiments or eight and ninth embodiments described previously. Further, any of the known mounting processes including those explained with reference to FIG. 8, FIGS. 10A–10C and 12 may be combined with the first through fifth embodiments or eighth and ninth embodiment described previously.

ELEVENTH EMBODIMENT

Figure 47:
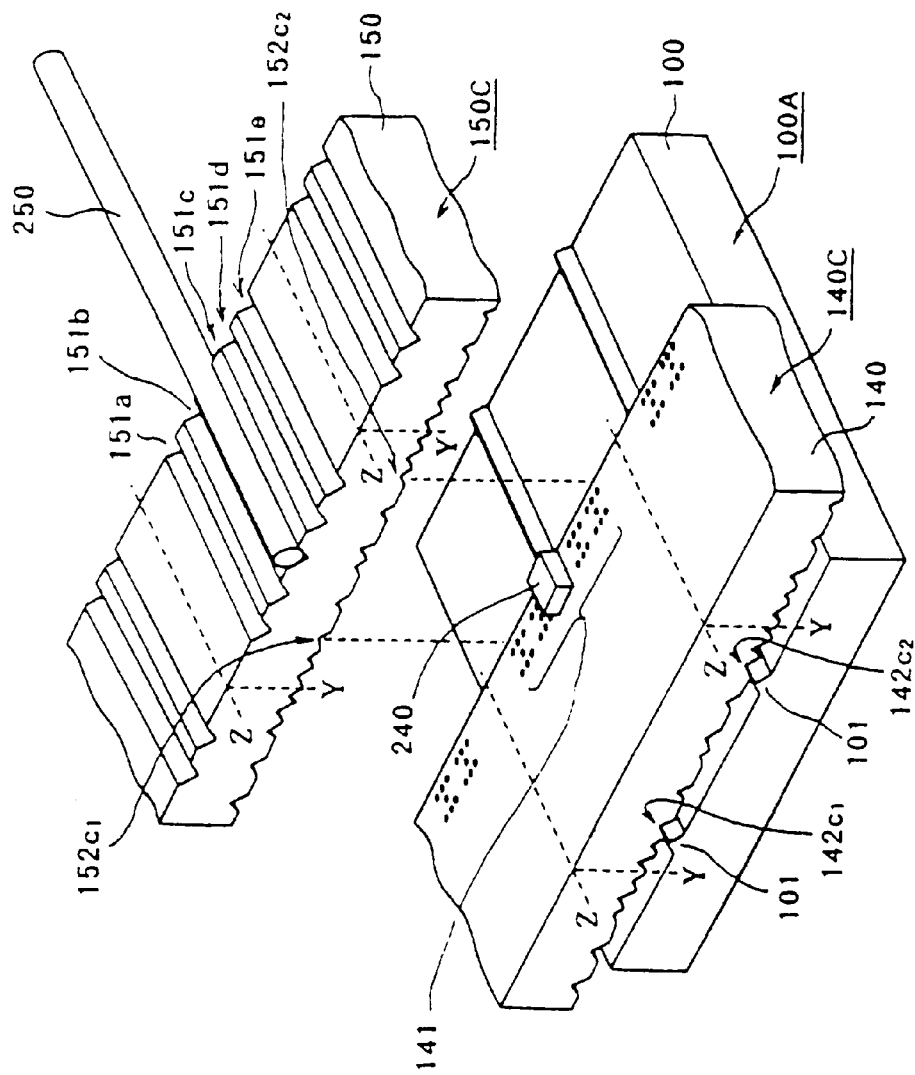
FIG. 47 is a diagram showing the construction of an optical coupling structure according to an eleventh embodiment of the present invention.

FIG. 47 shows an eleventh embodiment of the present invention, wherein those parts corresponding to the parts described previously are designated by the same reference numerals and the description thereof will be omitted.

Referring to FIG. 47, the optical coupling structure of the present embodiment includes a sub-carrier 140C for carrying the laser diode 140 in combination with the common substrate 100A similarly to the first embodiment of the present invention. In other words, the sub-carrier 140C of FIG. 47 is substantially identical with the sub-carrier 140A of the first embodiment shown in FIG. 26A.

On the other hand, the optical coupling structure of the present embodiment uses a sub-carrier 150C carrying thereon the optical fiber 250 in place of the sub-carrier 130A.

The sub-carrier 150C has a construction such that the lens-hold depressions $131a$–$131e$ of the sub-carrier 130A are replaced by grooves $151a$–$151e$ for holding the optical fiber 250. When the optical fiber 250 has a diameter of 125 $\mu$m, the width of the grooves $151a$–$151e$ is set to 141.8 $\mu$m. Because of the smaller diameter of the optical fiber 250 as compared with the spherical lens 230 which has a diameter of 800 $\mu$m, the grooves $151a$–$151e$ are formed with a reduced mutual separation of 300 $\mu$m as compared with the mutual separation of 1 mm for the depressions $131a$–$131e$.

Furthers the sub-carrier 150C carries on the bottom surface thereof engagement grooves $152a_1$–$152e_1$ and $152a_2$–$152e_2$, wherein the grooves $152a_1$ and $152a_2$ form a pair, the grooves $152b_1$–$152b_2$ form a pair, . . . for engagement with the ridges 101 on the common substrate 100A. Thus, in the state of FIG. 47, the sub-carrier 140C is mounted on the common substrate 100A in the state that the grooves $142c_1$ and $142c_2$ engage with the ridges 101. Further, the sub-carrier 150C is mounted in the state that the grooves $152c_1$ and $152c_2$ engage with the ridges 101.

In the present embodiment, the height of the optical axis of the optical fiber 250 as measured from the top surface of the sub-carrier 150C is set to about 6.52 $\mu$m in the present embodiment, which is substantially identical with the height of the optical axis of the laser diode 240. In the first embodiment, on the other hand, it should be noted that the height of the optical axis of the spherical lens 230 is set to 100 $\mu$m. As the height of the optical axis of the optical fiber 250 is generally equal to the height of the optical axis of the laser diode 240, the grooves $152a_1$–$152e_2$ of the sub-carrier 150C are formed to have the respective widths substantially identical with the engagement grooves $142a_1$–$142e_2$ formed on the sub-carrier 143C.

FIGS. 48A–48E show the fabrication process of the sub-carrier 150C of FIG. 47.

Figure 48A:
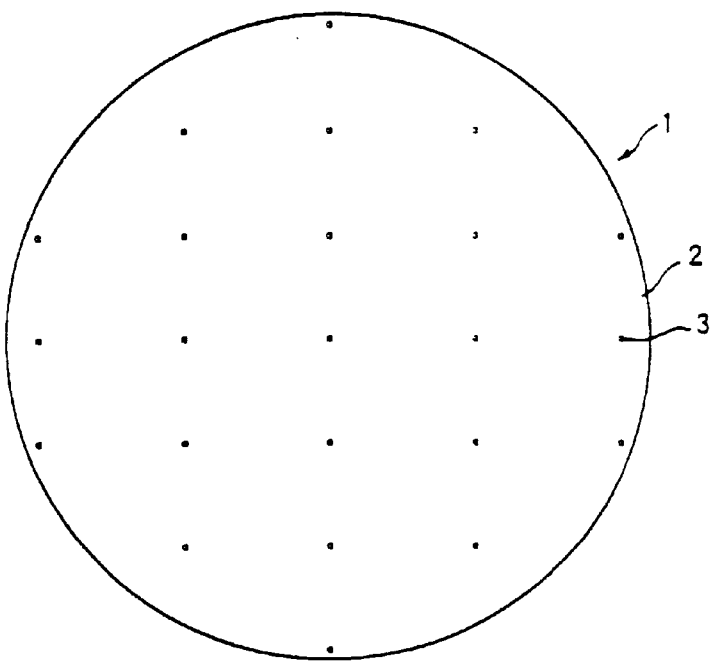
FIGS. 48A–48E are diagrams showing a fabrication process of the optical coupling structure of the eleventh embodiment.

Referring to FIG. 48A, the Si wafer 1 is subjected to a thermal oxidation process to form the oxide films 2 such that the oxide films 2 cover both of (100)-oriented upper and lower principal surfaces of the Si wafer 1. Further, alignment marks 3 are formed on the oxide film 2 covering the upper principal surface.

Figure 48B:
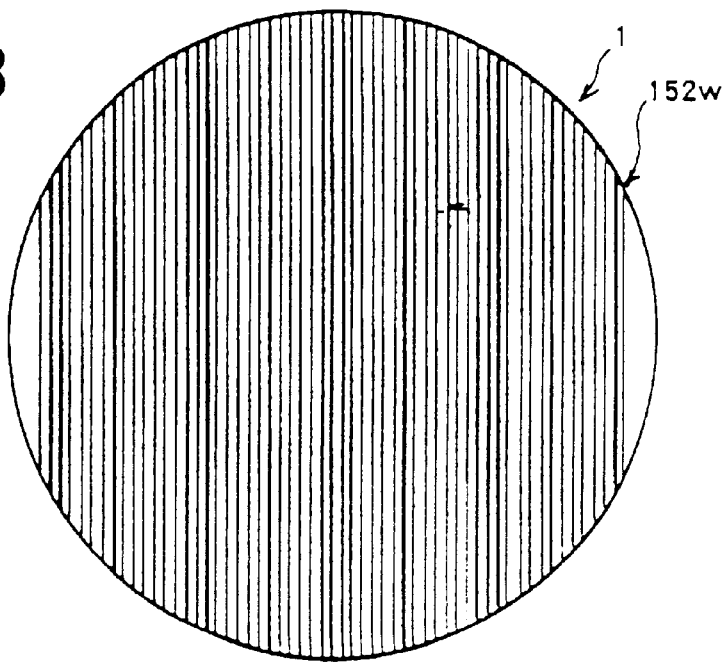

Next, in the step of FIG. 48B, a mask window $152w$ is formed on the oxide film 2 covering the lower principal surface of the wafer 1 by a photolithographic process so as to expose the Si surface in correspondence to where the engagement grooves $152a_1$–$152e_2$ are to be formed.

Figure 48C:
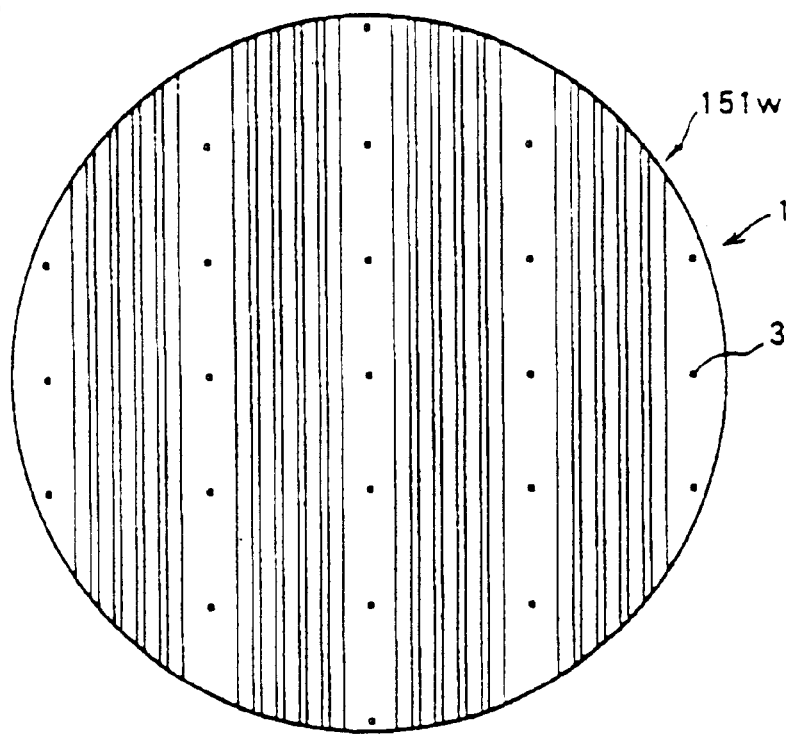

Next, in the step of FIG. 48C, a mask window $151w$ is formed on the oxide film 2 covering the upper principal surface of the wafer 1 by a photolithographic process to expose the Si surface in correspondence to where the guide grooves $151a$–$151e$ are to be formed.

Figure 48D:
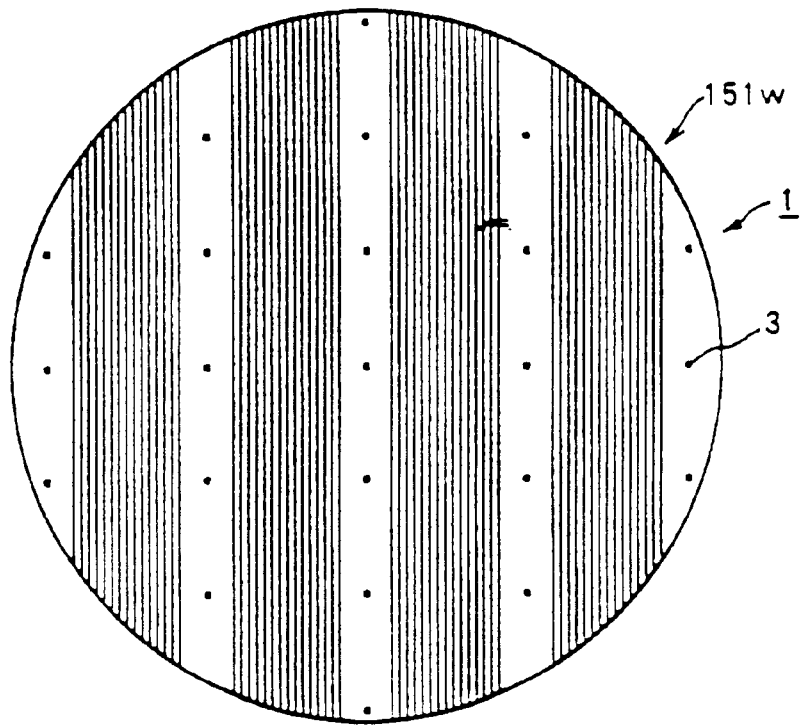

After the step of FIG. 48B and 48C, the wafer 1 is subjected to a wet etching process in the step of FIG. 48D to form the grooves $152a_1$–$152e_2$ by applying a KOH etchant, and the grooves $151a$–$151e$ respectively in correspondence to the mask windows $152w$ and $151w$.

Figure 48E:
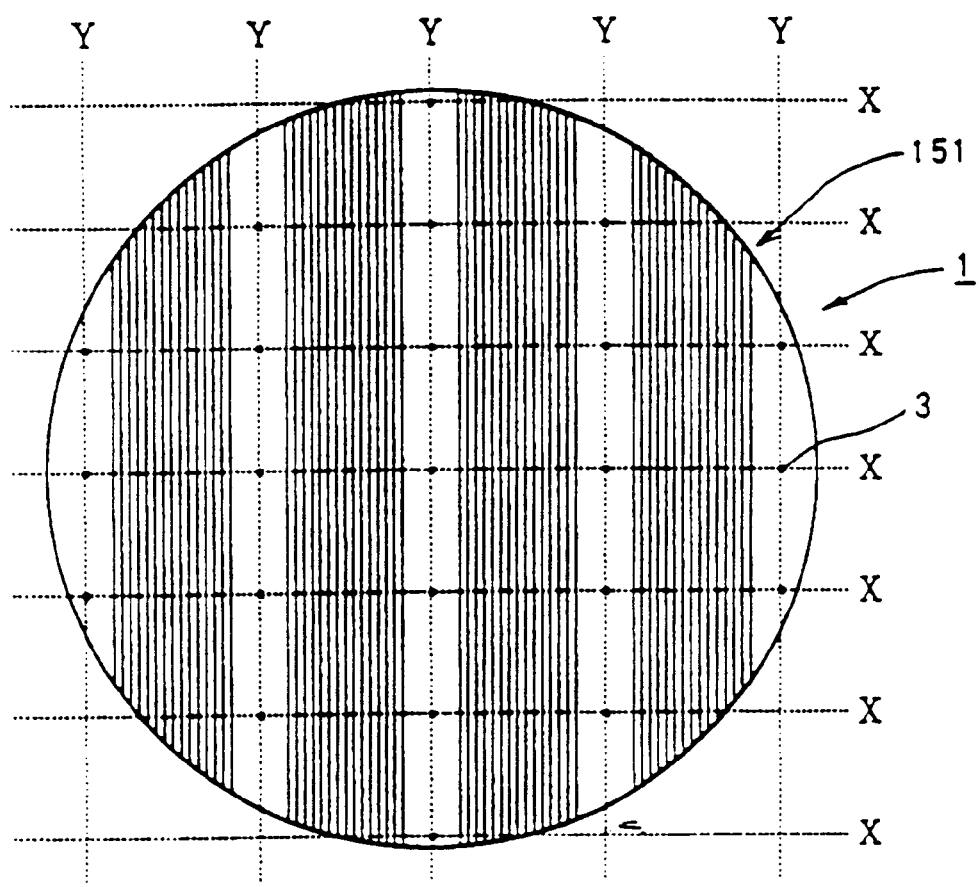

The wafer 1 thus processed in then diced in the step of FIG. 48E into individual sub-carriers along the dicing lines X and Y indicated in FIG. 48E by dotted lines.

TWELFTH EMBODIMENT

Figure 49:
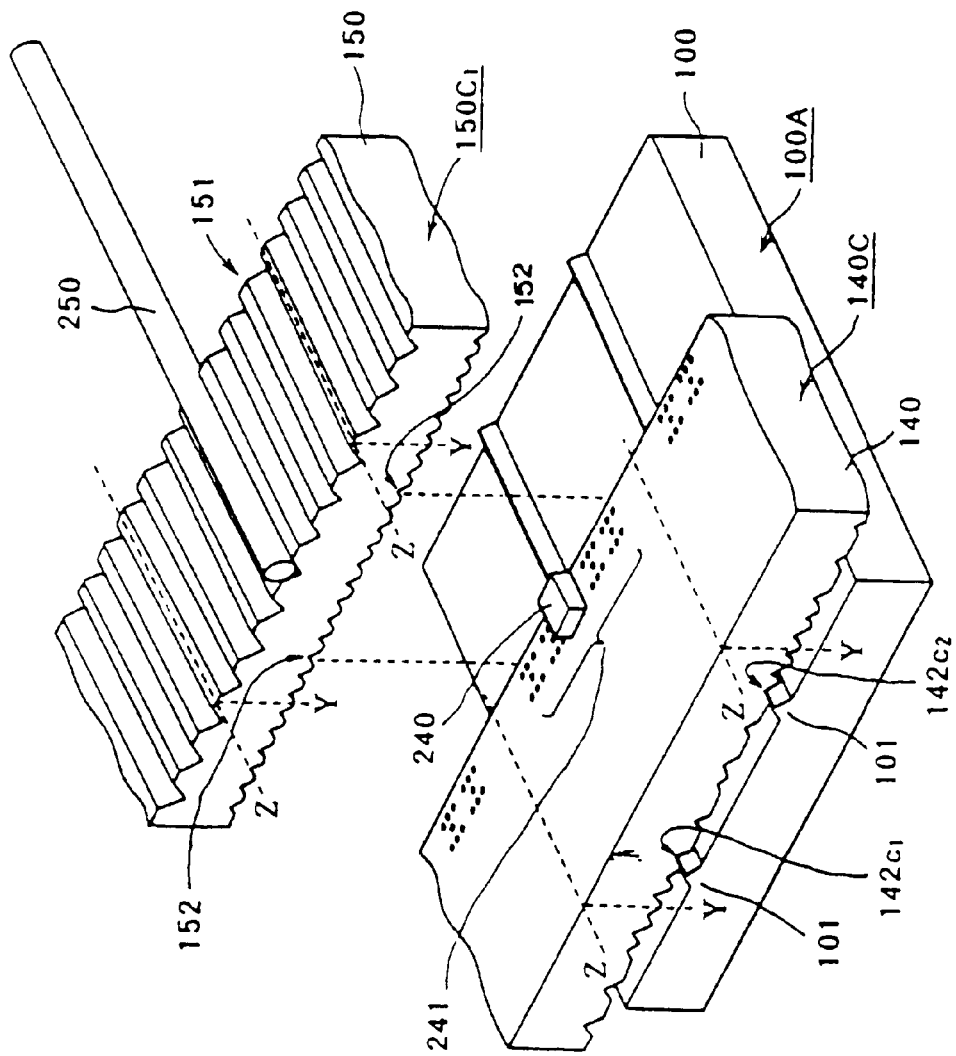
FIG. 49 is a diagram showing the construction of an optical coupling structure according to a twelfth embodiment of the present invention.

FIG. 49 shows the construction of an optical coupling structure according to a twelfth embodiment of the present inventions wherein those parts corresponding to the parts described previously are designated by the same reference numerals and the description thereof will be omitted.

Referring to FIG. 49, the optical coupling structure has a construction similar to that of FIG. 47 except that the optical coupling structure of FIG. 49 includes a sub-carrier $150C_1$ in place of the sub-carrier 150C.

It should be noted that the sub-carrier $150C_1$ carries the grooves $152a_1$–$152e_2$ such that the grooves $152a_1$–$152e_2$ have a common width and such that the grooves are arranged with a uniform mutual separation of 150 $\mu$m, for example. On the other hand, the grooves $151a$–$151e$ are formed to have a width that changes consecutively or monotonously. Thus, the grooves $151a$–$151e$ have the respective widths of 134.9 $\mu$m, 138.3 $\mu$m 141.8 $\mu$m, 145.3 $\mu$m and 148.7 $\mu$m, respectively.

By changing the width of the guide grooves $151a$–$151e$ as such, it is possible to adjust the height of the optical axis of the optical fiber 250 by suitably selecting the groove on which the optical fiber is mounted. In the present embodiment, it is possible to adjust the optical axis within the error of ±1 $\mu$m when the variation in the thickness of the sub-carrier $150C_2$ is within ±5 $\mu$m.

THIRTEENTH EMBODIMENT

Figure 50A:
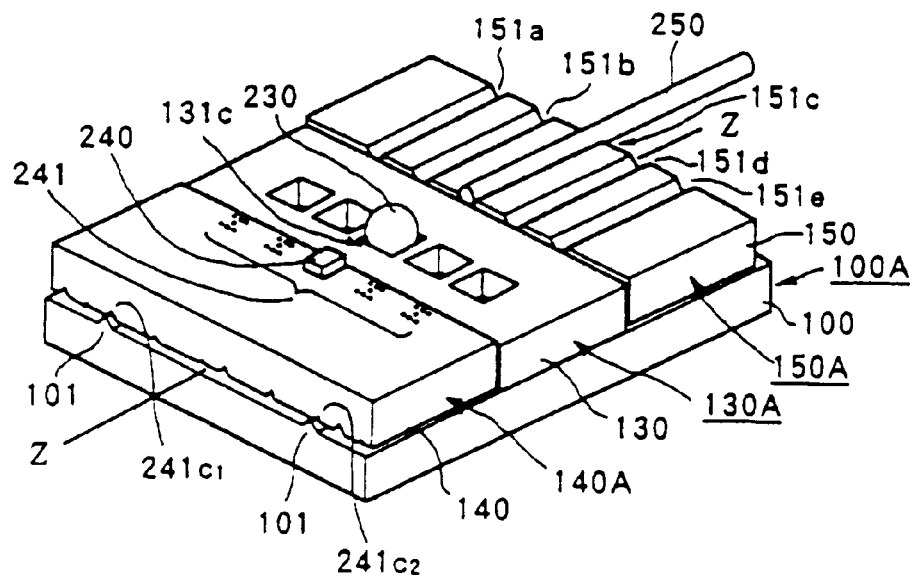
FIGS. 50A and 50B are diagrams showing the construction of an optical coupling structure according to a thirteenth embodiment of the present invention.
Figure 50B:
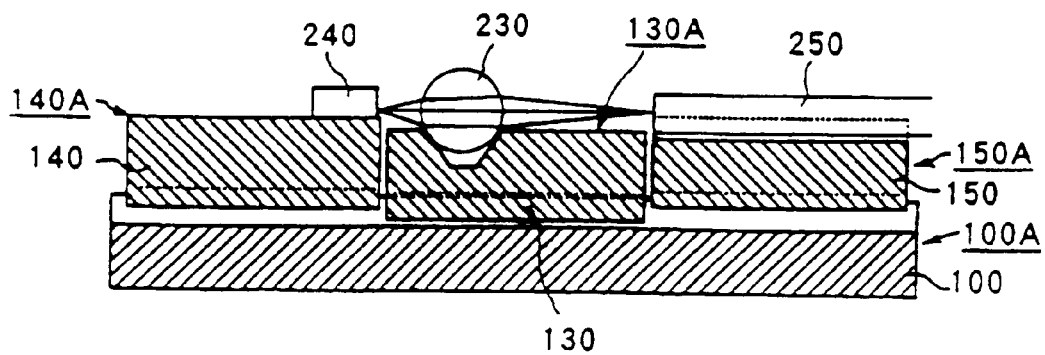

FIGS. 50A and 50B show the construction of an optical coupling structure according to a thirteenth embodiment of the present invention respectively in an oblique view and a cross-sectional view taken along a line z—z of FIG. 50A, wherein those parts corresponding to the parts described previously are designated by the same reference numerals and the description thereof will be omitted.

Referring to FIGS. 50A and 50B, the optical coupling structure includes the sub-carrier 130A carrying the lens 230 and the sub-carrier 140A carrying the laser diode 240 on the common substrate 100A similarly to the optical coupling structure of FIGS. 26A and 26B, except that the optical coupling structure further includes a sub-carrier 150A carrying the optical fiber 250 also on the common substrate 100A in the state that the lens 230 is aligned optically to both the laser diode 240 and the optical fiber 250. The sub-carrier 150A has a construction similar to that of the sub-carrier 150C of FIG. 47 except that the guide grooves $151a$–$151e$ and the engagement grooves $152a_1$–$152e_1$ and $152a_2$–$152e_2$ are formed with a mutual separation or pitch of 1 mm.

FIGS. 50A and 50B clearly indicate that the optical coupling structure of the present invention is effective for coupling three or more optical components carried by respective sub-carriers optically. Thereby, the sub-carriers may be formed from separate wafers having different thicknesses. Further some of the sub-carriers may be formed from a common wafer. For example, it is possible to form the sub-carrier 140A from a first wafer and the sub-carriers 130A and 150A a second, common wafer.

FIGS. 51A

FIGS. 51A–51E show the process of fabricating the sub-carriers 130A and 150A from a common Si wafer, the wafer 1 having (100)-oriented upper and lower principal surfaces.

Figure 51A:
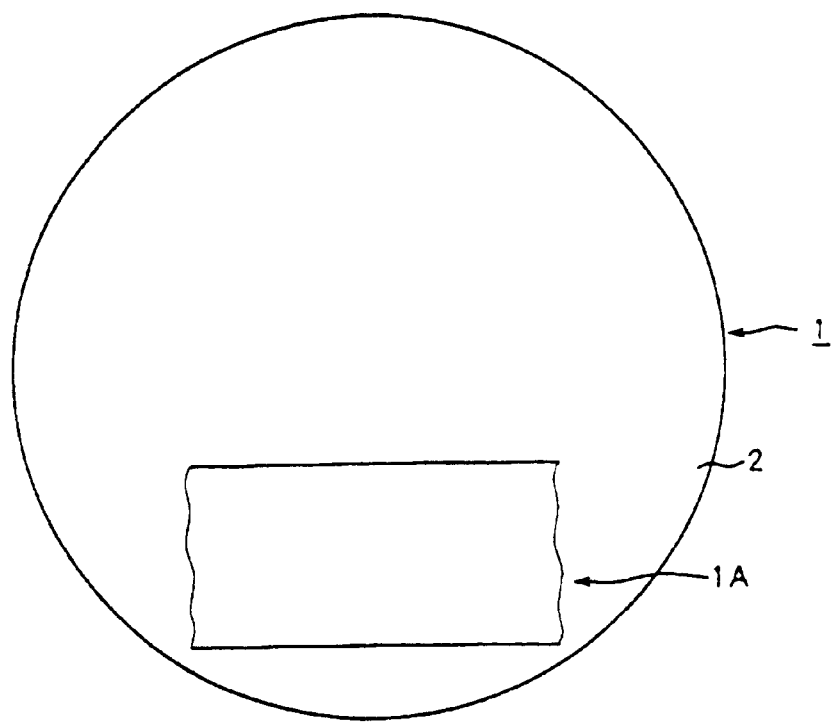
FIGS. 51A–51H are diagrams showing a fabrication process of the optical coupling structure of the thirteenth embodiment.
Figure 51B:
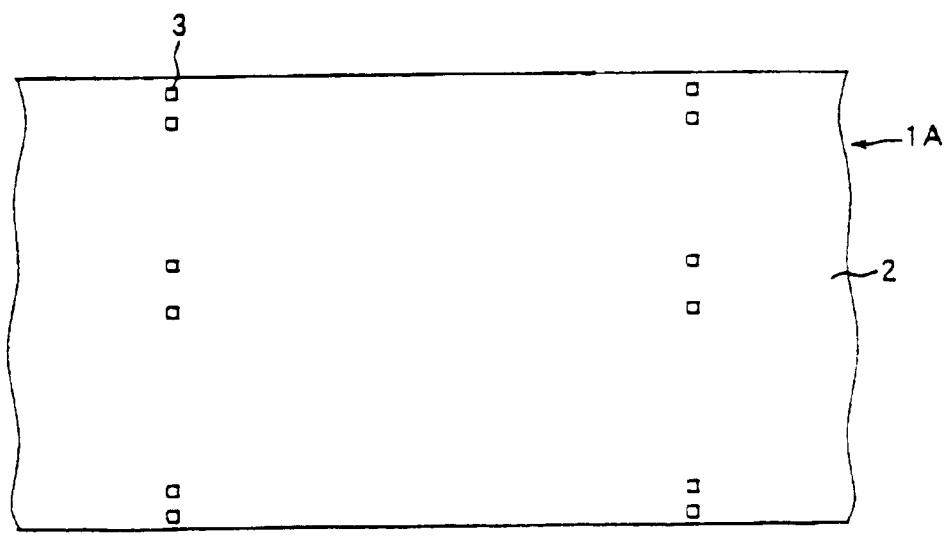

Referring to FIG. 51A, the Si wafer 1 is subjected to a thermal oxidation process to form the oxide films 2 on both the upper and lower principal surfaces of the wafer 1 Further alignment marks 3 are formed on the oxide film 2 covering the upper principal surface of the wafer 1 in a step of FIG. 51B. It should be noted that FIG. 51B shows a part of the wafer 1 shown in FIG. 51A by the numeral 1A.

Figure 51C:
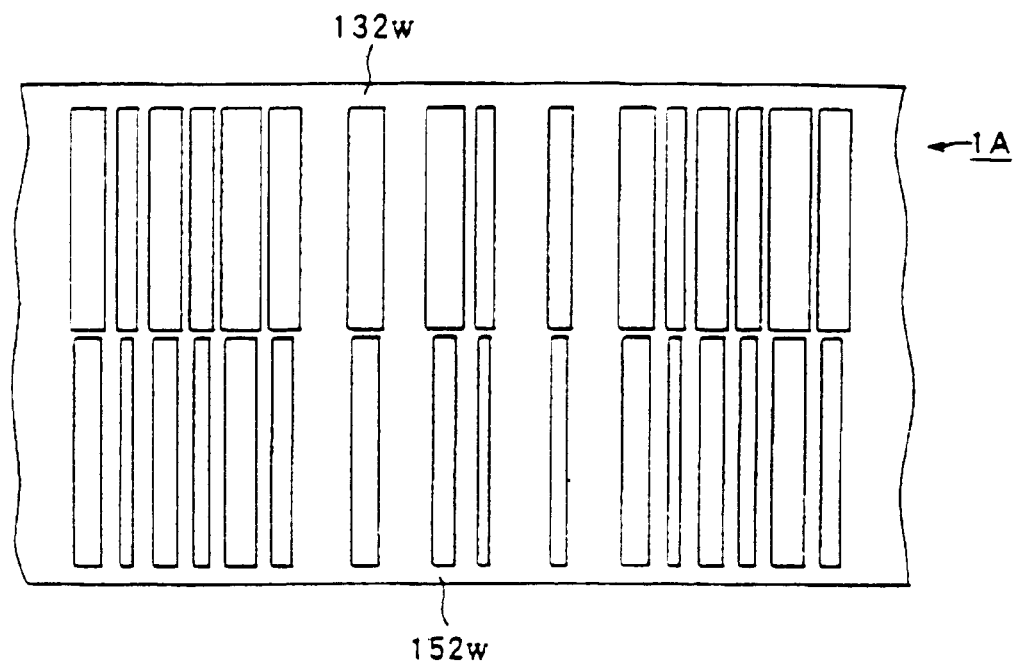

Next, in the step of FIG. 51C, the mask windows 132w are formed on the oxide film 2 covering the lower principal surface of the wafer 1 similarly to the process of FIG. 46C. Simultaneously, mask windows 152w are formed on the same oxide film 2 in correspondence to the part where the grooves 152 ($152a_1$–$152e_1$, $152a_2$–$152e_2$) are to be formed.

Figure 51D:
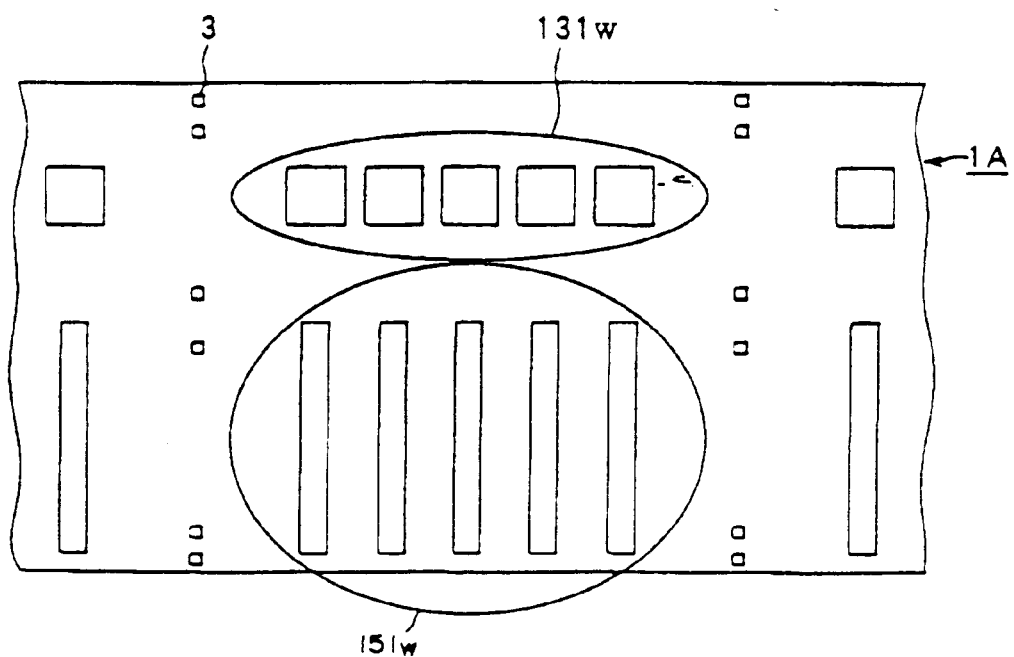

Further, in the step of FIG. 51D, the mask windows 131w are formed on the oxide film 2 covering the upper principal surface of the wafer 1 similarly to the process of 26D. Simultaneously, mask windows 151w are formed on the same oxide film 2 in correspondence to the part where the grooves 151 ($151a$–$151e$) are to be formed. It should be noted that the order of the process of FIG. 51C and the process of FIG. 51D may be reversed. Alternatively, the processes of FIGS. 51C and 51D may be conducted simultaneously.

Figure 51E:
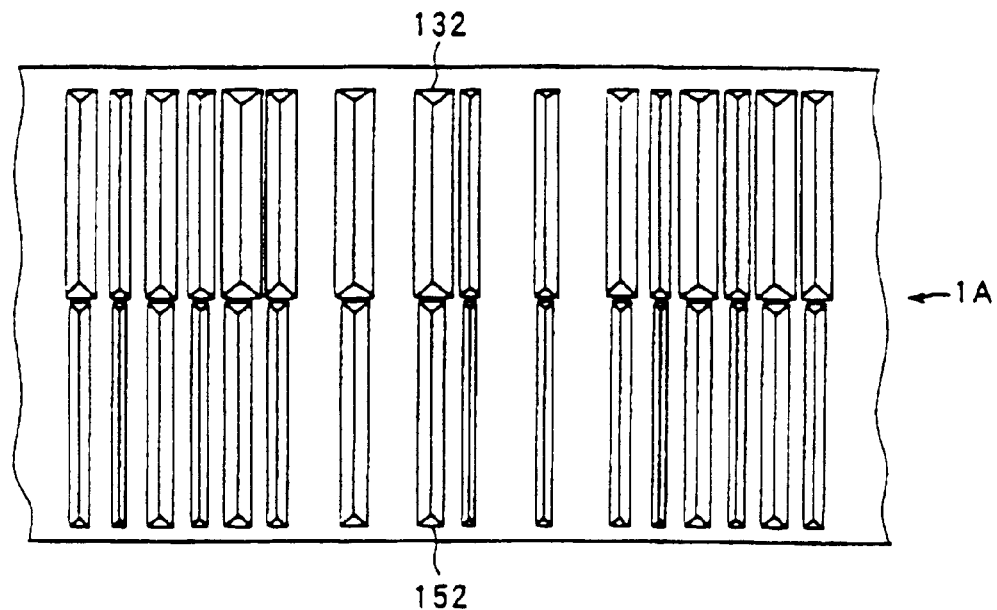
Figure 51F:
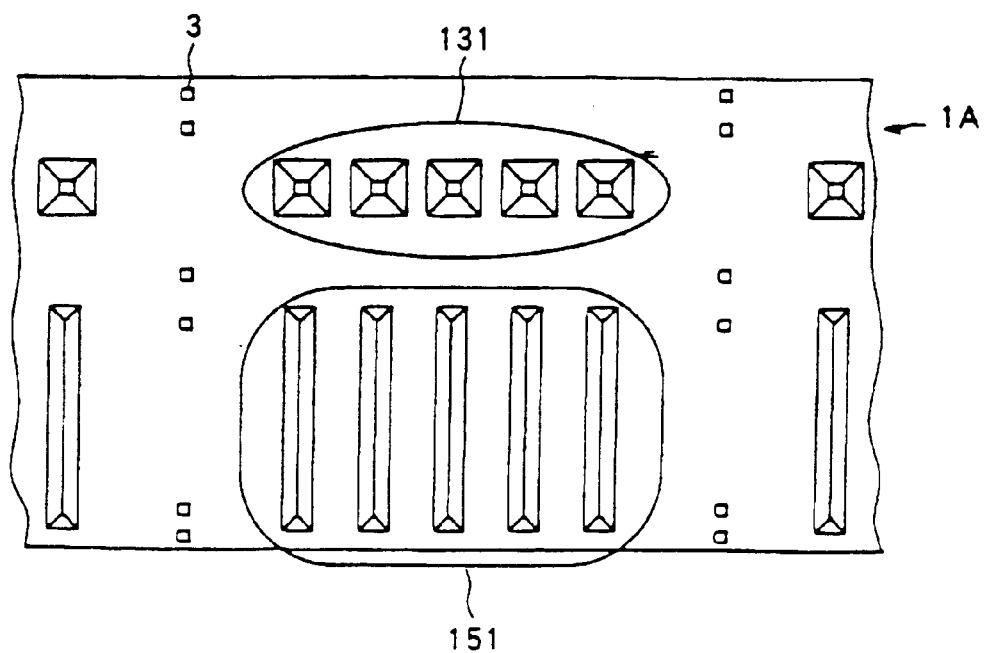

Next, in the step of FIGS. 51E and 51F, the wafer 1 thus masked is subjected to a wet etching process in a KOH aqueous solution to form the grooves 132 and 152 on the lower principal surface of the Si wafer 1 respectively in correspondence to the mask windows 132w and 152w as indicated in FIG. 51E. Simultaneously, the grooves 131 and 151 are formed on the upper principal surface of the Si substrate 1 respectively in correspondence to the windows 131w and 151w as indicated in FIG. 51F.

Figure 51G:
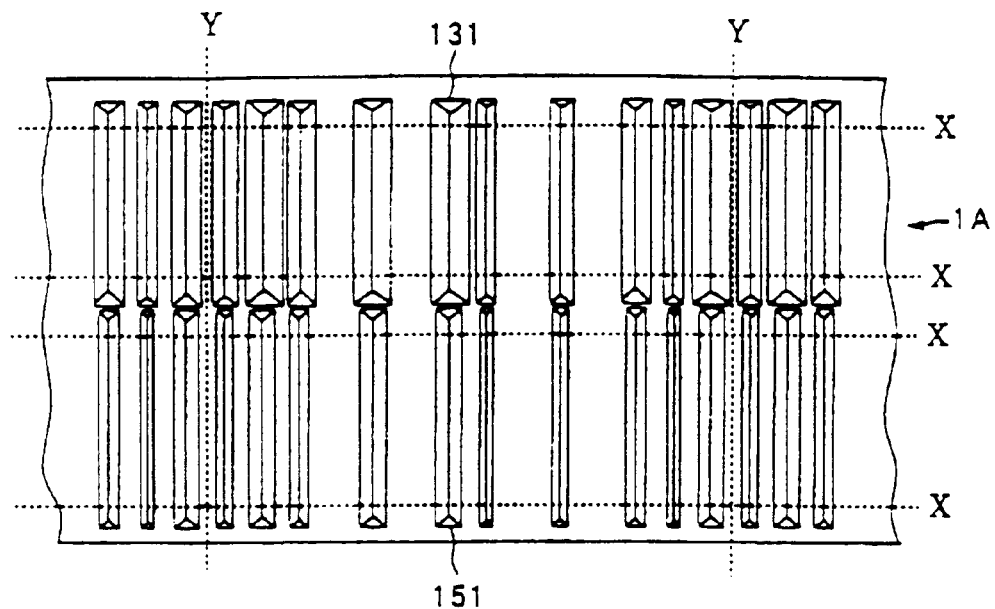
Figure 51H:
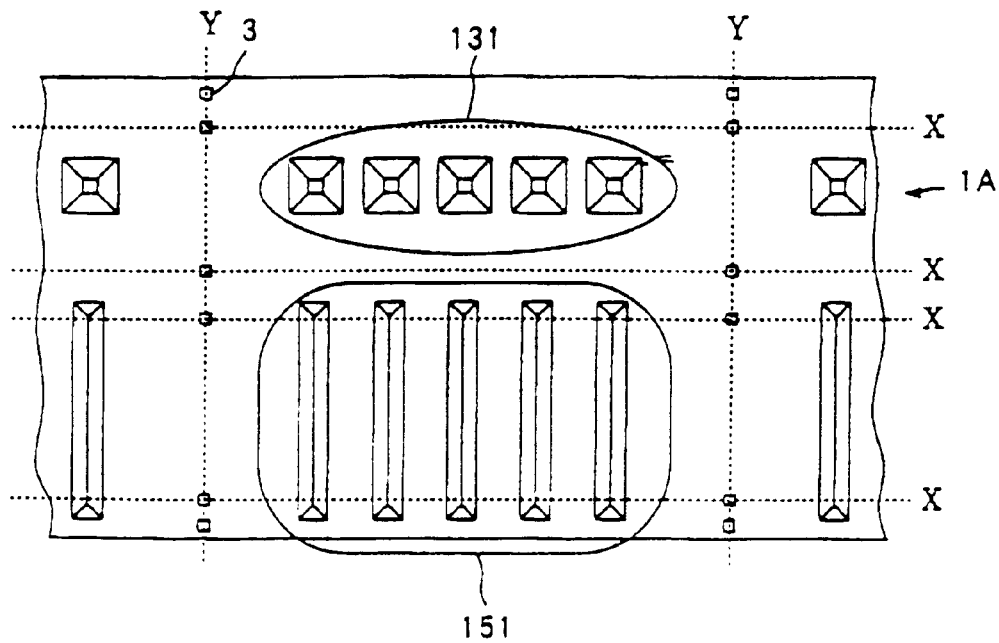

The wafer 1 thus processed is then subjected to a dicing process in the step of FIGS. 51G and 51H into the individual sub-carriers 130A and 150A, wherein the dicing is carried out along the dicing lines X and Y.

According to the process described above, it should be noted that the sub-carrier 130A and the sub-carrier 150A have the same thickness by forming the same from a common wafer. Thus, the precision of alignment of the optical axes between the laser diode 240 and the optical fiber 250. On the other hand, the patterning of the bonding pad structure 241 is carried out on a surface of a separate Si wafer on which no grooves are formed. Thus, the SECOND PROBLEM explained with reference to the prior art is successfully avoided.

It should be noted that the optical component coupled to the lens 230 is by no means limited to the optical fiber 250. For examples the optical coupling structure of the present embodiment is effective also for coupling an optical waveguide or other optical components Further, it is possible to construct a more complex system by adding further sub-carriers carrying thereon various active optical elements such as an optical amplifier or an optical modulator.

FOURTEENTH EMBODIMENT

Figure 52:
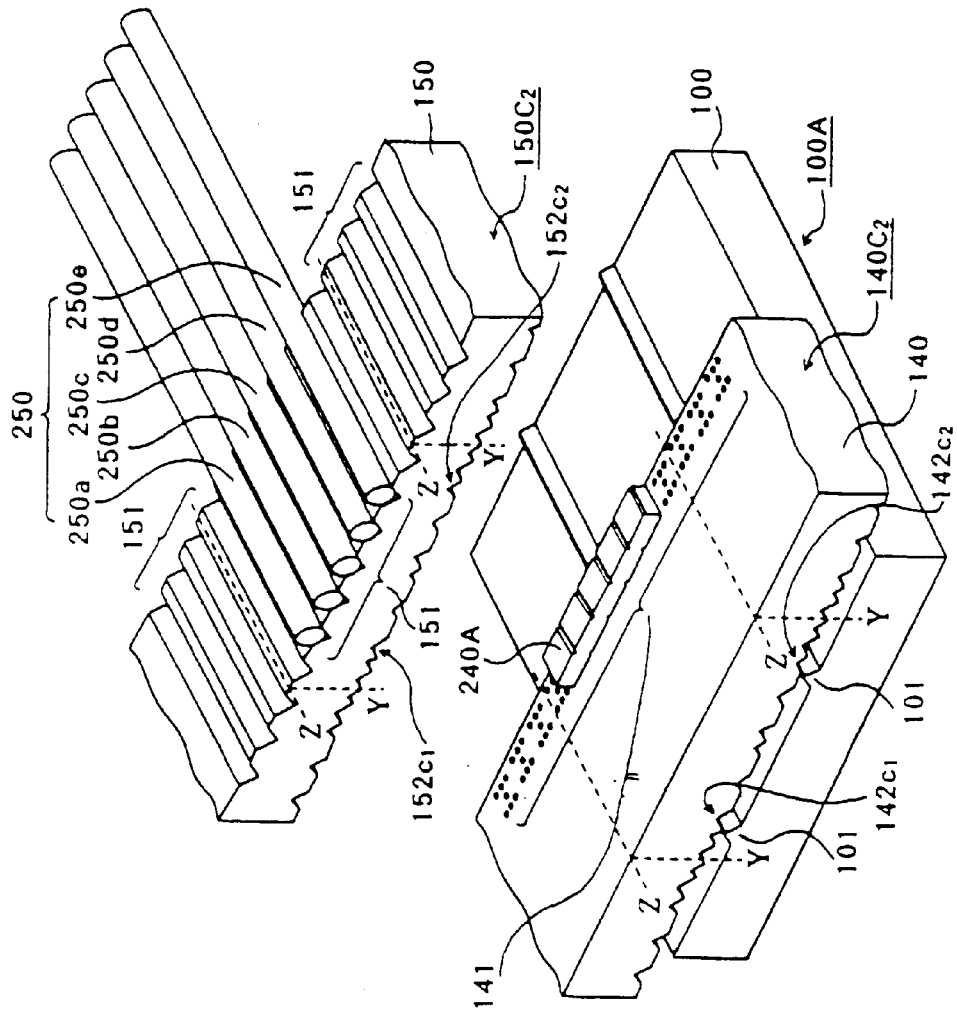
FIG. 52 is a diagram showing the construction of an optical coupling structure according to a fourteenth embodiment of the present invention.

FIG. 52 shows the construction of an optical coupling structure according to a fourteenth embodiment of the present inventions wherein those parts corresponding to the parts described previously are designated by the same reference numerals and the description thereof will be omitted.

Referring to FIG. 52, the optical coupling structure includes a sub-carrier $140C_2$ and a sub-carrier $150C_2$ on the common substrate 100A, wherein the sub-carrier $140C_2$ has a construction similar to that of the sub-carrier 140C of FIGS. 34A and 34B except that the sub-carrier $140C_2$ carries thereon a laser diode array 240A including five laser diode elements. For this purpose, the sub-carrier $140C_2$ carries thereon the bonding pads indicated collectively by the numeral 141 with a pitch or mutual separation of 250 $\mu$m. Similarly, the sub-carrier $150C_2$ carries thereon an optical fiber array including optical fibers $250a$–$250e$ in place of the optical fiber 250 such that the optical fibers $250a$–$250e$ engage with respective, corresponding grooves indicated collectively by the numeral 151, wherein each of the grooves 151 has a width of 141.8 $\mu$m and formed with a pitch or mutual separation of 250 $\mu$m.

Similarly to the previous embodiments, the sub-carrier $140C_2$ and the sub-carrier $150C_2$ are formed with the engagement groove structures 142 and 152 respectively, wherein the sub-carrier $140C_2$ is mounted on the common substrate 100A by engaging the grooves $142c_1$ and $142c_2$ with the ridges 101 of the common substrate 100A. It should be noted that the grooves forming the engagement groove structure 142 or 152 are arranged to have the widths of 85.0 $\mu$m, 87.9 $\mu$m, 90.7 $\mu$m, 93.5 $\mu$m and 96.4 $\mu$m, similarly to the previous embodiments.

It should be noted that the present embodiment is by no means limited to the optical coupling between a laser diode array and an optical fiber array but is applicable also to the optical coupling between other various optical array devices

FIFTEENTH EMBODIMENT

Figure 53:
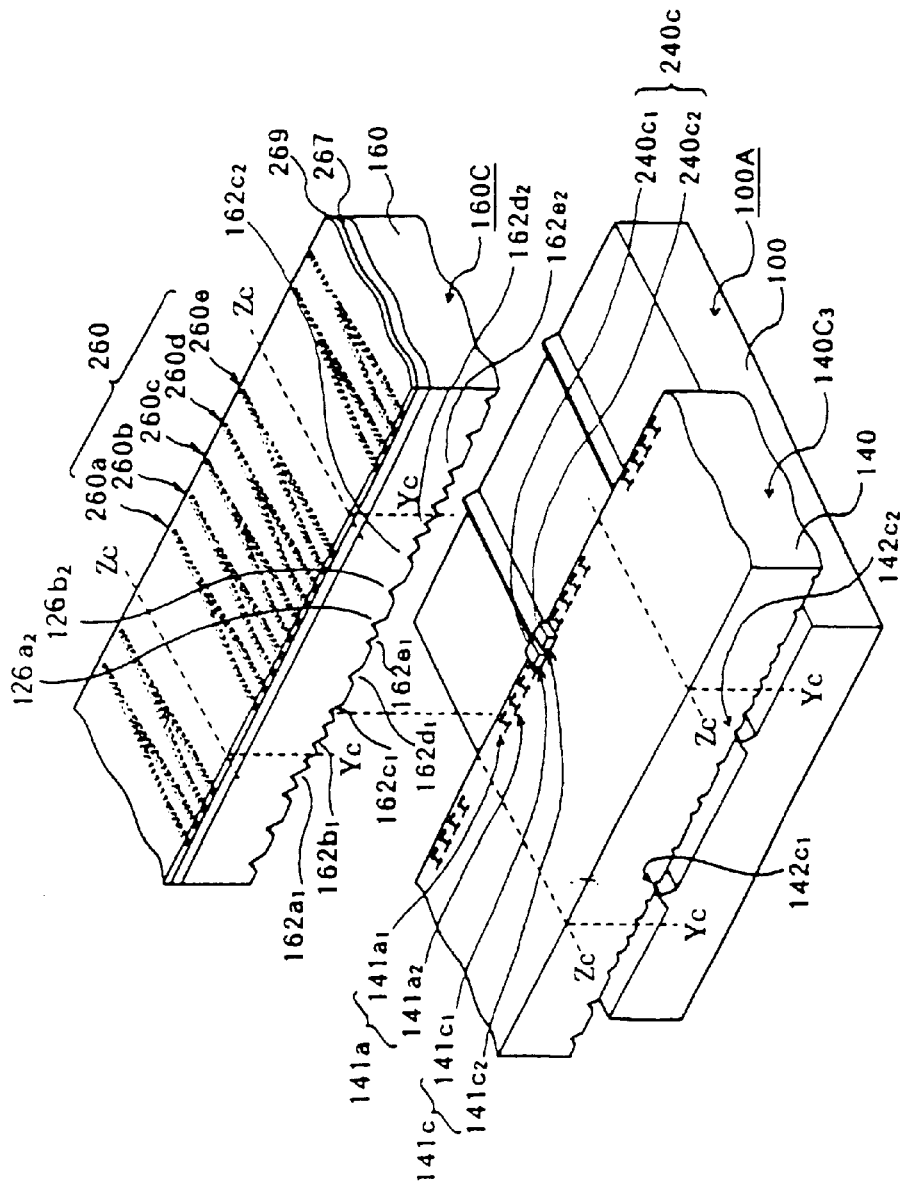
FIG. 53 is a diagram showing the construction of an optical coupling structure according to a fifteenth embodiment of the present invention.

FIG. 53 shows the construction of an optical coupling structure according to a fifteenth embodiment of the present invention, wherein those parts corresponding to the parts described previously are designated by the same reference numerals and the description thereof will be omitted.

Referring to FIG. 53, the optical coupling structure includes a sub-carrier $140C_3$ and a sub-carrier 160C on the common substrate 100A in a state that the engagement grooves $142c_1$ and $142c_2$, formed on the bottom side of the sub-carrier $140C_3$ as a part of the engagement groove structure 142, engage with the ridges 101 of the common substrate 100A and such that the engagement grooves $162c_1$ and $162c_2$, formed on the bottom side of the sub-carrier 160C as a part of the engagement groove structure 162 together with other grooves $162a_1$–$162e_2$, engage with the foregoing ridges 101.

The sub-carrier $140C_3$ carries thereon an edge-emission type laser diode $240c_1$ and an edgereception type photodiode $240c_2$ as an optical structure 240c, while the sub-carrier 160C carries thereon an optical waveguide array 260, wherein the optical waveguide array 260 includes optical waveguides 260a–260e each having a Y-shaped or branched structure. Thereby, it should be noted that one of the Y-shaped branches is used for optical coupling with the laser diode $240c_1$ and the other is used for optical coupling with the photodiode $240c_2$.

It should be noted that the optical waveguide array 260 includes a lower cladding layer 267 provided on a Si substrate 160 forming the base of the sub-carrier 160C with a thickness of 30 μm and a core layer 269 provided thereon with a thickness of 6 μm. Thus, the distance from the top surface of the substrate 160 to the center of the core 269 becomes 33 μm in the illustrated example. The Y-shaped branches are formed, on the other hand, with a mutual separation of 300 μm, and the optical waveguides 260a–260e are disposed with a mutual separation of 600 μm.

In correspondence to the mutual separation of 300 μm between the branches of the optical waveguide, the laser diode $240c_1$ and the photodiode $240c_2$ are disposed with a mutual separation of also 300 μm such that the laser diode $240c_1$ faces the end surface of one of the Y-shaped branches and the laser diode $240c_2$ faces the end surface of the other of the Y-shaped branches of the optical waveguide.

Although not illustrated it should be noted that the surface of the substrate 140 of the sub-carrier $140C_3$ is covered by a thermal oxide film having a thickness of 1 μm. Thus, the laser diode $240c_1$ and the photodiode $240c_2$ have the respective optical axes at the height of 6.52 μm as measured from the surface of the Si substrate 140 forming the sub-carrier $140C_3$.

As noted already, the sub-carrier $140C_3$ and the sub-carrier 160C includes the engagement groove structures 142 and 162 on the respective bottom surfaces, wherein the grooves forming the engagement groove structure 142 are formed to have the widths of 85.0 μm, 87.9 μm, 90.7 μm, 93.5 μm and 96.4 μm, while the grooves forming the engagement groove structure 162 are formed to have the widths of 122.5 μm, 125.3 μm, 128.1 μm, 131 μm and 133.0 μm.

By suitably choosing the engagement grooves in the engagement groove structure 142 and the engagement groove structure 162e it is possible to reduce the error in the height of the optical axis to be within ±1 μm, provided that the variation in the thickness of the sub-carriers $140C_3$ and 160C is within ±5 μm.

It is possible to form the sub-carriers $140C_3$ and 160C from a common wafer or from separate wafers. Further, any material may be used for the optical waveguide 260 as long as the optical waveguide can formed on the Si substrate 160. For example, a plastic optical waveguide or a PLC waveguide may be used for the optical waveguide 160.

Figure 54A:
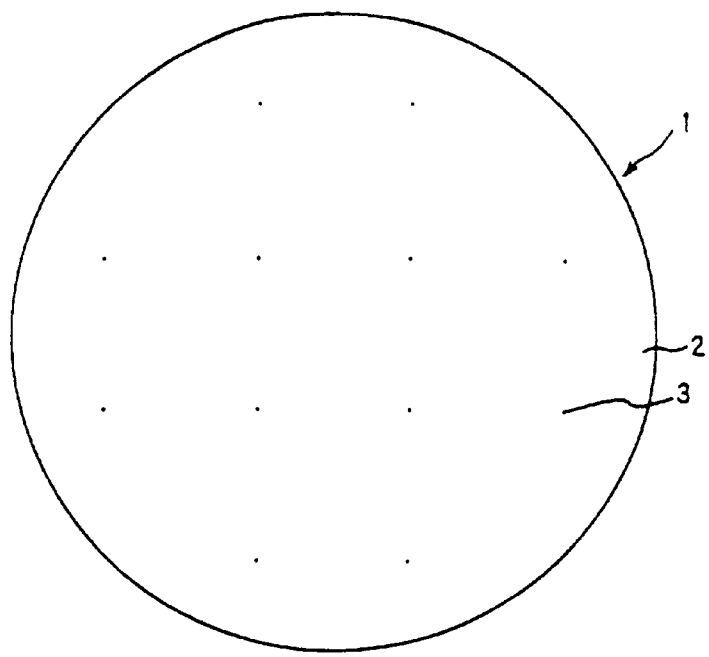
FIGS. 54A–54F are diagrams showing a fabrication process of the optical coupling structure of the fifteenth embodiment.

FIGS. 54A–54H show the process of fabricating the sub-carriers 160C from a common Si wafer, the wafer 1 having (100)-oriented upper and lower principal surfaces Referring to FIG. 54A, the Si wafer 1 is subjected to a thermal oxidation process to form the oxide films 2 on both the upper and lower principal surfaces of the wafer 1. Further alignment marks 3 are formed on the oxide film 2 covering the upper principal surface of the wafer 1.

Figure 54B:
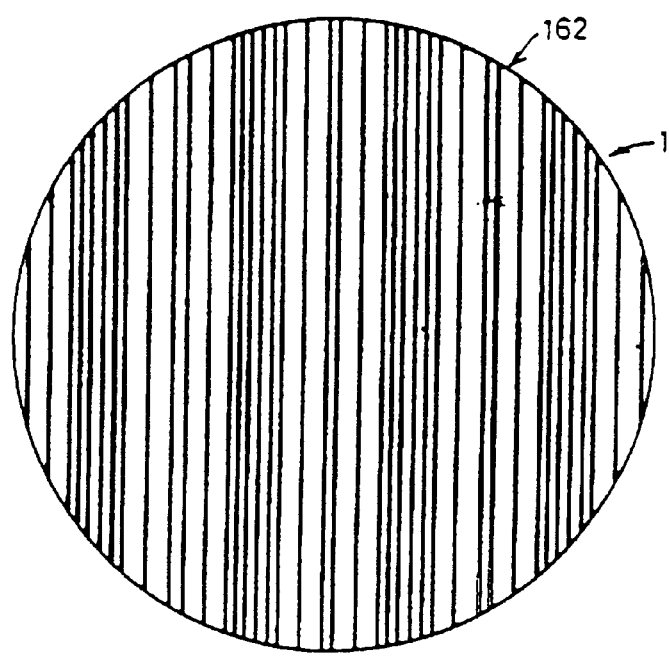

Next, the grooves forming the engagement groove structure 162 are formed on the lower principal surface of the wafer 1 by a photolithographic process as indicated in FIG. 54B.

Figure 54C:
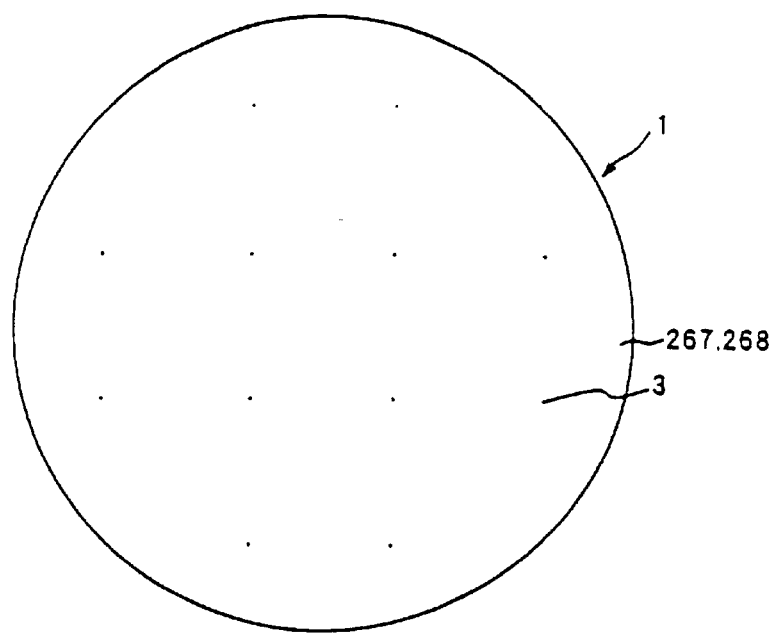
Figure 54D:
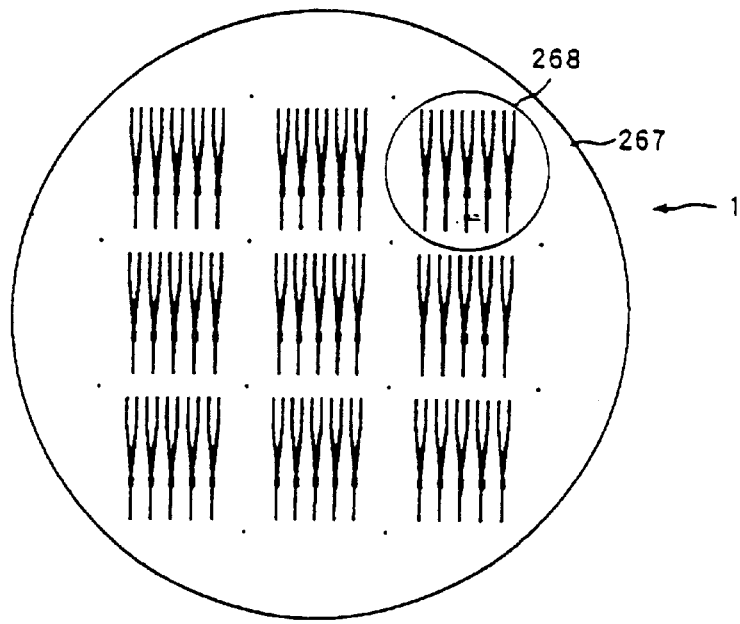

Further, the layers 267 and 268 forming the optical waveguide are deposited on the oxide film 2 at the side of the upper major surface of the wafer 1 in the step of FIG. 54C, and a core pattern is formed on the core layer 168 by way of a photolithographic process in the step of FIG. 54D.

Figure 54E:
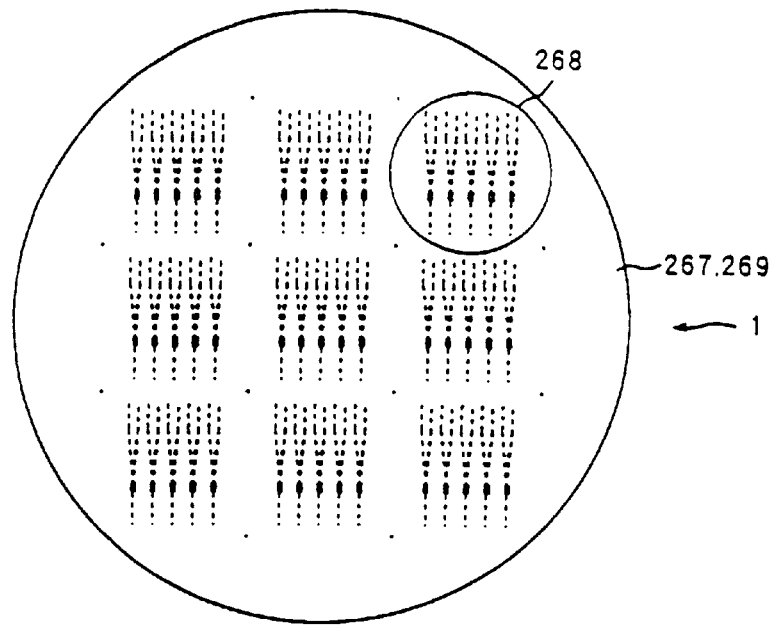
Figure 54F:
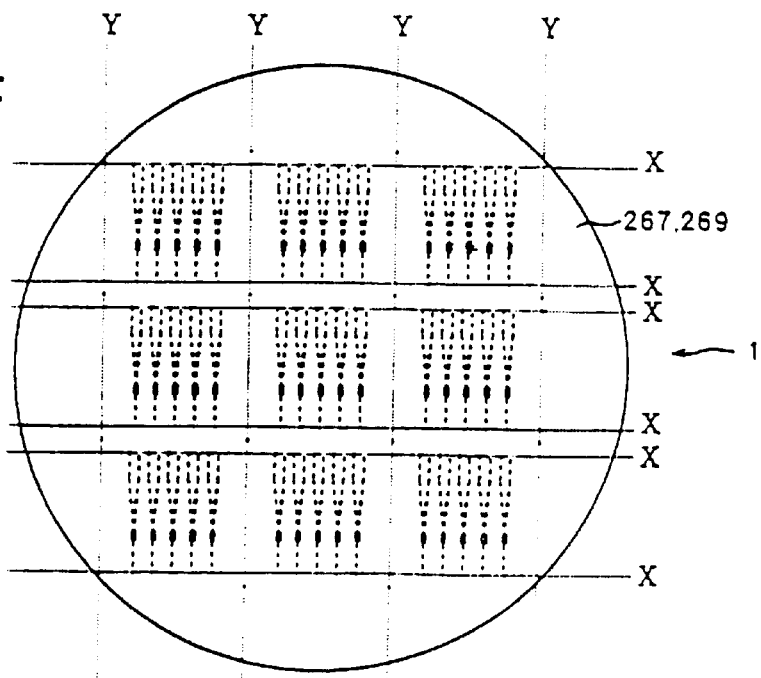

After a layer 269 forming the upper cladding layer is deposited on the structure of FIG. 54C in the step of FIG. 54E, the wafer 1 is diced along the dicing lines X and Y in the step of FIG. 54F.

After the dicing process of FIG. 54F, the exposed edge surface of the Y-shaped optical waveguide may be polished or cleaved as necessary to form a clean, flat surface. Alternatively, it is possible to form a desired flat surface at each end of the Y-shaped optical waveguide by way of a dry etching process, prior to the dicing of the wafer 1.

In the optical coupling structure of the present embodiment that uses an optical waveguide held on a sub-carrier, it should be noted that the problem of emission of the optical energy in the core to the underlying Si substrate of the sub-carrier, when the thickness of the lower cladding layer 267 is small. For example, an optical emission or leak tends to occur to the Si substrate 160 from the core 268 when the thickness of the lower cladding layer 267 of the optical waveguide is small. It should be noted that the Si substrate 160 has a refractive index of about 3.6 which is much larger than the refractive index of the material used for the optical waveguide 260.

In order to avoid the problem of such a leak of the optical energy to the substrate 160, it is necessary to increase the thickness of the lower cladding layer 267 to about 30 μm. However, the use of such a thick lower cladding layer 267 immediately raises the problem of optical alignment with respect to the laser diode $241c_1$ or the photodiode $241c_2$. For example, the distance from the top surface of the substrate 160 to the center of the core layer becomes about 33 μm, assuming that the lower cladding layer 267 has a thickness of 30 μm and the core layer 268 has a thickness of 6 μm.

Thus, when the optical waveguide is formed with the maximum error of ±10%, it is expected that the height of the optical axis may variate within the range of ±3.3 μm.

It should be noted that the optical coupling structure of the present embodiment can compensate for this amount of the alignment error easily, by forming several sets of the engagement groove structures 162 on the sub-carrier 160C with different sizes for the engagement grooves and selecting one of them such as the grooves $162c_1$ and $162c_2$ for engagement with the ridges 101 of the common substrate 100, similarly to the embodiments described heretofore. Such a selection may be made based upon the measurement of the total thickness of the wafer 1 after the formation of the lower cladding layer 267. Further, when the sub-carrier $140C_3$ and the sub-carrier 160C are formed from a common wafer as in the case of the conventional structure according to the PRIOR ART TYPE 2, the desired optical alignment is successfully achieved by measuring the thickness of the lower cladding layer 267 and selecting the appropriate grooves such as the grooves $162c_1$ and $162c_2$ based on the result of the thickness measurement.

SIXTEENTH EMBODIMENT

Figure 55:
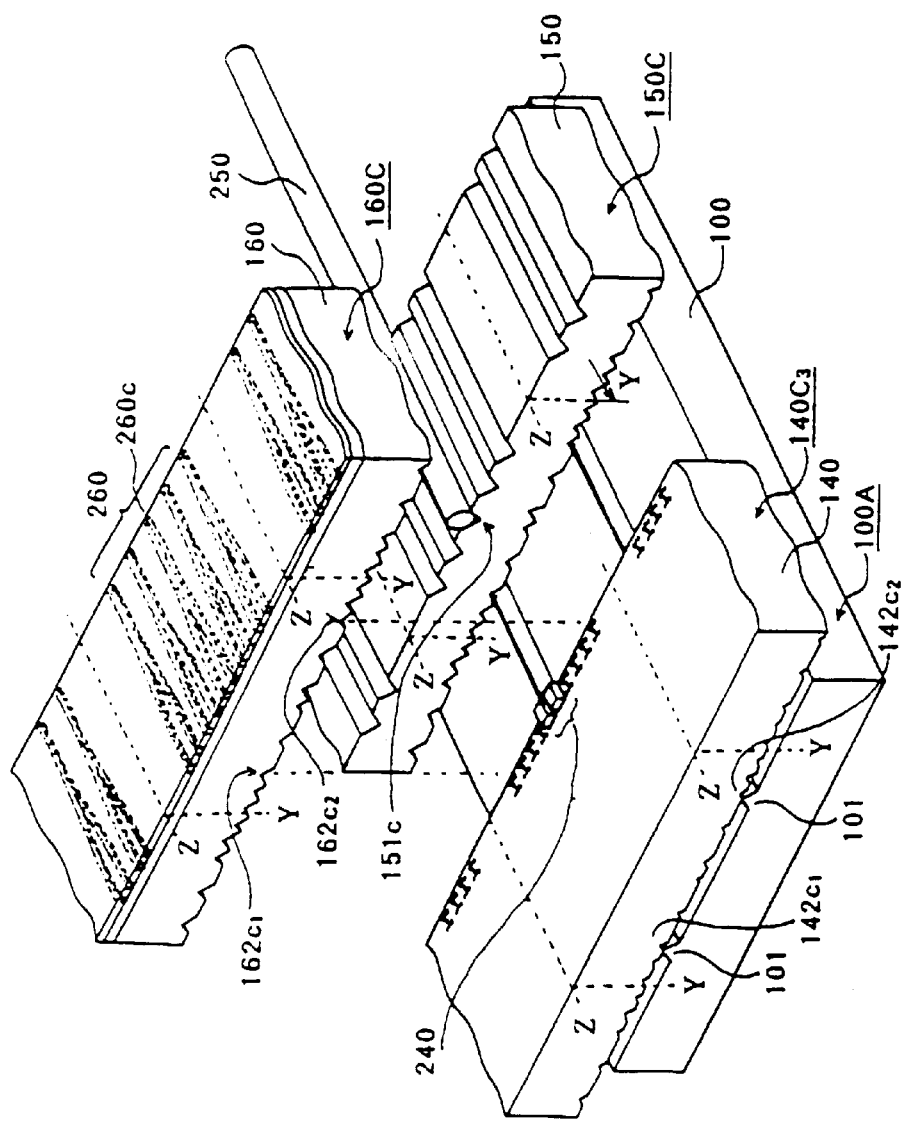
FIG. 55 is a diagram showing the construction of an optical coupling structure according to a sixteenth embodiment of the present invention.

FIG. 55 shows the construction of an optical coupling structure according to a sixteenth embodiment of the present invention, wherein those parts corresponding to the parts described previously are designated by the same reference numerals and the description thereof will be omitted.

Referring to FIG. 55, the optical coupling structure includes the foregoing sub-carriers $140C_3$, 160C and 150C on the common substrate 100A. By using the construction of FIG. 55, it is possible to achieve an optical coupling easily between the laser diode $240c_1$, photodiode $240c_2$, the optical waveguide 260 and the optical fiber array 250. As the constructions of the sub-carriers $140C_3$, 160C and 150C are described previously further repetition thereof will be omitted.

It should be noted that the sub-carrier $140C_3$ and the sub-carrier 160C may be formed from a common wafer when the optical waveguide 260 is formed of a material that enables formation of the optical waveguide 260 as a low temperature.

FIGS. 56A–56K show a fabrication process of the sub-carrier $140C_3$ and the sub-carrier 160C from a common Si wafer designated by the wafer 1.

Figure 56A:
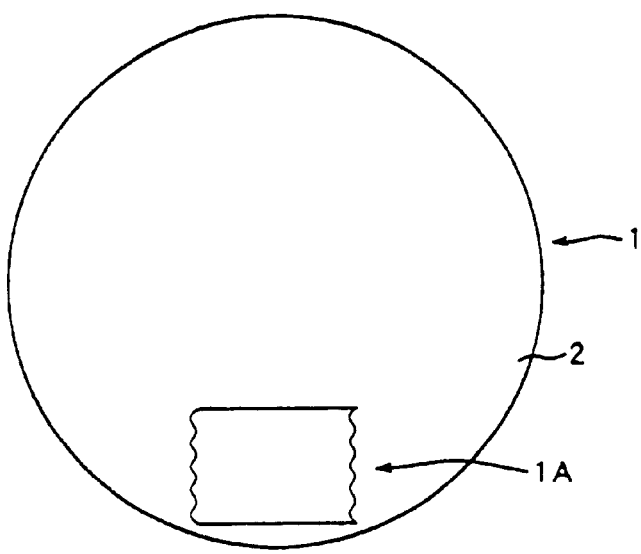

Referring to FIG. 56A, the wafer 1 is subjected to a thermal oxidation process to form the oxide film 2 such that the oxide film 2 covers both the upper and lower principal surfaces of the wafer 1.

Figure 56B:
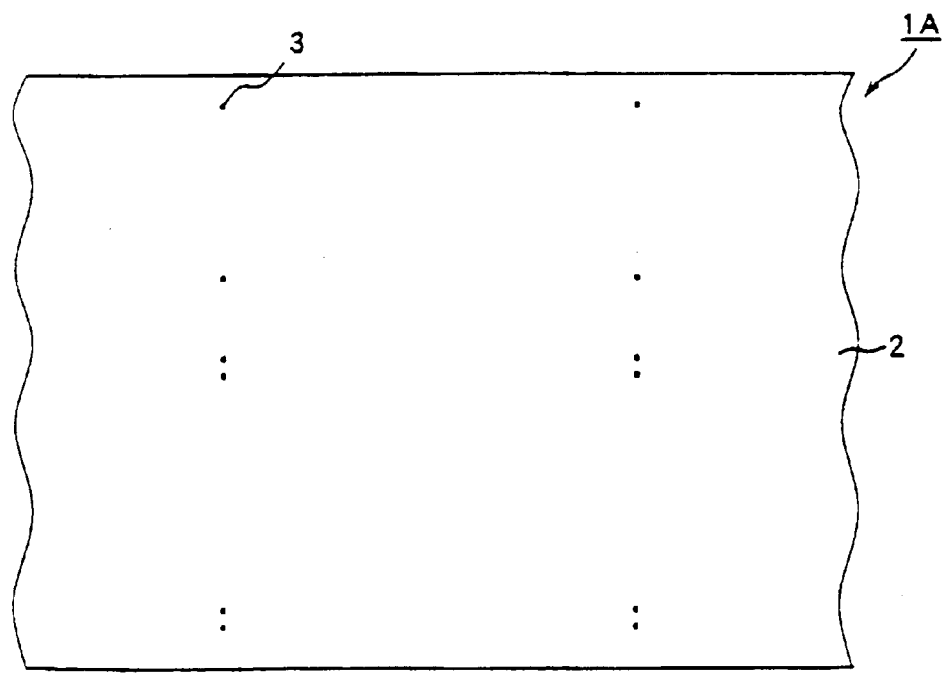
Figure 56C:
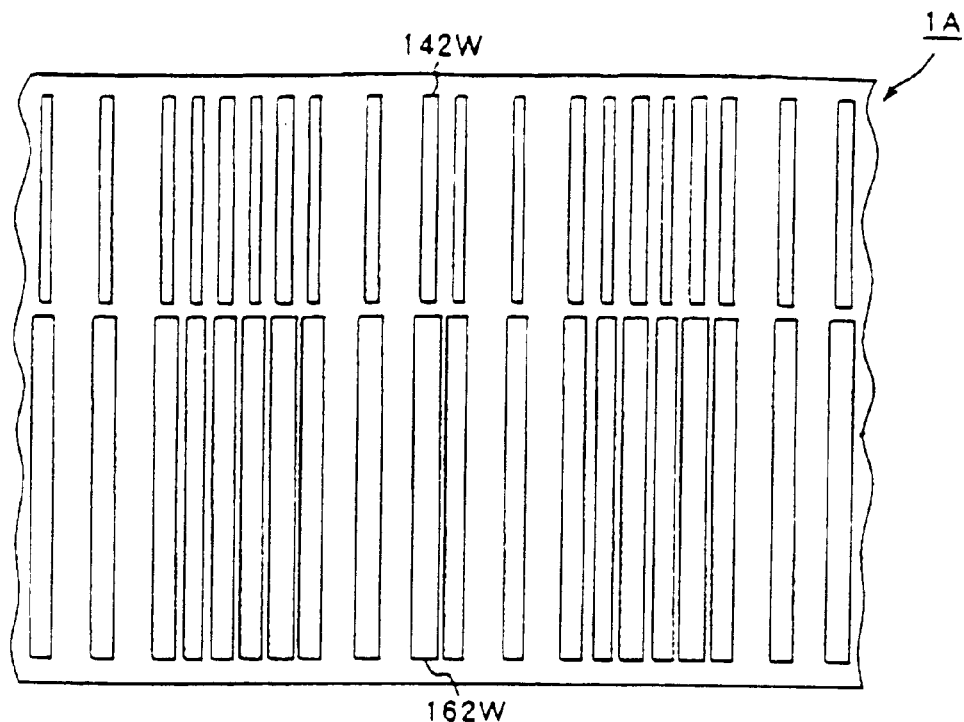

Next, in the step of FIG. 56B, the oxide film covering the upper principal surface is formed with the alignment marks 3, and the mask window 142w and a mask window 162w are formed on the oxide film 2 on the lower principal surface of the wafer 1 in the step of FIG. 56C, wherein the mask window 142w exposes the lower principal surface of the wafer 1 where the engagement grooves $142a_1$–$142e_2$ are to be formed while the mask window 162w exposes the lower principal surface of the wafer 1 where the engagement grooves $162a_2$–$162e_2$ are to be formed.

Figure 56D:
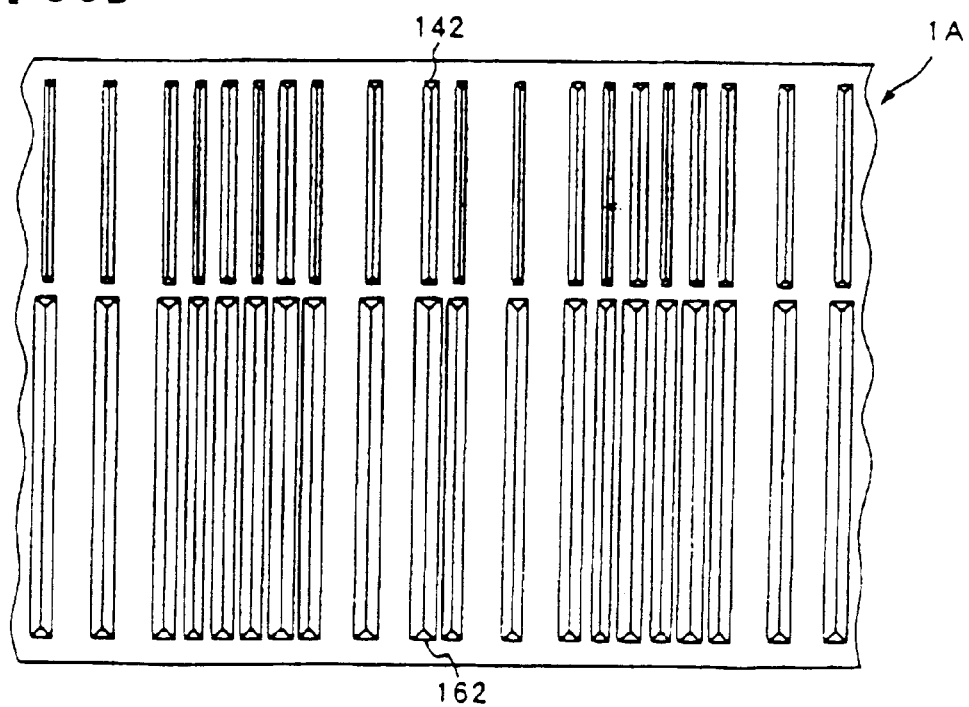

Next, the Si wafer 1 thus masked is subjected to an etching process in a KOH aqueous solution, and the grooves 142 and 162 are formed in correspondence to the foregoing windows 142w and 162w as indicated in FIG. 56D.

Figure 56E:
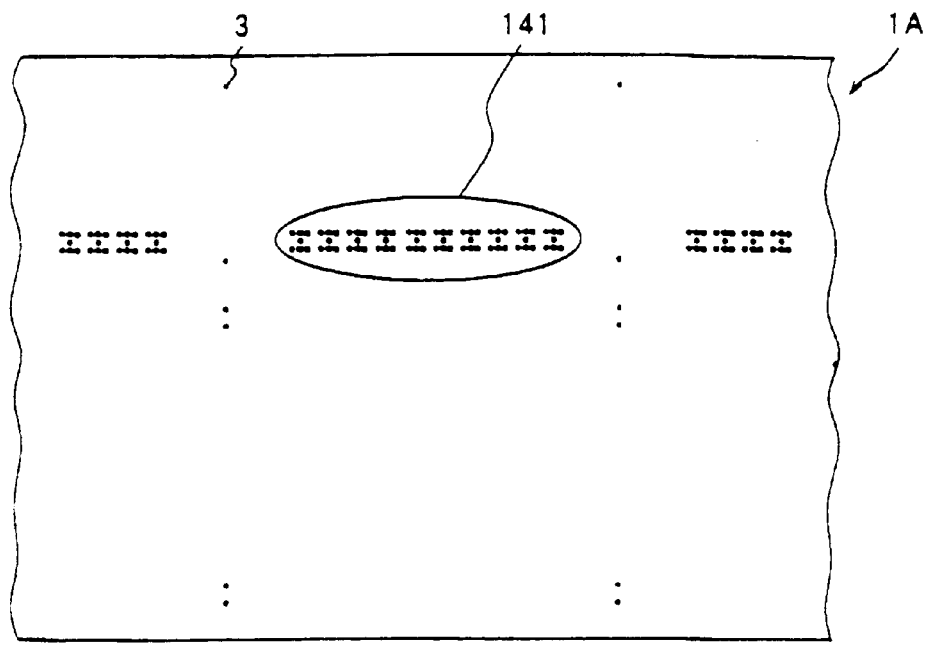
Figure 56F:
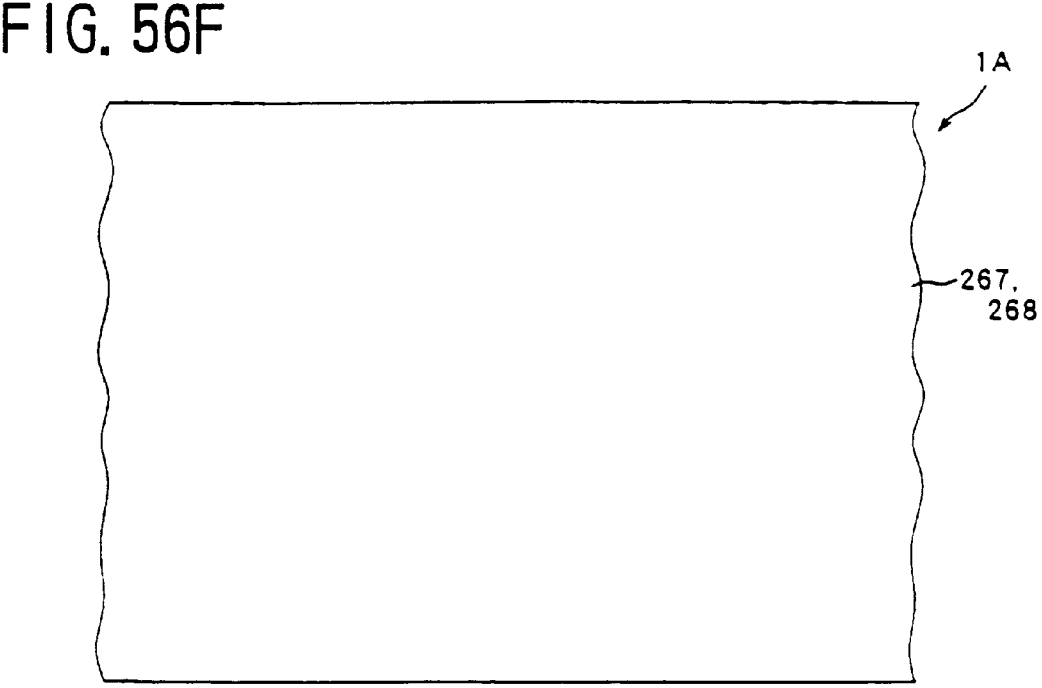

Next, in the step of FIG. 56E, the bonding pad structure 141 including various interconnection patterns are formed on the oxide film 2 covering the upper principal surface of the wafer 1 and the layers 267 and 268 respectively acting as the lower cladding layer and the core layer, are applied on the structure of FIG. 56E by way of a spin-coating process and the like.

Figure 56G:
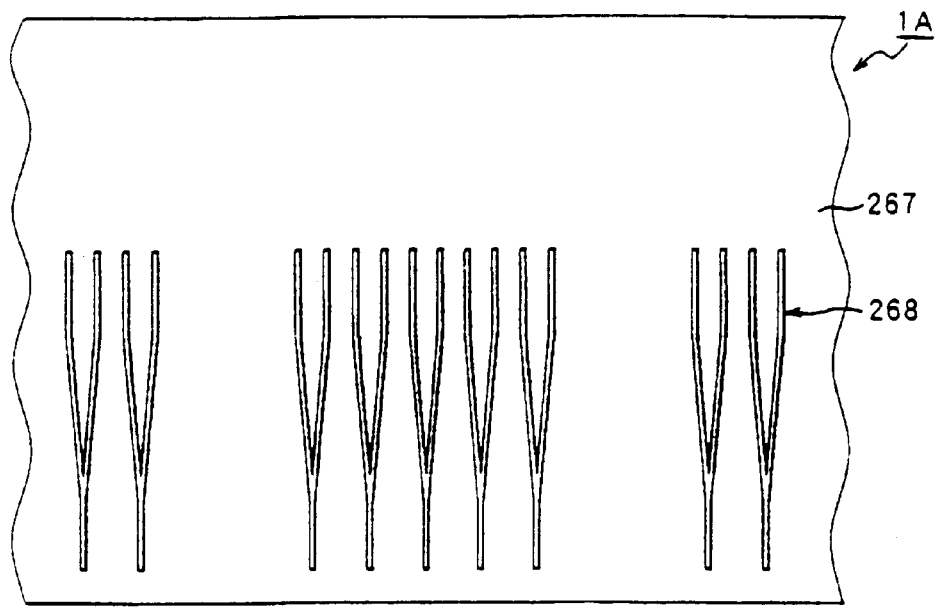
Figure 56H:
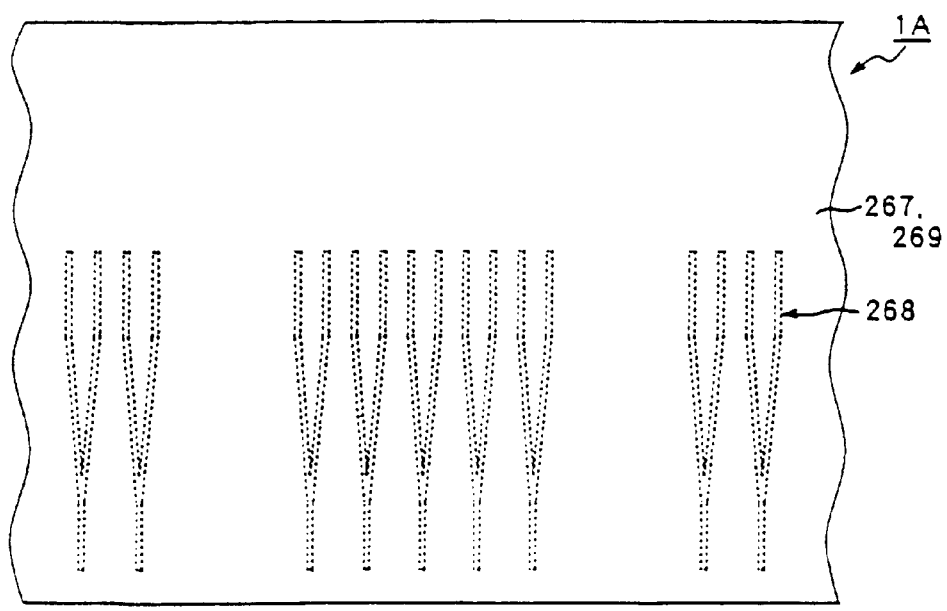
Figure 561:
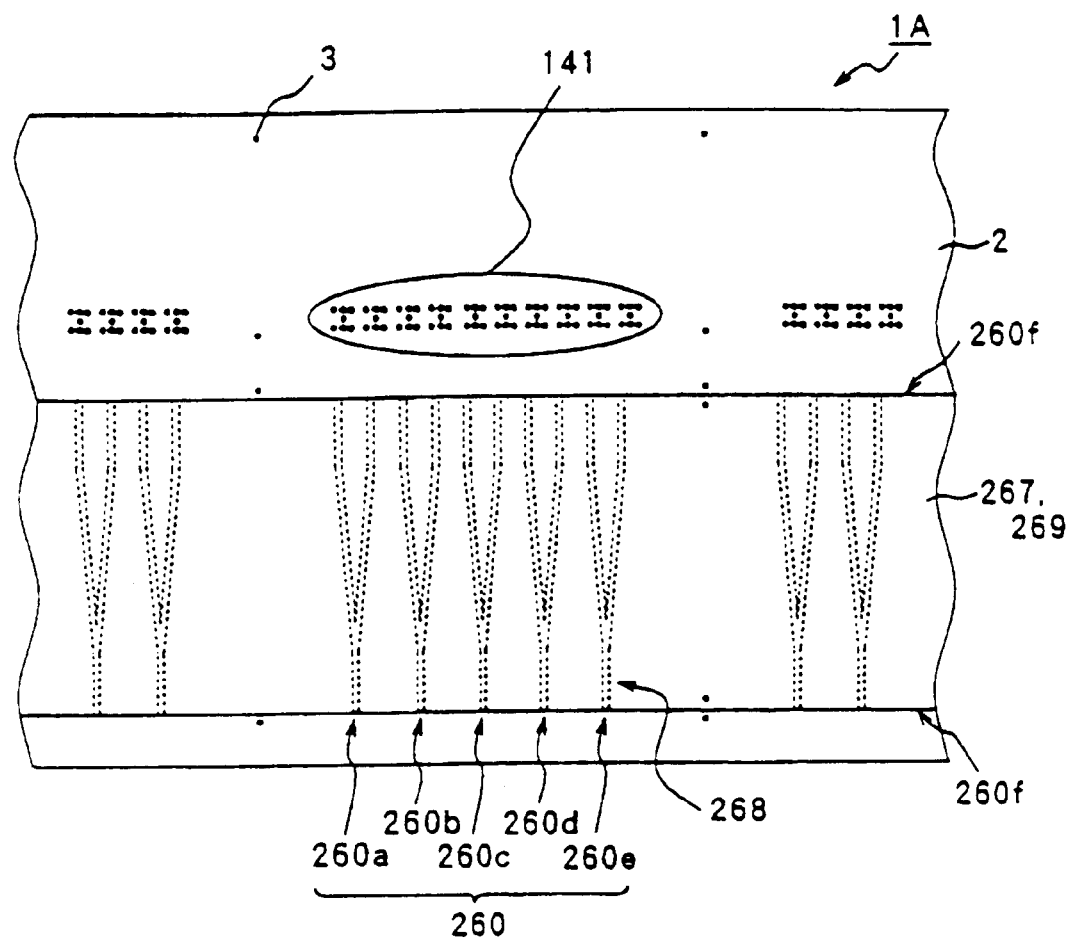
Figure 56J:
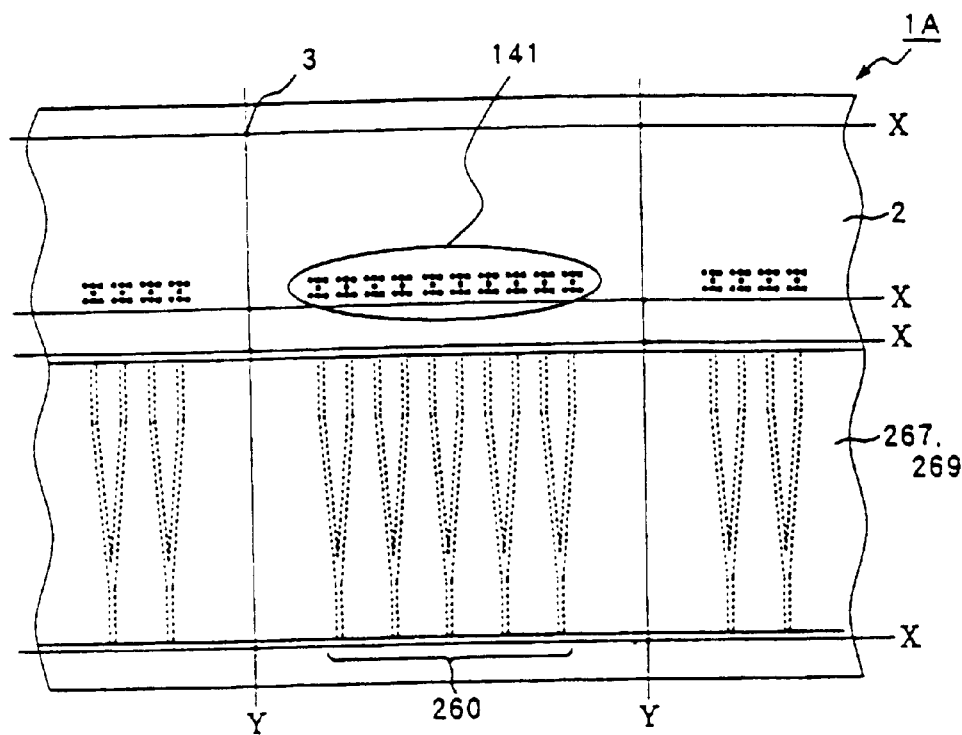

Next, the core layer 268 is patterned by a photolithographic process using an oxygen plasma in the step of FIG. 56G according to the desired Y-shaped form of the optical waveguide, and the material forming the upper cladding layer 269 is applied on the structure of FIG. 56G in the step of FIG. 56H.

Further, the upper cladding layer 269 is patterned in the step of FIG. 56I by a photolithographic process using an oxygen plasma such that the bonding pad structure 141 is exposed. The patterning is conducted such that the Y-shaped ends of the optical waveguide 260 as well as the opposite end thereof are exposed.

Figure 56K:
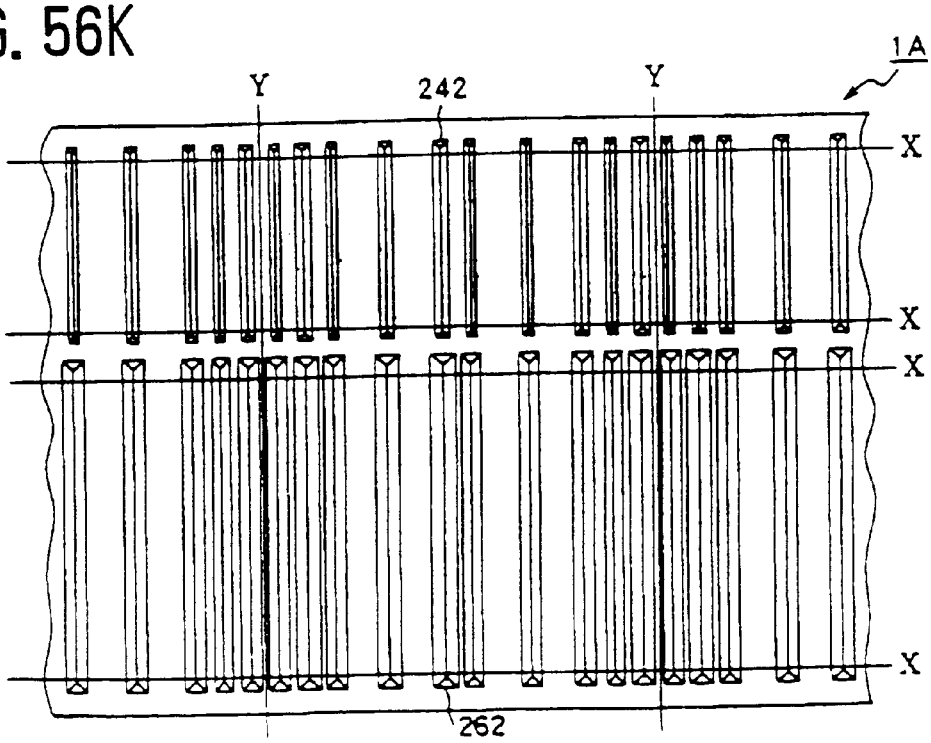

Finally, the wafer 1 thus processed is diced along the lines X and Y as indicated in FIG. 56K.

Figure 57:
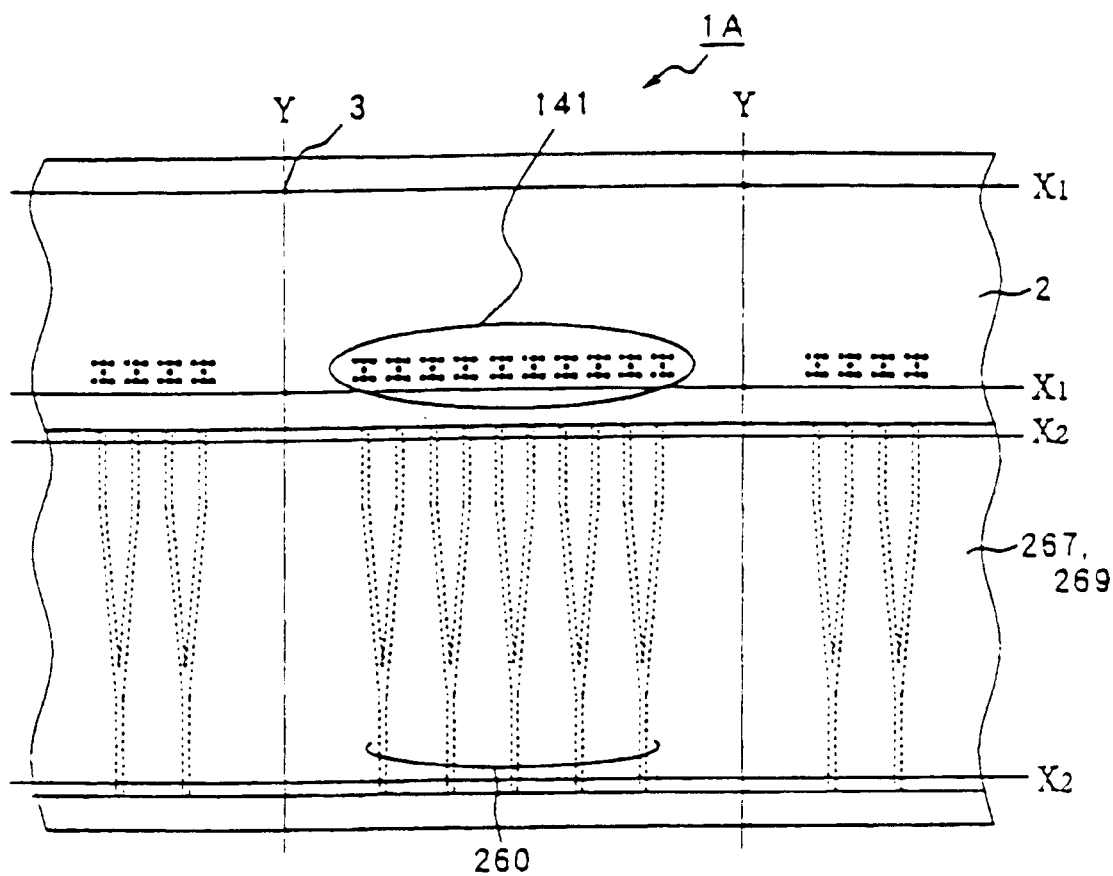
FIG. 57 is a diagram showing a modification of the fabrication process of FIG. 56J.

Alternatively to carry out the dicing process as in the case of FIG. 56K, it is also possible to divide the wafer 1 by a cleaving process as indicated in FIG. 57. In this case, the wafer 1 is cleaved along the lines $X_2$. Thereby, a clean, flat end surface is obtained at the both ends of the optical waveguide.

After the foregoing processes, the thickness of the lower cladding layer 267 is measured, and the selection of the engagement grooves is made for the engagement groove structure 142 the 162 based on the result of the measurement

SEVENTEENTH EMBODIMENT

Figure 58:
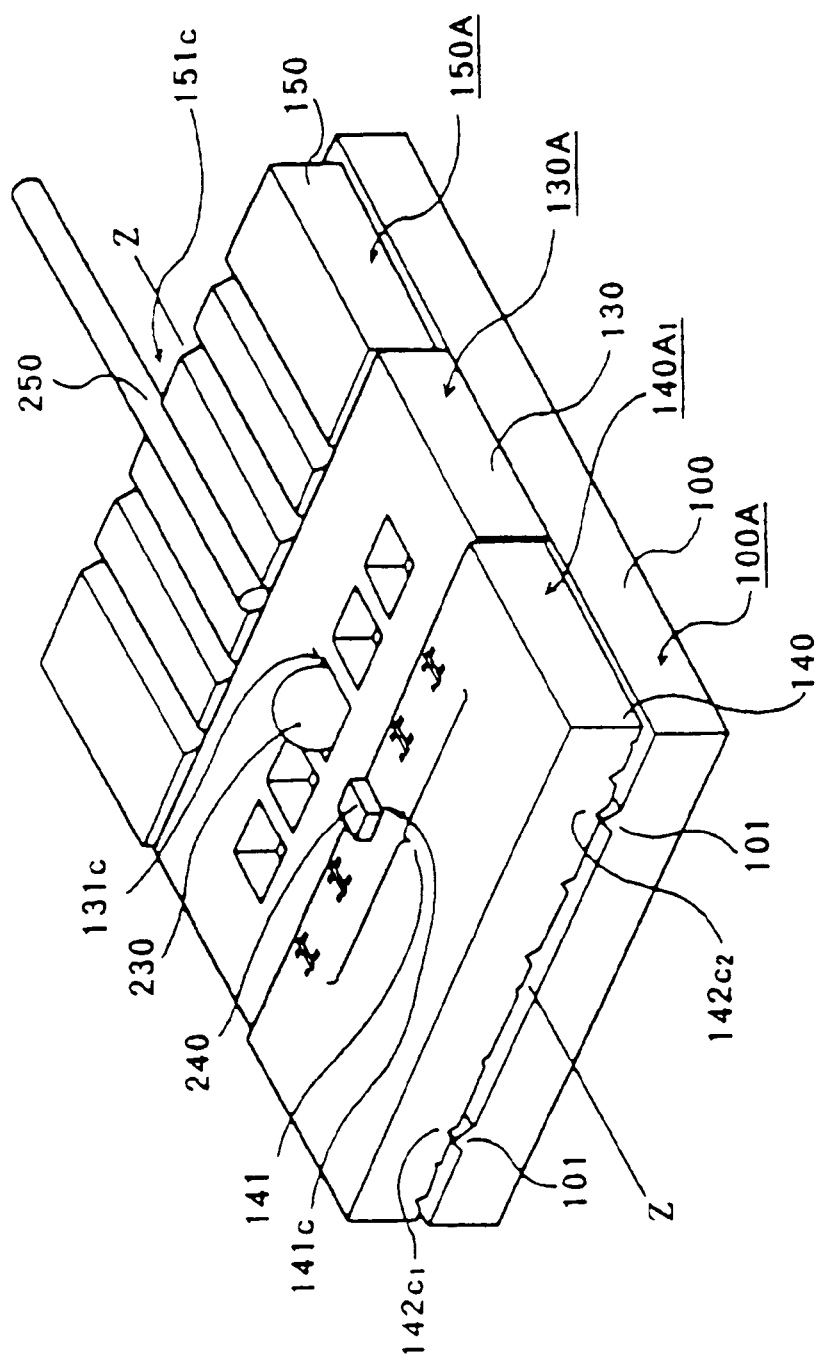
FIG. 58 is a diagram showing the construction of an optical coupling structure according to a seventeenth embodiment of the present invention.

FIG. 58 shows the construction of an optical coupling structure according to a seventeenth embodiment of the present invention wherein those parts corresponding to the parts described previously are designated by the same reference numerals and the description thereof will be omitted Referring to FIG. 58D the optical coupling structure includes the sub-carrier $140A_1$ carrying thereon the laser diode 240, the sub-carrier 130A carrying thereon the spherical lens 230 and the sub-carrier 150A carrying thereon the optical fiber 250, on the common substrate 100A, such that an optical alignment is achieved between the laser diode 240, the lens 230 and the optical fiber 250. According to the present invention, it is possible to form all of the sub-carriers $140A_1$, 130A and 150A from a common Si wafer. Thereby, the precision of the optical alignment is improved substantially.

FIGS. 59A–59I show a fabrication process of the foregoing sub-carriers $140A_1$, 130A and 150A from a common Si wafer, designated by the wafer 1.

Figure 59A:
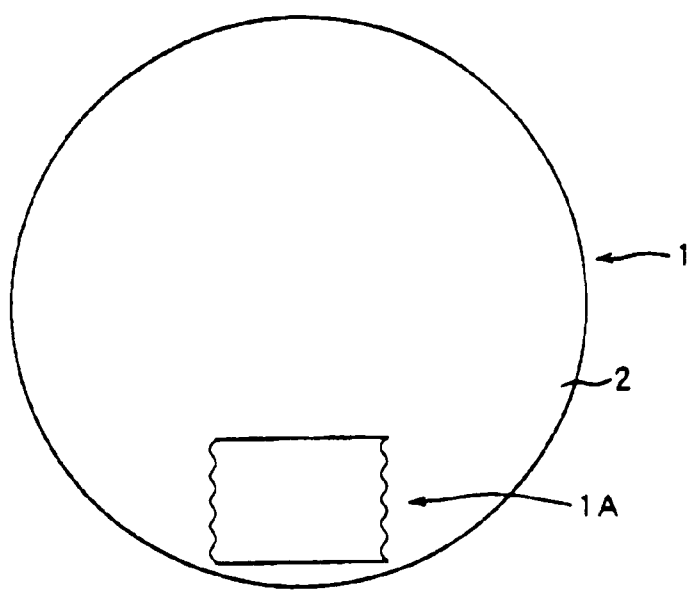
FIGS. 59A–59I are diagrams showing a fabrication process of the optical coupling structure of the seventeenth embodiment.

Referring to FIG. 59A, the Si wafer 1 is subjected to a thermal oxidation process to form the oxide film 2 both on the upper and lower principal surfaces of the wafer 1.

Figure 59B:
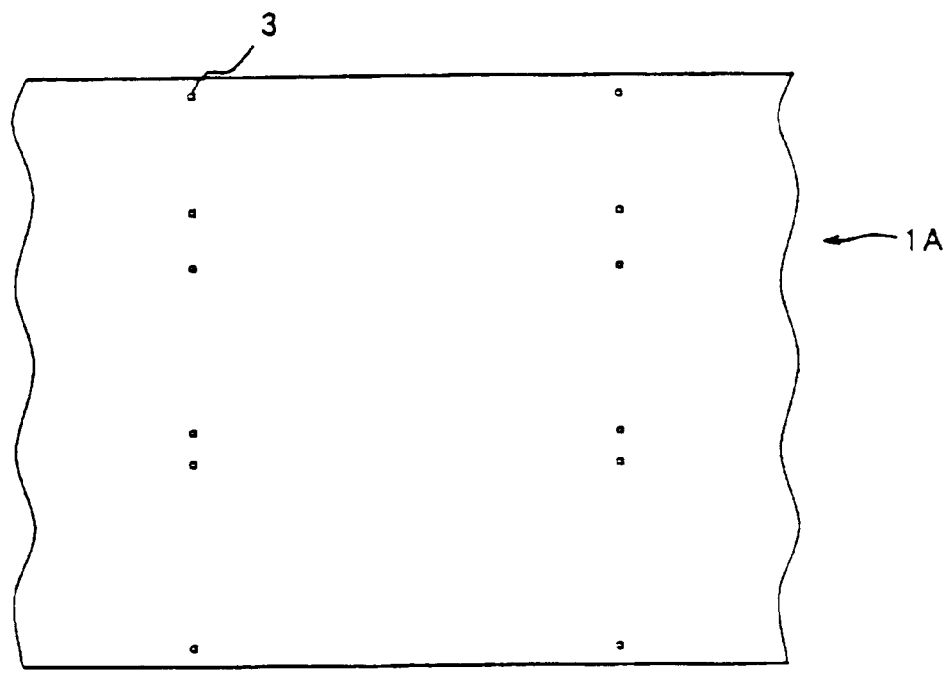
Figure 59C:
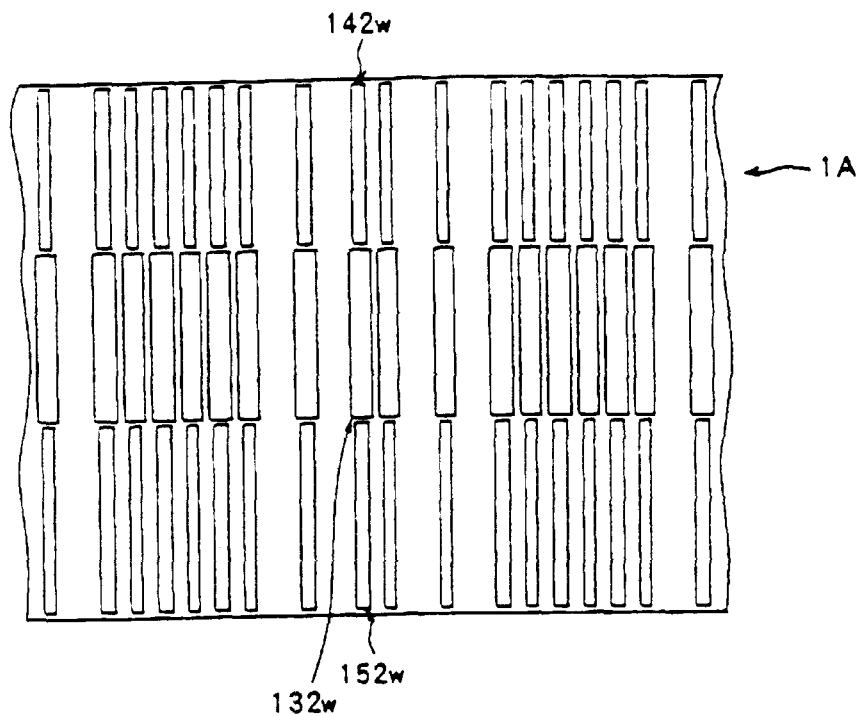

Next, in the step of FIG. 59B the oxide film 2 covering the upper principal surface of the wafer 1 is formed with the alignment mark 3, and mask windows 142w, 132w and 152w are formed in the next step of FIG. 59C on the oxide film 2 covering the lower principal surface of the wafer 1 similarly as before. Further, the region 1A represents a part of the wafer 1 represented in FIG. 59B by the numeral 1A.

Figure 59D:
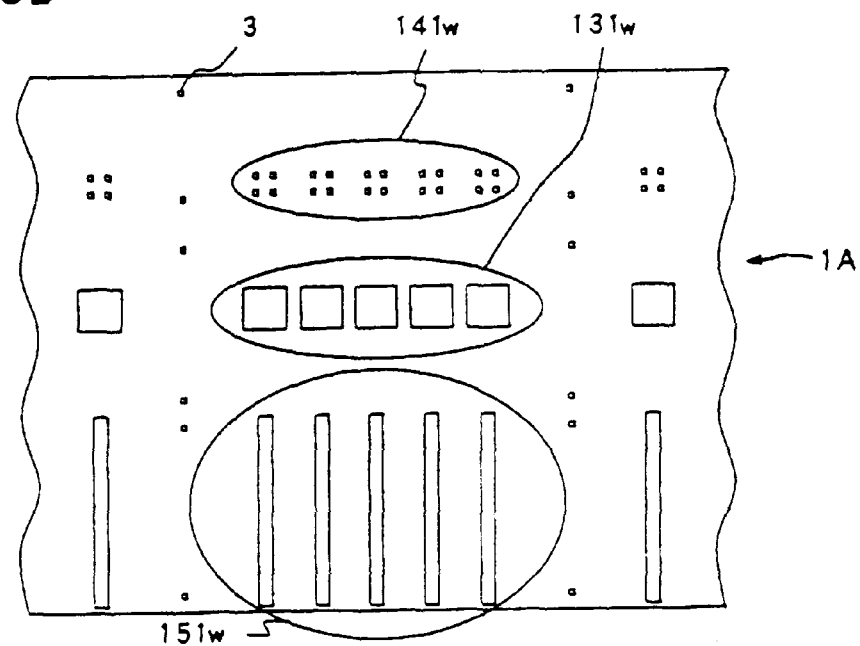

Next, in the step of FIG. 59D, mask windows 141w, 131w and 151w are formed on the oxide film 2 covering the upper principal surface of the wafer 1 respectively in correspondence to the bonding pads 141, the pyramidal depressions 131 and the V-shaped grooves 151 such that the mask openings expose the upper principal surface of the Si wafer 1.

Figure 59E:
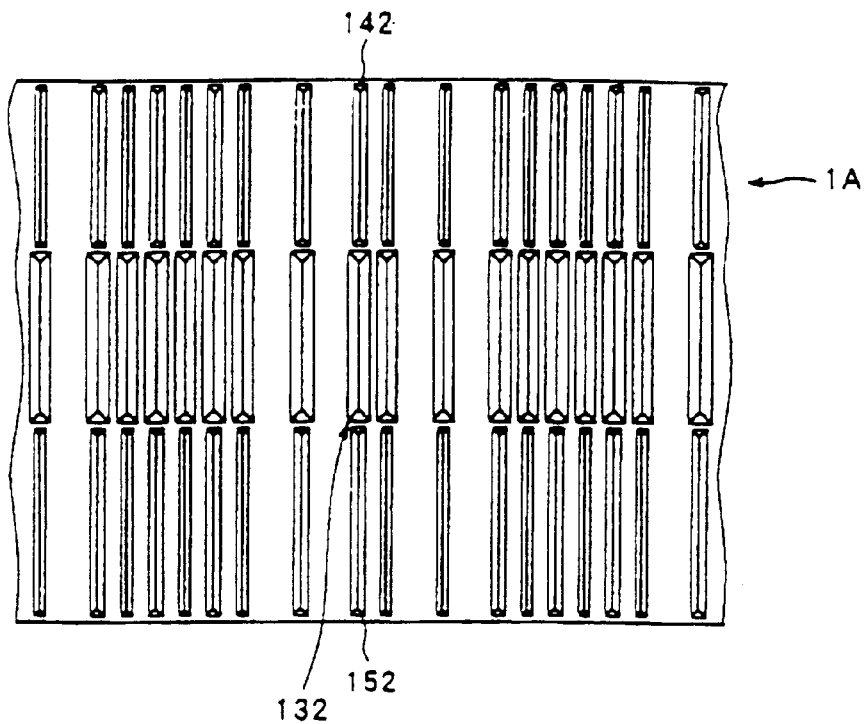
Figure 59F:
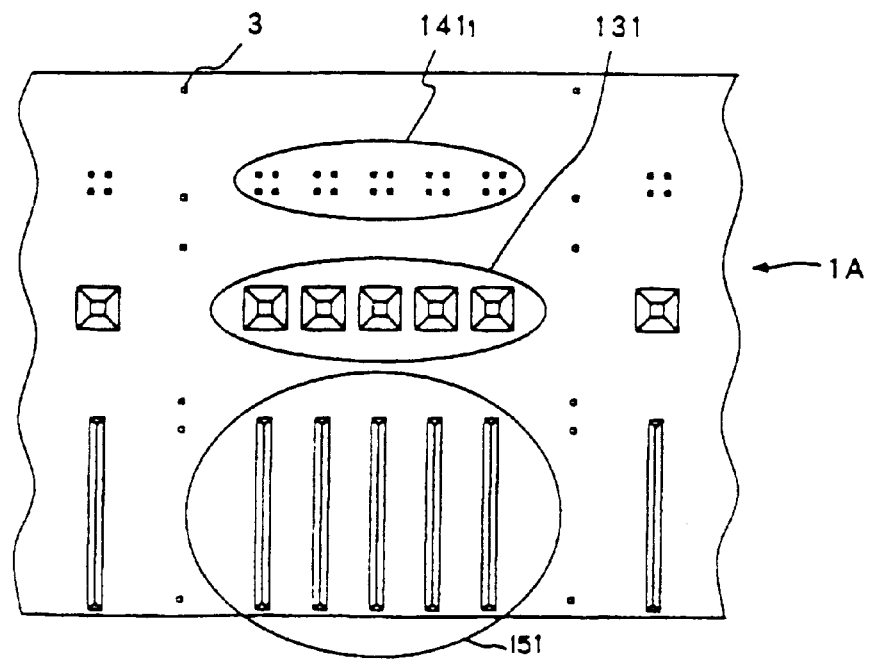
Figure 59G:
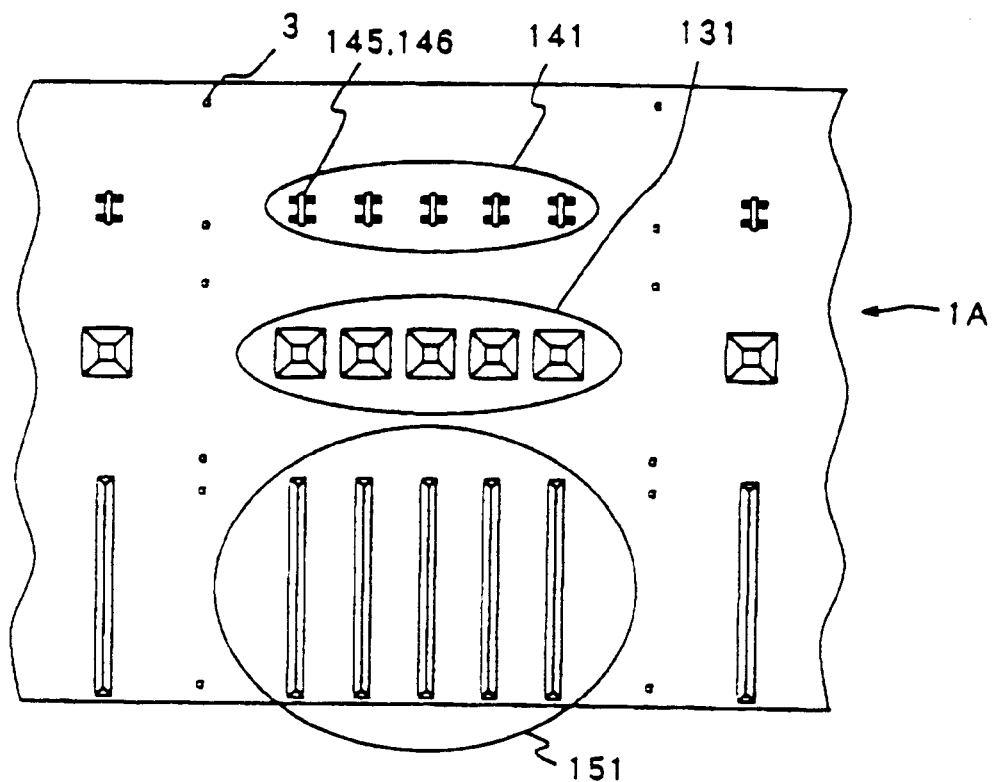
Figure 59H:
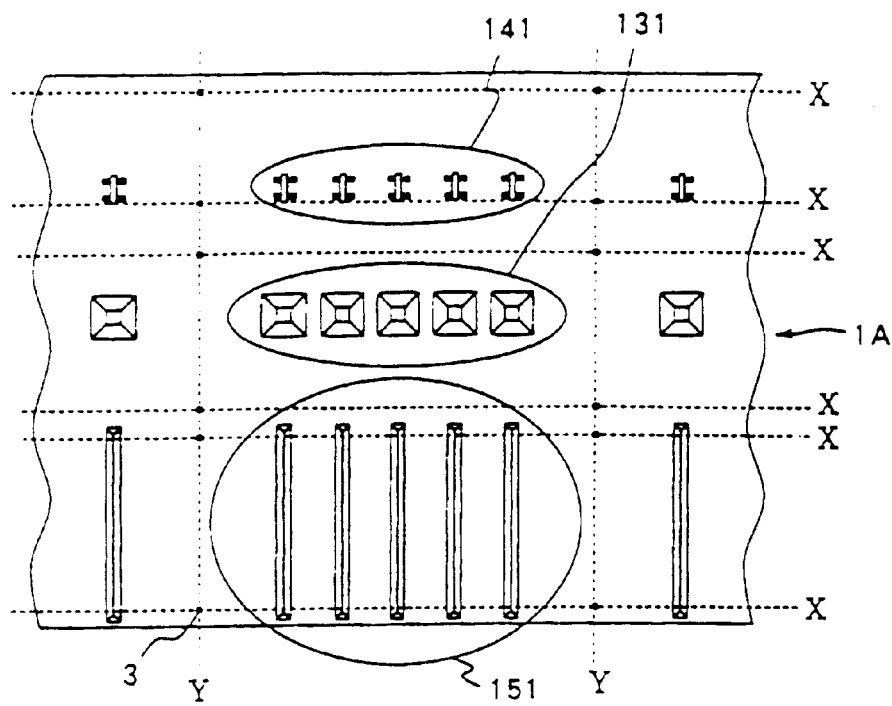
Figure 59I:
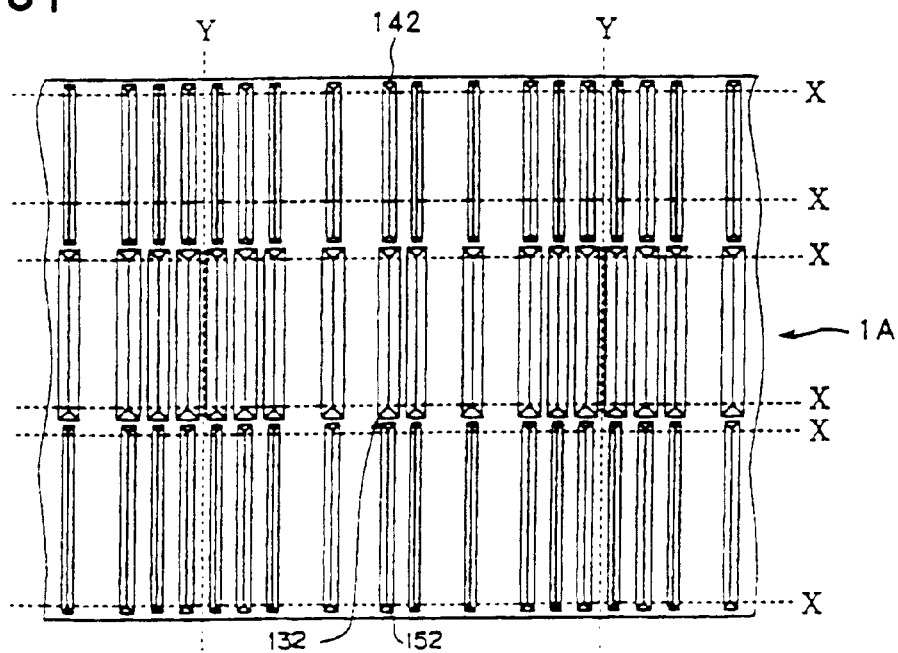

Next, the wafer 1 thus processed is subjected to an etching process in a KOH aqueous solution to form the grooves 132, 142 and 152 as indicated in FIG. 59E and the depressions $141_1$, 131 and 151 as indicated in FIG. 59F respectively in correspondence to the mask windows 132w, 142w and 152w and in correspondence to the mask windows 131w, 141w and 151w. It should be noted that the step of FIG. 59E and the step of FIG. 59F are conducted simultaneously After the step of FIGS. 59E and 59F, the conductor patterns 145 and 146 are provided for forming the bonding pads 141 in correspondence to the depressions $141_1$ in the step of FIG. 59G, and the wafer 1 thus processed is subjected to a dicing process in the step of FIGS. 59H and 59I, wherein FIG. 59H shows the dicing lines X and Y on the upper principal surface of the wafer 1 while FIG. 59I shows the dicing lines X and Y on the lower principal surface of the wafer 1.

By forming the sub-carriers from a common wafer, it is possible to minimize the positional error between the grooves formed on the upper principal surface and the lower principal surfaces It is of course possible to form the sub-carriers of FIG. 58 from different wafers.

EIGHTEENTH EMBODIMENT

Figure 60:
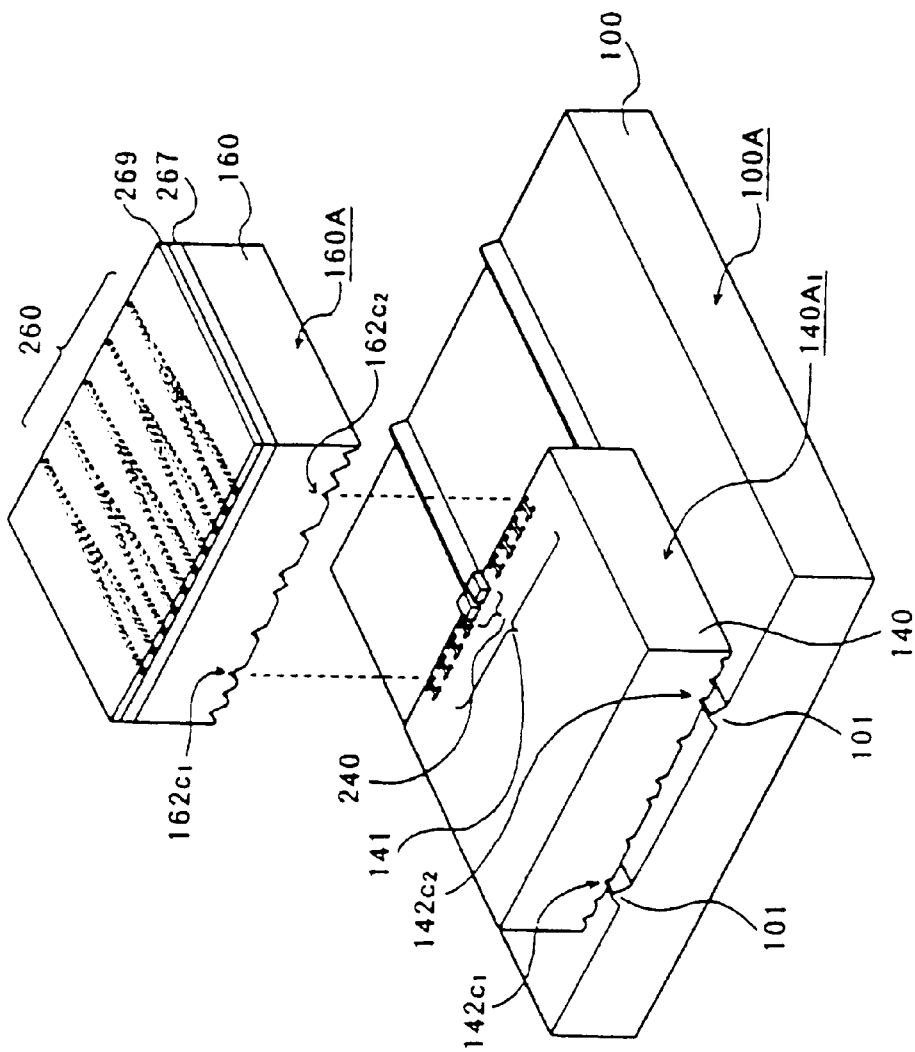
FIG. 60 is a diagram showing the construction of an optical coupling structure according to an eighteenth embodiment of the present invention.

FIG. 60 shows the construction of an optical coupling structure according to an eighteenth embodiment of the present invention.

Referring to FIG. 60, the optical coupling structure includes the sub-carrier 140A$_1$ described previously and the sub-carrier 160A also described previously respectively carrying a laser diode and a photodiode designated collectively by a numeral 240 and the optical waveguide 160 on the common substrate 100A. As the constructions of the sub-carriers 140A$_1$ and 160A are described already, further description thereof will be omitted.

By applying a planarization process described in the Japanese Laid-open Patent Publication 6-275870, it is possible to form the sub-carrier 140A$_1$ and the sub-carrier 160A from a common wafer as will be explained below with reference to FIGS. 61A–61L.

Figure 61A:
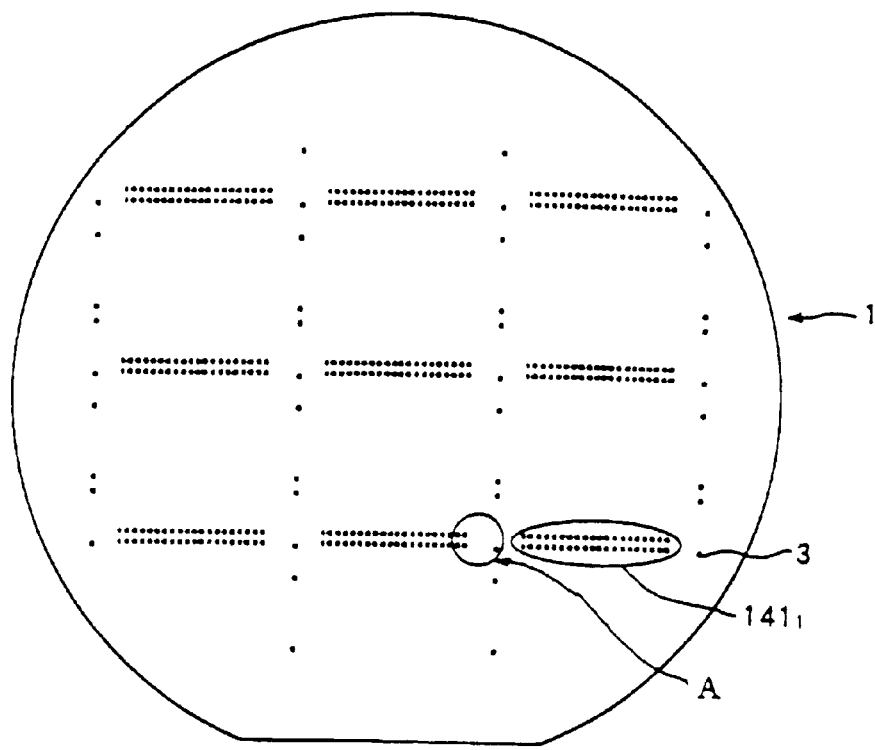
FIGS. 61A–61L are diagrams showing a fabrication process of the optical coupling structure of the eighteenth embodiment.

Referring to FIG. 61A, a Si wafer having (100)-oriented upper and lower principal surfaces represented by the wafer 1, is subjected to a thermal oxidation process similarly as before to form the thermal oxide films 2 on both the upper and lower principal surfaces of the wafer 1. Further, the alignment marks 3 as well as the depressions 141$_1$ for the bonding pad structure 141 are formed on the thermal oxide film 2 covering the upper principal surface of the wafer 1 by a photolithographic patterning process.

Figure 61B:
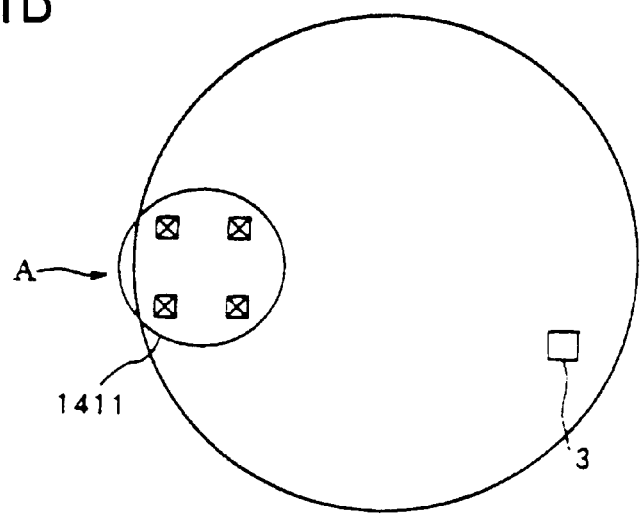

After the alignment marks 3 are thus formed, guide grooves 1411 for accepting the bumps of the laser diode or the photodiode are formed in the step of FIG. 61B on the oxide film 2 covering the upper principal surface of the wafer 1. It should further be noted that FIG. 61B shows a region A of FIG. 61A.

Figure 61C:

FIG. 61C shows the wafer 1 of FIG. 61B in a cross-sectional view.

Figure 61D:
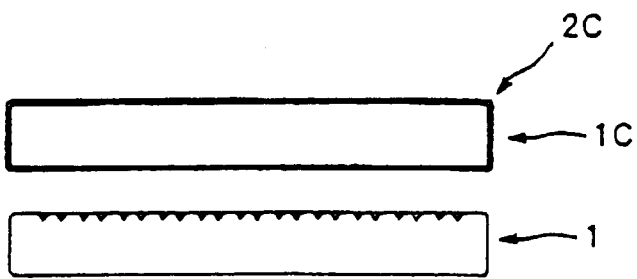
Figure 61E:
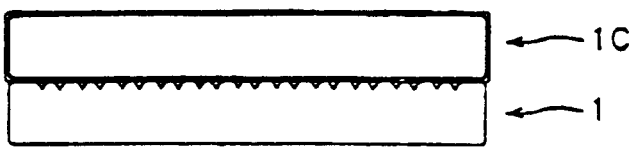
Figure 61F:
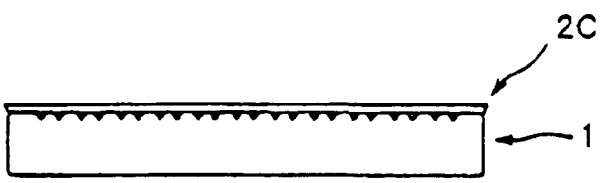

Next, in the step of FIG. 61D, another Si wafer 1C covered by a thermal oxide film 2C is bonded on the wafer 1 of FIG. 61C to form a structure of FIG. 61E followed by a process for removing the Si wafer 1C except for the oxide film 2C. Thereby, a planarized structure shown in FIG. 61F is obtained. A more detailed description of the foregoing planarization process can be found in the Japanese Laid-open Patent Publication 6-275870.

Figure 61G:
Figure 61H:
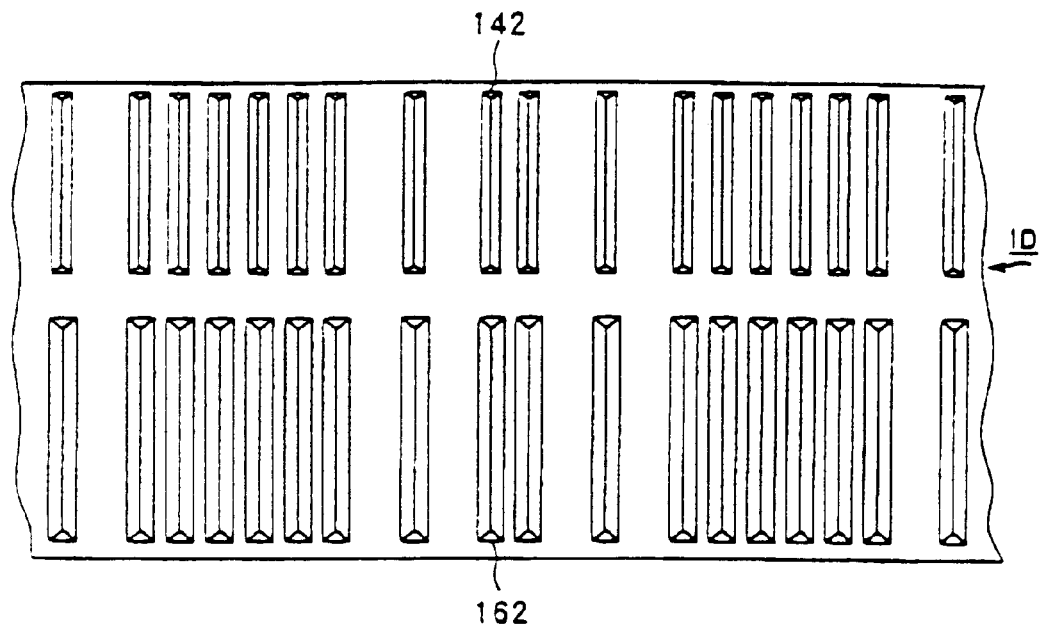

Next, the wafer 1 thus planarized is then subjected to a further thermal oxidation process to form an oxide film 1D such that the oxide film 1D covers the wafer 1 in continuation with the oxide film 2C as indicated in FIG. 61G, and a photolithographic process is conducted to form the V-shaped grooves 142 and 162 on the oxide film 1D covering the lower principal surface of the wafer 1 in the step of FIG. 61H similarly to the process described before.

Figure 61I:
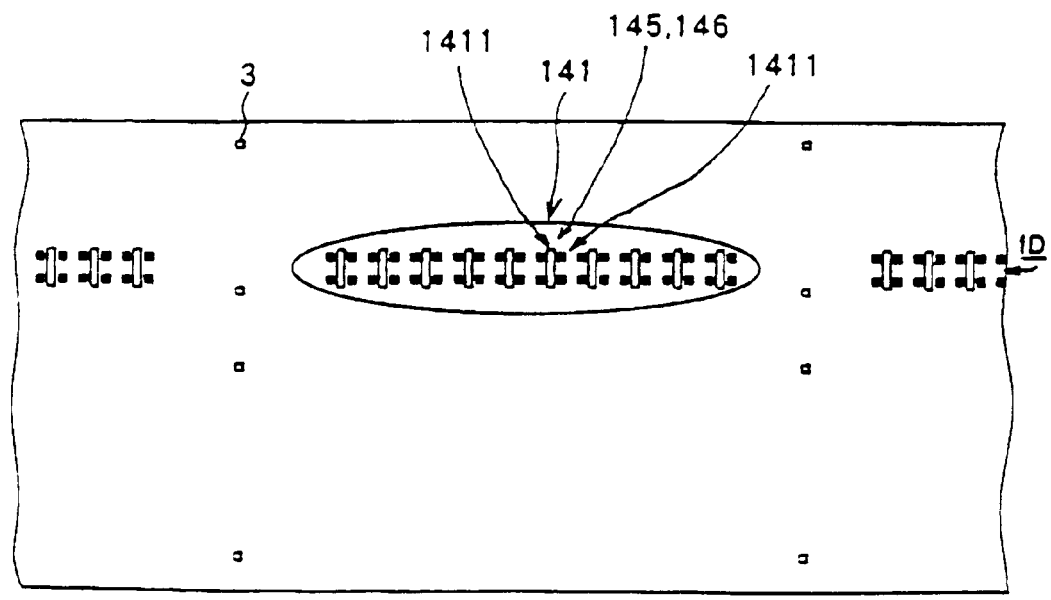

Further, in the step of FIG. 61I, the conductor patterns 145 and 146 are provided on the oxide film 1D on the upper principal surface of the wafer 1 for bonding with the laser diode.

Figure 61J:
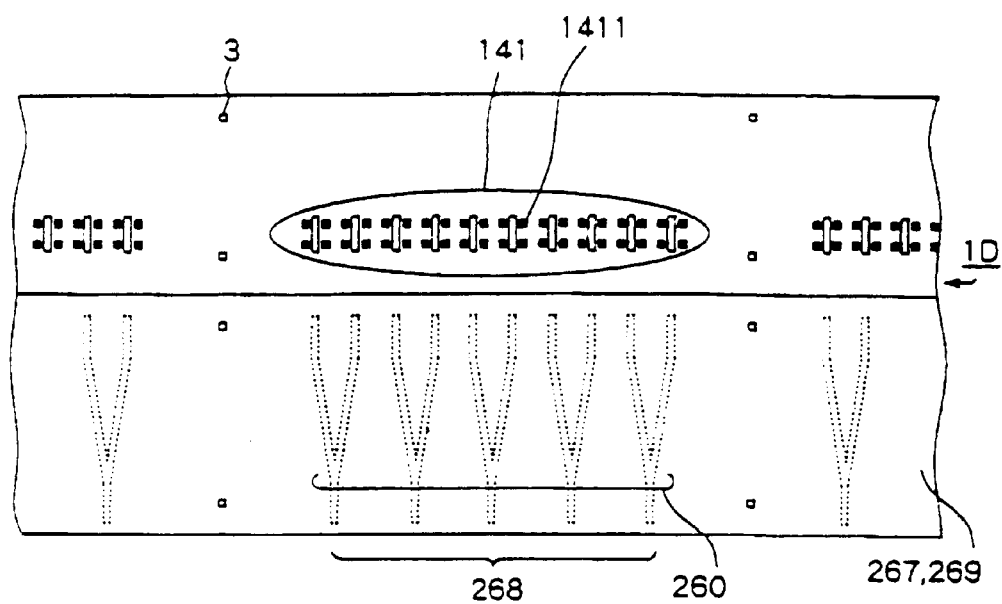

Next, in the step of FIG. 61J, resin layers forming the lower cladding layer 267 and the core layer 268 are deposited consecutively on the oxide film 1D covering the upper principal surface of the wafer 1 by a spin-coating process.

The core layer 268 is then patterned according to the pre-determined, Y-shaped pattern by a photolithographic process, and a resin layer forming the upper cladding layer 269 is deposited further on the Y-shaped core 268 pattern. The resin layers 267–269 thus formed are the removed from a region where the foregoing grooves 1411 and the conductor patterns 145 and 146 are formed by a photolithographic patterning process. Further, the oxide film 2C is removed from the foregoing region thus exposed as a result of the removal of the resin layers, and the grooves 1411 and the conductor patterns 145 and 146 are exposed in the structure of FIG. 61J. It should be noted that the edge surfaces are formed on the Y-shaped optical waveguide 260 in the structure of FIG. 61J as a result of the patterning of the resin layers 267–269.

Figure 61K:
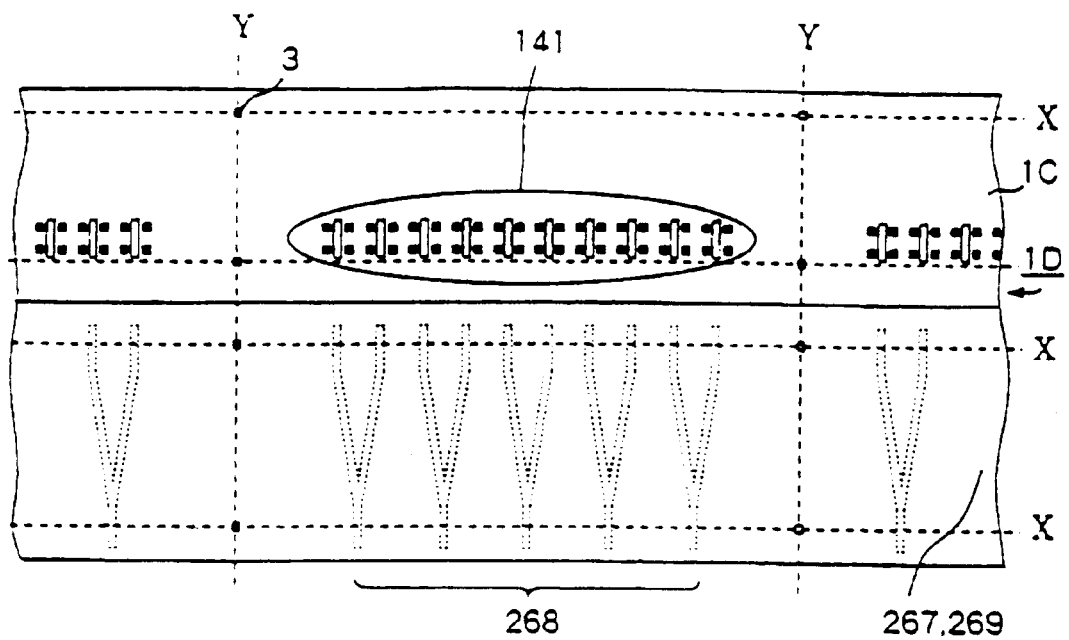
Figure 61L:
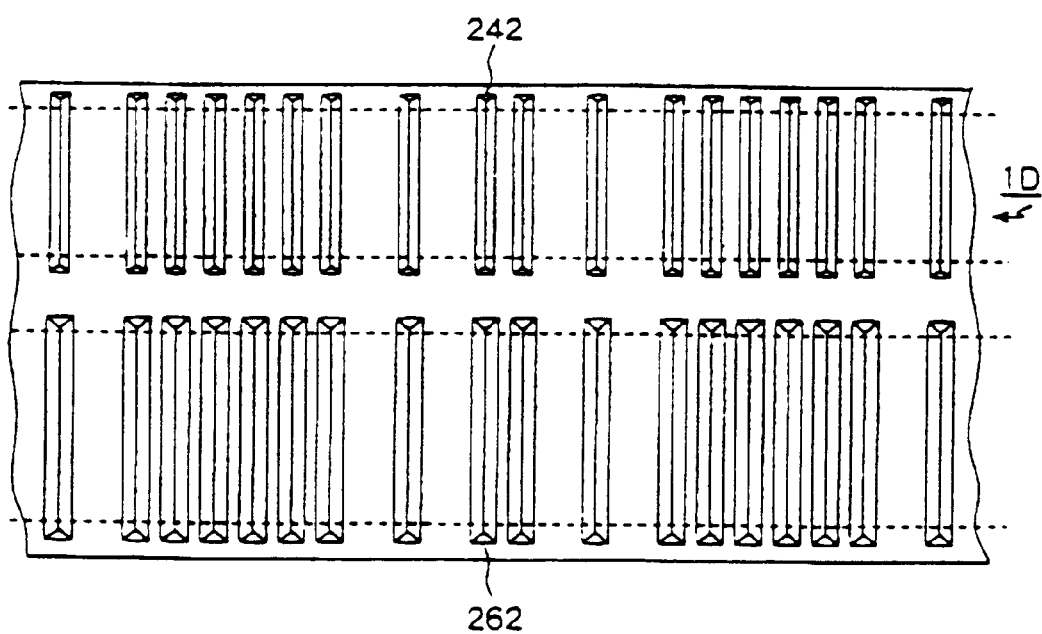

The structure of FIG. 61J thus obtained is then subjected to a dicing process indicated in FIGS. 61K and 61L respectively showing the side of the upper principal surface and the side of the lower principal surface, along the dicing lines X and Y.

FIGS. 62A–62D show an alternative process of forming the Y-shaped optical waveguide pattern with clean, flat edge surfaces.

Figure 62A:
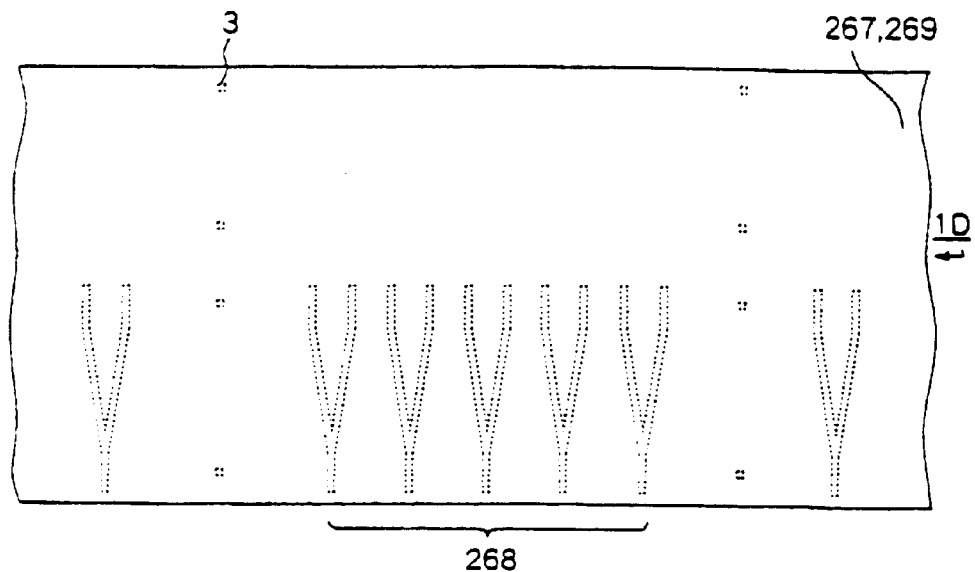
FIGS. 62A–62D are diagrams showing an alternative process of fabricating the optical coupling structure of the eighteenth embodiment.
Figure 62B:
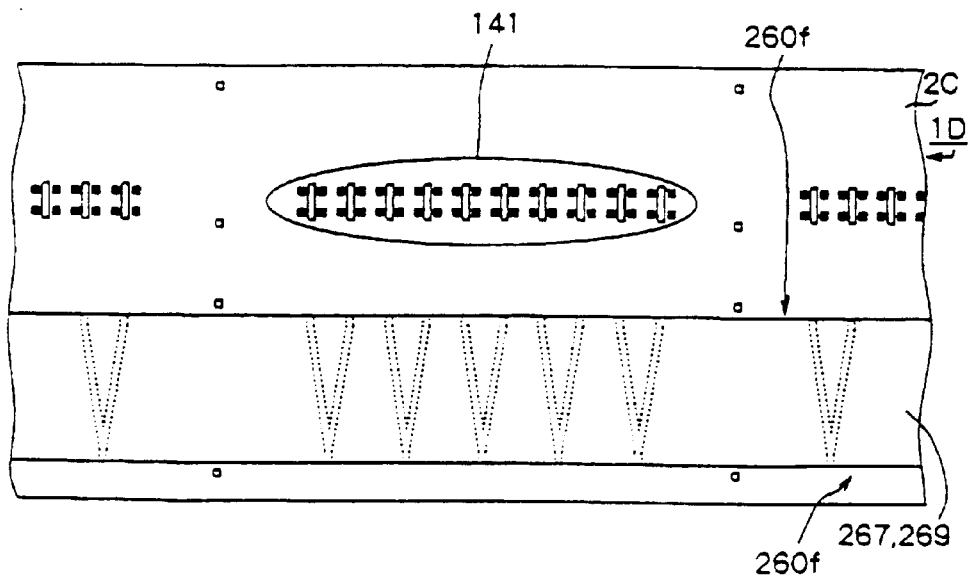

Referring to FIG. 62A showing the structure immediately after the formation of the upper cladding layer 269, the layers 267–269 are removed from the part where the bonding pad structure 141 is formed in the next step of FIG. 62B by applying a photolithographic patterning process including an oxygen plasma etching process, such that an edge surface 260f is formed at the boundary of the region where the optical waveguide 260 is formed.

Figure 62C:
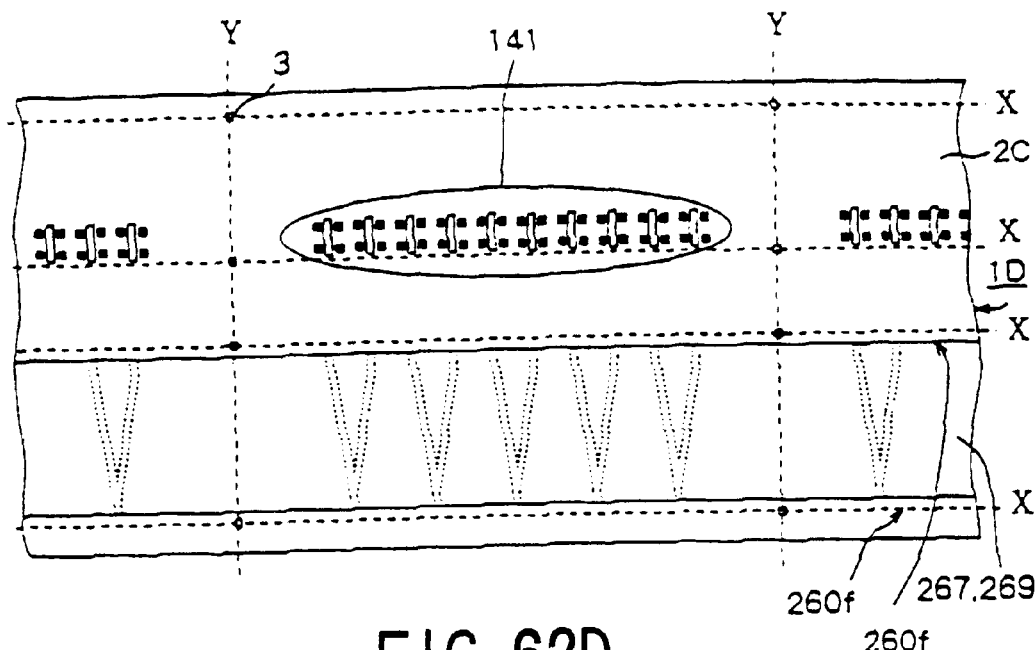
Figure 62D:
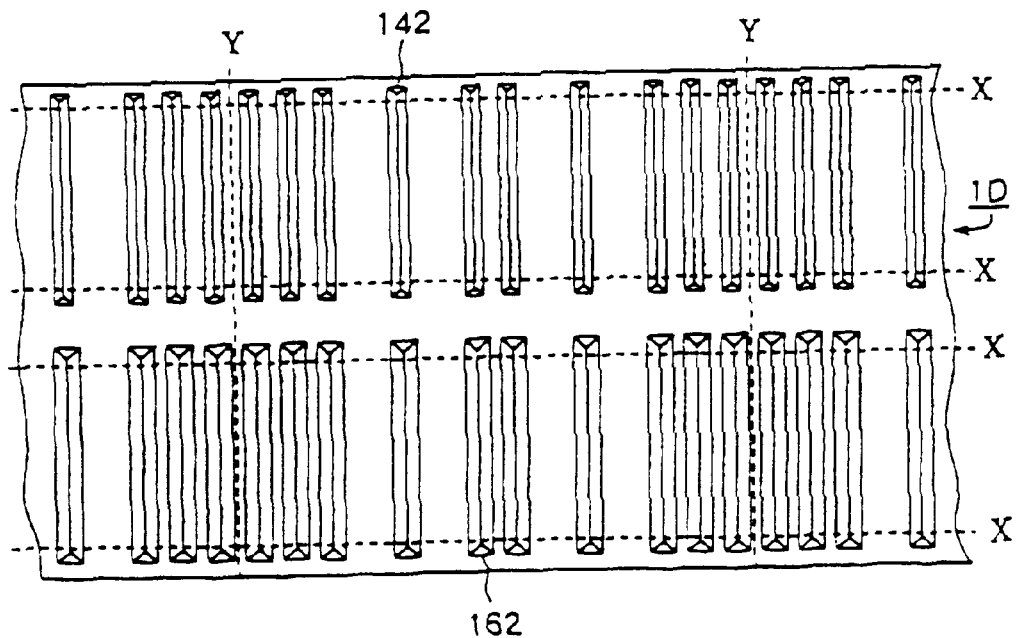

The structure thus obtained is then subjected to a dicing process in the step of FIGS. 62C and 62D into the individual sub-carriers along the dicing lines X and Y.

In the optical coupling structure thus formed, the optical waveguide 260 is defined by a sharp, flat surface by using the plasma etching process in the step of FIG. 62B.

In the present embodiment, it should be noted that the planarization process of the wafer may be carried out after the formation of the engagement groove structures 142 and 162. In this case, the planarization is carried out according to the steps of FIGS. 63A–63D.

Figure 63A:
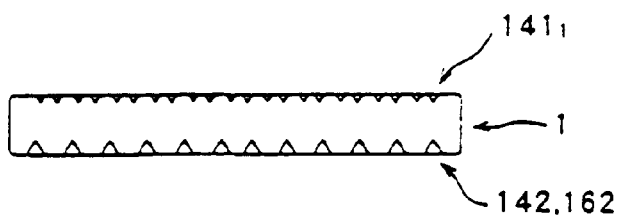
FIGS. 63A–63D are diagrams showing a modification of the fabrication process of the optical coupling structure of the eighteenth embodiment.
Figure 63B:
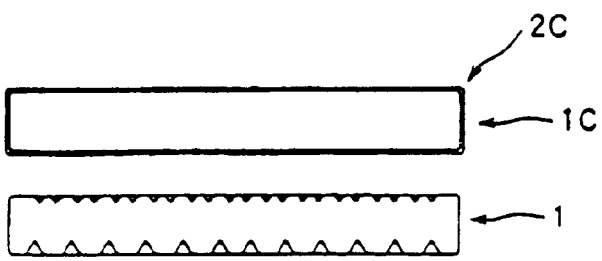
Figure 63C:
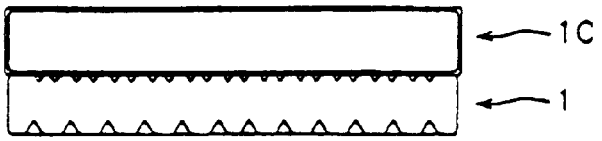
Figure 63D:
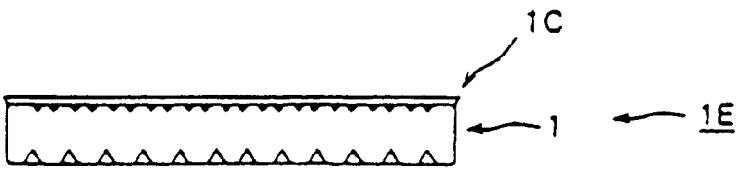

Referring to FIGS. 63A–63D, the engagement groove structures 142 and 162 are formed on the lower principal surface of the wafer 1 in the step of FIG. 63A, and the second Si wafer 1C formed with the oxide film 2C is mounted on the wafer 1 in the step of FIG. 63B. Further, the Si wafer 1C is bonded upon the Si wafer 1 in the step of FIG. 63C, and the wafer 1C is removed except for the oxide film 2C in the step of FIG. 63D. Thereafter, the process of forming the patterns 145 and 146 on the upper principal surface of the wafer 1 is carried out at a part located between the guide grooves 1411 of the laser diode, and the processes of FIGS. 61J–61L are carried out. According to this process, the precision of the pattern alignment is improved substantially due to the use of the same wafer for the source of the two sub-carriers. Further, the present embodiment enables a precise alignment of the optical axis with respect to the height by measuring the thickness of the lower cladding layer 267 and selecting an appropriate engagement groove 162 in response to the result of the measurement.

In the present embodiment as well as in the previous, seventeenth embodiment, it should be noted that the sub-carriers may be formed from separate wafers.

NINETEENTH EMBODIMENT

Figure 64A:
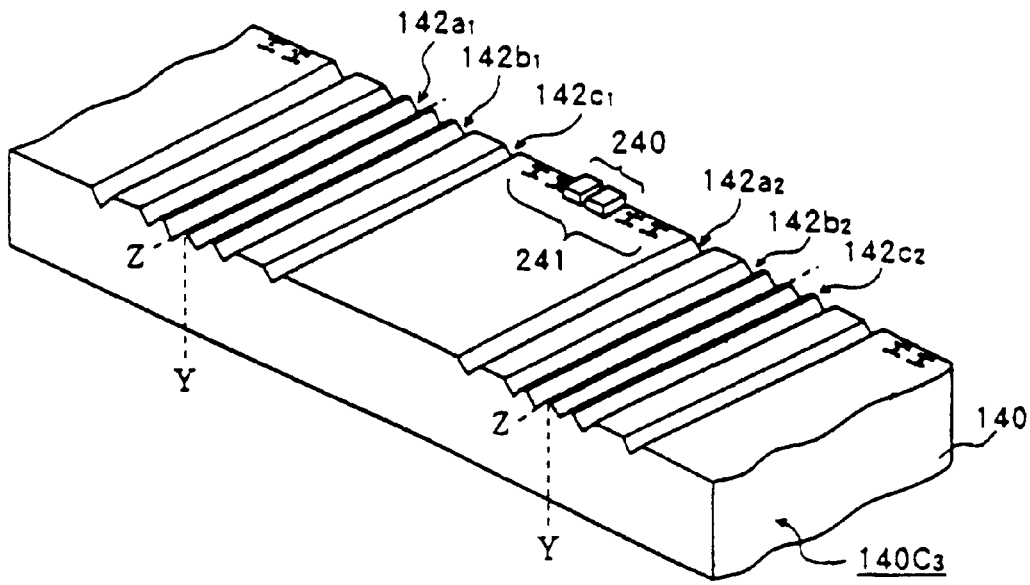
FIGS. 64A and 64B are diagrams showing a part of the optical coupling structure according to a nineteenth embodiment of the present invention.
Figure 64B:
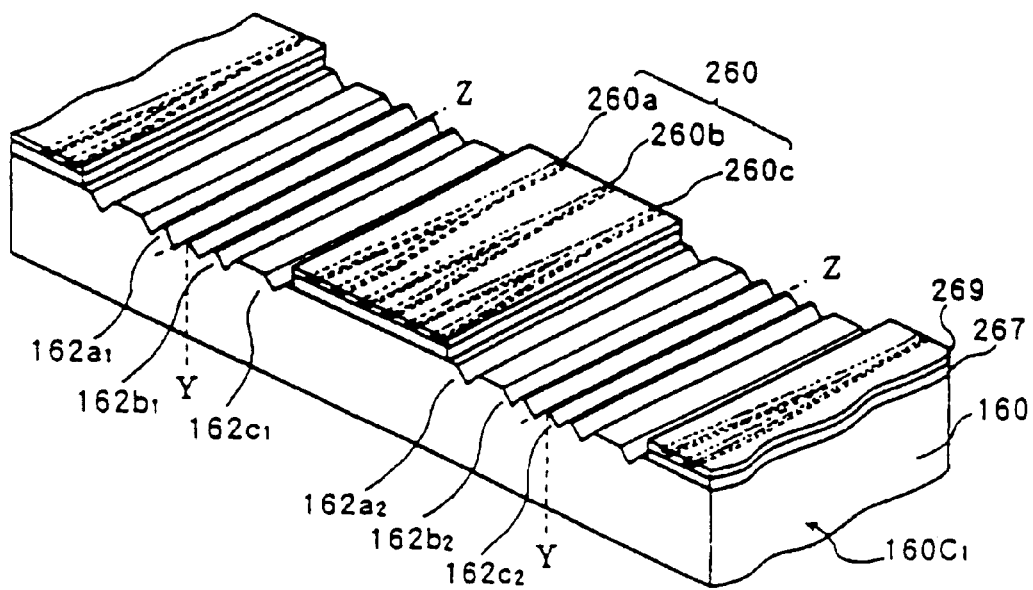

FIGS. 64A and 64B show respectively a sub-carrier 140C$_3$' and a sub-carrier 160C$_1$' used in an optical coupling structure according to a nineteenth embodiment of the present invention, wherein those parts corresponding to the parts described previously are designated by the same reference numerals and the description thereof will be omitted. Further, FIG. 65 shows the overall construction of the optical coupling structure of the present embodiment.

Referring to FIG. 64A, the sub-carrier $140C_3'$ has a construction similar to that of the sub-carrier $140C_3$ except that a laser diode and a photodiode collectively designated by the reference 240 are mounted on the same side of the sub-carrier where the engagement groove structure 142 including the grooves $142a_1$, $142b_1$, $142c_1$, ... are formed. In correspondence to this, the sub-carrier $140C_3'$ carries, on the side where the laser diode/photodiode pair 240 is formed, a thermal oxide film corresponding to the oxide film 2 although not illustrated, with a thickness of 1 μm, and the bonding pad structure 241 is formed on such an oxide film.

FIG. 64B, on the other hand, shows that the sub-carrier $160C_1'$ has a construction similar to that of the sub-carrier $160C_1$ except that the optical waveguide 260 is provided on the same side of the sub-carrier where the engagement groove structure 162 including the grooves $162a_1$, $162b_1$, ... are formed. It should be noted that the optical waveguide 260 includes three Y-shaped optical waveguide patterns 260a, 260b and 260c.

Figure 65:
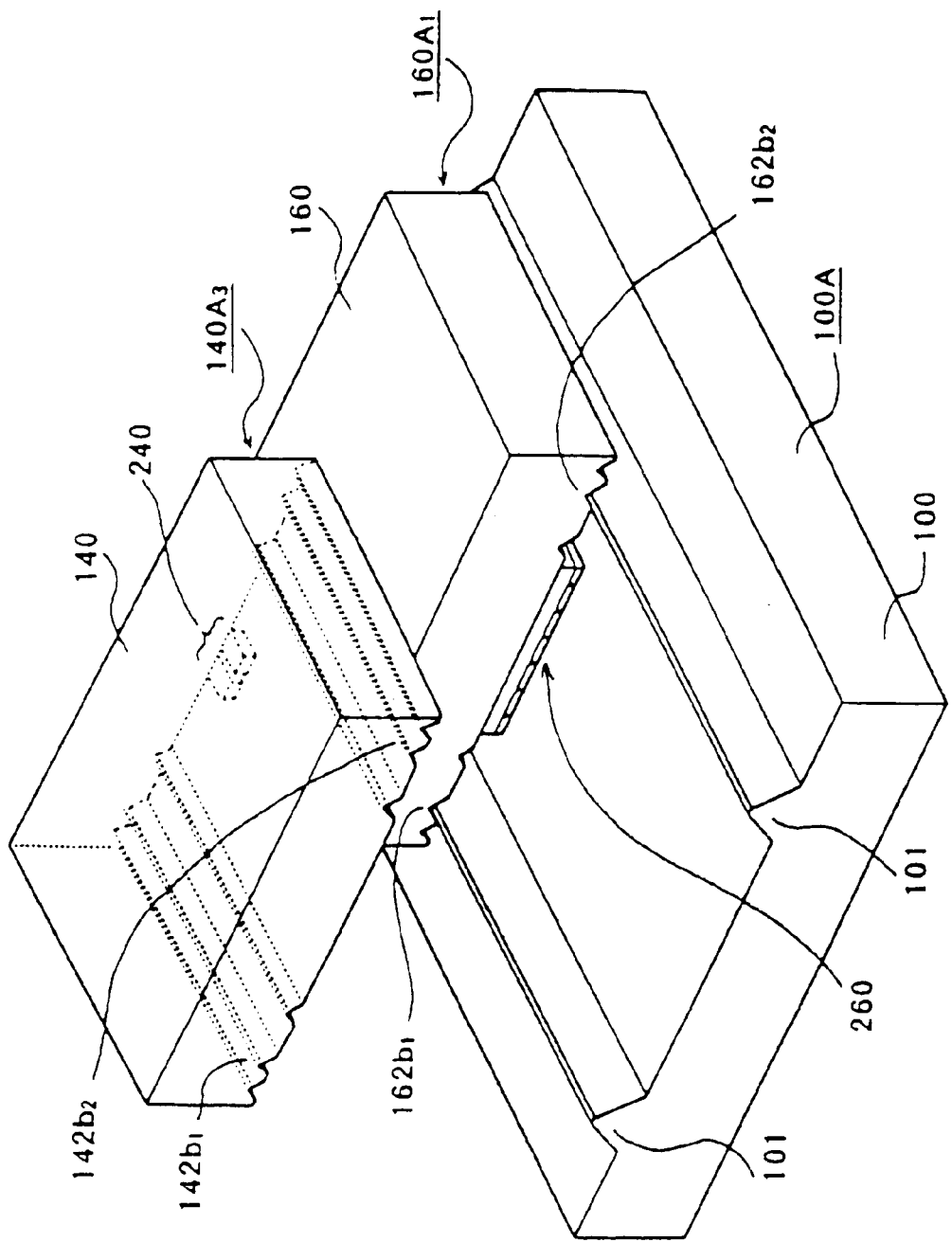
FIG. 65 is a diagram showing the construction of the optical coupling structure according to the nineteenth embodiment.

FIG. 65 shows the optical coupling structure of the present embodiment in an assembled state.

Referring to FIG. 65, it should be noted that the sub-carrier $140A_3$ is formed by dicing the sub-carrier $140C_3'$ along the dicing lines Z of FIG. 64A and carries the laser diode/photodiode pair 240 on the lower principal surface in the state that the sub-carrier $140A_3$ is mounted on the common substrate 100A by engaging the engagement structure 142 with the ridges 101 of the common substrate 100A. Thereby, the laser diode/photodiode pair 240 aligns with one of the Y-shaped optical waveguides 260 similarly formed on the lower principal surface of the sub-carrier $160A_1$ that is formed by dicing the sub-carrier $160C_1'$ along the dicing lines Z. The sub-carrier $160C_1'$ is mounted in the state that the engagement groove structure 162 engages with the ridges 101 of the common substrate 100A.

In the state of FIG. 65, it should be noted that the height of the optical axes of the laser diode and the photodiode as measured from the surface of the sub-carrier $140A_3$ is 6.52 μm, including the thickness of the oxide film On the other hand, the height of the core layer 268 as measured from the surface of the sub-carrier $160A_1$ is 33 μm by assuming the thickness of the lower cladding layer 267 to 30 μm and the thickness of the core layer 268 to 6 μm. In this case, the laser diode and the photodiode can be aligned with the core layer 268 optically by forming the engagement grooves of the engagement groove structure 142 to have the widths of 125.3 μm, 1281 μm and 131 μm and by forming the engagement grooves of the engagement groove structure 162 to have the widths of 87.9 μm, 907 μm and 93.5 μm. In the illustrated example, the ridges 101 on the common substrate 100A has a with of 20 μm at the top part and a height of 200 μm.

As noted above, the sub-carriers $140A_3$ and the sub-carriers $160A_1$ are formed by dicing the sub-carriers $140C_3'$ and the sub-carriers $160C_1'$ along the dicing lines Z at the location Y. The sub-carriers $140A_3$ and the sub-carriers $160A_1$ are then mounted on the common substrate 100A in a face-down state. Thereby, the location of the dicing may be shifted in the left direction by one pitch when the measured thickness of the lower cladding layer 267 is larger than a predetermined thickness. By doing so, it is possible to reduce the error in the height of the optical axis to within ±1 μm when the error in the thickness of the lower cladding layer 267 is within ±3 μm.

It should be noted that the construction of the optical coupling structure of FIG. 65 in which the sub-carriers carrying the optical components are mounted in the face-down state the problem of the optical alignment error of the optical components due to the variation in the thickness of the sub-carriers is successfully eliminated. Furthers the relative position of the engagement grooves forming the engagement groove structures 142 or 162 with respect to the optical components such as the laser diode 240 or the optical waveguide 260 on the sub-carriers is determined with an improved precision due to the fact that the engagement grooves are formed on the same side on which the optical components are provided.

FIGS. 66A–66H show the fabrication process of the sub-carrier $160C_1$ of the present embodiment.

Figure 66A:
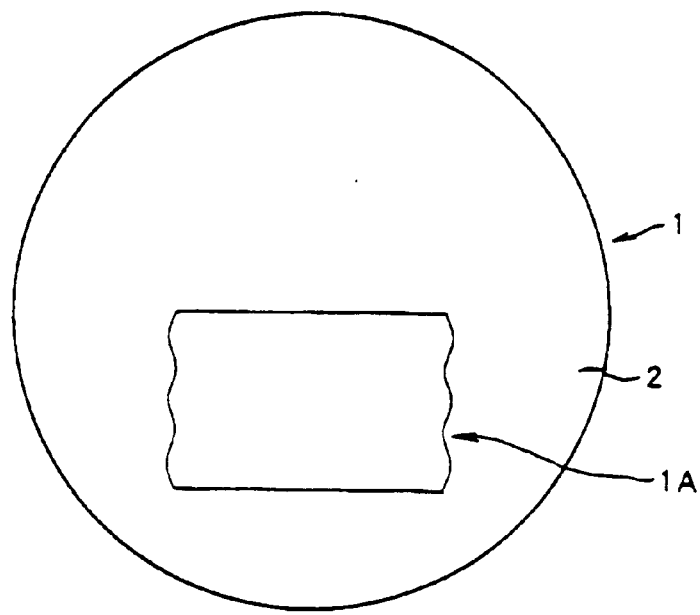
FIGS. 66A–66H are diagrams showing a fabrication process of the optical coupling structure according to the nineteenth embodiment.
Figure 66B:
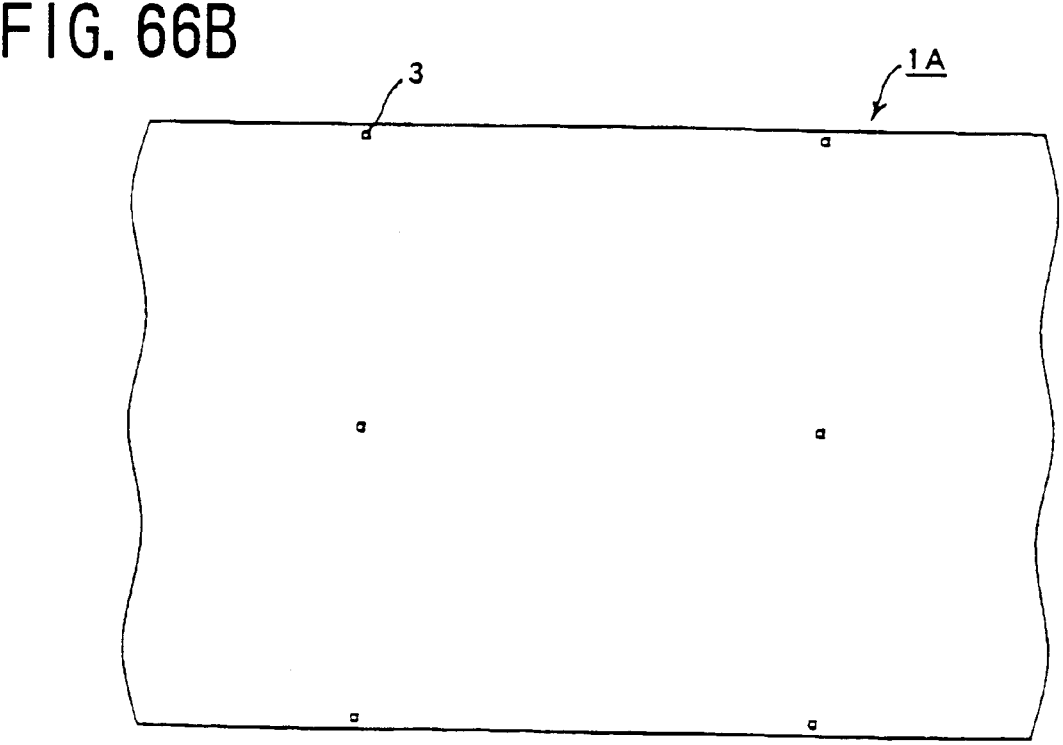
Figure 66C:
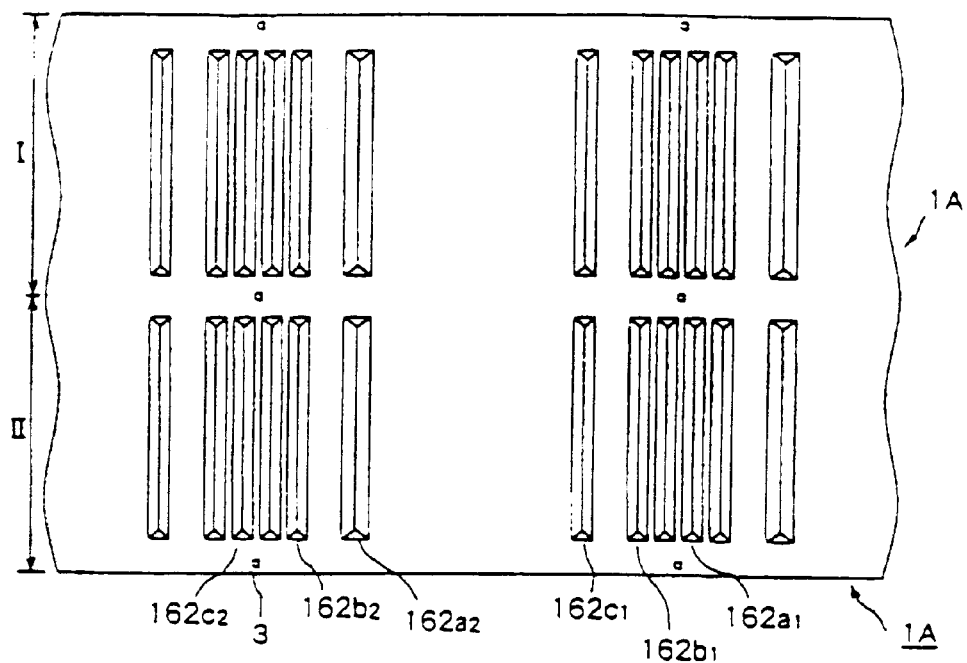

Referring to FIG. 66A, a Si wafer having a (100)-oriented principal surface designated by the reference numeral 1 is subjected to a thermal annealing process to form the oxide film 2 on the upper and lower principal surfaces thereof Next, in the step of FIG. 66B, the alignment marks 3 are formed on the oxide film 2 covering the upper principal surface of the Si wafer 1 similarly to the previous embodiments, and the engagement grooves forming the engagement groove structure 162 are formed on the oxide film 2 covering the lower principal surface of the wafer 1 in the step of FIG. 66C by applying a wet etching process in a KOH aqueous solution similarly as before.

Figure 66D:
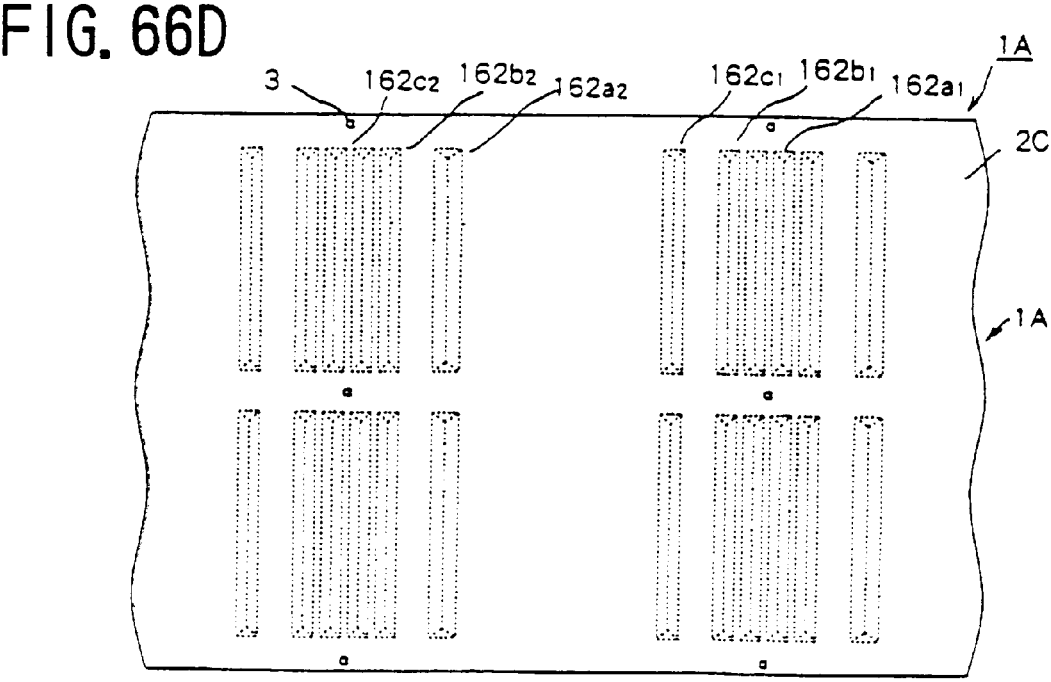

After the formation of the engagement grooves, an oxide film formed on another Si wafer is bonded on the Si oxide film on which the foregoing engagement grooves are formed, similarly to the process of FIGS. 66C–66G, wherein the oxide film thus bonded is designated by the numeral 2C in FIG. 66D. Further, resin layers are deposited on the oxide film 2C providing a planarized surface in correspondence to the lower cladding layer 267 and the core layer 268.

Figure 66E:
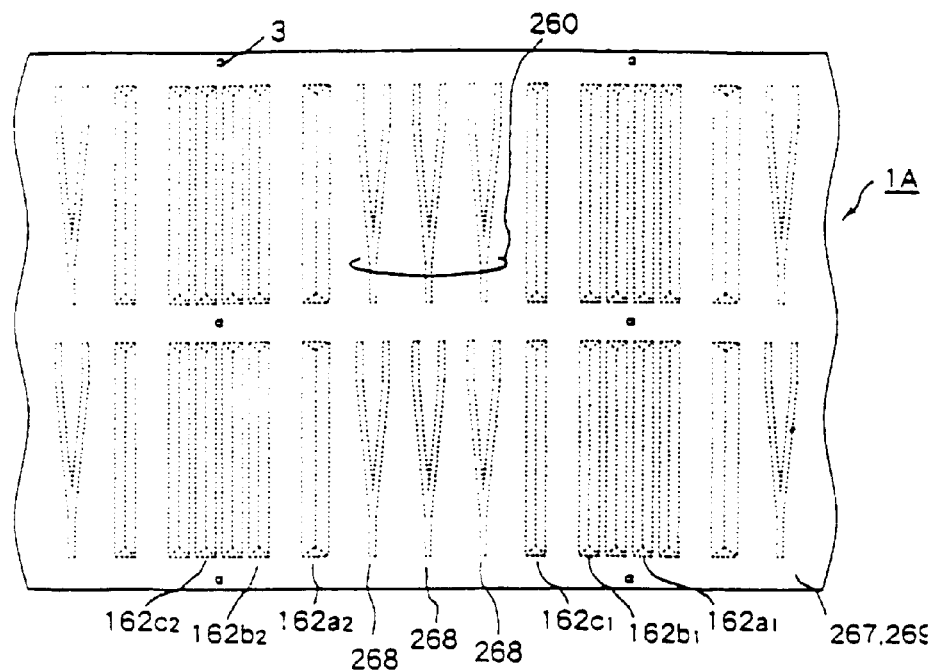

Next, in the step of FIG. 66E, the core layer 268 is patterned by a photolithographic patterning process that uses an oxygen plasma to form the desired Y-shaped core pattern, and a further resin layer corresponding to the upper cladding layer 269 is deposited so as to cover the Y-shaped core pattern 268.

Figure 66F:
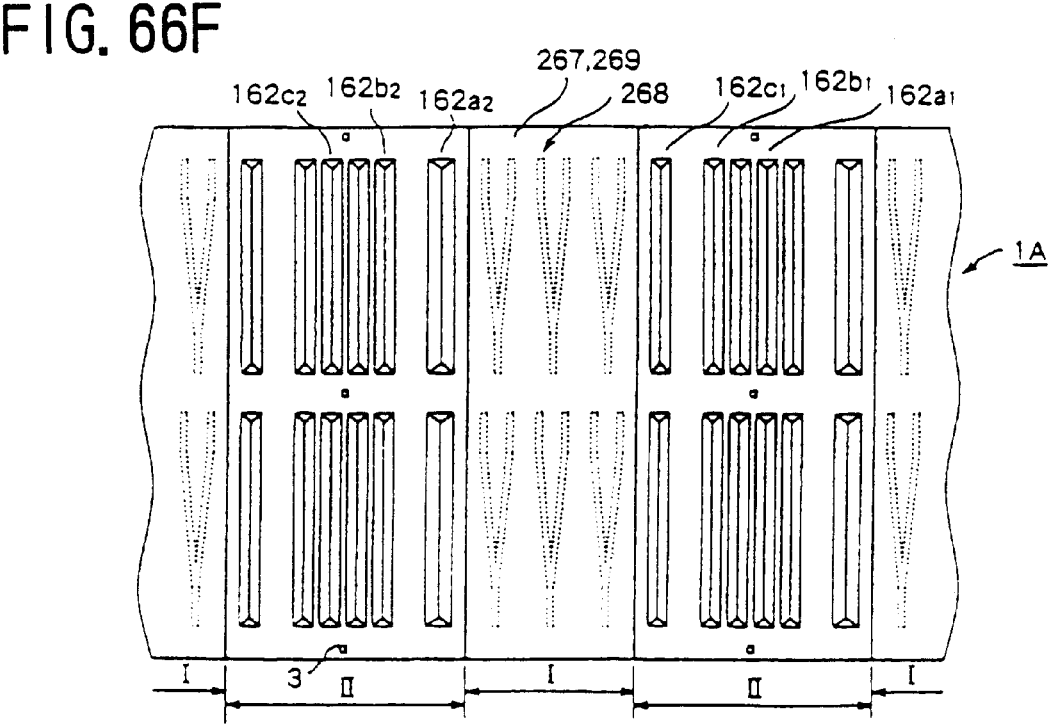

Next, in the step of FIG. 66F, the layers 267–269 as well as the oxide film 2C are removed from the part where the engagement grooves of the engagement groove structure 162 are formed. As a result, the engagement grooves $162a_1$–$162c_1$ and $162a_2$–$162c_2$ are exposed as indicated in FIG. 66F by a continuous line.

Figure 66G:
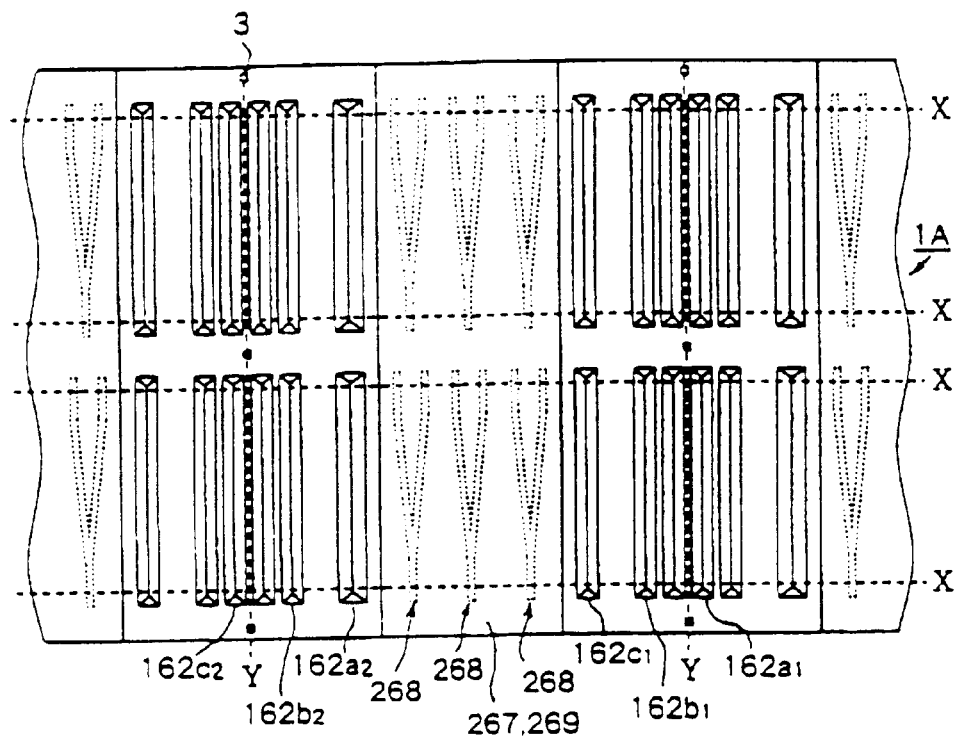
Figure 66H:
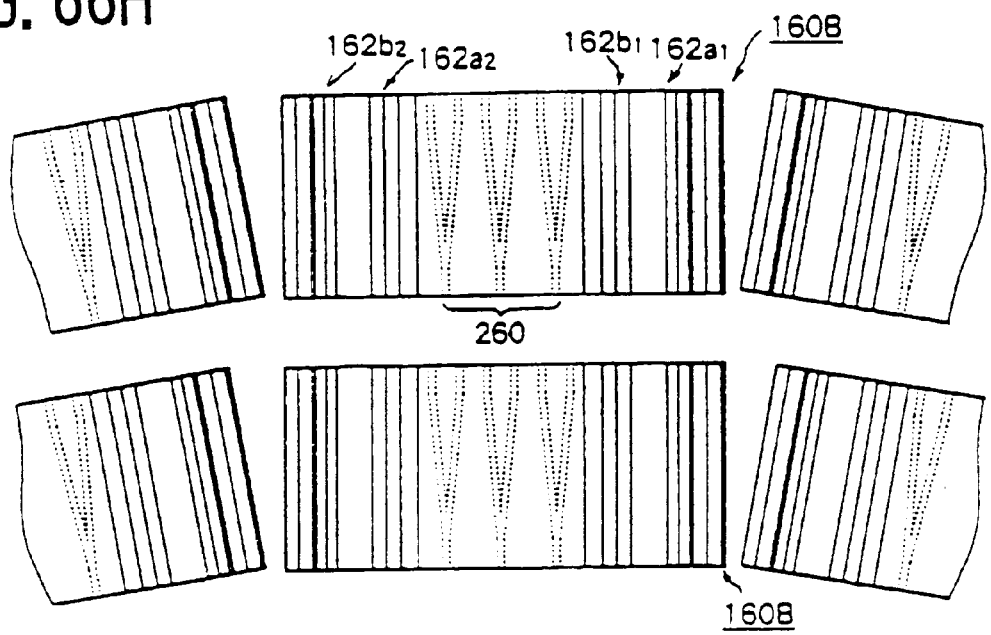

Thereby, the desired sub-carriers are obtained by dicing the structure of FIG. 66F in the step of FIG. 66G along the dicing lines X and Y.

Further, the foregoing process of the present embodiment can be easily modified to form the sub-carriers for the laser diode or photodiode simultaneously, by forming a bonding pad structure corresponding to the bonding pad structure 141 in one of the regions I and II shown in FIG. 66C in place of the optical waveguide 260. In this case, the bonding pad structure 141 may be formed on the region I by a photolithographic patterning process before depositing the lower cladding layer 267 and the core layer 268 in the step of FIG. 66E.

It should be noted that the present embodiment is applicable not only to the coupling structure for coupling a Y-shaped optical waveguide to a laser diode or a photodiode as noted above, but is also applicable to a coupling structure coupling various other optical components such as an optical fiber.

TWENTIETH EMBODIMENT

Figure 67:
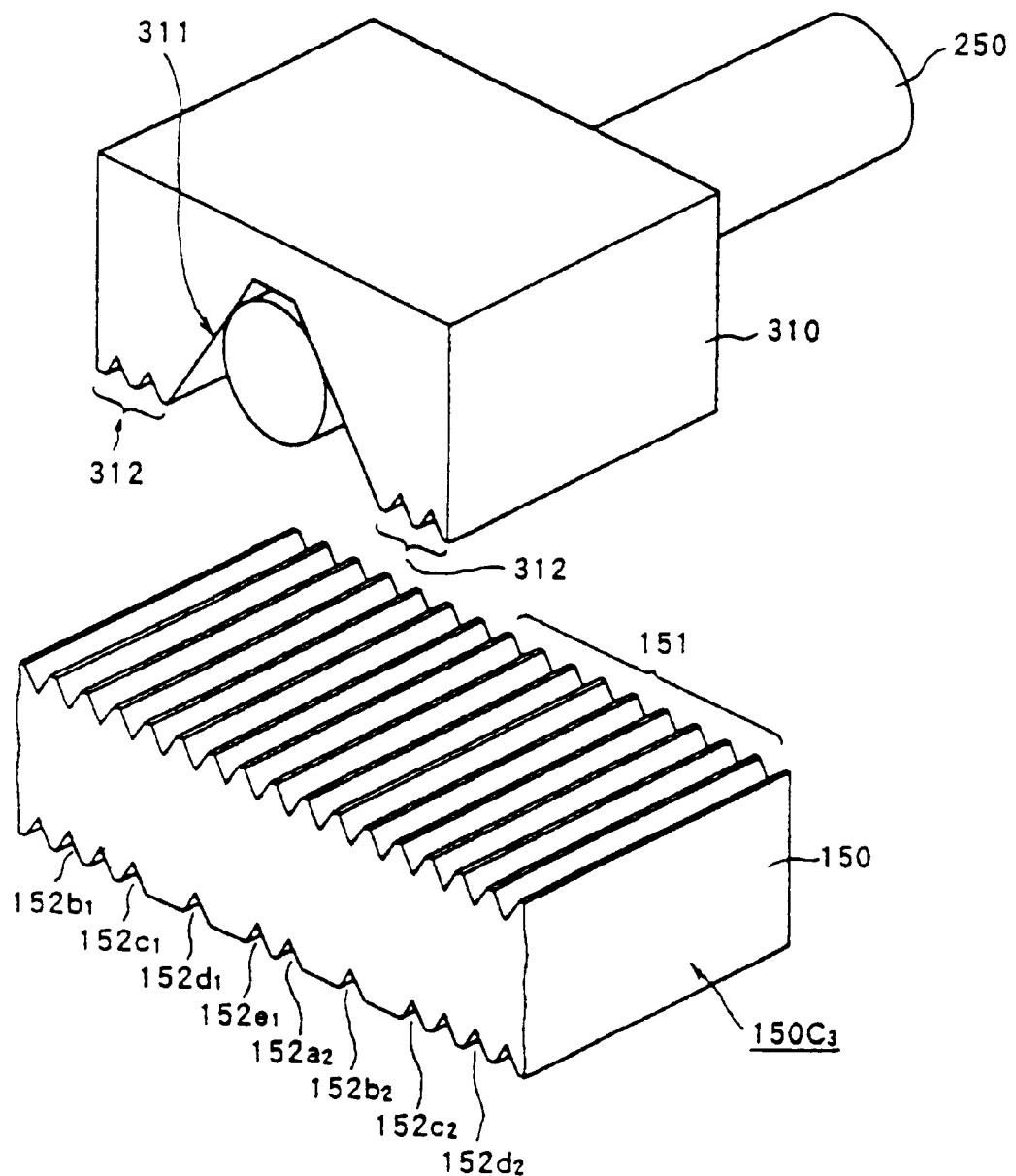
FIG. 67 is a diagram showing the construction of an optical coupling structure according to a twentieth embodiment of the present invention.
Figure 68:
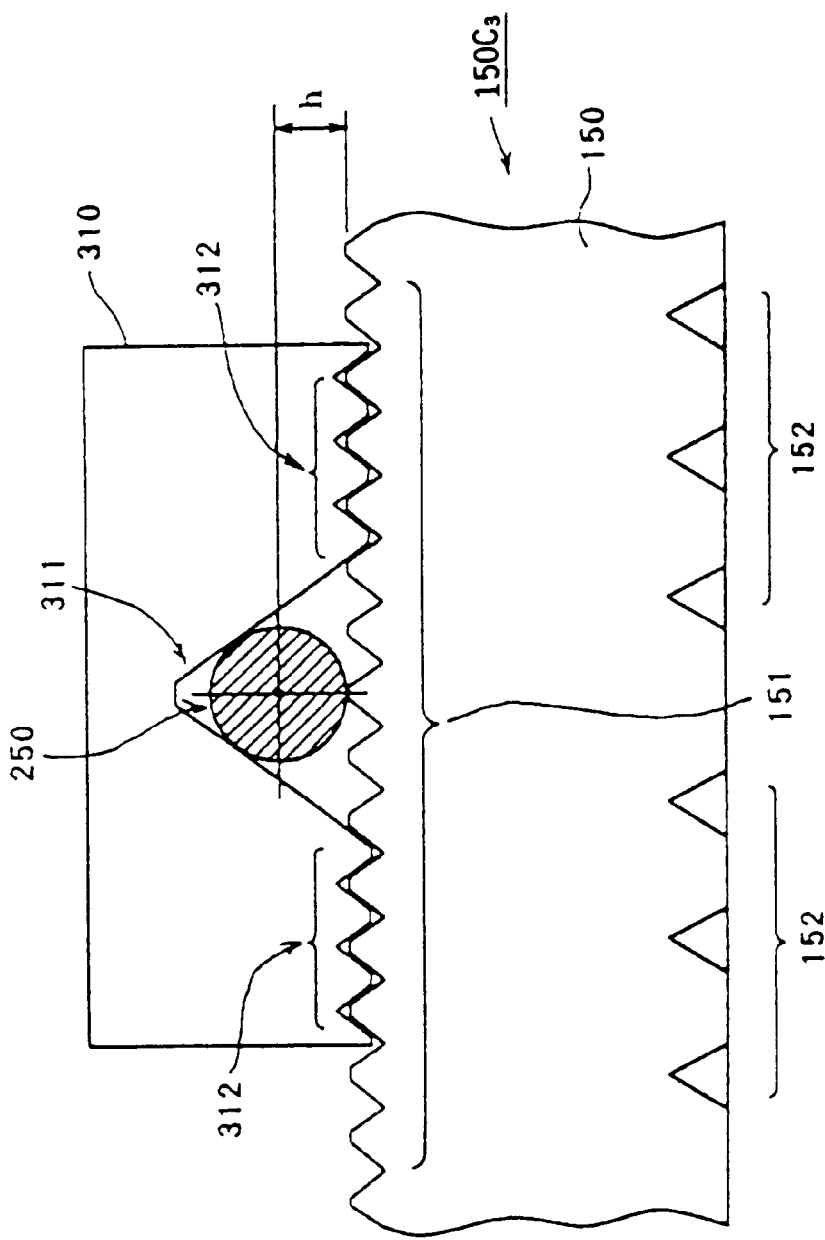
FIG. 68 is a diagram showing a part of the optical coupling structure of the twentieth embodiment in detail.

FIGS. 67 and 68 show the construction of an optical coupling structure according to a twentieth embodiment of the present invention respectively in an oblique view and a front view, wherein those parts corresponding to the parts described previously are designated by the same reference numerals and the description thereof will be omitted.

Referring to FIGS. 67 and 68, the present embodiment relates to the mounting of an optical fiber such as the optical fiber 250 on a sub-carrier $150C_3$ that carries thereon a periodic grating structure 151. Thereby, the optical fiber 250 is mounted by engaging a mounting member 310 such that the mounting member 310 holds an end part of the optical fiber 250 in a V-shaped groove 311 formed therein in a state that the optical fiber 250 is urged against the grated surface of the sub-carrier $150C_3$. In order to cause the mounting member 310 to engage stably with the sub-carrier $150C_3$, the mounting member 310 is also provided with a corresponding periodic grating 312 at the part where the engagement occurs with the sub-carreir $150C_3$.

In the present embodiment, it should be noted that the V-shaped groove 311 has a width of 248.5 $\mu$m at the bottom of the mounting member 310, and the gratings 151 and 312 are formed with a pitch of 50.7 $\mu$m. Further, the grooves forming the grating 312 are formed with a width of 45.7 $\mu$m at the bottom of the mounting member 310, and the grooves 151 on the sub-carrier $150C_3$ are formed to have a width of 12.1 $\mu$m at the top surface thereof and a depth of about 8.6 $\mu$m. Thereby, the grooves 312 on the mounting member 310 engage with the corresponding grooves 151 on the sub-carrier $150C_3$ with a depth of 5 $\mu$m.

According to the present embodiment, the depth of the grooves 151 on the sub-carrier $150C_3$ can be reduced, and the difficulty of carrying out a photolithographic process on the top surface of the sub-carrier $150C_3$ is substantially reduced. Thus, it is possible to form the sub-carrier $150C_3$ and the sub-carrier 140A simultaneously from a common wafer as will be explained below with reference to FIGS. 69A–69I.

Figure 69A:
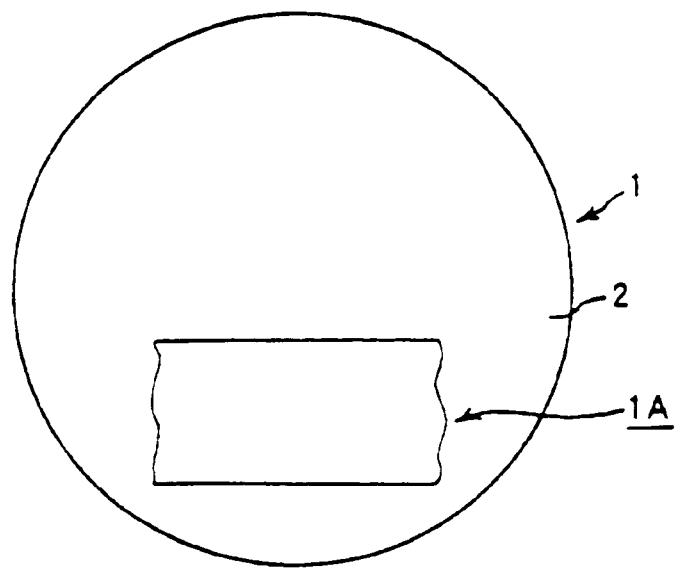
FIGS. 69A–69I are diagrams showing a fabrication process of the optical coupling structure of the twentieth embodiment.

Referring to FIG. 69A, a Si substrate designated by the numeral 1 having (100)-oriented upper and lower principal surfaces is subjected to a thermal oxidation process to form an oxide film 2 on the upper and lower principal surfaces.

Figure 69B:
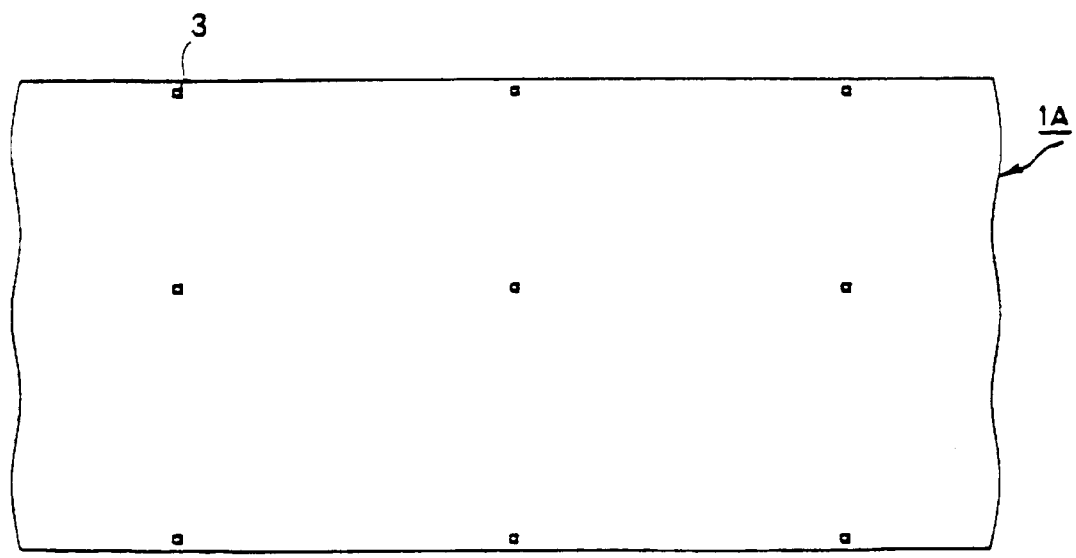

Next, in the step of FIG. 69B, the alignment marks 3 are formed on the oxide film 2 covering the upper principal surface of the wafer 1. Similarly as before, FIG. 69B shows a part of the wafer 1 designated in FIG. 69A by the numeral 1A.

Figure 69C:
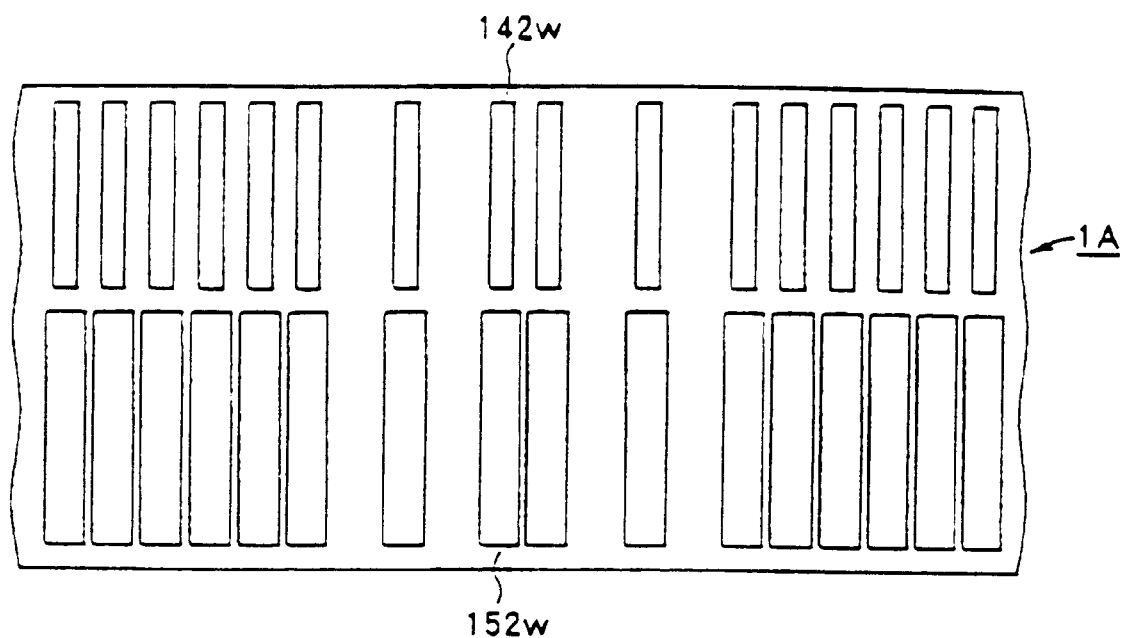
Figure 69D:
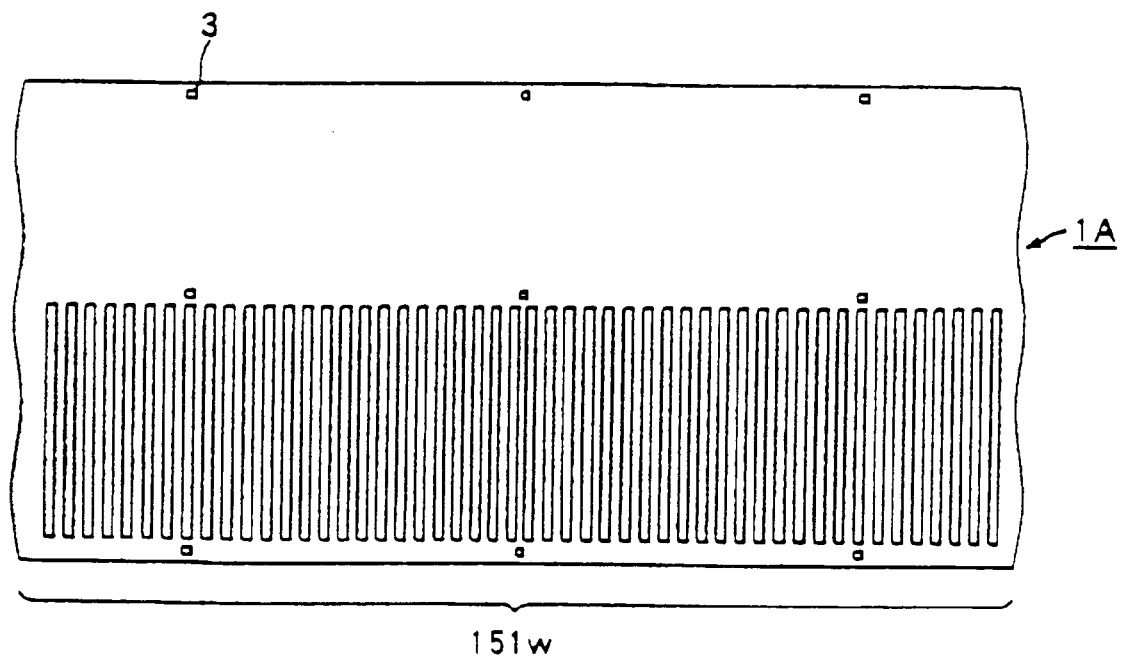

Next, in the step of FIG. 69C, the mask openings 142w and 152w are formed on the oxide film 2 covering the lower principal surface of the wafer 1 similarly as before, and the step of FIG. 69D is conducted further such that mask windows 151w are formed on the oxide film 2 covering the upper principal surface of the wafer 1. It should be noted that the order of processes of FIGS. 69C and 69D may be reversed. Further, the processes of FIGS. 69C and 69D may be carried out simultaneously.

Figure 69E:
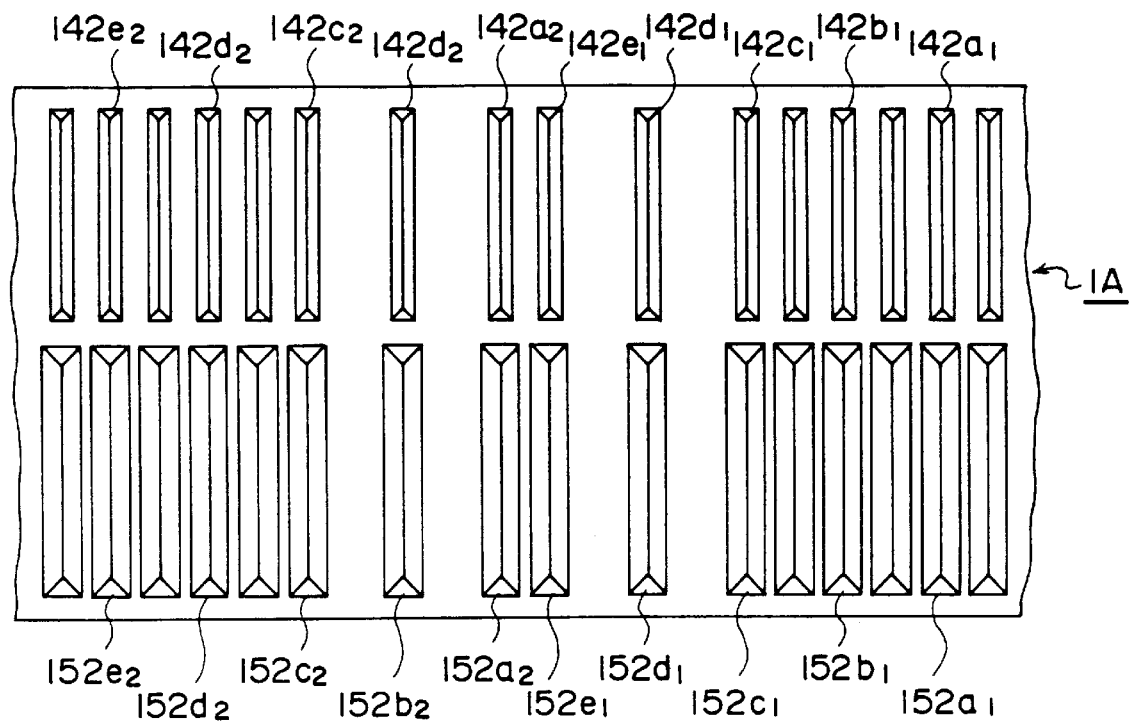
Figure 69F:
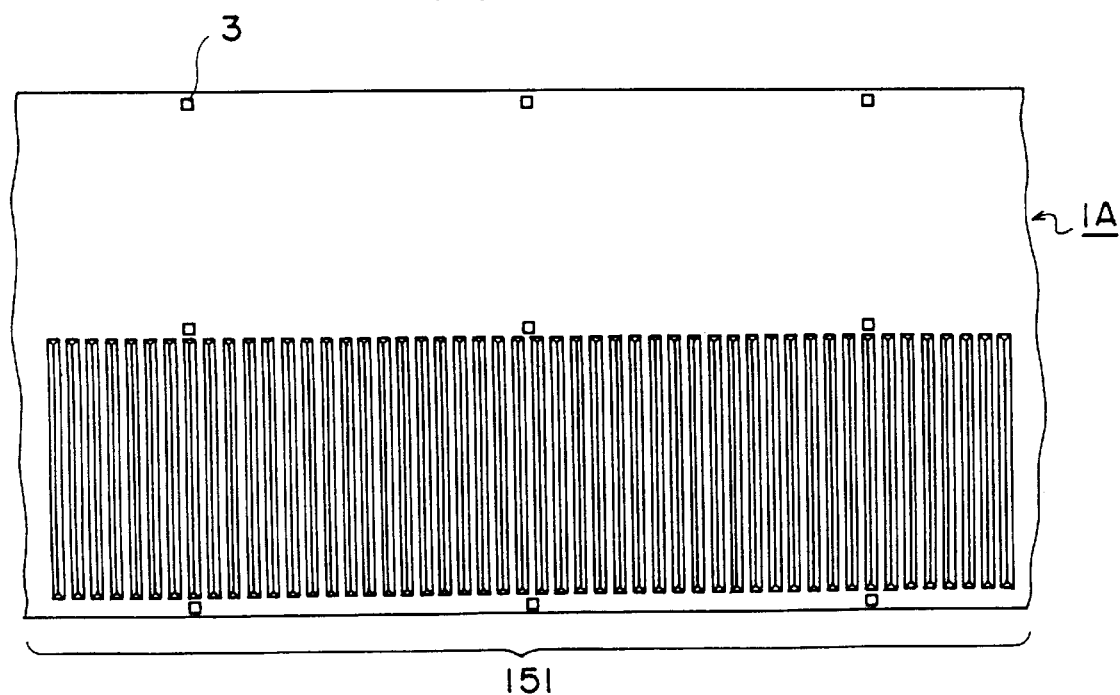

Next, in the steps of FIGS. 69E and 69F, the wafer thus processed is subjected to a wet etching process in a KOH aqueous solution such that the grooves $142a_1$–142e, and $142a_2$–142$e_2$ are formed in correspondence to the mask windows 142w and the grooves $152a_1$–$152e_1$ and $152a_2$–$152e_2$ are formed in correspondence to the mask windows 152w as indicated in FIG. 69E and such that the grooves 151 are formed in correspondence to the mask windows 151w as indicated in FIG. 69F.

Figure 69G:
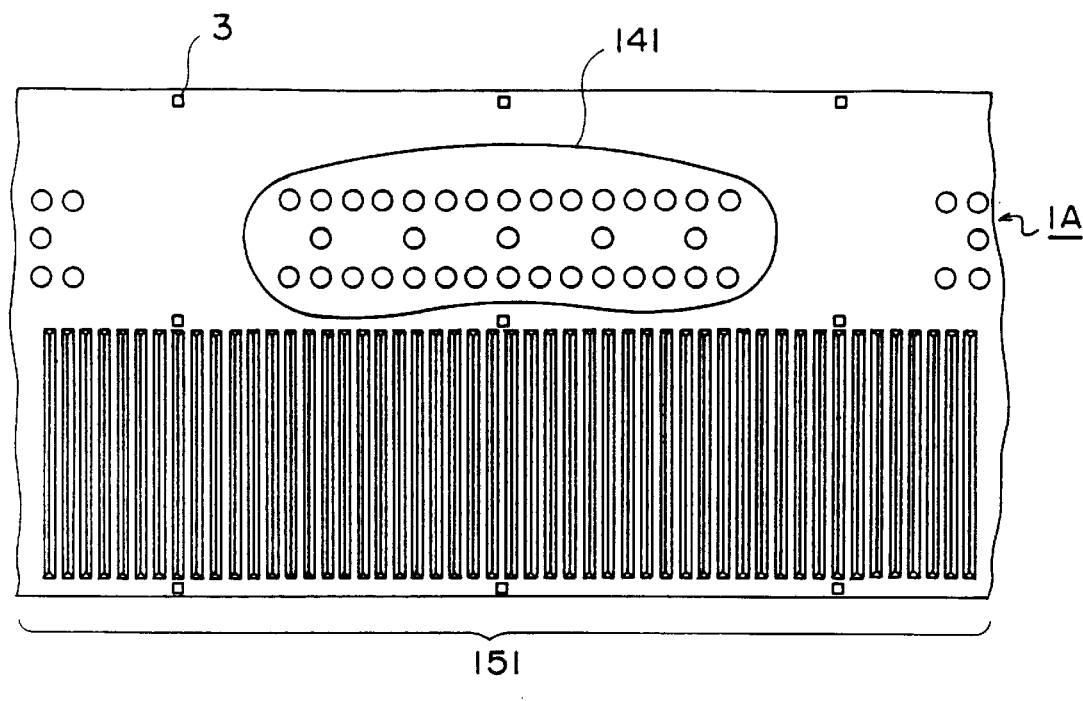
Figure 69H:
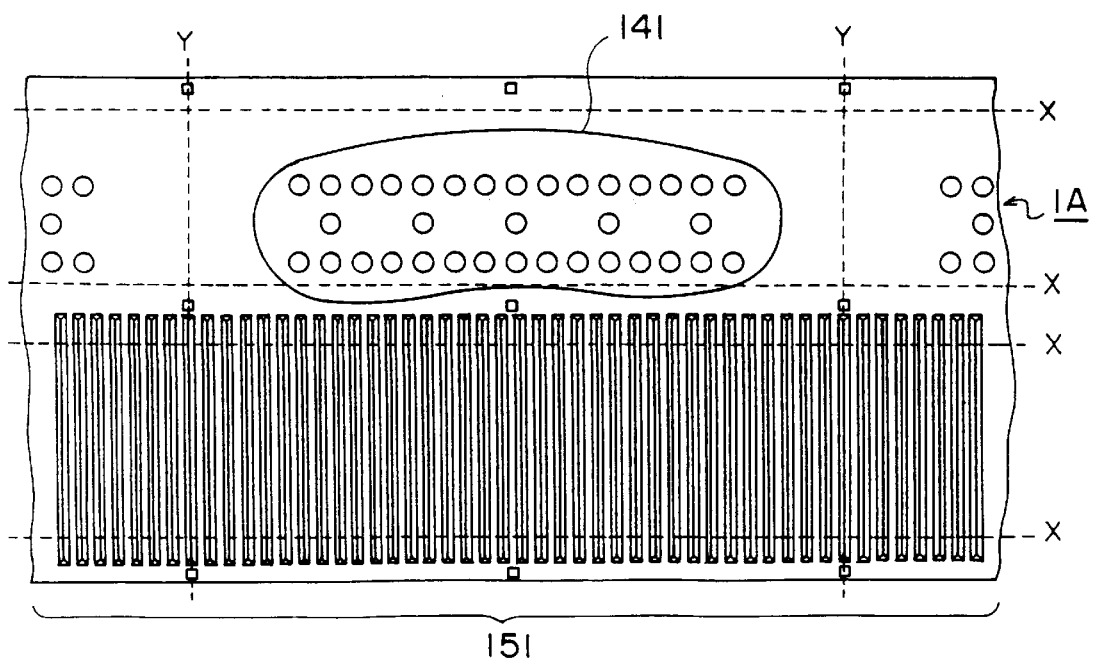
Figure 69:
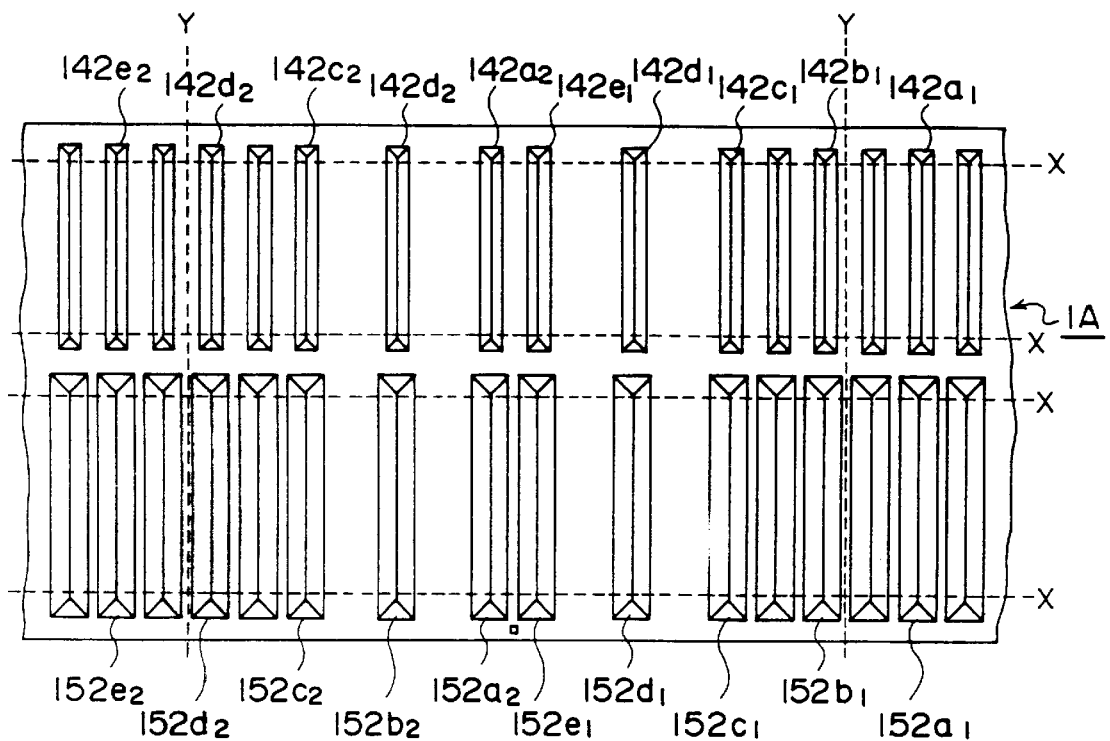

Further, the bonding pad structure 141 is formed on the oxide film 2 covering the upper principal surface of the wafer 1 in the step of FIG. 69G, and the wafer 1 thus processed is subjected to a dicing process along the lines X and Y indicated in FIGS. 69H and 69I.

As the depth of the grooves 151 is small as noted previously, there is no difficulty in carrying out a photolithographic process in the step of FIG. 69G for forming the bonding pad structure 141.

FIGS. 70A–70F show the case when three sub-carriers, the sub-carrier 140A of FIG. 26A, the sub-carrier 160C of FIG. 53 and the sub-carrier $150C_3$ of FIG. 67 are formed simultaneously from a common wafer, the wafer 1.

Figure 70A:
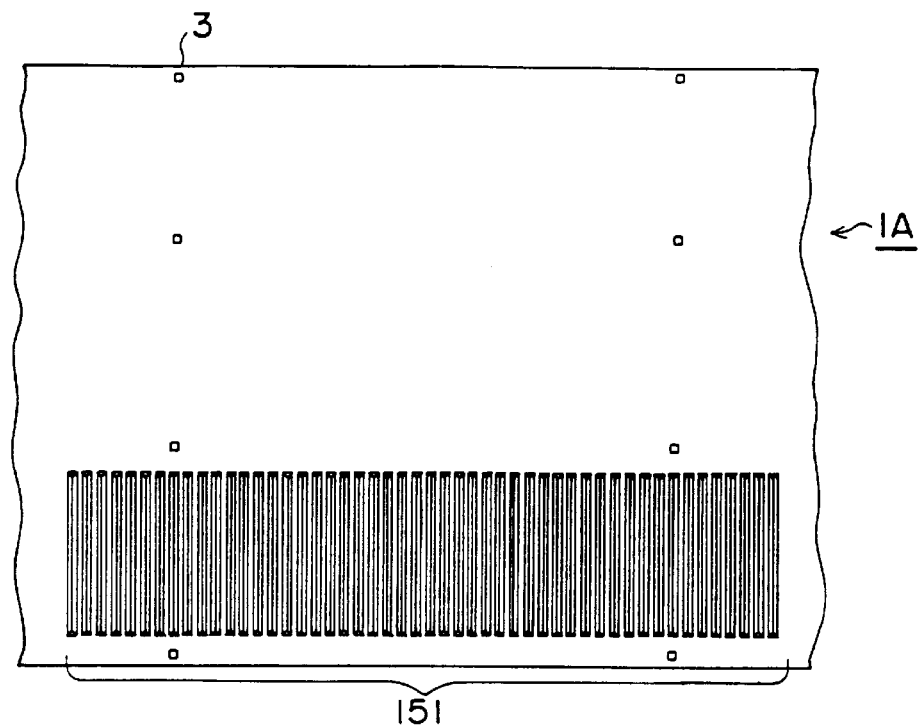
FIGS. 70A–70F are diagrams showing an alternative process of fabricating the optical coupling structure of the twentieth embodiment.
Figure 70B:
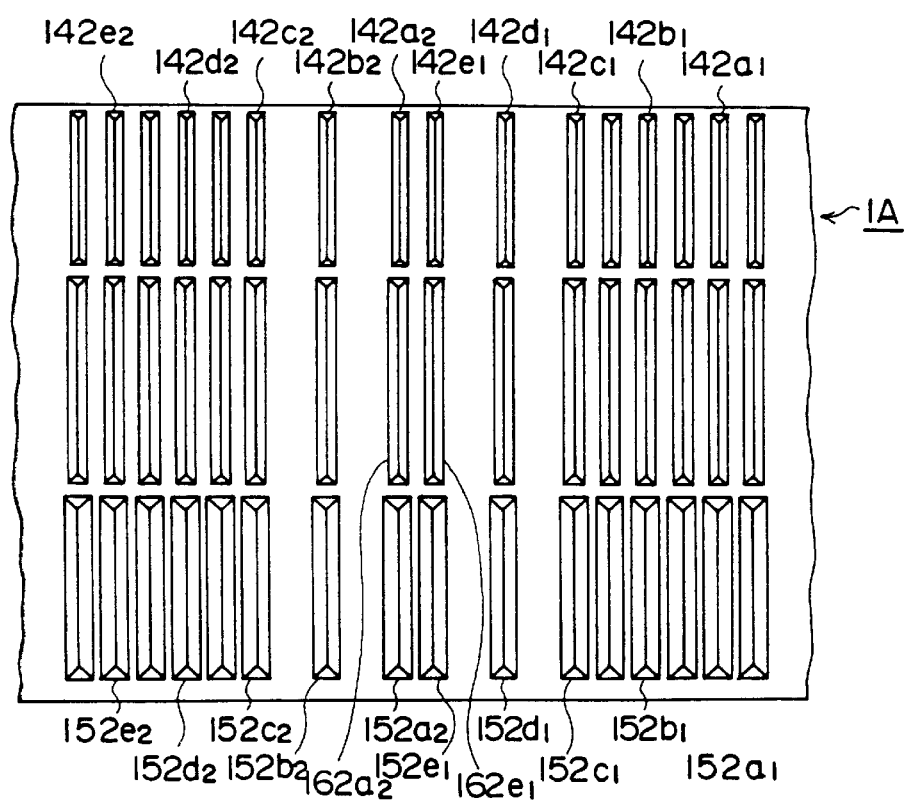

Referring to FIG. 70A, the grooves 151 are formed on the side of the upper principal surface of the wafer 1 in correspondence to the sub-carrier $150C_3$ and the engagement grooves $142a_1$–142e, and $142a_2$–142$e_2$, as well as the engagement grooves $152a$–$152e_1$ and $152a_2$–$152e_2$ are formed on the side of the lower principal surface of the wafer 1 in correspondence to the sub-carrier 140A similarly as before. Further, as indicated in FIG. 70B, the engagement grooves 162 are formed in correspondence to the sub-carrier 160C to be formed.

Figure 70C:
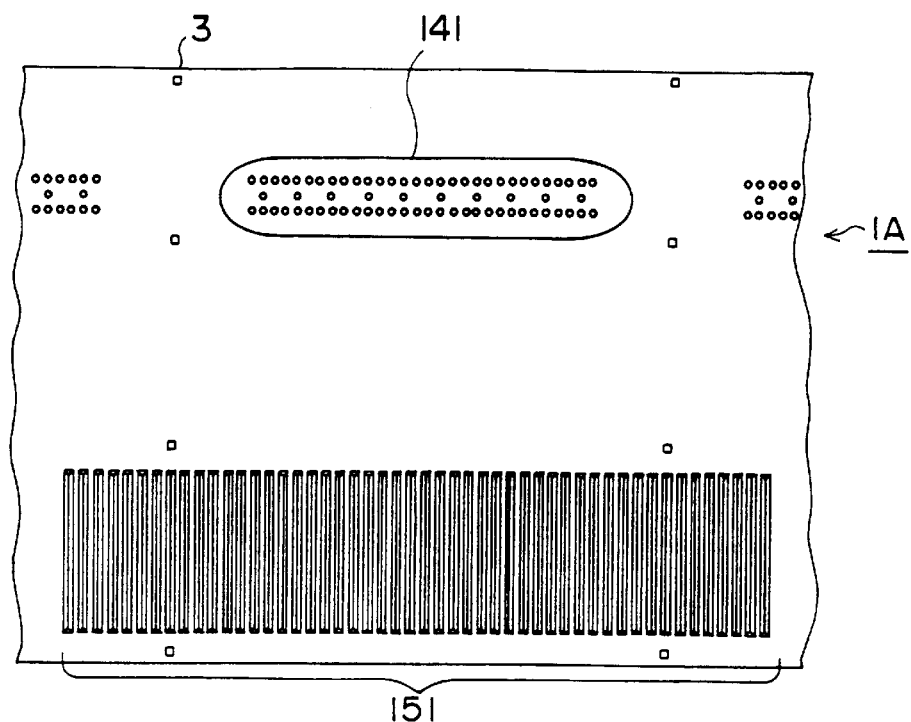
Figure 70D:
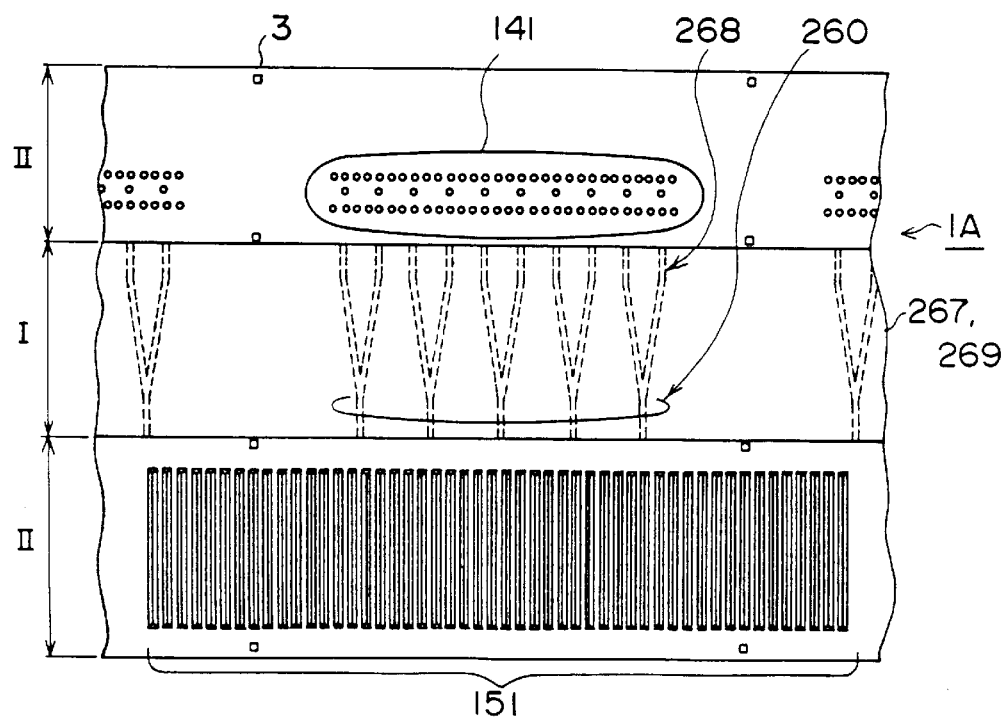

After the formation of the bonding pad structure 141 in the step of FIG. 70C, the resin layers are applied on the part of the wafer 1 where the sub-carrier 160C is to be formed in the step of FIG. 70D to form the lower cladding layer 267 and the upper cladding layer 268, followed by a patterning process of the core layer 268.

Figure 70E:
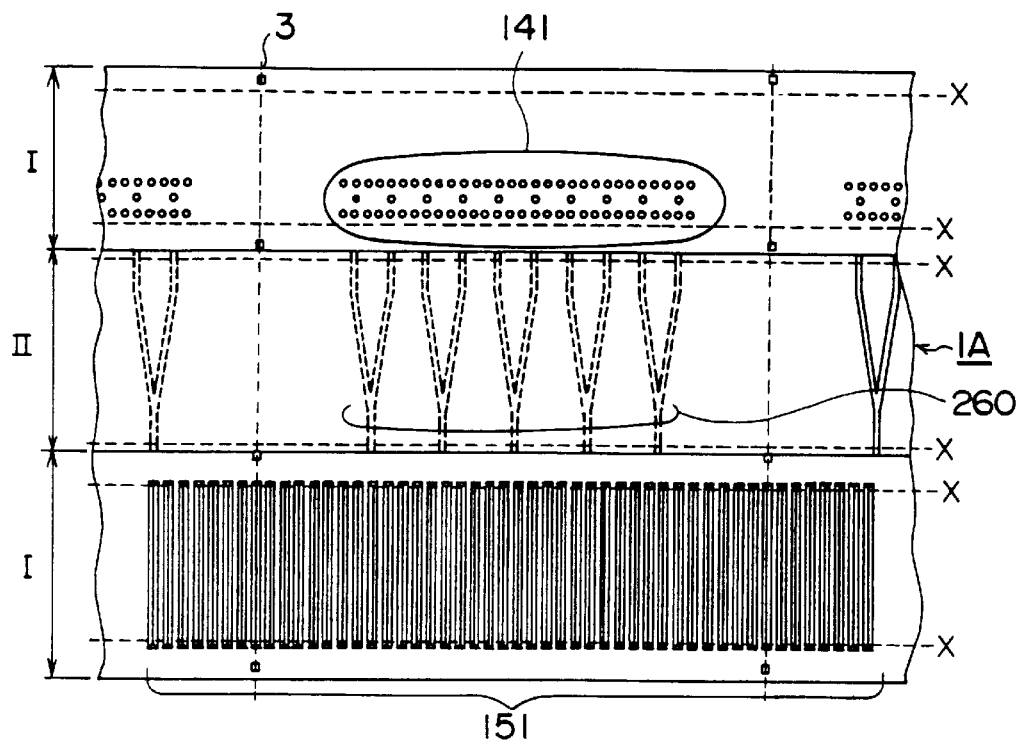
Figure 70F:
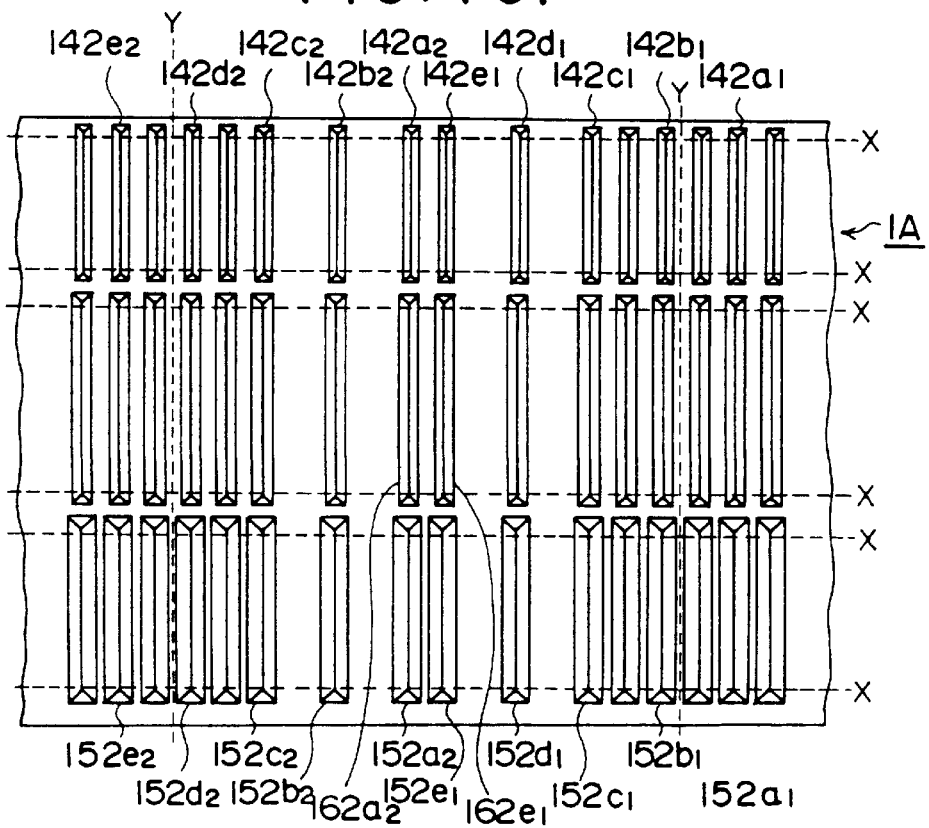

The core layer 268 thus patterned is covered by a resin layer acting as the upper cladding layer 269, and the structure thus obtained is subjected to a dicing process along the dicing lines X and Y in the step of FIGS. 70E and 70F.

By forming the three sub-carriers from a common wafer, it is possible to reduce the error in the engagement grooves at the bottom of the wafer 1 with respect to the grooves 151 at the top of the wafer 1.

It is also possible to carry out, after the steps of FIG. 70F or the step of FIG. 70A, the planarization process of FIGS. 61C–61D or FIGS. 63A–63D, and apply a photolithographic patterning process on the planarized surface thus obtained for forming the bonding pad structure 141. In this case, the oxide film bonded for the planarization is removed selectively after the patterning of the bonding pad structure 141 so as to expose the grooves 151.

Figure 71A:
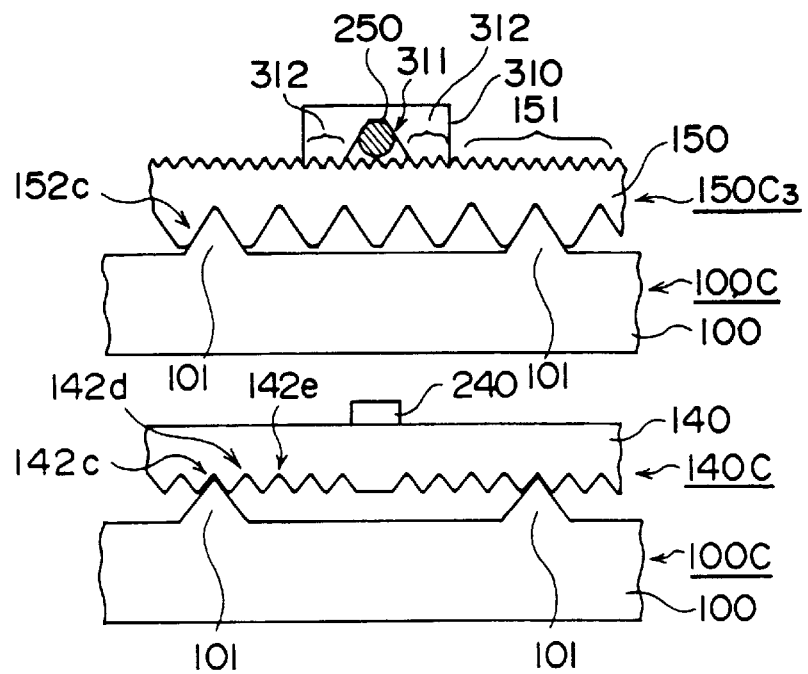
FIGS. 71A and 71B are diagrams showing a lateral adjustment of the optical components in the optical coupling structure according to the twentieth embodiment.
Figure 71B:
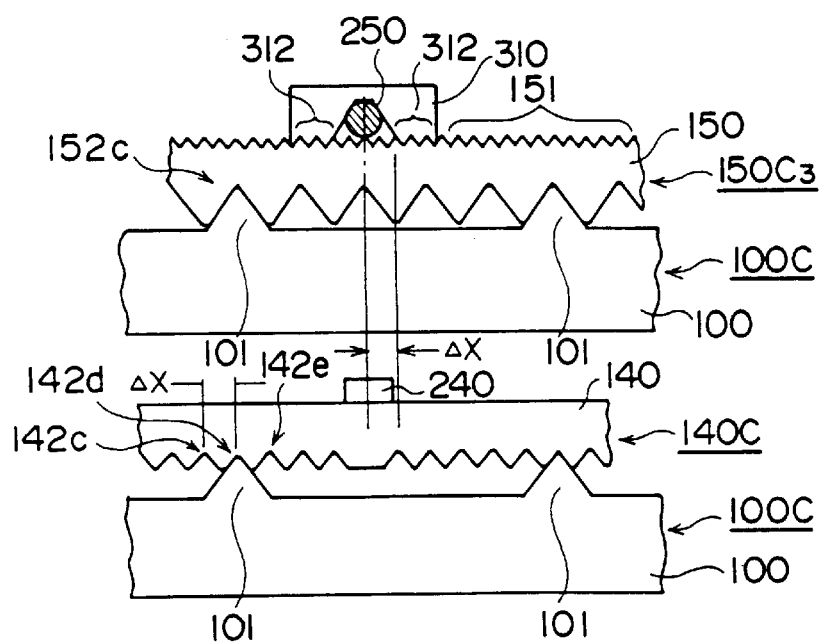

FIG. 71A shows the construction of the optical coupling structure of the present embodiment fabricated according to the process described before, wherein it will be noted that the sub-carrier $150C_3$ carries the optical fiber 250 thereon while the sub-carrier 140C carries the laser diode 240 thereon Similarly as before the sub-carriers $150C_2$ and 140C are mounted on a common substrate 100C. Thereby, the optical fiber 250 is held in exact alignment with the laser diode 240e by appropriately selecting a pair of the engagement grooves from the engagement structure 142 in which the width of the engagement grooves 142c–142e is changed form 85 $\mu$m to 96 $\mu$m and by approximately selecting a pair of the engagement grooves from the engagement structure 152 in which the width of the engagement grooves including the groove 152c is changed from 64–170 $\mu$m.

Further, in the optical coupling structure of FIG. 71A, it should be noted that the pitch of the grooves forming the grating 151 on the sub-carrier 150C₃ is set to 50.7 μm, and the pitch of the grooves 142c–142e forming the engagement groove structure 142 on the sub-carrier 140C is set to be four times as large as the foregoing pitch of 50.7 μm. Further, the pitch of the grooves such as the groove 152c forming the engagement groove structure 152 on the sub-carrier 150C₃ is set to be six times as large as the foregoing pitch of 50.7 μm. In such a construction, the pitch of the engagement grooves is thus reduced, and the number of the engagement grooves provided on the sub-carrier 140C or 150C₃ can be increased without increasing the size of the sub-carrier. Thereby, the precision of the optical alignment is improved substantially.

In such a construction where the pitch of the engagement grooves is different between the sub-carrier 140C and the sub-carrier 150C₂, it will be noted that the alignment between the laser diode 240 and the optical fiber 250 may be lost. This problem, however, is easily resolved by merely translating the member 310 laterally.

F84B shows the case in which the engagement grooves 142d are selected for engagement with the ridges 101 of the common substrate 100C for the vertical adjustment of the optical axis of the laser diode 240, in place of the engagement grooves 142c. In this case, the position of the laser diode 240 is laterally offset to the left by a distance ΔX as compared with the state of FIG. 71A. Thus, in correspondence to the deviation ΔX, the mounting member 310 is shifted to the left by a distance corresponding to four pitches of the grooves of the grating 151. In the illustration, it should be noted that the shifting is made only by two pitches but this is merely the sake of simplicity of the illustration .

Figure 72A:
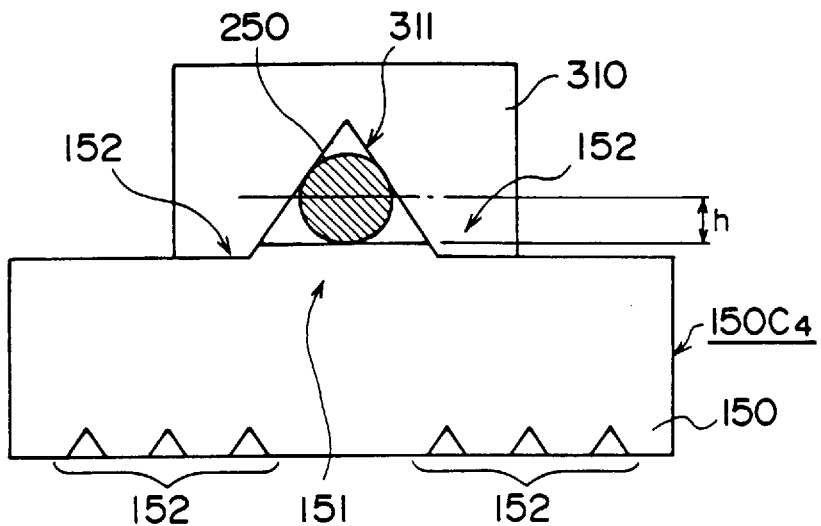
FIGS. 72A and 72B are diagrams showing a modification of the optical coupling structure according to the twentieth embodiment.
Figure 72B:
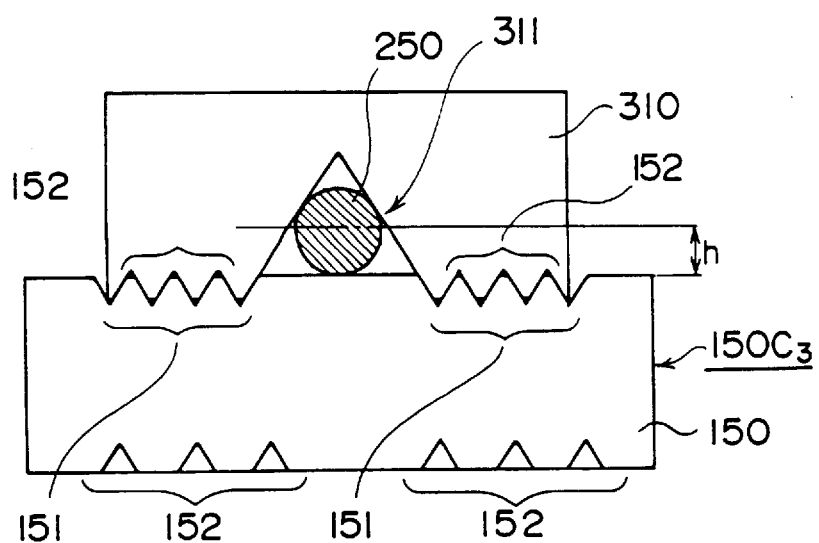

FIGS. 72A and 72B show modifications of the optical coupling structure of the present embodiment, wherein FIG. 72A shows the case of forming a projection 152 on the upper major surface of a sub-carrier 150C₄ for engagement with the mounting member 310. Further, FIG. 72B shows a sub-carrier 150C₅ that is formed with the grating 151 only for a limited part of the upper major surface thereof. Any of the modifications of FIGS. 72A and 72B is effective for reducing the depth of the grooves of the grating 151 and facilitates the formation of a bonding pad structure on the sub-carrier by way of a photolithographic patterning process.

TWENTY-FIRST EMBODIMENT

Figure 73:
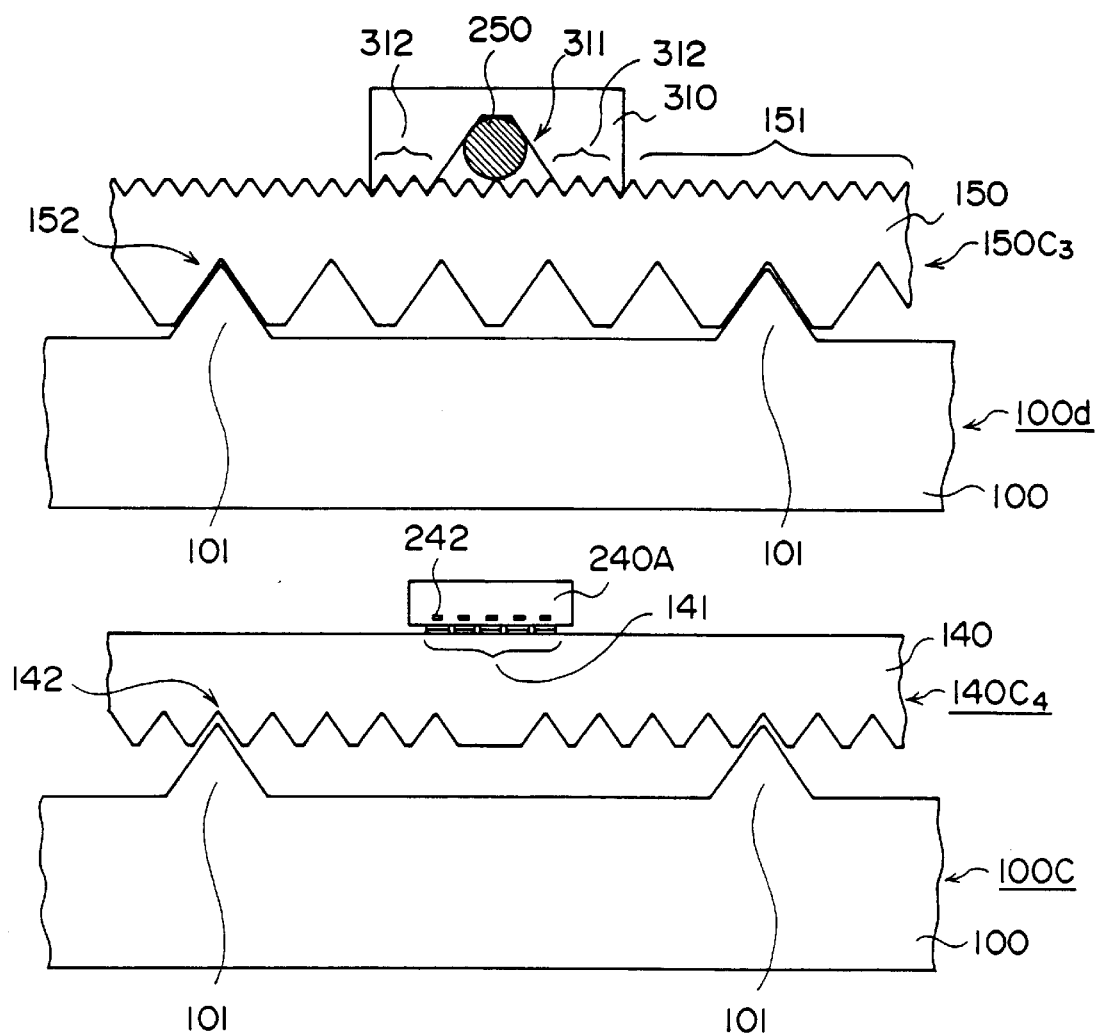
FIG. 73 is a diagram showing the construction of an optical coupling structure according to a twenty-first embodiment of the present invention.

FIG. 73 show the construction of an optical coupling structure according to a twenty-first embodiment of the present invention in two, different cross-sections, wherein those parts corresponding to the parts described previously are designated by the same reference numerals and the description thereof will be omitted Referring to FIG. 73, the optical coupling structure uses a sub-carrier 140C₄ that is similar to the sub-carrier 140C of the previous embodiment shown in FIG. 71A, except that the laser diode 240 is replaced with a laser diode array 240A including an array of active layers 242 with a mutual pitch of 48.7 μm. By using the construction of FIG. 73, it becomes possible to compensate for the lateral offset of the laser diode in addition to the advantageous effect achieved by the previous embodiment More specifically, a lateral offset of the active layer 242e such as the active layer located at the center of the array, in the right direction by a distance of 2±1 μm, is successfully compensated for by shifting the optical fiber 250 in the right direction by one pitch of the grating 151. Thereby, an optical alignment within an error of ±1 μm is achieved between the optical fiber 250 and the active layer 242 under consideration. When the offset is 4±1 μm, the desired compensation is achieved by shifting the optical fiber 250 in the right direction by an amount of 2 pitches of the grating 151.

TWENTY-SECOND EMBODIMENT

Figure 74:
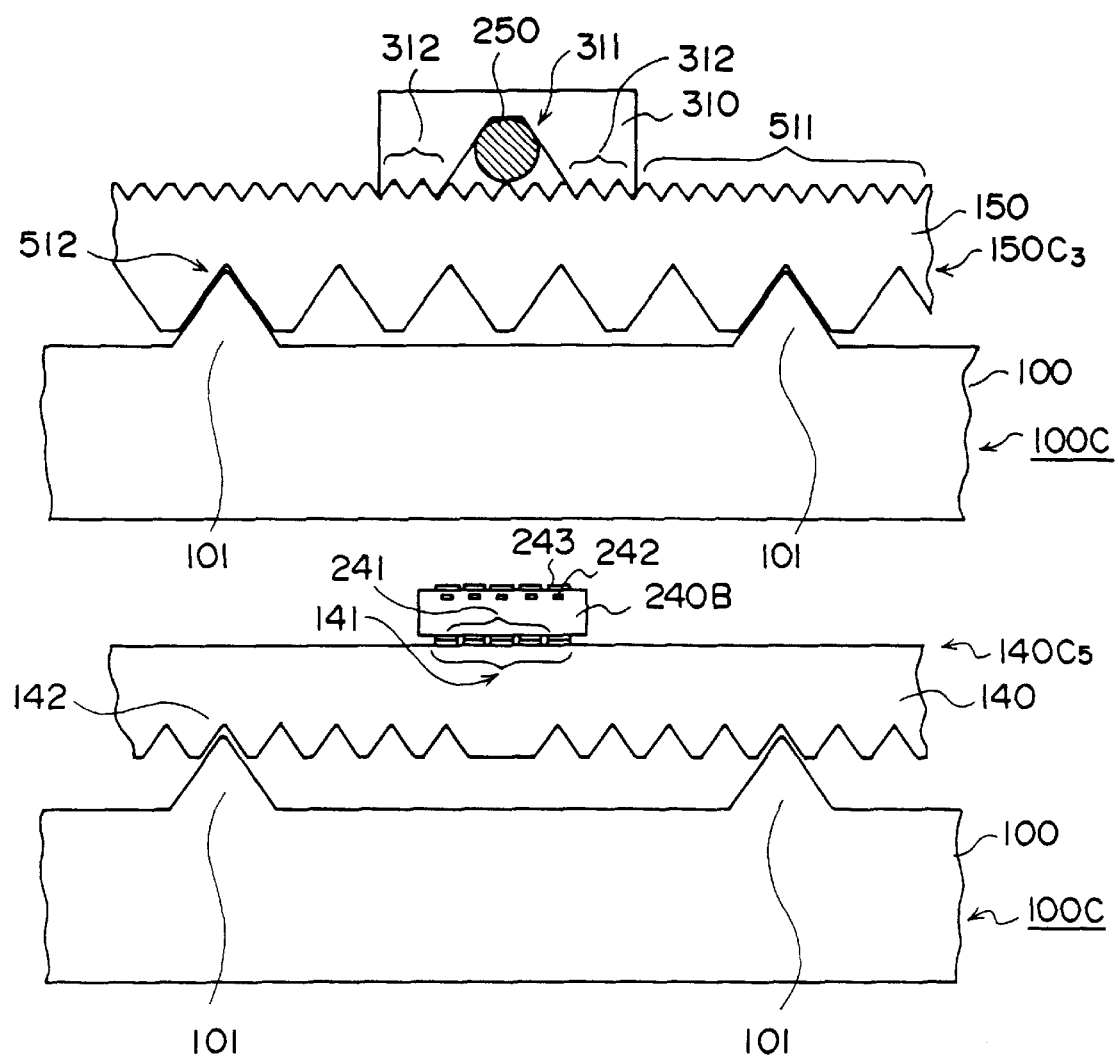
FIG. 74 is a diagram showing the construction of an optical coupling structure according to a twenty-second embodiment of the present invention.

FIG. 74 shows the construction of an optical coupling structure according to a twenty-second embodiment of the present invention in two, different cross-sections wherein those parts corresponding to the parts described previously are designated by the same reference numerals and the description thereof will be omitted.

Referring to FIG. 74, the optical coupling structure of the present embodiment is substantially identical with that of FIG. 73, except that a laser diode array 240B is mounted in a face-up state. In the present embodiment, too, the height of the laser diode is adjusted by selecting the grooves of the engagement groove structure 142. Further, the lateral alignment between the laser diode array 240B and the optical fiber 250 is achieved by translating the mounting member 310 laterally It should be noted that the present embodiment can be easily modified by replacing the optical fiber with a cylindrical lens such as the lens 230.

TWENTY-THIRD EMBODIMENT

Figure 75A:
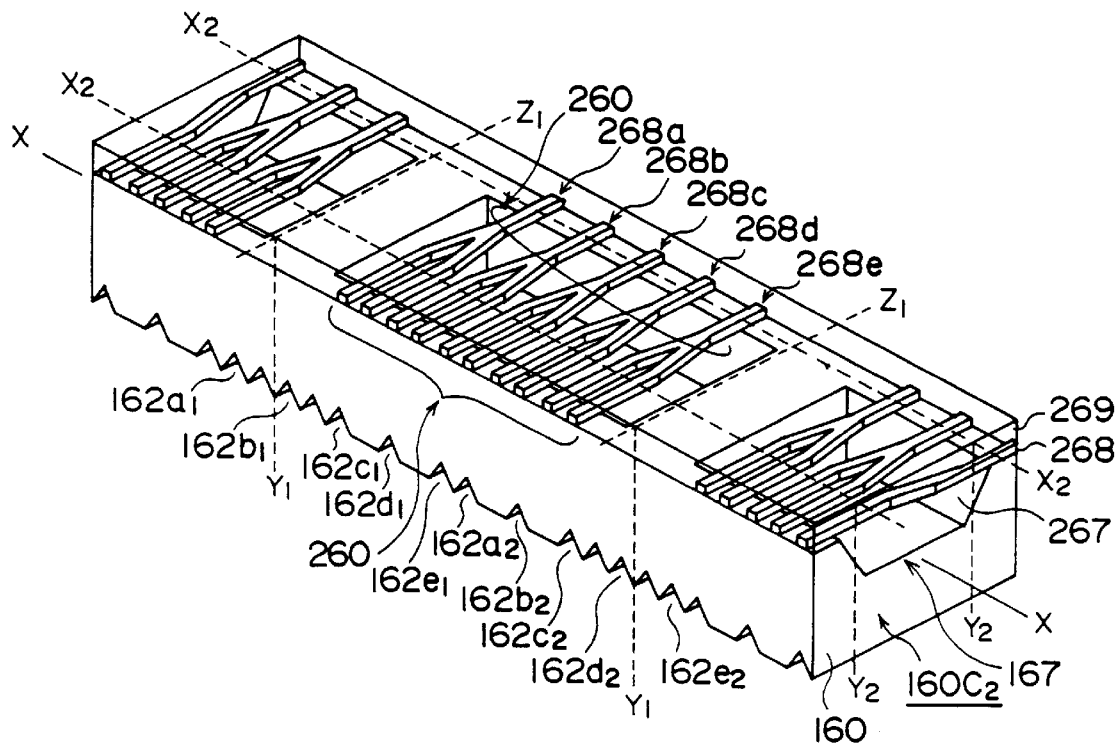
FIGS. 75A and 75B are diagrams showing a part of an optical coupling structure according to a twenty-third embodiment of the present invention.
Figure 75B:
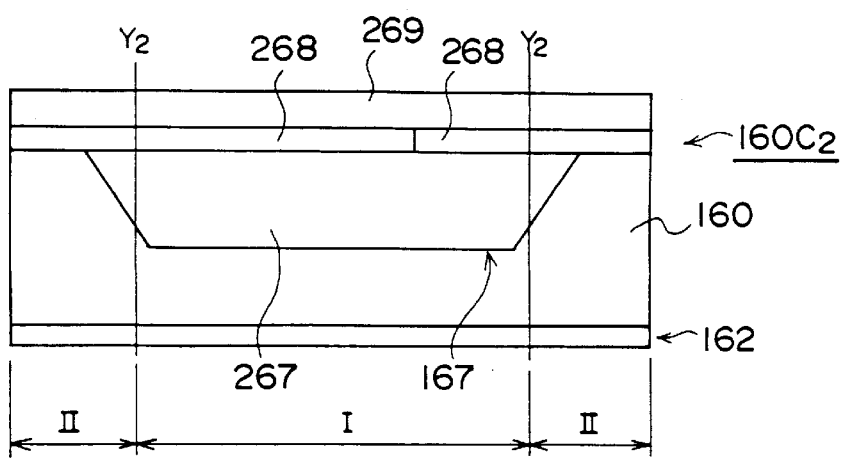

FIGS. 75A and 75B show the construction of an optical coupling structure according to a twenty-third embodiment of the present invention respectively in an oblique view and a cross-sectional view, wherein those parts corresponding to the parts described previously are designated by the same reference numerals and the description thereof will be omitted Referring to FIGS. 75A and 75B, it should be noted that the optical coupling structure of the present embodiment includes a sub-carrier 160C₂ for carrying the Y-shaped optical waveguide 260 thereon, wherein the sub-carrier 160C₂ is formed with a depression 167 on the top surface thereof, and the lower cladding layer 267 is formed to fill the depression 167 as indicated in the cross-sectional view of FIG. 75B. By polishing the top surface of the lower cladding layer 267 such that the top surface of the cladding layer 267 forms a flush surface with the top surface of the substrate 160 used for the sub-carrier 160C₂, it is possible to control the height of the core layer 268 of the optical waveguide 260 with an improved precision The sub-carrier 160C₂ is then diced along the dicing lines Y₂

It should be noted that the depression 167 of the sub-carrier 160C₂ is formed with a depth of about 30 μm, while this depth is different from the depth of the engagement grooves forming the engagement groove structure 162, which is set to about 65 μm. In order to form such grooves having different depths simultaneously at both sides of a wafer, the present embodiment performs the process of FIGS. 76A–76D.

Figure 76A:
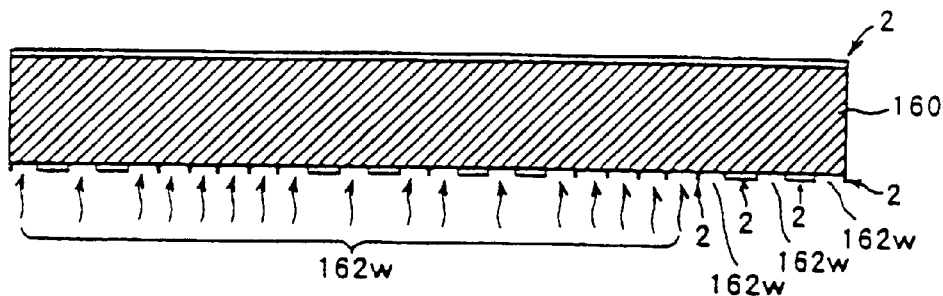
FIGS. 76A–76D are diagrams showing a fabrication process of the optical coupling structure of the twenty-third embodiment.

Referring to FIG. 76A, a silicon oxide film indicated by the numeral 2 is formed first on both the upper and lower principal surfaces of the wafer or substrate 160 of Si, and the windows 162w are formed on the oxide film 2 covering the lower principal surface of the substrate 160.

Figure 76B:
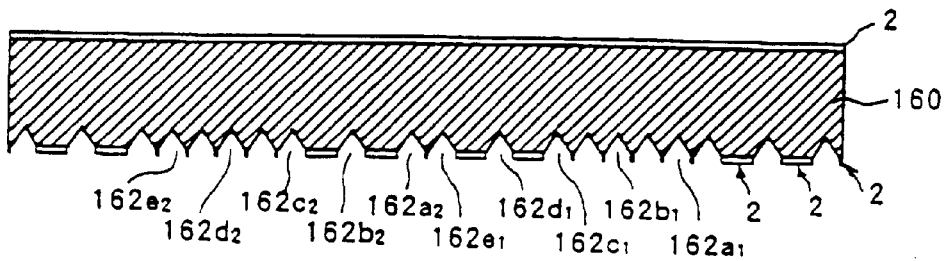

Next, in the step of FIG. 76B, the substrate 160 thus processed is immersed into an aqueous solution of KOH to form the engagement grooves 160a₁–160e₁ and 160a₂–160e₂ in correspondence to the mask windows 162w.

Figure 76C:
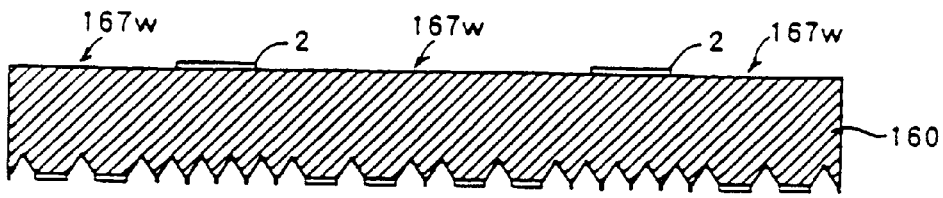
Figure 76D:
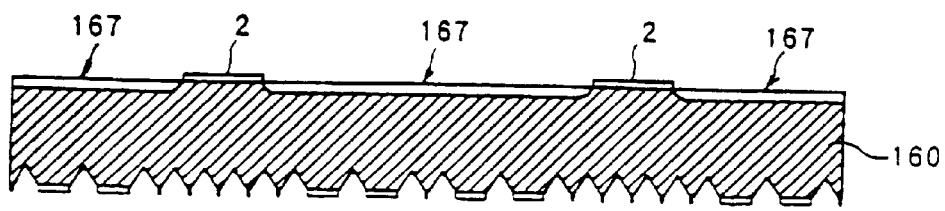

Next, the oxide film 2 covering the upper principal surface of the substrate 160 is formed with windows 167w corresponding to the groove 167 to be formed in the step of FIG. 76C, and the substrate 160 thus processed is immersed in an aqueous solution of KOH in the step of FIG. 76D to form the grooves 167 in correspondence to the mask windows 167w.

In the step of FIG. 76B, the engagement grooves $162a_1$–$162e_1$ and $162a_2$–$162e_2$ may be formed with an intermediate depth such as 35 μm, such that the rest of the etching of the grooves $162a_1$–$162e_1$ and $162a_2$–$162e_2$ is completed in the etching step of FIG. 76D.

As noted already, such a process aligns the top surface of the lower cladding layer 167 with the top surface of the substrate 160, and the height of the core layer 268 formed on the lower cladding layer 167 is controlled exactly. Thus, by using the sub-carrier $160C_2$ in the optical coupling structure of the fifteenth embodiment shown in FIG. 53, it is possible to adjust the height of the optical axis of the optical waveguide 260 precisely by merely selecting an appropriate engagement groove for the engagement groove structure 162.

TWENTY-FOURTH EMBODIMENT

Figure 77:
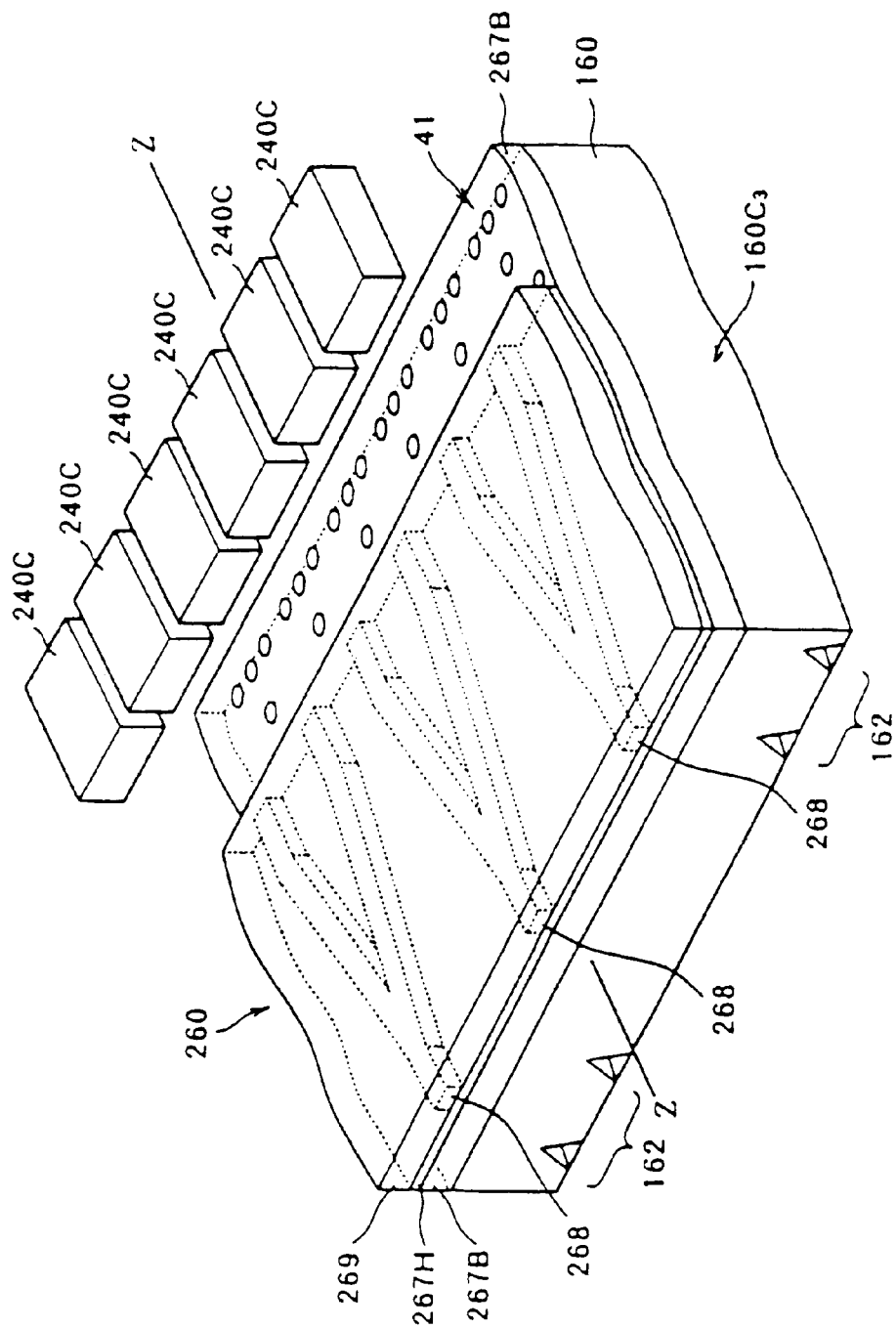
FIG. 77 is a diagram showing the construction of an optical coupling structure according to a twenty-fourth embodiment of the present invention.

FIG. 77 show the construction of an optical coupling structure according to a twenty-fourth embodiment of the present invention.

Referring to FIG. 77, the optical coupling structure of the present embodiment includes a sub-carrier $160C_3$ carrying thereon a buffer layer 267B of a transparent inorganic material. The optical waveguide 260 is thereby formed on such buffer layer 267B by selecting the resin material such that the optical waveguide 160 has a refractive index equal to or larger than the refractive index of the buffer layer 267B. Typically, the buffer layer 267B is formed of a silicon oxide film having a thickness of 6 μm. On the buffer layer 267B, a lower cladding layer 267H of a polyimide is formed with a thickness of 2 μm and a refractive index of 155 μm, and the core layer 268 is formed on the lower cladding layer 267H with a thickness of 6 μm and a refractive index of 1.56. Similarly as before, the core layer 268 is patterned into Y-shaped form, and the upper cladding layer 269 is formed so as to bury the core layer 268 with a thickness of 10 μm and a refractive index of 1.55 μm.

In the structure of FIG. 77, it should further be noted that the buffer layer 267B carries the bonding pad structure 41, and the engagement groove structure 162 is formed on the rear surface of the sub-carrier $160C_3$.

FIGS. 78A–78E show the fabrication process of the optical waveguide 260 of the embodiment of FIG. 77.

Figure 78A:
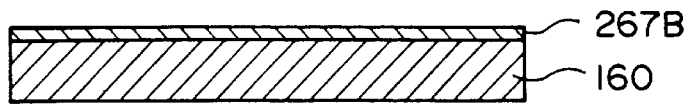
FIGS. 78A–78E are diagrams showing a fabrication process of the optical coupling structure of the twenty-fourth embodiment.
Figure 78B:
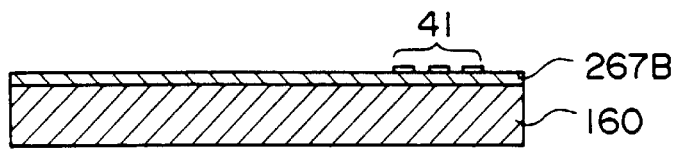

Referring to FIG. 78A, the buffer layer 267B of silicon oxide is formed on the Si substrate 160, and the bonding pad structure 41 is formed on the buffer layer 267B by a photolithographic patterning process in the step of FIG. 78B.

Figure 78C:
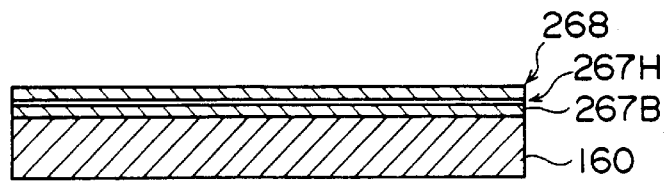

Next, the lower cladding layer 267H and the core layer 268 of polyimide are deposited on the structure of FIG. 78B in the step of FIG. 78C such that the layers 267H and 268 cover the bonding pad structure 41 formed previously.

Figure 78D:
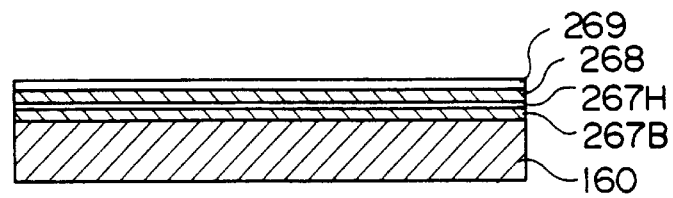
Figure 78E:
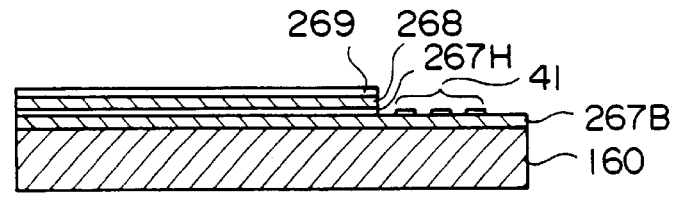

Next, in the step of FIG. 78D, the core layer 268 is patterned according to the desired Y-shaped pattern by a photolithographic patterning process using an oxygen plasma, and the upper cladding layer 269 is deposited on the core layer 268 thus patterned Further, in the state of FIG. 78E, the layers 267H–269 are patterned by a photolithographic patterning process using an oxygen plasma to expose the bonding pads 41.

In the foregoing step of FIG. 78A, the buffer layer 267B may be formed by a sputtering process of flame deposition process when the desired thickness of the layer 267B is larger than about 2 μm, while the layer may be formed by a pyrolytic CVD process or a plasma CVD process when the desired thickness of the layer 267B is smaller than about 2 μm. The thickness of the buffer layer 267B may be reduced below 2 μm when the thickness of the lower cladding layer 267H is set large, typically larger than about 12 μm.

By forming the optical waveguide 260 from an organic resin on the buffer layer 267H, which in turn is formed of an inorganic material, it is possible to stop the oxygen plasma etching in the step of FIG. 78E upon the exposure of the buffer layer 267B. In other words, the buffer layer 267B, on which the bonding pad structure 41 are formed acts as an etching stopper.

According to the process of the present embodiment, it is possible to carry out the photolithographic process of the bonding pad structure 41 on a flat surface of the buffer layer 267B in the step of FIG. 78B, and the difficulty of patterning the bonding pad structure in the step of FIG. 78E is successfully avoided.

Further, the present embodiment provides an advantageous effect in that the height of the optical axis of the optical waveguide 260 is easily adjusted with respect to the surface on which the bonding pad structure 41 is formed, by merely adjusting the thickness of the layer 267H. Thus, the layer 267H may be called a height adjustment layer.

As already noted, the buffer layer 267B is formed of a material having a refractive index substantially equal to or smaller than refractive index of the lower cladding layer 267H. Particularly, the thickness of the lower cladding layer 267H can be reduced substantially when silicon oxide of which refractive index is smaller than the refractive index of the polyimide forming the lower cladding layer 267H, is used for th buffer layer 267B.

Figure 79A:
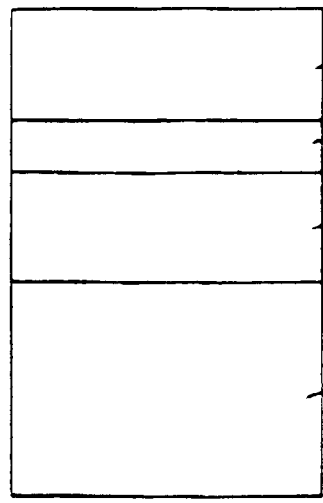
FIGS. 79A–79F are diagrams showing an optical confinement occurred in an optical waveguide used in the optical coupling structure of the twenty-fourth embodiment.
Figure 79B:
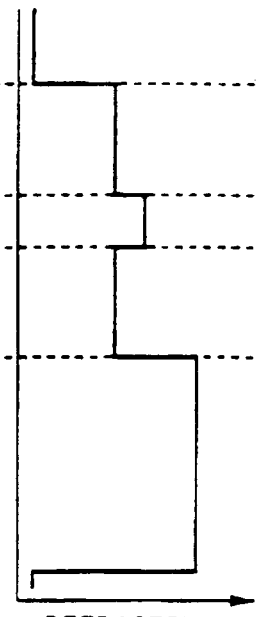
Figure 79C:
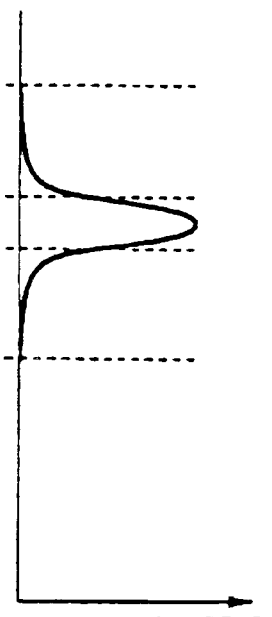

FIGS. 79B and 79C show the refractive index profile and the electric field profile of the layered structure of FIG. 79A.

Referring to FIG. 79A showing a model structure including the cladding layer 267 forming the optical waveguide 260 together with the core layer 268 and the upper cladding layer 269, it should be noted that the cladding layer 267 is formed directly on the Si substrate 160. In such a structure, it is necessary to secure a substantial thickness for the lower cladding layer 267 in view of the optical field strength profile of FIG. 79C. In FIG. 79C, it will be noted that, while the peak of the optical field strength profile is located in the core layer 268. the tail of the profile extends gradually toward the substrate 160 and tends to cause an optical coupling with the Si substrate 160 of which refractive index is much larger than the refractive index of the core layer 268 as indicated in FIG. 79B. In such a system, therefore, the optical radiation confined in the core layer 268 causes a leak into the Si substrate 160 when the thickness of the lower cladding layer 267 is insufficient. This is the reason why the conventional optical waveguide uses a thick lower cladding layer, such that the optical radiation in the core layer 268 does not leak to the Si substrate 160.

Figure 79D:
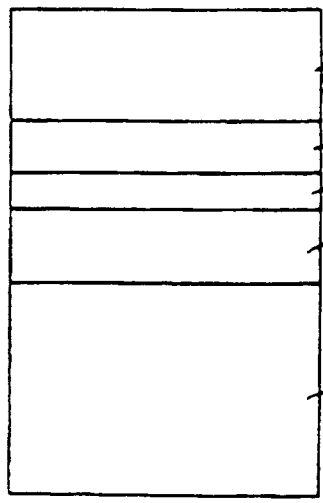
Figure 79E:
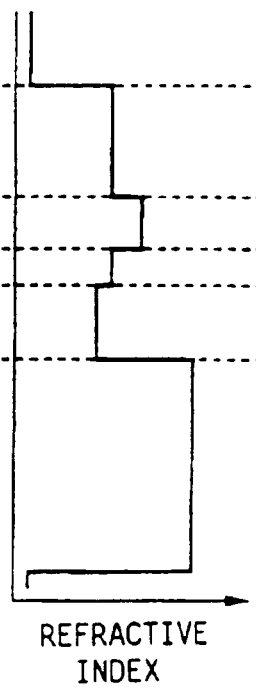
Figure 79F:
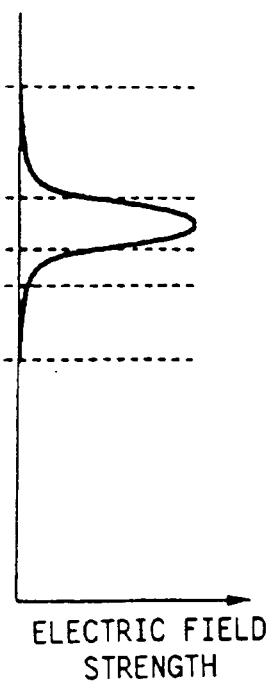

In the structure of FIG. 79D, on the other hand, the buffer layer 267B of a low refractive index is interposed between the Si substrate 160 and the lower cladding layer 267H. It should be noted that the buffer layer 267B has a refractive index even smaller than the refractive index of the lower cladding layer 267H as indicated in the refractive index profile shown in FIG. 79E. Thus, the extension of the tail part of the electric field strength shown in FIG. 79F toward the Si substrate 160 is successfully suppressed even when the thickness of the lower cladding layer 267H is reduced, by interposing the buffer layer 267B between the Si substrate 160 and the lower cladding layer 267H. In fact, it is possible to reduce the thickness of the lower cladding layer 267H to 2 μm or less, by setting the thickness of the buffer layer 267B to be 12 μm or more.

As the present embodiment, which uses the buffer layer 267B in combination with the lower cladding layer 267H, allows a substantially free adjustment of the thickness of the lower cladding layer 267H without being restricted from the requirement of avoiding the optical coupling between the lower cladding layer 267H and the Si substrate 160, it becomes possible to adjust the height of the optical axis of the optical waveguide 260 freely and precisely.

The thickness of the lower cladding layer 267H can be reduced when the buffer layer 267B is formed to have a refractive index smaller than the refractive index of the lower cladding layer 267H. Thereby, the precision of adjustment of the height of the optical axis of the optical waveguide 260 is Improved further In the optical coupling structure of the fifteenth embodiment shown in FIG. 53, for example, it should be noted that an error of ±3 μm occurs in the height of the optical axis of the optical waveguide solely as a result of the error in the thickness of the lower cladding layer, when the lower cladding layer of the optical waveguide is formed to have a thickness of 30 μm with an error of ±10%. on the other hand, the extent of the error that can be compensated for by selecting one of the five sets of the engagement grooves, is about ±5 μm. Thereby, the extent that the compensation is effective for the error in the thickness of the substrate is reduced to about ±2 μm. Production of a substrate with such a precision is difficult.

On the other hand, when the thickness of the lower cladding layer 267H is reduced to 2 μm by providing the buffer layer 267B with the thickness of 6 μm as in the case of the present embodiments the error caused in the height of the optical axis of the optical waveguide is only 0.8 μm in the worst case, even when the thickness of the lower cladding layer 267H has included an error of 10%. This means that the engagement groove structure on the sub-carrier can be used to compensate for the error of as much as ±4.2 μm for the thickness of the substrate forming the sub-carrier.

Figure 80A:
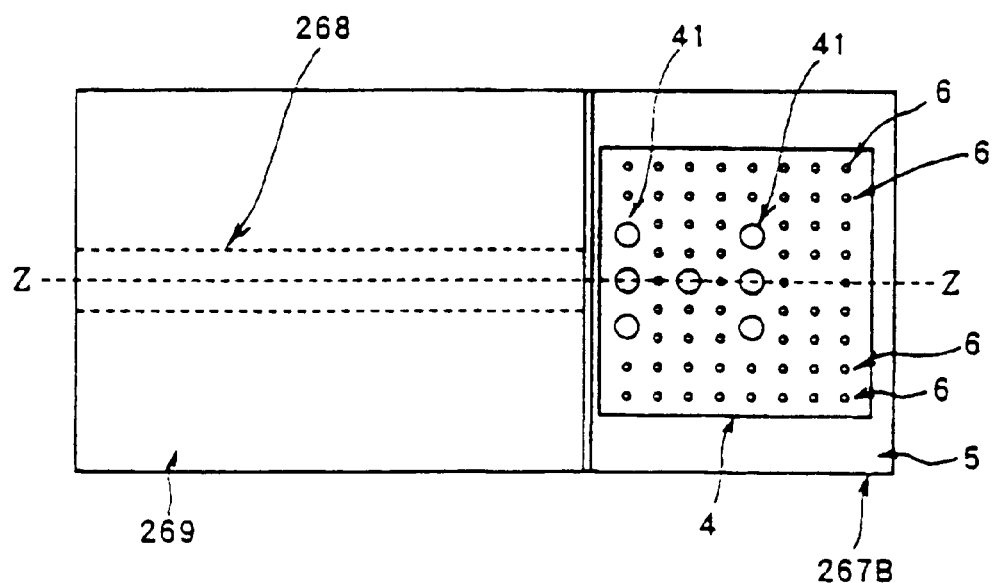
FIGS. 80A and 80B are diagrams showing a modification of the optical coupling structure of the twenty-fourth embodiment.
Figure 80B:
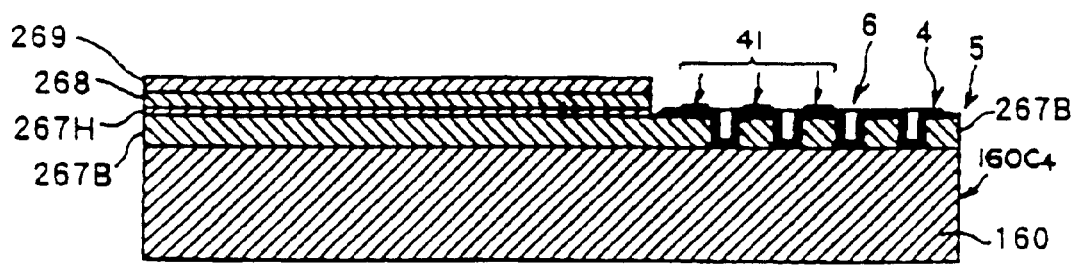

FIGS. 80A and 80B show a modification of the sub-carrier according to the present embodiment.

Referring to FIGS. 80A and 80B, it will be noted that the buffer layer 267B is formed with a plurality of through-holes 6 exposing the Si substrate 160 for improving the heat dissipation of the laser diode held on the bonding pad structure 41. For this purpose, a metal coating is provided on the inner surface of the through-holes 6 such that the metal coating extends from the top surface of the buffer layer 267B to the substrate 160. The through-holes 6 are thus called heat-dissipation pit.

FIGS. 81A–81D show the process of forming the heat dissipation pit 6 on the buffer layer 267B.

Figure 81A:
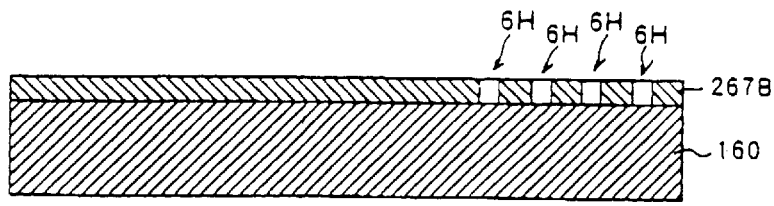
FIGS. 81A–81D are diagrams showing a fabrication process of the optical coupling structure of the twenty-fourth embodiment.

Referring to FIG. 81A, through-holes 6H are formed on the buffer layer 267B by an RIE (reactive ion etching) process or an ion beam etching process such that the through-holes 6H extends from the top surface to the bottom surface of the buffer layer 267B.

Figure 81B:
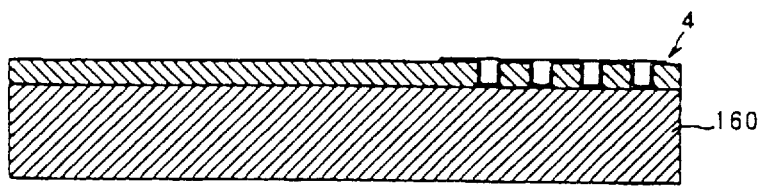

Next, in the step of FIG. 81B, a metal coating 4 is deposited uniformly such that the metal coating covers the through-holes 6H including the inner side wall thereof as well as the exposed top surface of the substrate 160.

Figure 81C:
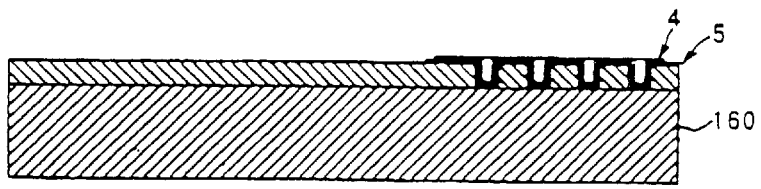

Next, in the step of FIG. 81C, an insulating film 5 such as silicon oxide or silicon nitride is deposited so as to cover the foregoing metal coating 4.

Figure 81D:
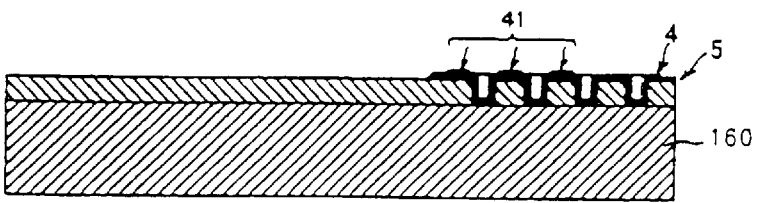

Further, in the step of FIG. 81D, the bonding pads forming the bonding pad structure 41 are formed further on the insulating film 5 covering the top surface of the buffer layer 267B by a photolithographic patterning process.

By forming the heat-dissipation pits 6 as such, it is possible to dissipate the heat of the laser diode quickly to the Si substrate 160 of the sub-carrier through the metal coating 4.

Although the foregoing process of FIGS. 81A–81D does cause a formation of depression on the surface of the buffer layer 267B, no problem occurs in the photolithographic patterning process of the bonding pads 41 It should be noted that the throughholes 6 has a typical diameter of only 50 μm and a depth of only 6 μm. Further, the bonding pads 41 are formed on the flat part of the buffer layer 267B.

TWENTY-FIFTH EMBODIMENT

Figure 82:
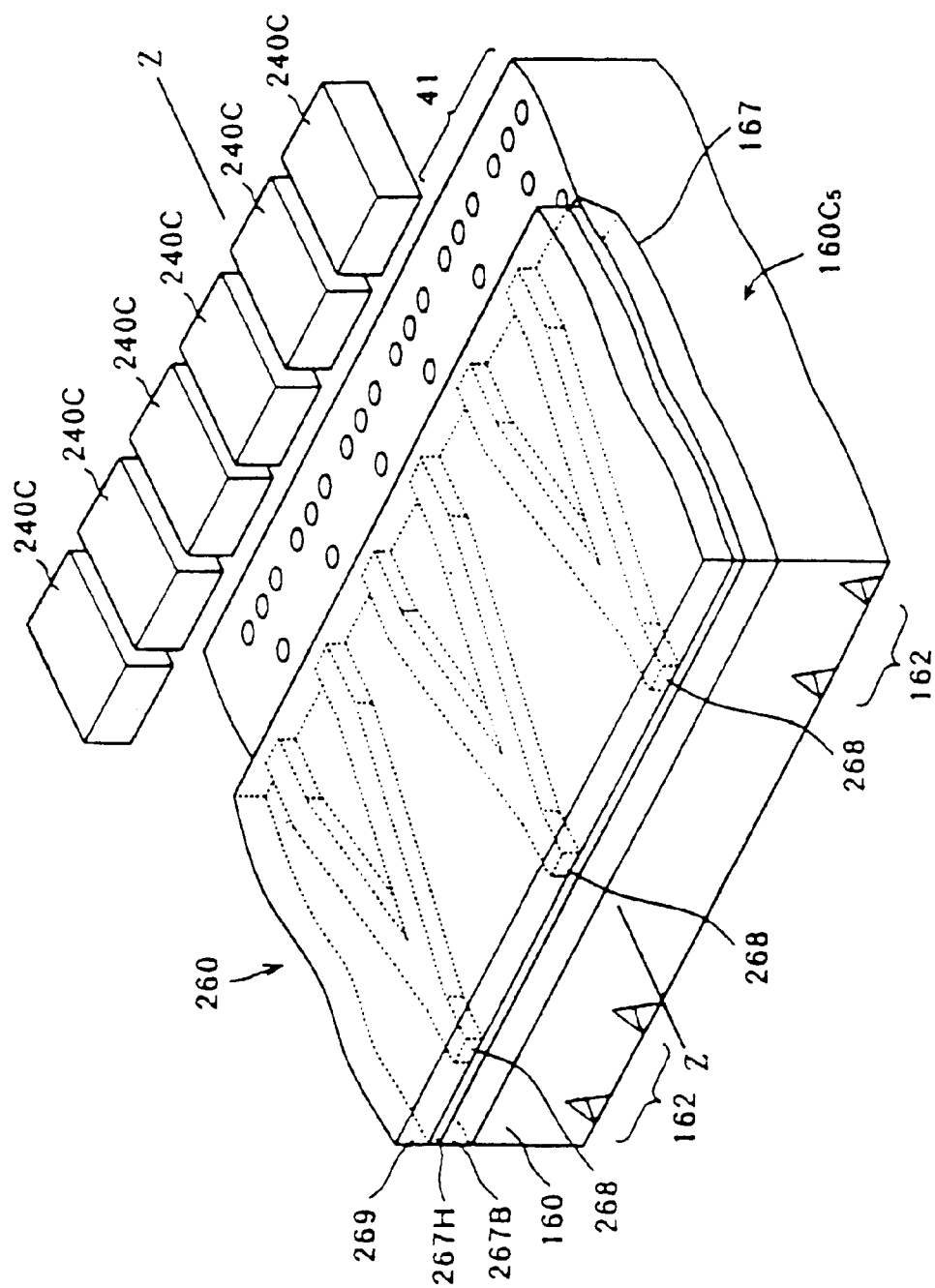
FIG. 82 is a diagram showing the construction of an optical coupling structure according to a twenty-fifth embodiment of the present invention.

FIG. 82 shows the construction of an optical coupling structure according to a twenty-fifth embodiment of the present invention, wherein those parts corresponding to the parts described previously are designated by the same reference numerals and the description thereof will be omitted.

Referring to FIG. 82, the optical coupling structure includes a sub-carrier $160C_5$ carrying the optical waveguide 260 thereon wherein the substrate 160 constituting the sub-carrier $160C_5$ is formed with the depression 167 for accepting the buffer layer 267B of the optical waveguide 260. The substrate 160 further includes a rim part at a level generally flush to the level of the top surface of the lower cladding layer 267H formed on the buffer layer 267B, and the bonding pad structure 41 is provided on such a rim part with a thin insulating film interposed between the bonding pad structure 41 and the surface of the rim part. It should be noted that the buffer layer 267B as well as the layers of the optical waveguide 260 thereon are eliminated from the foregoing rim part.

The optical waveguide 260 exposes an edge surface in correspondence to the boundary between the foregoing rim part of the substrate 160 and the depression 167, and laser diodes 240C are mounted on the bonding pad structure 41 on the rim part in a facing relationship to the exposed edge surface of the optical waveguide 260. Further, the engagement groove structure 162 is formed on the bottom surface of the substrate 160 of the sub-carrier $160C_5$, similarly to the previous embodiments.

As the laser diodes 240c are mounted directly on the substrate 160 the heat dissipation of the laser diode 240c to the substrate 160 is substantially facilitated in the construction of the present embodiment Further, by forming the buffer layer 2673 to have the top surface substantially flush with the top surface of the rim part 41 as noted above, the error in the height of the optical axis of the optical waveguide 260 caused by the error in the thickness of the buffer layer 2673 is successfully eliminated. It should be noted that Electronic Letters, vol.29, no.5, pp.444–446, 1993, op. cit. as well as Technical Digest of Fifth Optoelectronic Conference, pp.326–327, 1994, op. cite, discuss the improvement of heat dissipation and the improvement of the vertical accuracy of the optical waveguide.

The present embodiment provides a further advantageous feature in that, because of the use of Si for the substrate 160, the plasma etching conducted under the presence of oxygen plasma for exposing the rim part where the bonding pad structure 41 is formed, stops spontaneously, and a sharp edge is obtained for the optical waveguide 260. This, in turns means that it is also possible to use an organic material for the buffer layer 267B, as the buffer layer 267B is not exposed to the etching process. Further, the present embodiment allows a formation of positioning depressions on the rim part similarly to the embodiment of FIG. 45A in the form of an etch pit formed on a single crystal surface of Si.

In the case a certain error is tolerated for the alignment or shape of the bonding pad structure 41, it is possible to use silicon oxide for the optical waveguide 260 including the layers 267H–269 as noted in the foregoing references. In this case, the bonding pad structure 41 is formed after the formation of the optical waveguide 260.

FIGS. 83A–83E show the process of forming the optical coupling structure of FIG. 82e particularly for the part related to the formation of the optical waveguide 260.

Figure 83A:
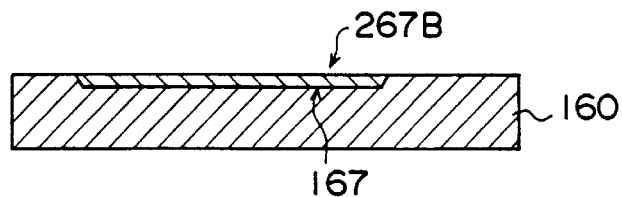
FIGS. 83A–83E are diagrams showing a fabrication process of the optical coupling structure of the twenty-fifth embodiment.

Referring to FIG. 83A, a Si substrate already formed with a thermal oxide film on the (100)-oriented principal surfaces thereof and designated by the numeral 160 is subjected to a wet etching process in a KOH aqueous solution to form the groove 167 on the upper principal surface thereof Simultaneously, the engagement groove structure 162 is formed, although not illustrated, on the lower principal surface thereof The groove 167 thus formed is then filled with a transparent material having a refractive index lower than the refractive index of the lower cladding layer 267H to be formed thereon. After the groove 167 is thus filled, the surface of the structure thus obtained is planarized by a polishing process such that the lower cladding layer 267H filling the groove 167 has a flat top surface flush to the rim surface of the substrate 160.

Figure 83B:
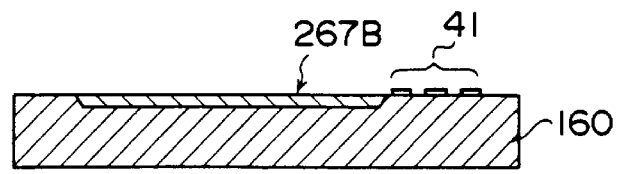
Figure 83C:
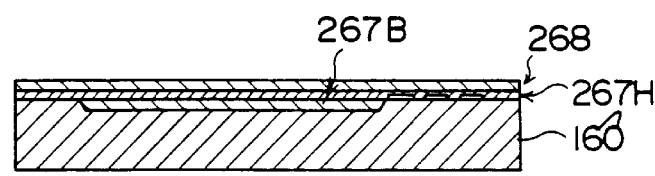

Next, in the step of FIG. 83B, the bonding pad structure 41 is formed on the rim part of the substrate 160 thus planarized, and the lower cladding layer 267H and the core layer 268 forming the optical waveguide 260 are deposited consecutively in the step of FIG. 83C so as to bury the bonding pad structure 41.

Figure 83D:
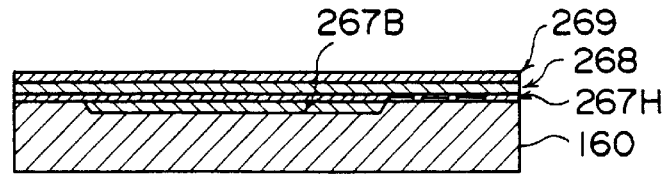

The core layer 268 are then patterned according to the desired Y-shaped core pattern by a photolithographic patterning process conducted under the existence of oxygen plasma, and the upper cladding layer 269 is deposited so as to cover the core layer 268 in the step of FIG. 83D. It should be noted that the layers 267H–269 are formed of a polyimide.

Figure 83E:
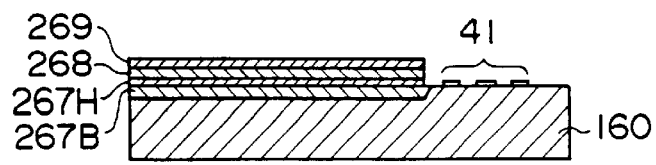

After the structure of FIG. 83D is formed, the layers 267H–269 are removed from the rim part of the substrate 160 where the bonding pad structure 41 is formed in the step of FIG. 83E by a photolithographic patterning process conducted under the existence of oxygen plasma.

From the foregoing process, it will be noted that the bonding pad structure 41 is formed on a planarized structure as indicated in FIG. 83B. As the oxygen plasma etching stops spontaneously upon the exposure of the rim part of the substrate 160, it is possible to control the height of the optical axis of the optical waveguide 260 exactly with respect to the rim surface When the optical coupling structure is used only for the optical coupling between an optical device and an optical waveguide, a further structure other than those shown in FIG. 77 or FIG. 82 may be used.

Figure 84A:
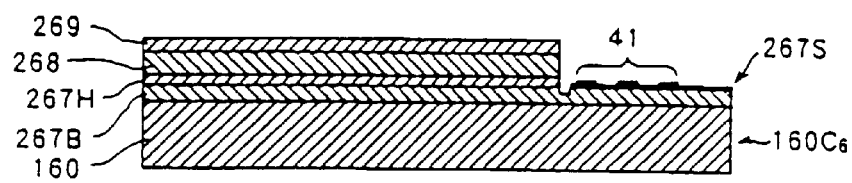
FIGS. 84A–84C are diagrams showing various modifications of the optical coupling structure of the twenty-fifth embodiment.
Figure 84B:
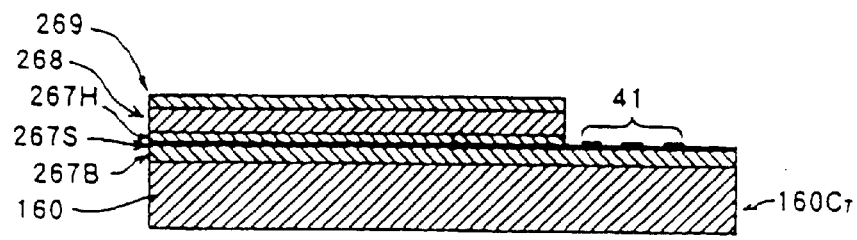
Figure 84C:
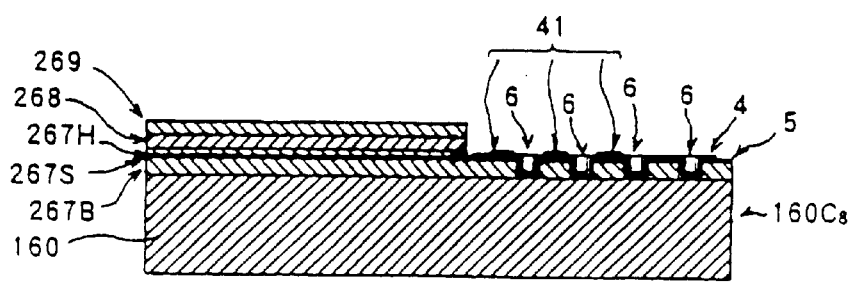

FIGS. 84A–84C show such alternative structures.

Referring to FIG. 84A, it will be noted that the structure includes a silicon nitride layer 267S provided on the exposed lower cladding layer 267H as an etching stopper, and the bonding pad structure 41 is formed on such a silicon nitride layer 267S.

In the structure of FIG. 84B, on the other hand, the etching stopper 267S is provided over the entire surface of the buffer layer 267B. Such a structure of FIG. 84B is possible when the thickness of the etching stopper layer 267S is sufficiently small. For example the etching stopper layer 267S may be formed to have a thickness of 0.3 $\mu$m and a refractive index of 1.6, when the buffer layer 267B has a thickness of 2 $\mu$m or more and a refractive index of 1.55 and the core layer 268 has a thickness of 6 $\mu$m and a refractive index of 1.56.

FIG. 84C shows a further modification of FIG. 84B in which the heat-dissipation pits 6 are formed in the buffer layer 2673 similarly to the embodiment of FIG. 84B. By forming the heat-dissipation pits 6 as such, it is possible to facilitate heat dissipation of the laser diode mounted on the bonding pad structure 41.

As the laser diode is mounted on the common sub-carrier together with the optical waveguide in the present embodiment, the optical alignment between the laser diode and the optical waveguide is substantially facilitated

TWENTY-SIXTH EMBODIMENT

Figure 85:
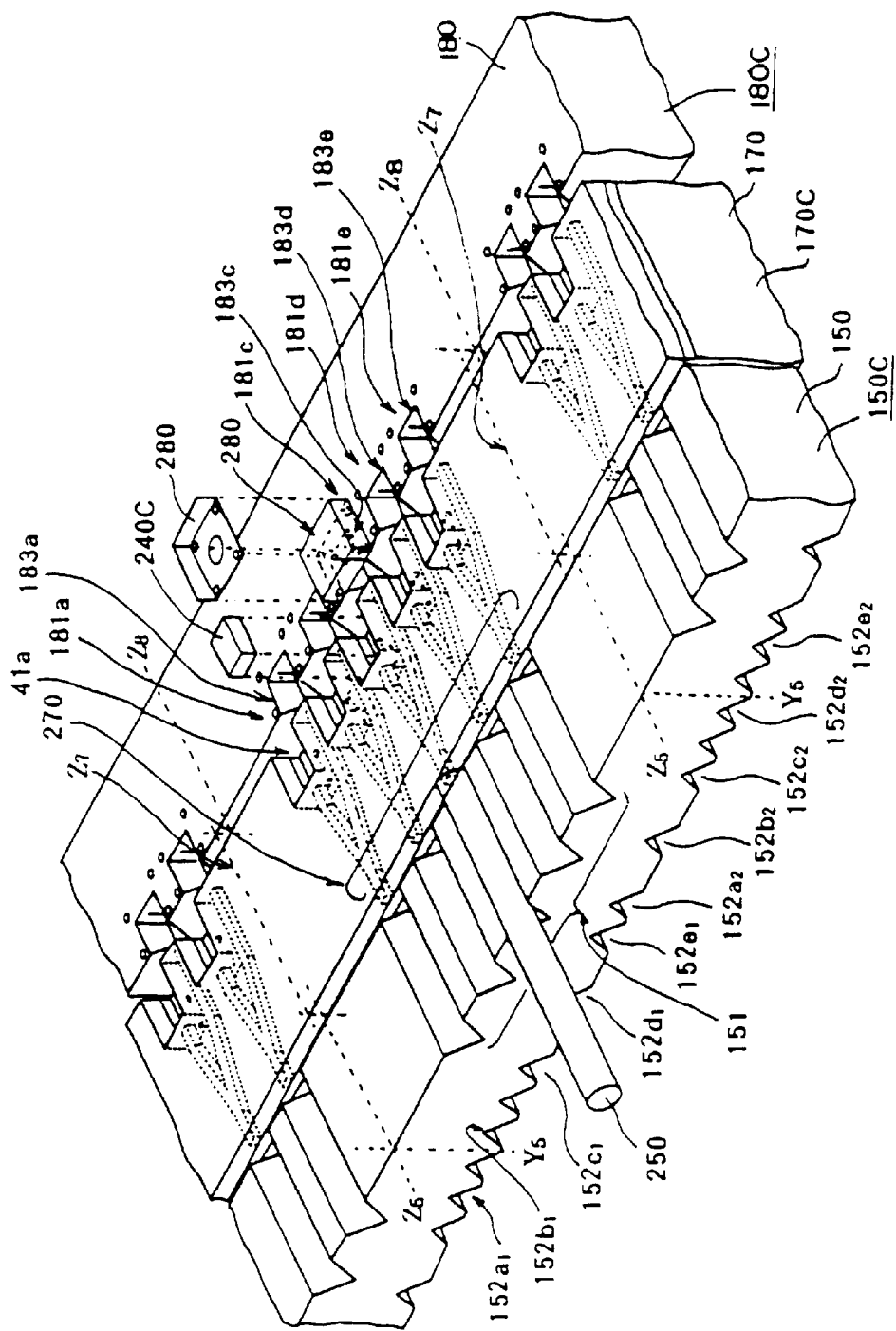
FIG. 85 is a diagram showing the construction of an optical coupling structure according to a twenty-sixth embodiment of the present invention.

FIG. 85 shows the construction of an optical coupling structure according to a twenty-sixth embodiment of the present invention, wherein those parts corresponding to the parts described heretofore are designated by the same reference numerals and the description thereof will be omitted.

Referring to FIG. 85e the optical coupling structure uses three separate sub-carriers for coupling the optical fiber 250e a Y-shaped optical waveguide 270e the laser diode 240C and a planar photodiode 280, such that the optical fiber 250 is coupled to a single end of the optical waveguide 270, the laser diode 240C is coupled to one of the Y-shaped branches of the optical waveguide 270, and the photodiode 280 is coupled to the other of the Y-shpaped branches of the optical waveguide 270. Thereby, the optical fiber 250 is carried by the sub-carrier 150C described in FIG. 47 with reference to the eleventh embodiment, while the planar photodiode 280 is carried by a separate sub-carrier 180C including a Si substrate 180. Further, the optical waveguide 270 and the laser diode 240C are carried by another sub-carrier 170C including a Si substrate 170.

As noted above, the sub-carrier 170C carries not only the optical waveguide 270 but also the laser diode 240C. The laser diode 240C is mounted upon the bonding pad structure 41 on the sub-carrier 170C in a flip-chip process in optical alignment with one branch of the Y-shaped the optical waveguide 270. As the bonding pad structure, any of the bonding pad structure disclosed in FIG. 77 or FIG. 82 may be used. Alternatively, the bonding structure of any of FIGS. 84A–84C may be used.

Figure 86:
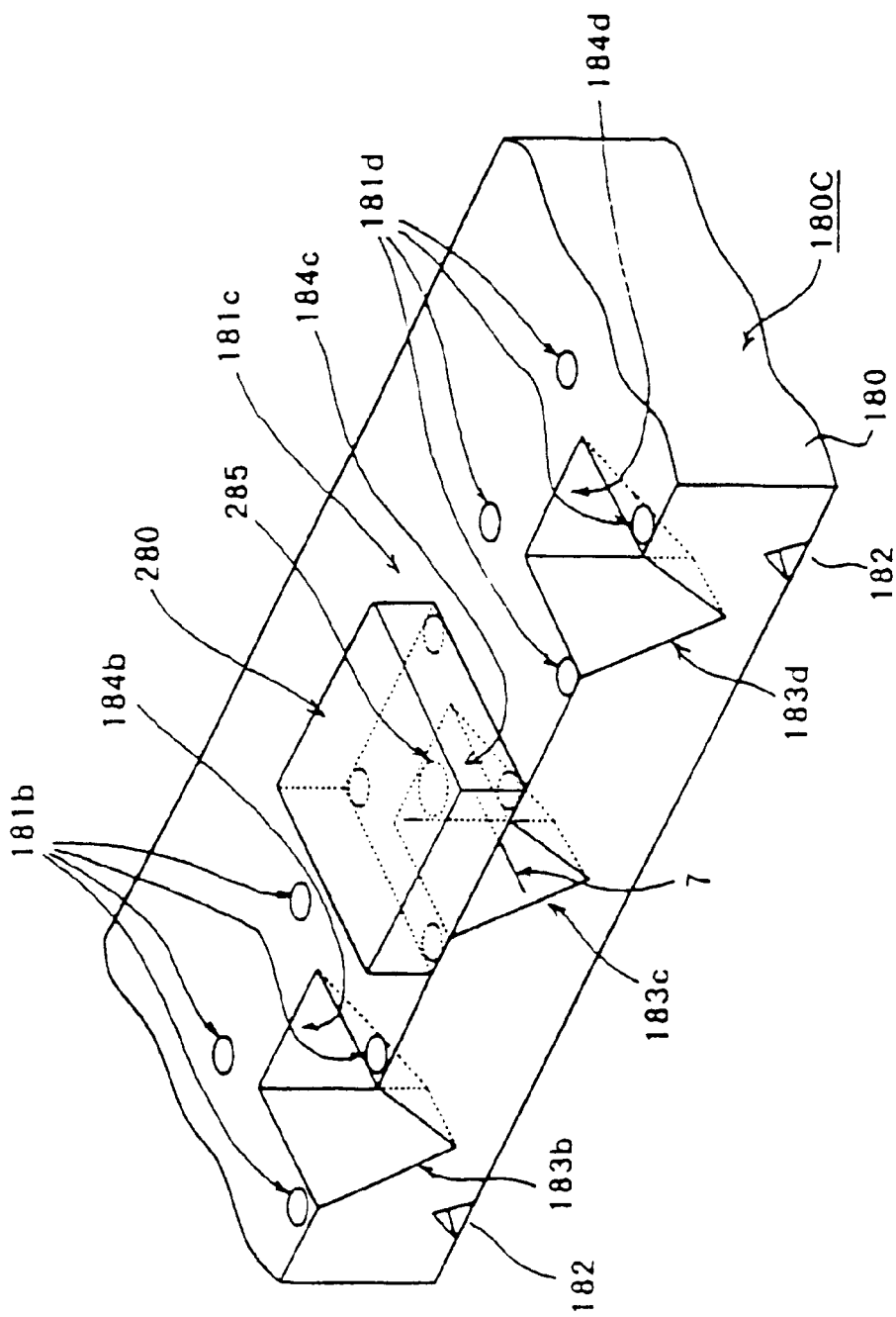
FIG. 86 is a diagram showing a part of the optical coupling structure of the twenty-sixth embodiment in detail.

The other branch of the Y-shaped optical waveguide is coupled optically to the photodiode 280 via the sub-carrier 180C of which construction is shown in detail in FIG. 86.

Figure 14A:
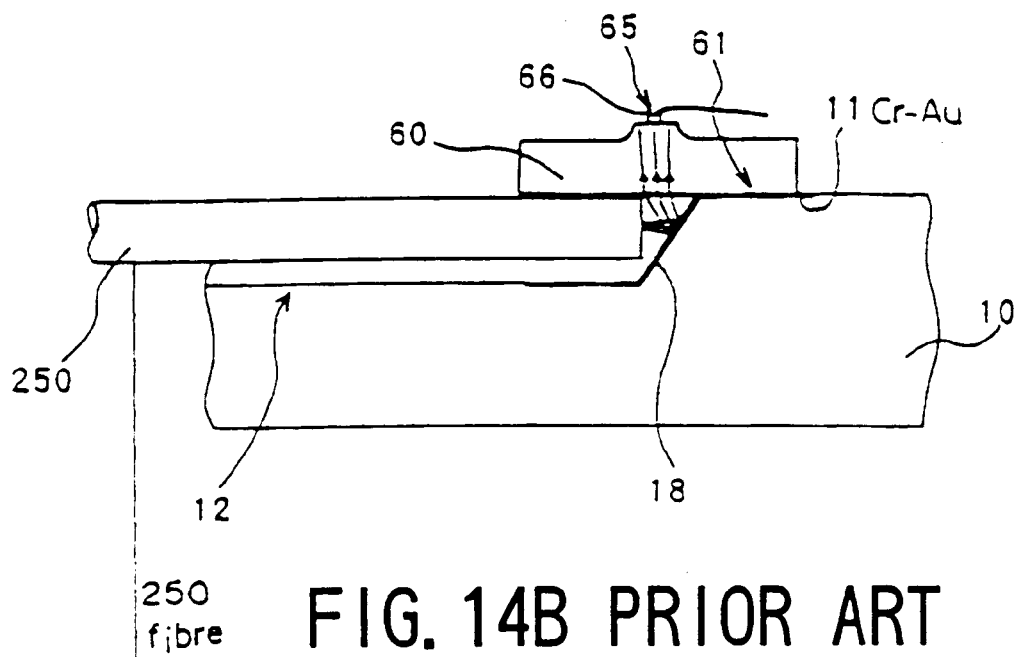
FIGS. 14A and 14B are diagrams showing a further example of a conventional optical coupling structure.
Figure 14B:
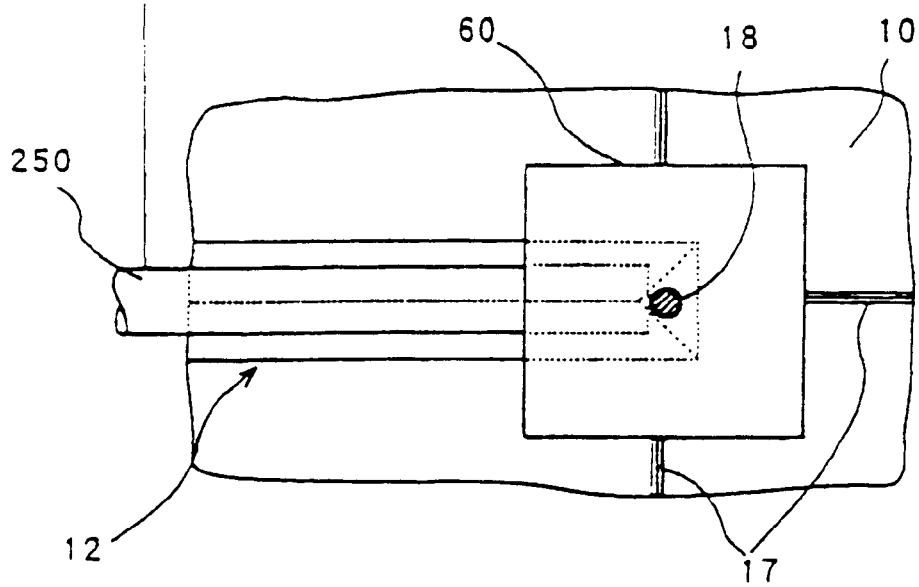
Figure 15A:
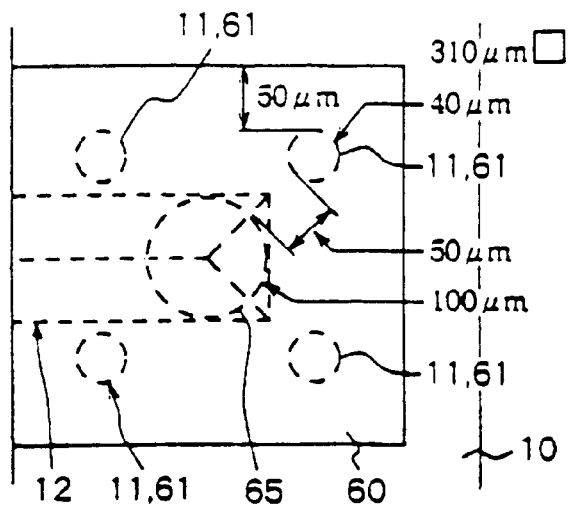
FIGS. 15A–15C are diagrams showing the details of the optical coupling structure of FIGS. 14A and 14B.
Figure 15B:
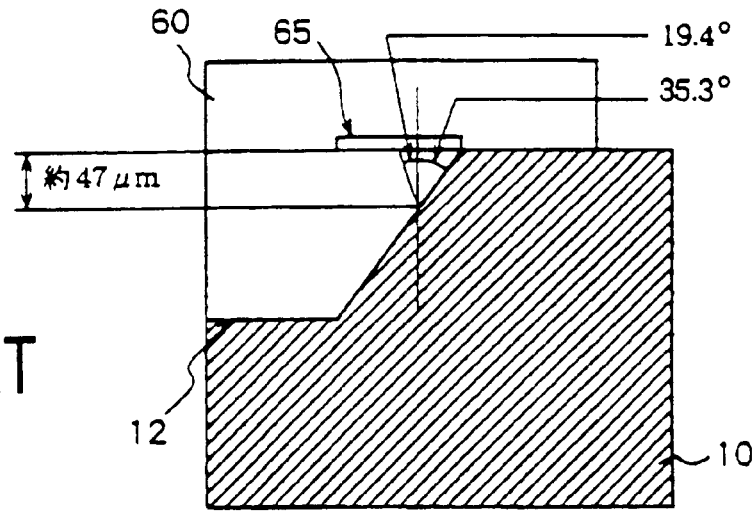
Figure 15C:
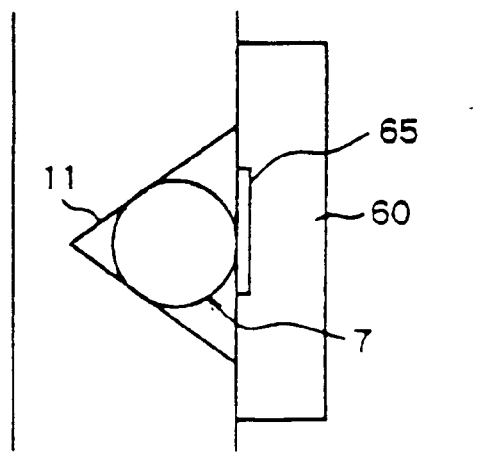
Figure 16:
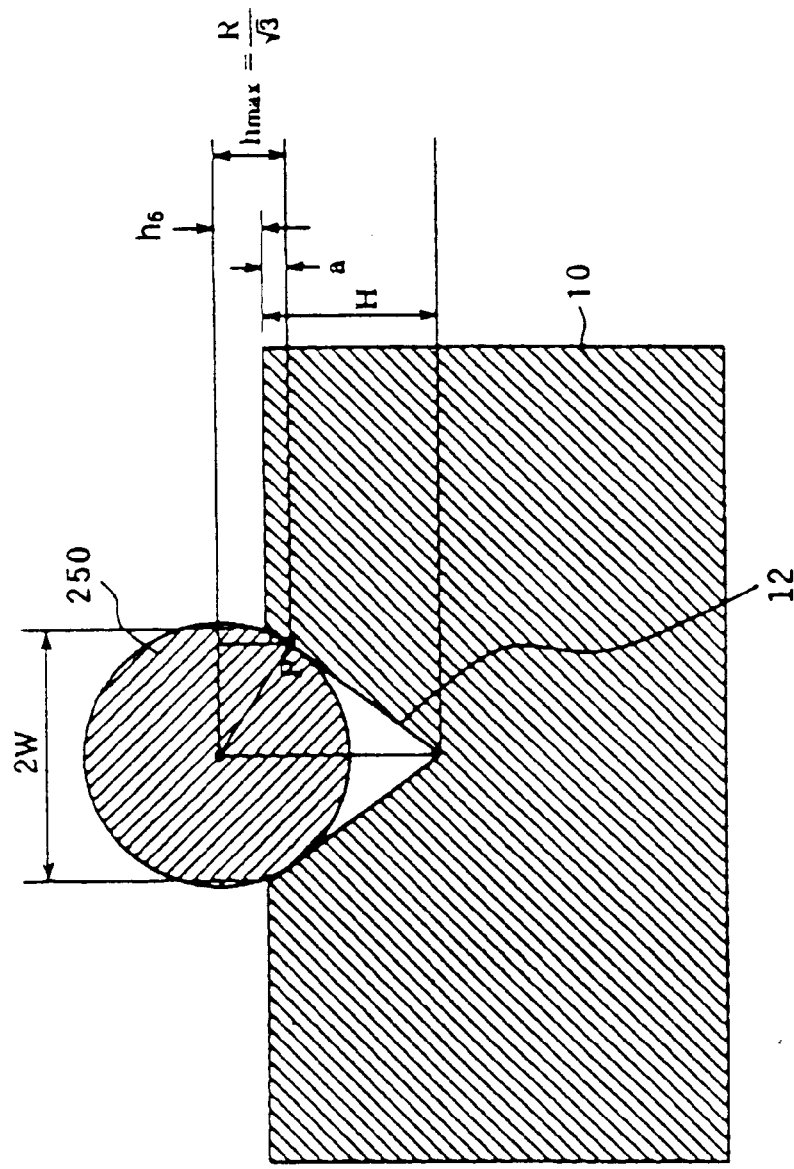
FIG. 16 is a diagram showing an engagement of an optical fiber with a V-shaped groove formed on a substrate.
Figure 17:
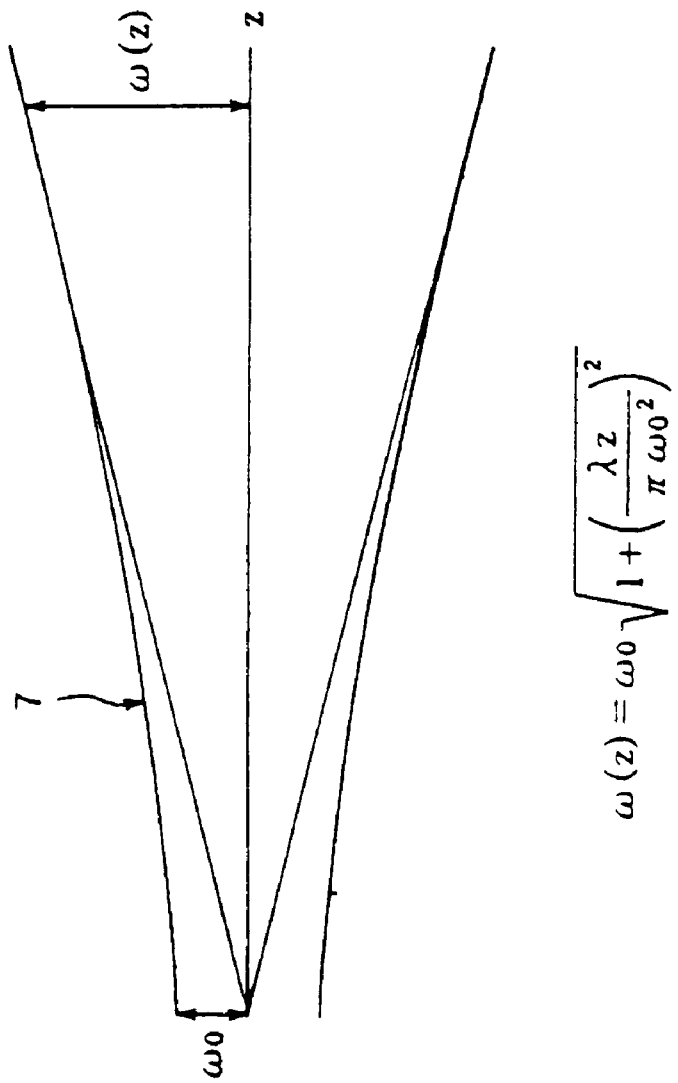
FIG. 17 is a diagram showing a beam divergence of an optical beam caused by a diffraction.
Figure 18:
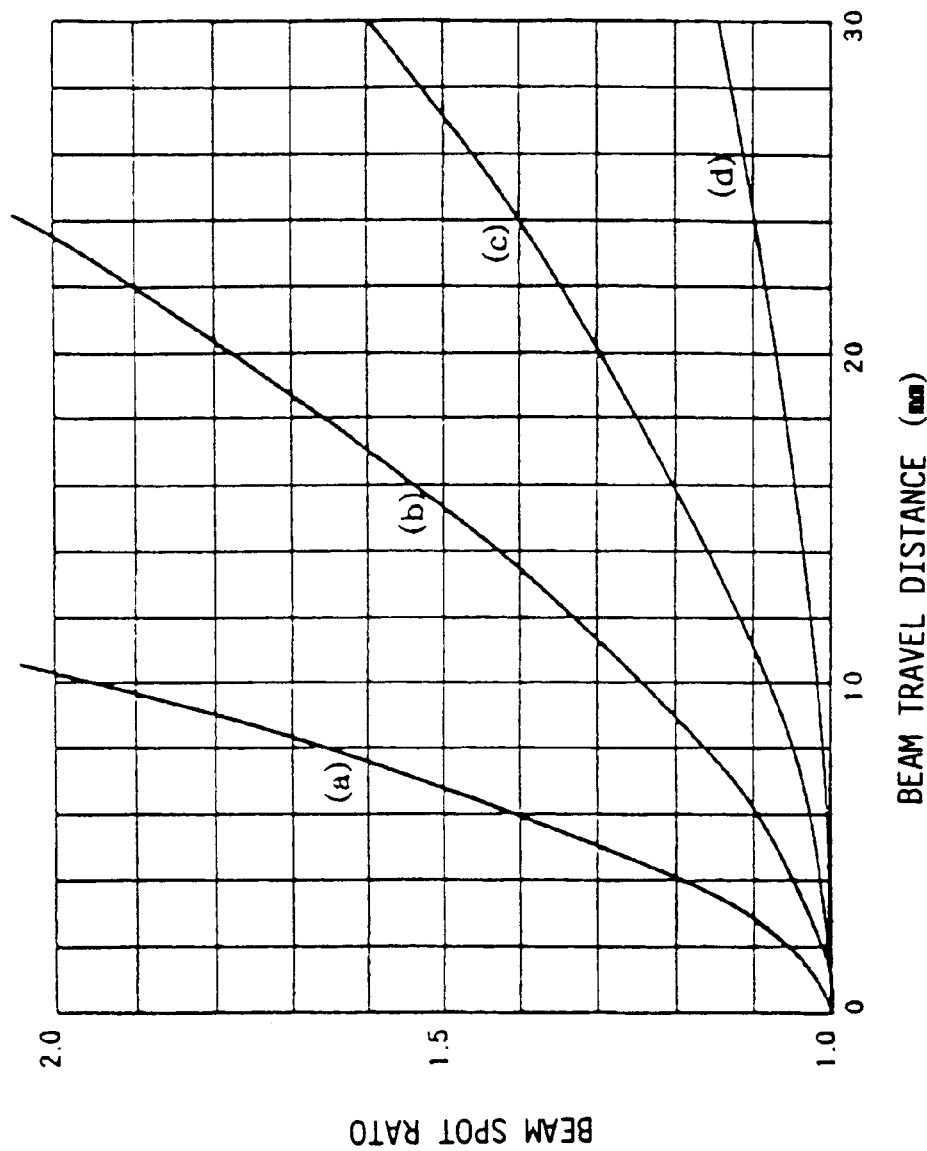
FIG. 18 is another diagram showing a beam divergence of an optical beam caused by a diffraction.
Figure 19:
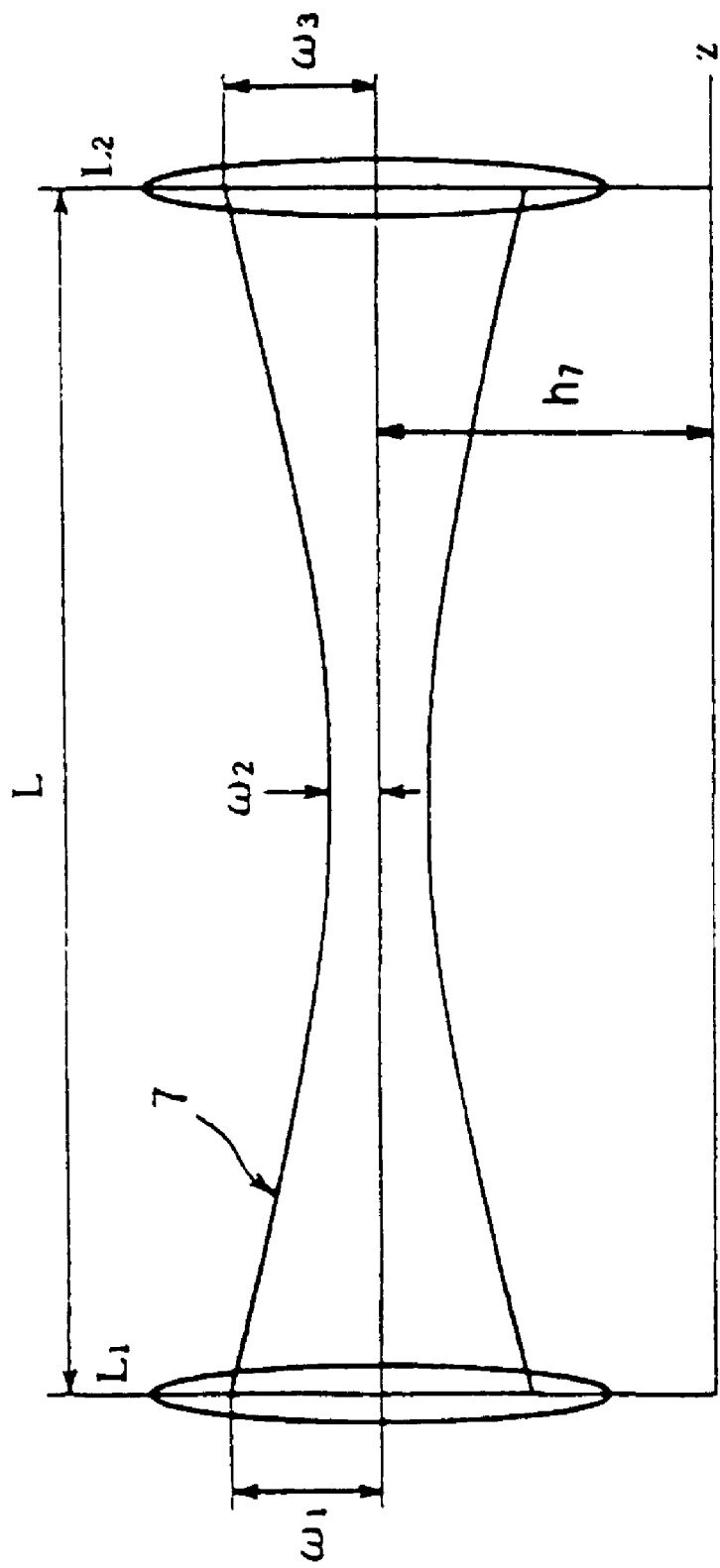
FIG. 19 is a diagram showing the change of a beam spot size of an optical beam traveling between a pair of lenses.
Figure 20:
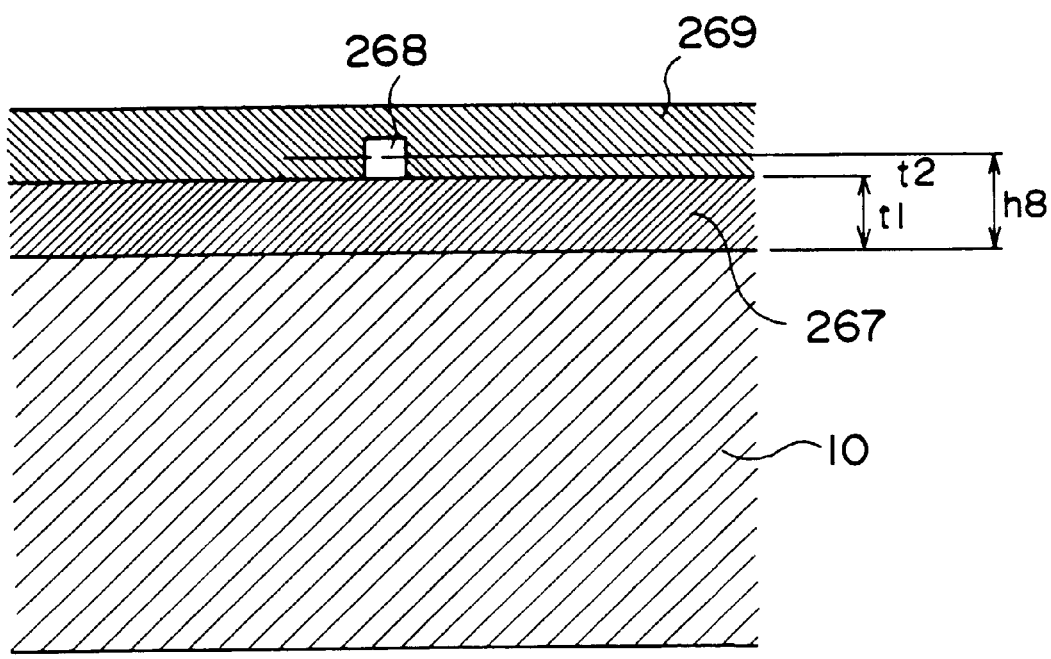
FIG. 20 is a diagram showing a cross-section of an optical waveguide.
Figure 21A:
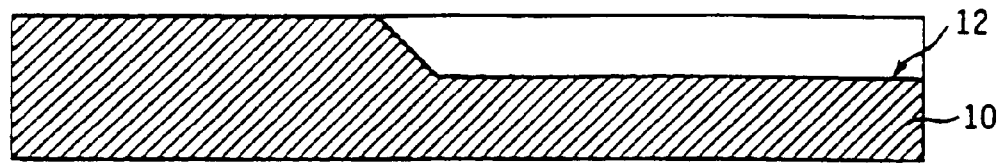
FIGS. 21A–21C are diagrams explaining the problem that arises when a patterning of a bonding pad is made on a substrate after forming a groove on the same substrate adjacent to the region where the bonding pad is to be formed.
Figure 21B:
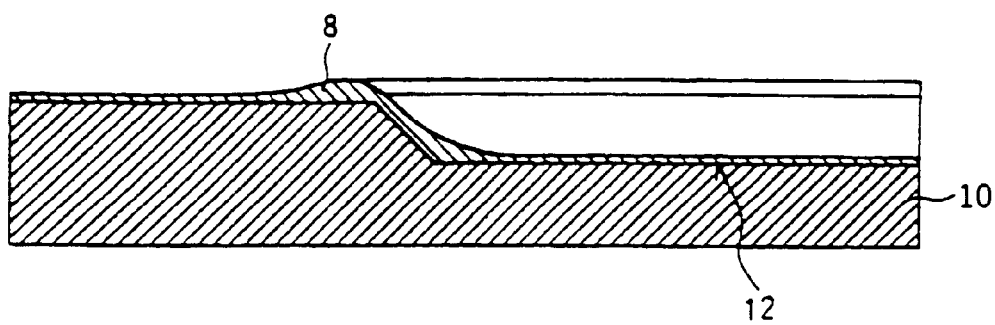
Figure 21C:
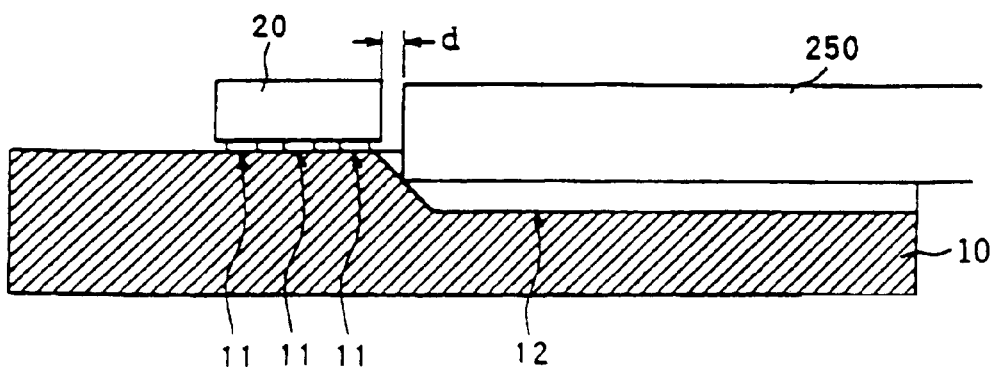

Referring to FIG. 86, the sub-carrier 180C carries on the Si substrate 180 a plurality of bonding pad structures 181b–181d similarly to the bonding pad structure 61 described previously with reference to FIG. 14A. Further, the sub-carrier 180C is formed with mirror surfaces 184b–184d respectively forming a part of the grooves 183a–183e, such that the optical beam emitted from the corresponding branch of the Y-shaped optical waveguide is reflected in the upward direction. Further, the planar photodiode 280 is mounted on selected one of the bonding pad structures 181b–181d, the bonding pad structure 181c in the illustrated case, according to a flip-chip process such that a photoreception area 285 of the photodiode 280 is located immediately above the groove 183c. It is preferable to increase the reflectance of the mirror surfaces 184b–184d by providing a metal coating thereon.

Figure 87A:
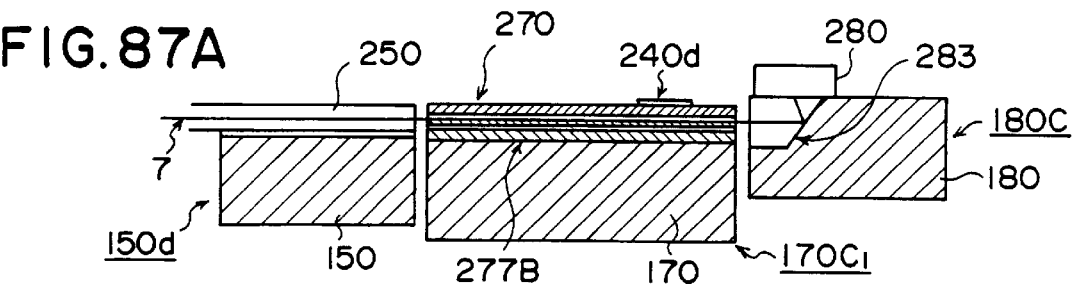
FIGS. 87A–87D are diagrams showing modifications of the optical coupling structure of the twenty-sixth embodiment in a cross-sectional view.

FIGS. 87A and 873 show the cross-section of the optical coupling structure of FIG. 86 respectively along the optical path passing through the branch coupled optically to the photodiode 280 and along the optical path passing through the branch coupled optically to a laser diode 240d corresponding to the laser diode 240C of FIG. 86.

Referring to FIG. 87A, the optical beam traveled along the optical fiber 250 and entered into the optical waveguide 270 is emitted from the edge surface of the optical waveguide branch and is reflected by a crystal surface 283 corresponding to the mirror surface 184 of FIG. 86 in the upward direction toward the photodiode 280. In the second branch, on the other hand, the optical beam emitted from the laser diode 240d impinges upon the core layer of the optical waveguide 270, while the optical beam thus entered into the optical waveguide 270 is further coupled to the optical fiber 250. As noted already, the laser diode 240d is flip-chip mounted on the bonding pad structure 41 formed on the buffer layer 277B corresponding to the buffer layer 267B of FIG. 77 or FIG. 84A.

Figure 87B:
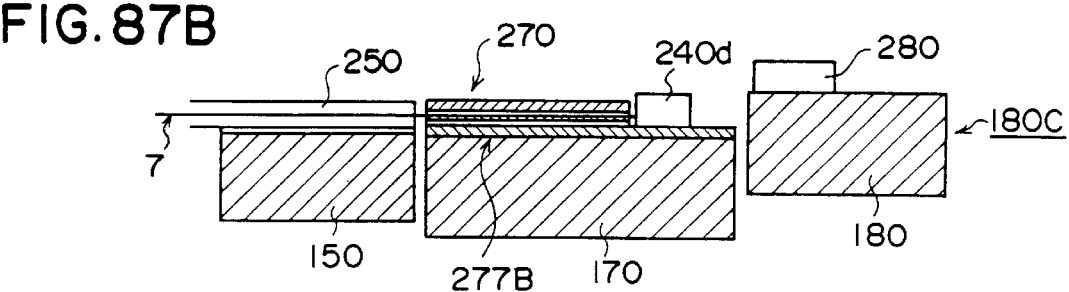
Figure 87C:
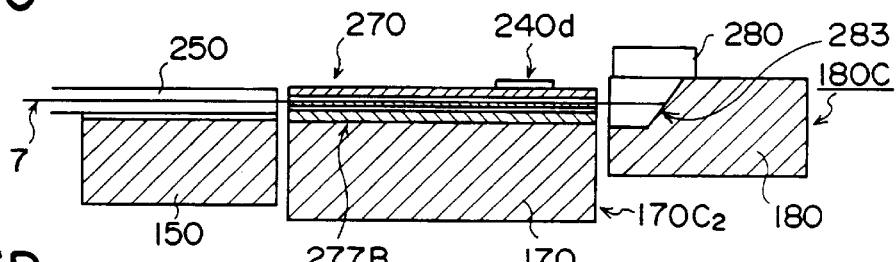
Figure 87D:
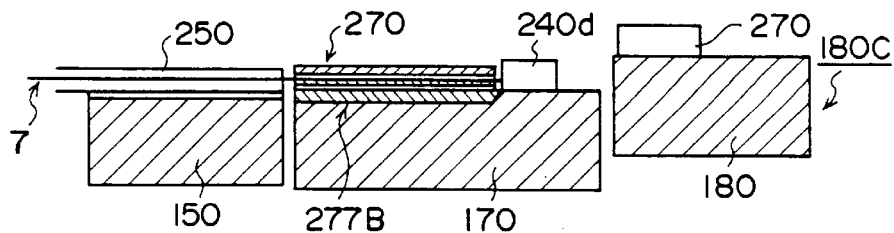

FIGS. 87C and 87D are diagrams similar to those of FIGS. 87A and 87B, except that the sub-carrier 170C is formed with a groove filled with a buffer layer in correspondence to the groove 167 of FIG. 82.

As other aspects of the embodiment of FIGS. 87C and 87D are apparent from the foregoing description, further description thereof will be omitted.

FIGS. 88A–88F show the fabrication process of the sub-carrier 170C of the present embodiment.

Figure 88A:
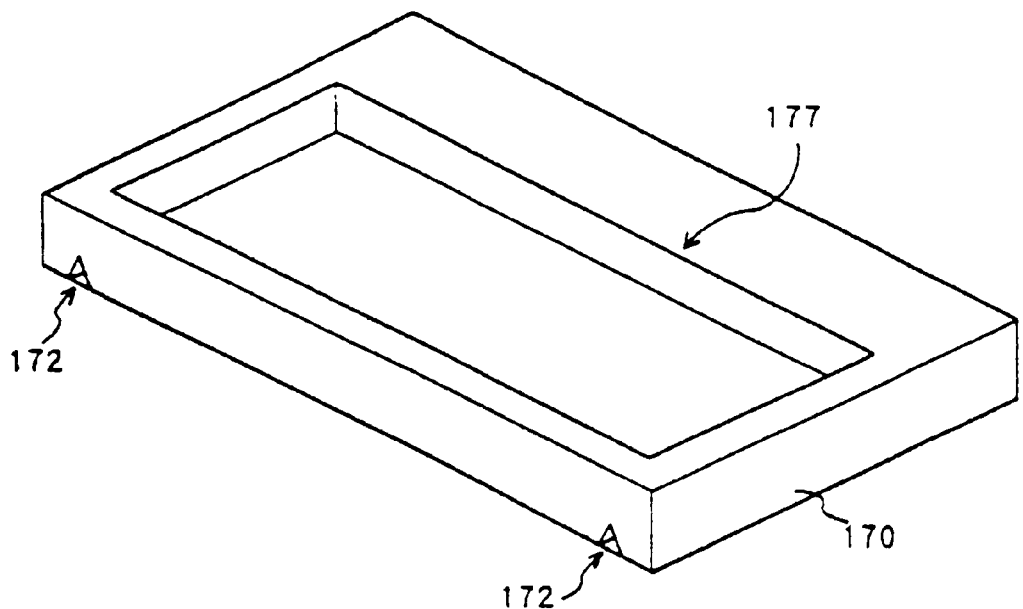
FIGS. 88A–88F are diagrams showing a fabrication process of the optical coupling structure of the twenty-sixth embodiment.
Figure 88B:
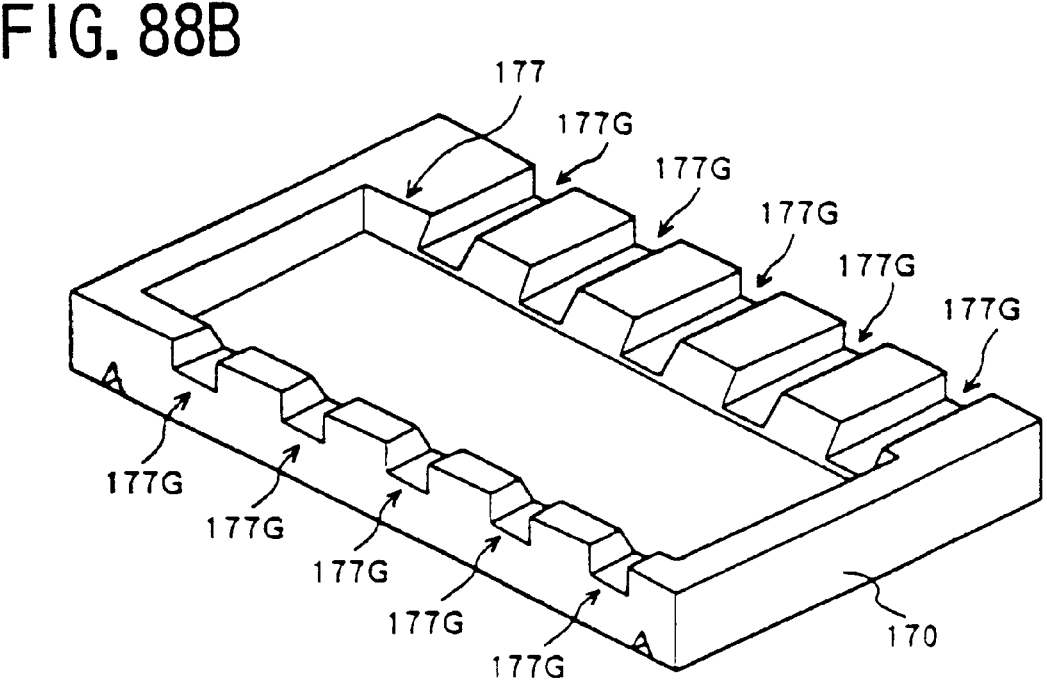

Referring to FIG. 88A, a Si substrate 170 carrying a thermal oxide film on the upper and lower principal surfaces thereof is subjected to a photolithographic patterning process conducted in a KOH aqueous solution to form a groove 177 corresponding to the groove 167 of the previous embodiment on the top side of the substrate 170. Further, V-shaped grooves 172 are formed on the bottom side of the Si substrate 170 as the engagement groove structure.

Next, in the step of FIG. 883B, grooves 177G are formed on the top side of the structure of FIG. 88A in correspondence to one of the Y-shaped branches of the optical waveguide to be formed. The grooves 177G may be formed by using a dicing saw.

Figure 88C:
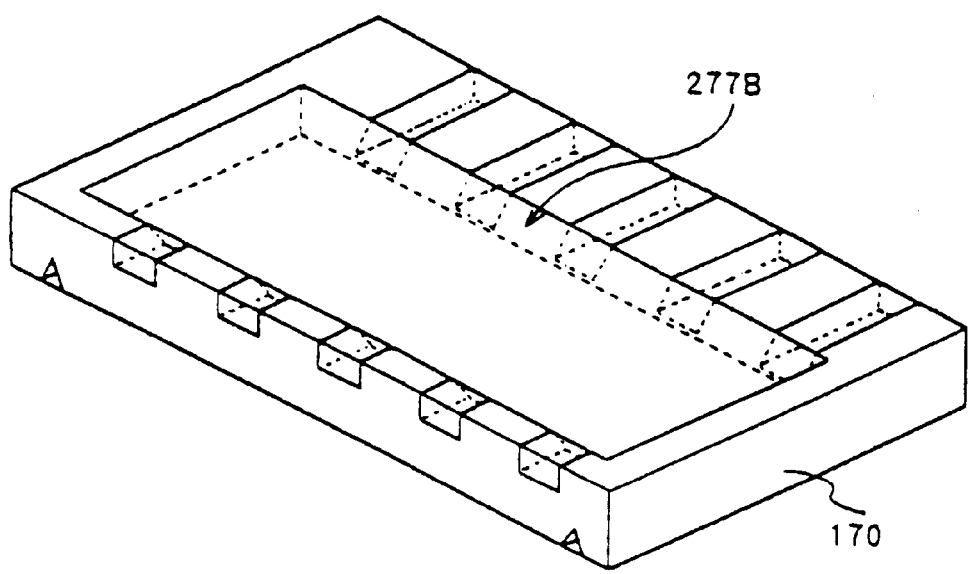

Further, in the step of FIG. 88C, the groove 177 and the grooves 177G are filled with the buffer layer 277B, followed by a polishing process such that the top surface of the buffer layer 2773 forms a flush surface with the rim part of the substrate 170. Similarly as before, the buffer layer 277B is formed of a transparent material having a refractive index smaller than the refractive index of the cladding layer 277H of the optical waveguide 270 to be formed.

Figure 88D:
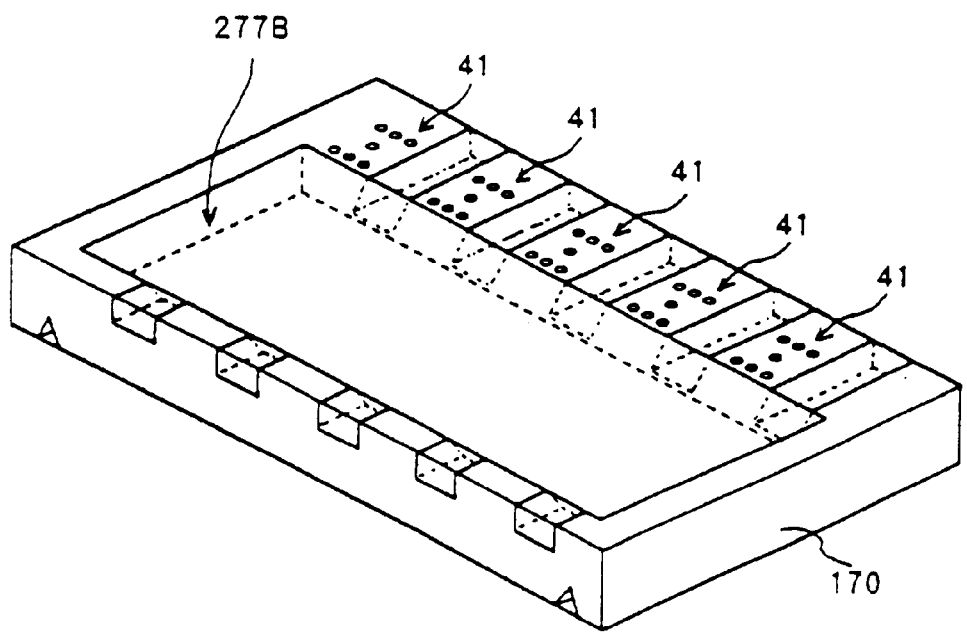

After the step of FIG. 88C, the bonding pad structures 41 are formed on the rim part of the structure of FIG. 88C as indicated in FIG. 88D.

Figure 88E:
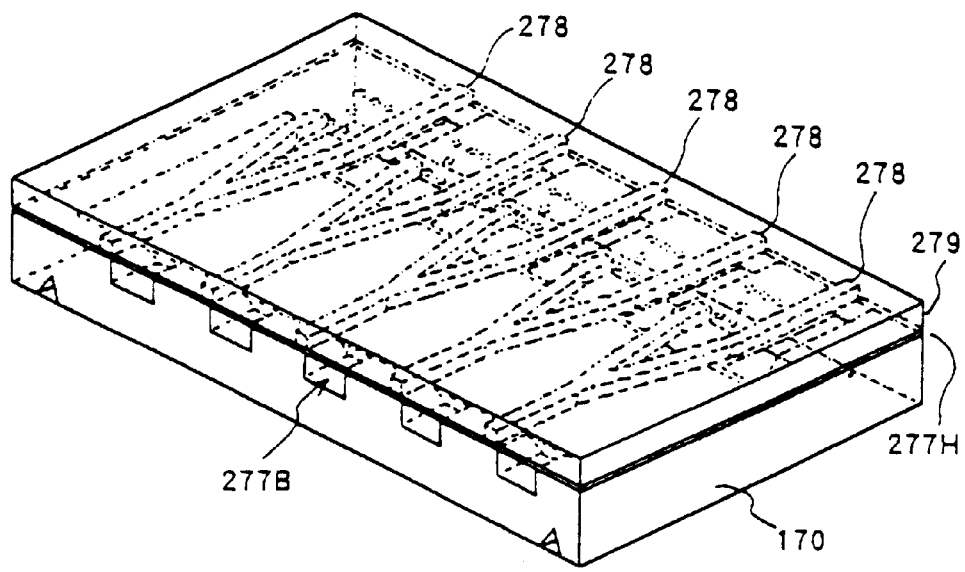

Next, a lower cladding layer 277H and a core layer 278 are deposited consecutively on the structure formed in the step of FIG. 88D, and the core layer 278 is further patterned according to the desired Y-shaped pattern by a photolithographic patterning process conducted in a oxygen plasma. Further, by depositing an upper cladding layer 279 such that the upper cladding layer 279 covers the Y-shaped core pattern 278, the structure of FIG. 88E is obtained.

Figure 88F:
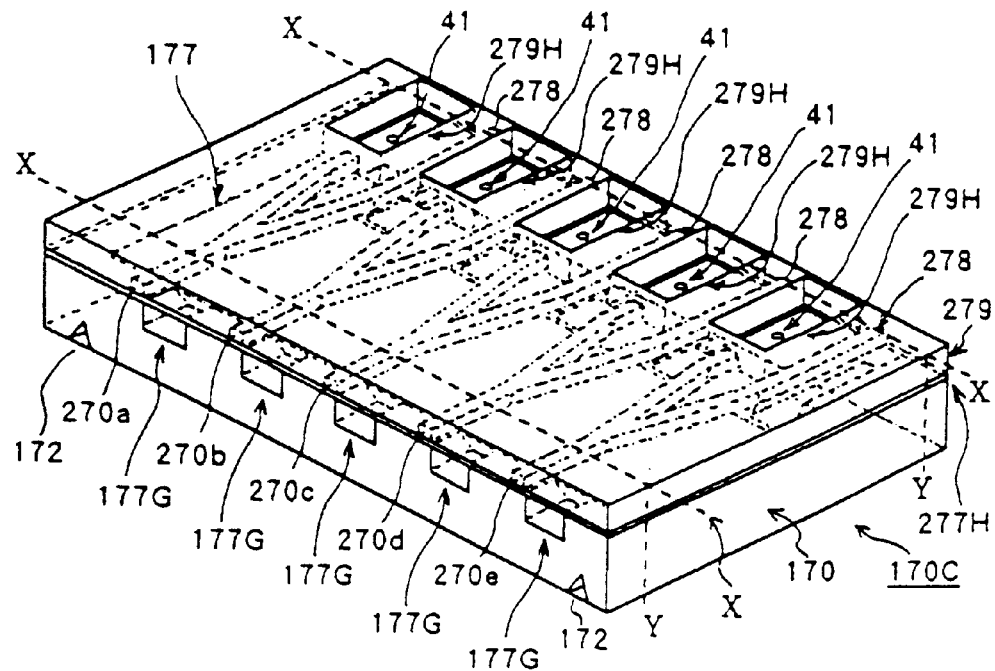

Further, in the step of FIG. 88F, the bonding pad structures 41 are exposed by applying a photolithographic patterning process using an oxygen plasma The structure thus obtained is then diced or cleaved along the dicing lines x—x.

Of course, it is possible to expose the edges of the optical waveguide 270 along the lines x—x in the step of FIG. 88F not by the cleaving process but by the photolithographic patterning process conducted in an oxygen plasma.

Figure 89A:
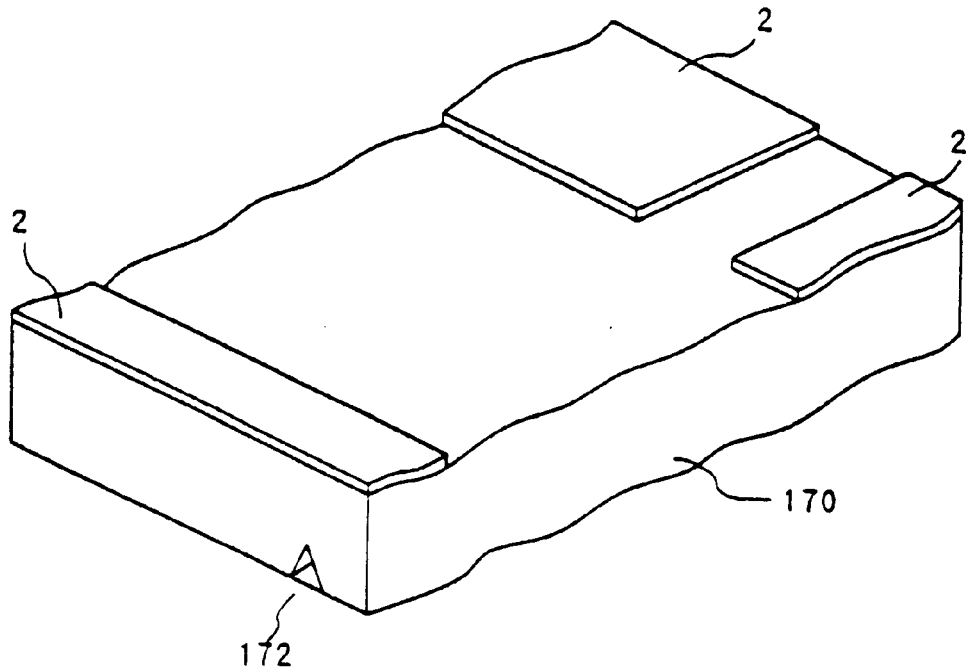
FIGS. 89A and 89B are diagrams showing a further modification of the optical coupling structure of the twenty-sixth embodiment.
Figure 89B:
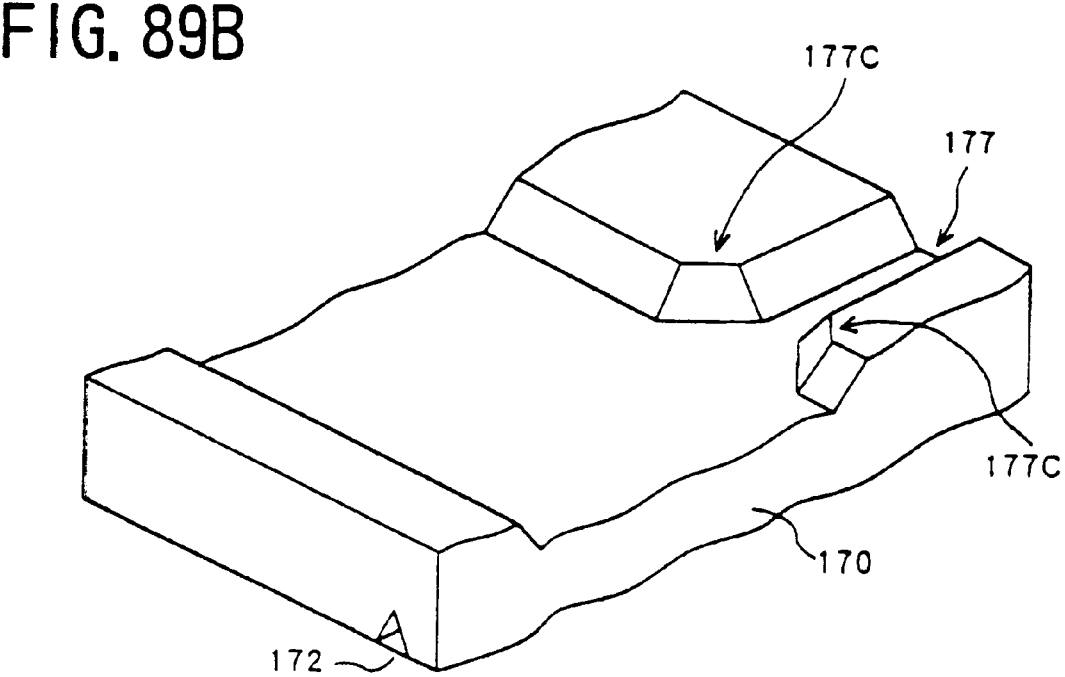

It should be noted that the groove 177 can be formed on the Si substrate 170 according to the process of FIGS. 89A and 89B.

Referring to FIG. 89A, the oxide film 2 covering the Si substrate 170 is patterned so as to expose the surface of the Si substrate 170. As indicated in FIG. 89A, the oxide film 2 is patterned so as to expose the part of the Si substrate 170 corresponding to the region where the optical waveguide branch for coupling with the planar photodiode 280 is to be formed.

Next, the substrate 170 thus masked is subjected to a wet etching process in a KOH aqueous solution to form the structure indicated in FIG. 89B. The structure of FIG. 89B is used in the step of FIG. 88C in place of the structure of FIG. 88B.

The alternative process of FIGS. 89A and 89B is useful as long as the existence of the chamfered surface 177C, formed as a result of the wet etching process, does not cause a problem In the present embodiment, the two branches of the Y-shaped optical waveguide may be formed with a separation of 250 μm. In this case, the optical waveguides 270 may be disposed laterally with a pitch of 500 μm. The buffer layer 277B may have a thickness of 30 μm.

It should further be noted that, as the bonding pad structure 41 is formed on the flat surface in the present embodiment, the photolithographic patterning process for forming the bonding pad structure 41 is facilitated substantially. Further, because of the fact that the oxygen plasma etching stops spontaneously upon the exposure of the bonding pad structure 41 and because of the fact that the lower cladding layer 277H to have a small thickness in view of the existence of the buffer layer 277B, it is possible to control the height of the optical axis of the Y-shaped optical waveguide 270 exactly.

Further, when the precision of formation of the bonding pad structure 41 is negotiable it is possible to form the optical waveguide 270 by stacking silicon oxide layers and by providing the bonding pad structure 41 after the patterning of the optical waveguide 270, similarly as before.

By arranging the sub-carriers 150C, 170C and 180C on a common substrate such as the substrate 100A explained before, it is possible to achieve the optical alignment between the optical fiber 250, the optical waveguide 270, the laser diode 240C and the planar photodiode 280, easily and with high precision.

TWENTY-SEVENTH EMBODIMENT

Figure 90:
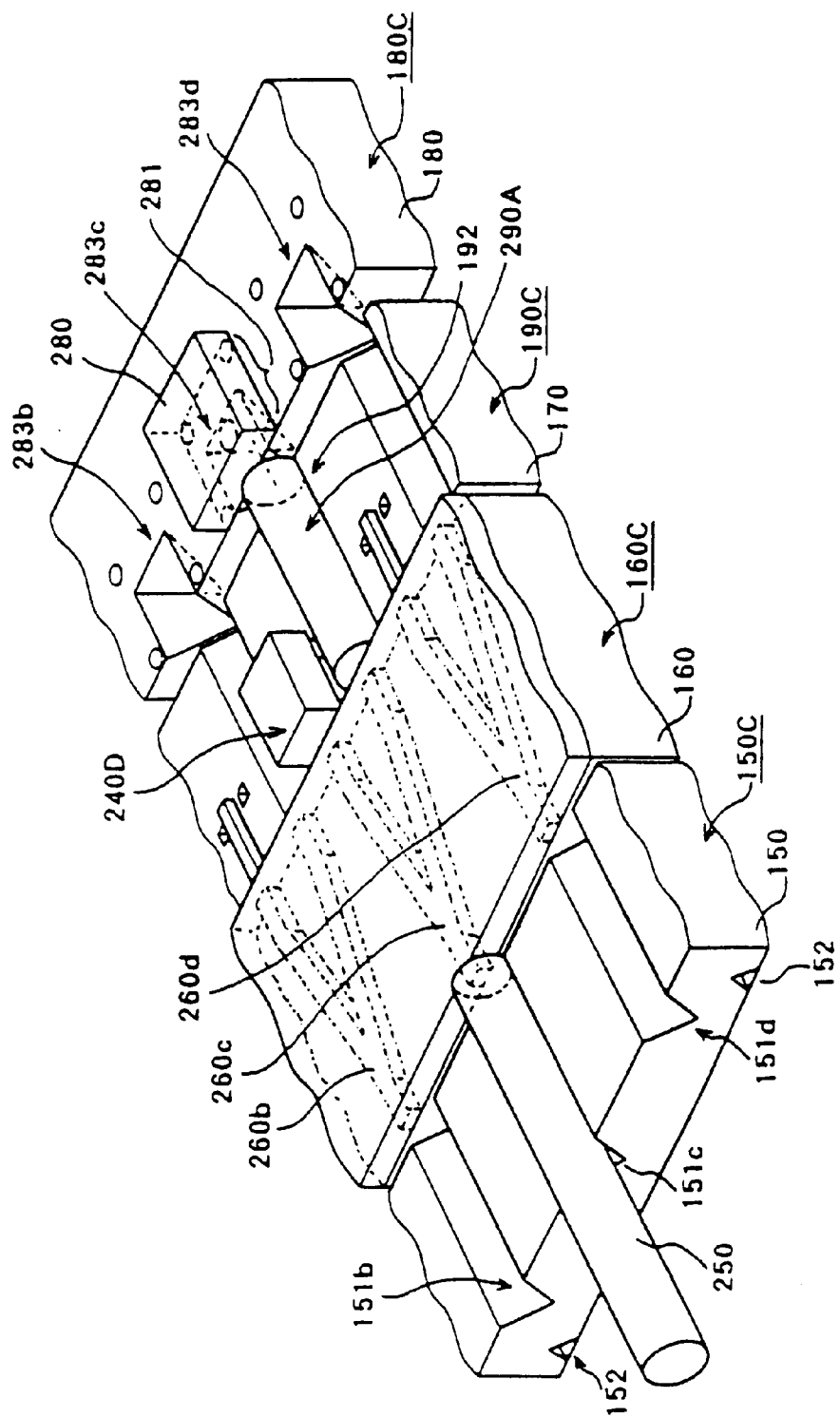
FIG. 90 is a diagram showing the construction of an optical coupling structure according to a twenty-seventh embodiment of the present invention.

FIG. 90 shows the construction of an optical coupling structure according to a twenty-seventh embodiment of the present invention.

Referring to FIG. 90, the optical coupling structure includes, in addition to the sub-carrier 150C carrying the optical fiber 250, the sub-carrier 160C carrying the optical waveguide 260, the sub-carrier 180C carrying the planar photodiode 280 and a sub-carrier 190C carrying a laser diode 240D, such that the optical fiber 250 is coupled optically to an end of the Y-shaped optical waveguide 260c constituting the optical waveguide 260 together with the Y-shaped optical waveguides 260b and 260d, such that the laser diode 240D is coupled to one of the Y-shaped branches of the optical waveguide 260c, and such that the photodiode 280 is coupled optically to the other branch of the Y-shaped optical waveguide 260c.

It should be noted that the sub-carrier 180C includes grooves 283b–283d corresponding to the grooves 183b–183d of FIG. 86e and the planar photodiode 280 is mounted in correspondence to selected one of the grooves, the groove 283c in the illustrated example.

In the present embodiment, the laser diode 240D is mounted on the sub-carrier 190C different from the sub-carrier 160C, in optical alignment with one of the two branches of the Y-shaped optical waveguide 260c. Further, the substrate 190 forming the sub-carrier 190C is formed with a groove 192 and a cylindrical optical interconnection element 290A is mounted on such a groove 192 in optical alignment with the other branch of the Y-shaped optical waveguide 260c at a first end of the element 290A and further in optical alignment with the groove 283c at the other end of the element 290A. Thereby, the optical beam in the Y-shaped optical waveguide 260c is injected into the planar photodiode 280 on the groove 283c efficiently after reflection by a mirror surface of the groove 283c.

As the constructions of the sub-carriers 150C and 160C are described already further description thereof will be omitted. Further, the sub-carriers 150C and 160C of the present embodiment may be formed according to any other embodiments of the present invention.

It should be noted that the cylindrical element 290A is preferably formed of an optical fiber having a graded index profile with a core diameter of 50 $\mu$m. However, it is also possible to use a single mode optical fiber or a multi-mode optical fiber for this purpose. Alternatively, the element 290A may be formed of a cylindrical lens having a distributed refractive index profile similar to the lens 230 described before.

According to the present embodiment, the sub-carrier 160C is used exclusively for carrying the optical waveguide 260. Thus, the fabrication of the sub-carrier 160C is substantially facilitated. of In the construction of FIG. 90e it is possible to replace the optical interconnection element 290A may be replaced by a single-mode or multi-mode optical waveguide as represented in FIGS. 91A–91C.

Figure 91A:
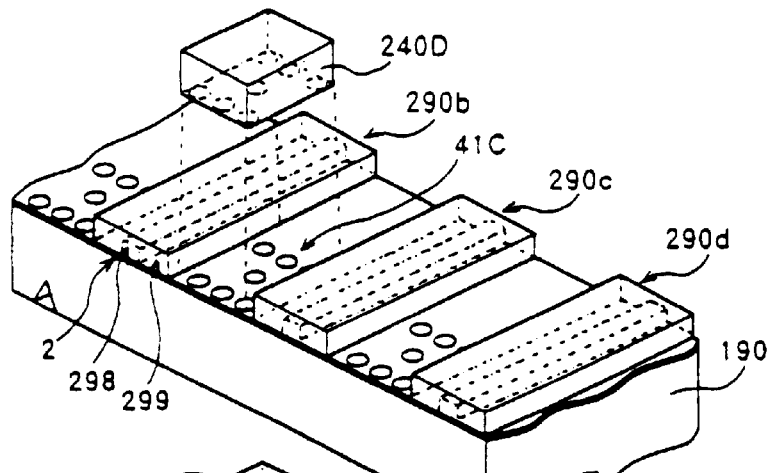
FIGS. 91A–91C are diagrams showing various modifications of the optical coupling structure of the twenty-seventh embodiment.

In the example of FIG. 91A optical waveguides 290b–290d are formed on the flat top surface of the substrate 190 covered by an oxide film, with the bonding pad structures 41C intervening therebetween, wherein each of the optical waveguides 290b–290d includes a core 298 of which height or thickness is set to 11 $\mu$m such that the height of the optical axis of the core 298 coincides with the height of about 5.5 $\mu$m of the optical axis of the laser diode 240D. Further, it should be noted that the height or thickness of the core 298 can be increased further when the laser diode 240D is mounted according to the procedure explained in the tenth embodiment of the present invention with reference to FIG. 45A. In such a case, the optical coupling between the core 298 and the optical waveguide 260 is substantially facilitated due to the increased thickness of the core 298.

Figure 91B:
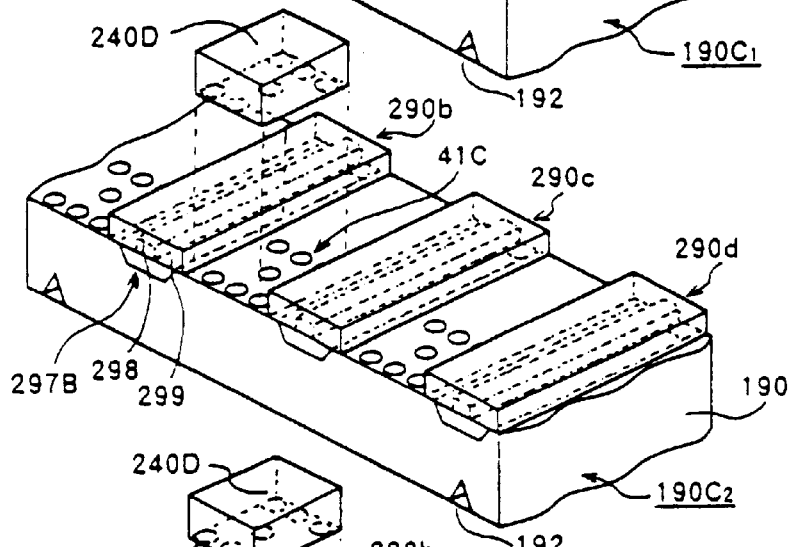

FIG. 91B shows the case in which the optical waveguide 290b is formed to have a structure similar to the optical waveguide 260 of FIG. 82. Thus, the substrate 190 is formed with a groove along each of the optical waveguides 290b–290d and a buffer layer 297B fills the groove thus formed with a thickness of 6 $\mu$m. The core 298 of the optical waveguide is thereby formed with a thickness of 7 $\mu$m. Although not illustrated an insulation film of silicon oxide or silicon nitride is disposed between the substrate 190 and the bonding pad structure 41. The optical waveguides 290b–290d may be formed of a multi-mode optical waveguide. Similarly, as before, the height or thickness of the core 298 can be increased further when the laser diode 240D is mounted according to the procedure explained in the tenth embodiment of the present invention with reference to FIG. 45A. In such a case, the optical coupling between the core 298 and the optical waveguide 260 is substantially facilitated due to the increased thickness of the core 298.

Figure 91C:
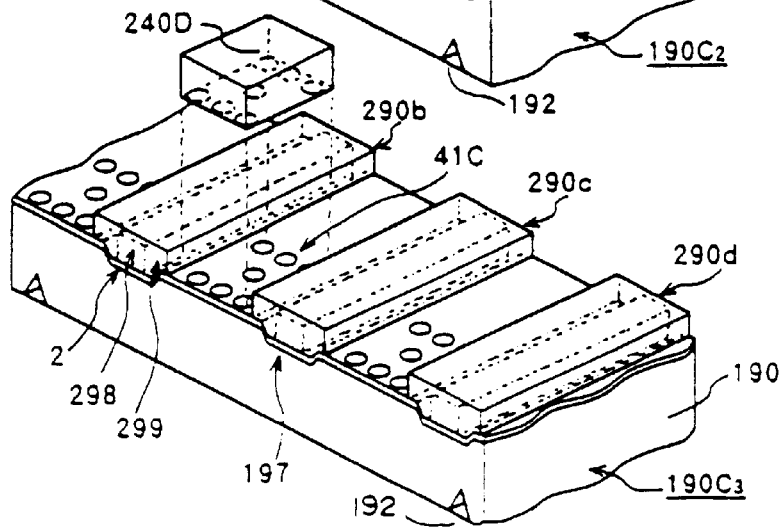

FIG. 91C shows the case in which a groove 197 is formed in the substrate 190 similarly to the embodiment of FIG. 91B, and the multi-mode optical waveguides 290b–290d are formed such that the thick core layer 298 thereof reaches the bottom of the groove 197. For example, the thickness of the core layer 298 can reach as much as 51 $\mu$m by forming the groove 197 with a thickness of 20 $\mu$m. Again, the present embodiment is advantageous for facilitating the optical coupling with the optical waveguide 260 on the sub-carrier 260C due to the increased thickness of the core 298.

TWENTY-EIGHTH EMBODIMENT

Figure 92:
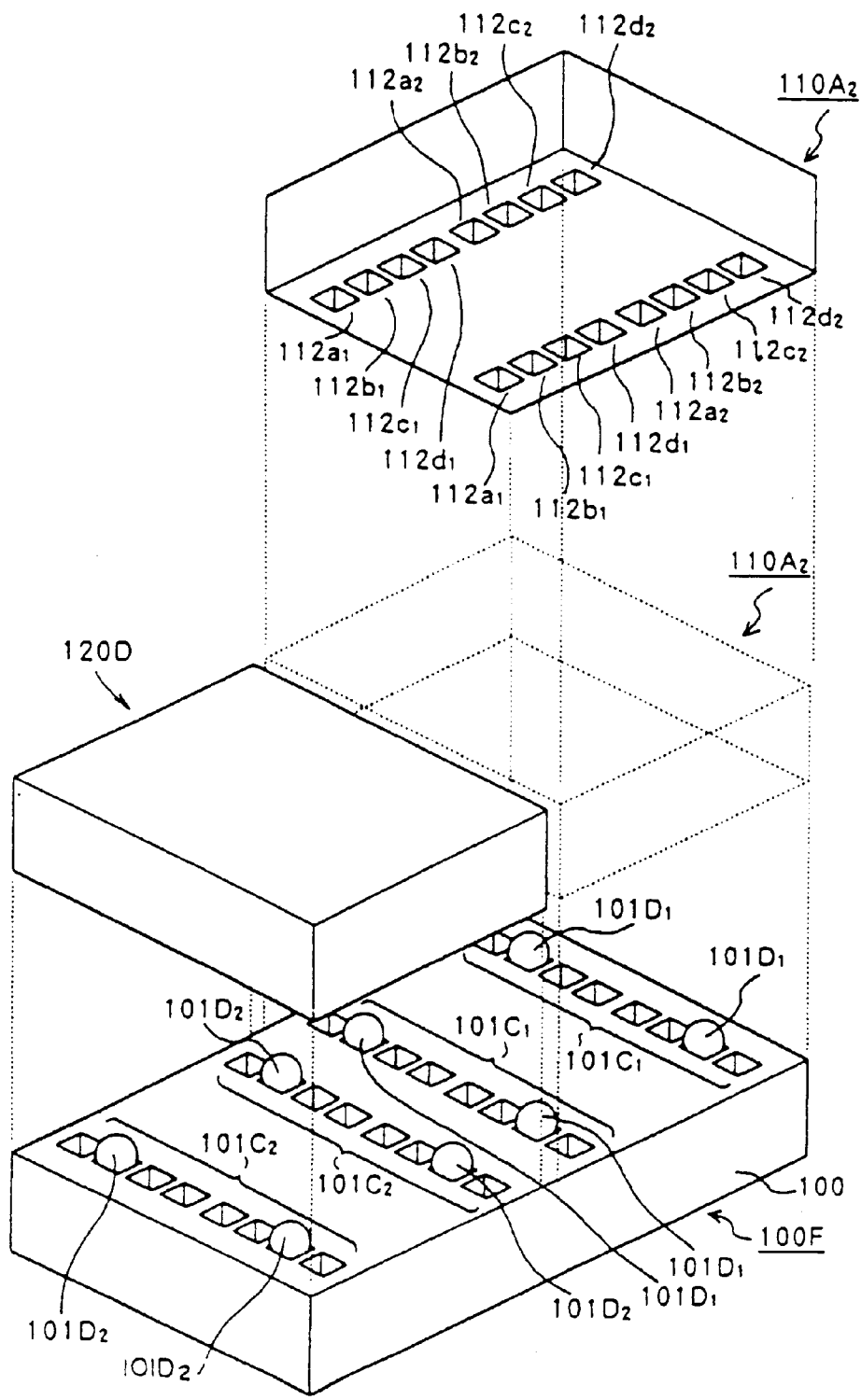
FIG. 92 is a diagram showing the construction of an optical coupling structure according to a twenty-eighth embodiment of the present invention.

FIG. 92 shows the construction of an optical coupling structure according to a twenty-eighth embodiment of the present invention.

Referring to FIG. 92, the optical coupling structure of the present embodiment includes a common substrate 100F formed of the Si substrate 100, and groove structures 101C$_1$ and 101C$_2$ are formed on the top surface of the substrate 100.

Each of the groove structures 101C$_1$ and 101C$_2$ includes a plurality of etch pits of an inverted pyramidal shape with different sizes for engagement with a spherical engagement member 101D$_1$ or 101D$_2$ having a predetermined diameter. Further, similar etch pits 112a$_1$–112d$_1$ and 112a$_2$–112d$_2$ are formed on a bottom surface of a sub-carrier 110A$_2$ or 120D with various sizes. The sub-carrier 110A$_2$ or the sub-carrier 120D is thereby mounted on the common substrate 100F in the state that the spherical engagement members 101D$_1$ or 101D$_2$ engage with the etch pits selected from the foregoing etch pits 112a$_1$–112d$_1$ and 112a$_2$–112d$_2$.

Thereby, by merely changing the size of the grooves forming the groove structure 101C$_1$ or 101C$_2$ or the etch pits 112a$_1$–112d$_1$ and 112a$_2$–112d$_2$ or by changing the diameter of the spherical engagement members 101D$_1$ or 101D$_2$, it is possible to adjust the height of the sub-carrier 110A$_2$ or the sub-carrier 120D with respect to the common substrate 100F.

TWENTY-NINTH EMBODIMENT

Figure 93A:
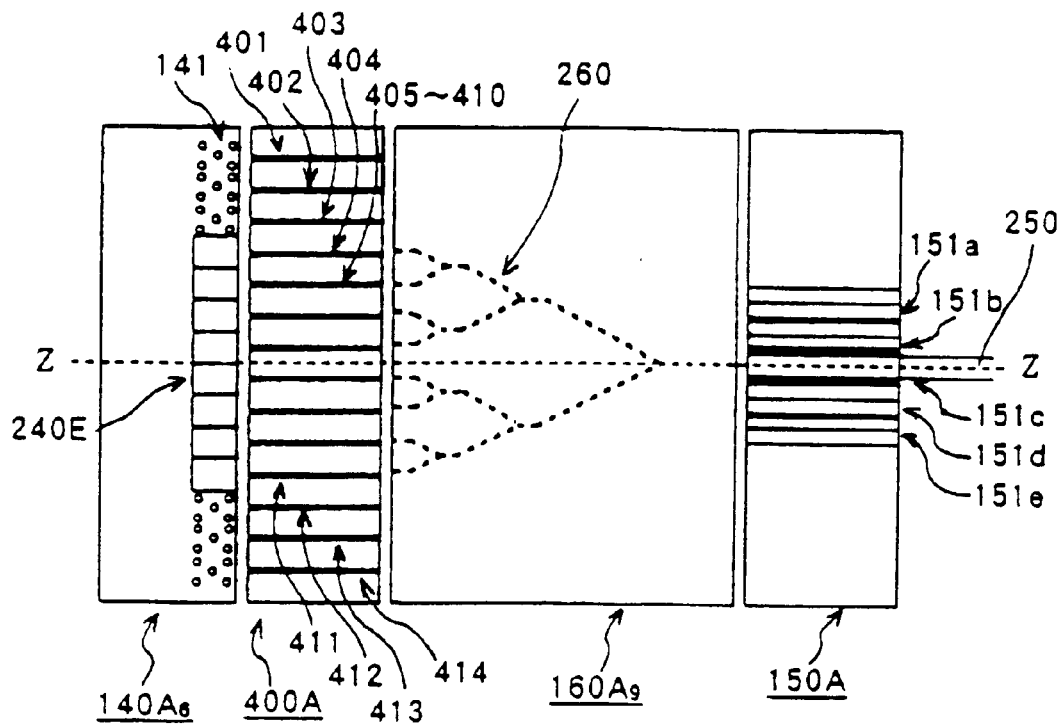
FIGS. 93A and 93B are diagrams showing the construction of an optical coupling structure according to a twenty-ninth embodiment of the present invention.
Figure 93B:
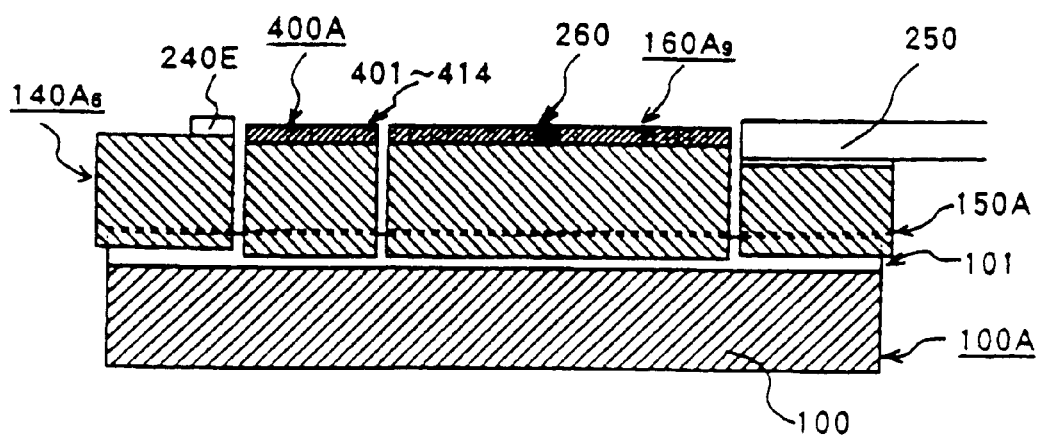

FIGS. 93A and 93B show the construction of an optical coupling structure according to a twenty-ninth embodiment of the present invention respectively in a plan view and a cross-sectional view taken along a line z—z of FIGS. 93A.

Referring to FIGS. 93A and 93B, the optical coupling structure of the present embodiment includes, in addition to the common substrate 100 and the sub-carrier 150A carrying the optical fiber 250 a sub-carrier 140A$_6$ similar to the sub-carrier 140A except that the sub-carrier 140A$_6$ carries a laser diode array 240E on the bonding pad structure 141, a sub-carrier 400A carrying optical modulators 401–414 of the waveguide type, and a sub-carrier 160A$_9$ similar to the sub-carrier 160A except that the sub-carrier 160A$_9$ carries the optical waveguide 260. In the optical waveguide 260 of the present embodiment, two branches of the optical waveguide merge with each other to form a single branch, which in turn merges with a similar branch to form a single branch. In all, eight branches are merged into a single branch forming an output branch.

By using the laser diodes having different oscillation wavelengths for the laser diode array 240E, it is possible to construct an optical source for a wavelength multiplex telecommunication.

In the construction of FIGS. 93A and 93B, one may use an optical amplifier in place of the optical waveguides 401–414.

It should be noted that each of the sub-carriers of the present embodiment is formed with an engagement groove structure similar to those described previously. In the present embodiment, it should be noted that only one optical waveguide pattern 260 is provided in view of the large lateral extension of the branched optical waveguide pattern 260. In order to achieve this, the location where the optical waveguide 260 to be formed is selected based on the result of measurement of the thickness of the substrate 160 and the thickness of the lower cladding layer of the optical waveguide 260 according to the procedure of FIGS. 94A–94D.

Figure 94A:
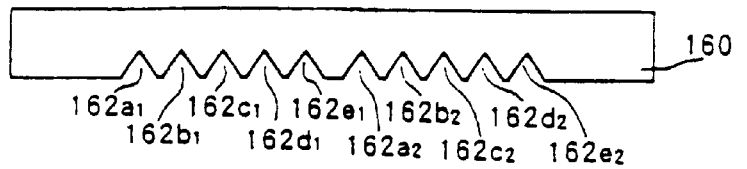
FIGS. 94A–94D are diagrams showing a fabrication process of the optical coupling structure of the twenty-ninth embodiment
Figure 94B:
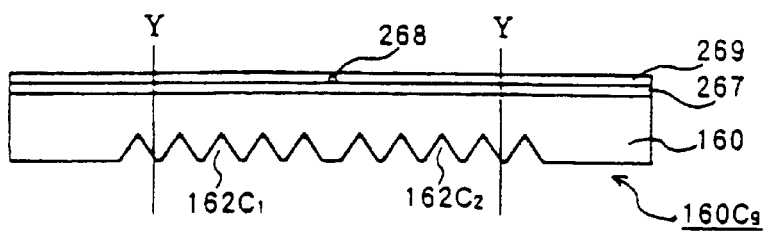

Referring to FIG. 94A, the engagement groove structure 162 including the grooves $162a_1$–$162e_2$ is formed on the bottom surface of the substrate 160, and the lower cladding layer 267 is applied in the step of FIG. 94B to the top surface of the substrate 160 and a measurement is made for the thickness of the lower cladding layer 267 thus formed. Further, the engagement groove to be used for engagement with the ridges 101 of the common substrate 100A is selected based upon the result of the measurement, In the illustrated case, the grooves $162c_1$ and $162c_2$ are selected.

Figure 94C:
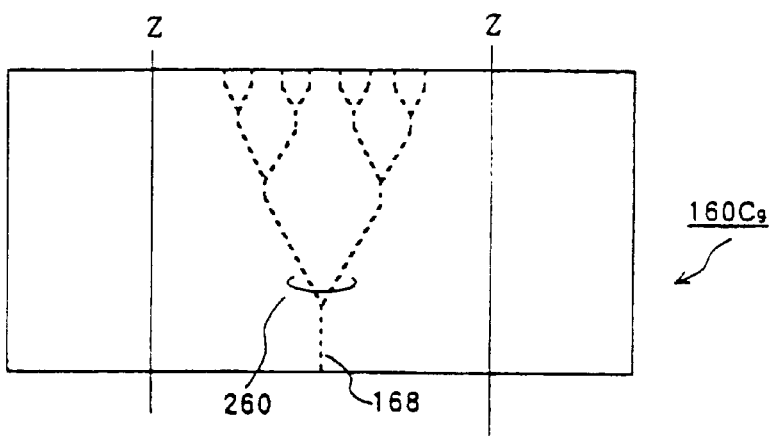

Further, the core layer 268 is deposited in the step of FIG. 94B so as to cover the lower cladding layer 267 and the core layer 268 is patterned such that a center of the branched core pattern to be formed coincides with the center of the grooves $162c_1$ and $162c_2$ as indicated in FIG. 94C. Next, the upper cladding layer 269 is deposited as indicated in FIG. 94B.

Figure 94D:
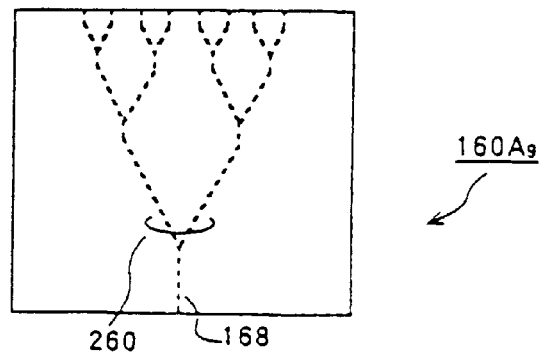

Further, the structure thus formed is diced in the step of FIG. 94D.

Further, the present invention is not limited to the embodiments described heretofore but various variations and modifications may be made without departing from the scope of the invention.

What is claimed is:

1. An optical coupling structure, comprising:
    a common substrate carrying a first engagement structure on a principal surface thereof;
    a first sub-carrier having a first principal surface and a second, opposing principal surface and mounted on said common substrate in a state that said second principal surface faces said principal surface of said common substrate,
    said first sub-carrier carrying a second engagement structure including a plurality of engagement elements on said second principal surface, such that one of said engagement elements engages with said first engagement structure when said first sub-carrier is mounted on said common substrate, said first sub-carrier carrying a first optical component on one of said first and second principal surfaces; and
    a second sub-carrier having a third principal surface and a fourth, opposing principal surface and mounted on said common substrate in a state that said fourth principal surface faces said principal surface of said common substrate, said second sub-carrier carrying a third engagement structure on said fourth principal such that said third engagement structure engages with said first engagement structure when said second sub-carrier is mounted on said common substrate, said second sub-carrier carrying a second optical component on one of said third and fourth principal surfaces;
    said plurality of engagement elements forming said second engagement structure having respective mutually different structures, such that a distance between said principal surface of said common substrate and said second principal surface is changed by selecting said engagement element from said second engagement structure for engagement with said first engagement structure,
    said engagement element being selected such that said first optical component aligns optically with said second optical component.

2. An optical coupling structure as claimed in claim 1, wherein said first sub-carrier carries, on said principal surface on which said first optical component is carried, an optical waveguide in a monolithic state, in addition to said optical component.

3. An optical coupling structure as claimed in claim 2, wherein said optical waveguide has a branched structure including at least a first branch and a second branch, and wherein said first optical component is held on said first sub-carrier in an optical coupling state with said first branch.

4. An optical coupling structure as claimed in claim 3, wherein said first sub-carrier further carries, on said principal surface on which said first optical component and said optical waveguide are provided, an optical interconnection member having first and second, opposite ends in optical alignment with said second branch such that said first end of said optical interconnection member faces an end of said second branch, said optical interconnection member passing an optical beam from said first end to said second end.

5. An optical coupling structure as claimed in claim 4, wherein said optical interconnection member is a cylindrical optical waveguide extending between said first and second ends, and wherein said optical interconnection member is provided in engagement with a groove formed on said principal surface of said first sub-carrier on which said first optical component and said optical waveguide are provided.

6. An optical coupling structure as claimed in claim 2, wherein said optical waveguide extends from a first end to an opposite, second end, said optical waveguide thereby transmitting an optical power from said first end to said second end without a substantial decrease of said optical power.

7. An optical coupling structure as claimed in claim 2, wherein said optical waveguide is formed of a multi-mode optical waveguide.

8. An optical coupling structure as claimed in claim 1, wherein said first optical component comprises an optical waveguide including a lower cladding layer, a core layer provided on said lower cladding layer and an upper cladding layer provided on said core layer, said first sub-carrier being provided with a depression filled with a transparent buffer layer having a refractive index equal to or smaller than a refractive index of said lower cladding layer, said optical waveguide being provided on said buffer layer, said buffer layer having a surface substantially flush to said principal surface of said first sub-carrier on which said first optical component is provided, said buffer layer being formed of an organic material, said lower cladding layer, said core layer and said upper cladding layer are formed respectively of organic materials, and wherein an inorganic material layer is interposed between said buffer layer and said lower cladding layer.

9. An optical coupling structure as claimed in claim 8, wherein a part of said inorganic material layer is exposed, and wherein a bonding pad is provided on said exposed part for holding an additional optical component.

10. An optical coupling structure as claimed in claim 9, wherein said optical coupling structure further includes an optical semiconductor device on said bonding pad in an optical alignment with said optical waveguide.

11. An optical coupling structure as claimed in claim 8, wherein a part of said inorganic material layer is exposed, a through-hole reaching said first sub-carrier being provided on said inorganic material layers and wherein a metal film is provided on said inorganic material layer so as to cover a side wall and a bottom of said through-hole.

12. An optical coupling structure as claimed in claim 1, wherein said first optical component comprises an optical waveguide including a lower cladding layer, a core layer provided on said lower cladding layer and an upper cladding layer provided on said core layer, said first sub-carrier being provided with a depression filled with a transparent buffer layer having a refractive index equal to or smaller than a refractive index of said lower cladding layer, said optical waveguide being provided on said buffer layer, said buffer layer having a surface substantially flush to said principal surface of said first sub-carrier on which said first optical component is provided, said buffer layer being formed of an organic material, said lower cladding layer, said core layer and said upper cladding layer are formed respectively of organic materials, a part of said buffer layer being exposed, and wherein an inorganic material layer is provided on said exposed part of said buffer layer.

13. An optical coupling structure as claimed in claim 12, wherein a bonding pad is provided on said inorganic material layer.

14. An optical coupling structure as claimed in claim 12, wherein said optical coupling structure further includes an optical semiconductor device on said bonding pad in an optical alignment with said optical waveguide.

15. An optical coupling structure as claimed in claim 12, wherein a through-hole reaching said first sub-carrier is provided on said inorganic material layer, and wherein a metal film is provided on said inorganic material layer so as to cover a side wall and a bottom of said through-hole.

16. An optical coupling structure as claimed in claim 1 wherein said first sub-carrier carries a single optical component on one of said first and second principal surfaces monolithically as said first optical component.

17. An optical coupling structure as claimed in claim 16, wherein said first optical component is an optical waveguide formed monolithically to said first sub-carrier.

18. An optical coupling structure as claimed in claim 17, wherein said optical waveguide includes a lower cladding layer, a core layer formed on said lower cladding layer and an upper cladding layer formed on said core layer,
  said first sub-carrier further including: a depression formed on said principal surface of said first sub-carrier on which said first optical component is provided, and a buffer layer formed of an optically transparent material and filling said depression, said buffer layer having a refractive index equal to or smaller than a refractive index of said lower cladding layer and having a principal surface flush with said principal surface on which said depression is formed.

19. An optical coupling structure as claimed in claim 1, wherein one of said first and second principal surfaces of said first sub-carrier on which said first optical component is to be carried, is formed with a periodical grating structure, and said first optical element is held on said periodical grating structure by a holding member having a corresponding grating structure, said holding member being mounted in a state such that said grating structure of said holding member engages with said grating structure of said first sub-carrier.

20. An optical coupling structure as claimed in claim 19, wherein said grating structure on said principal surface on which said optical component is held has a pitch equal to an integer multiple fraction of a pitch of said engagement elements forming said second engagement structure.

21. An optical coupling structure as claimed in claim 19, wherein said third engagement structure of said second sub-carrier includes a plurality of engagement elements on said fourth principal surface such that one of said engagement elements engages with said first engagement structure when said second sub-carrier is mounted on said common substrate,
  said plurality of engagement elements forming said third engagement structure having respective, mutually different sizes, such that a distance between said principal surface of said common substrate and said fourth principal surface is changed by selecting said engagement element from said third engagement structure for engagement with said first engagement structure,
  said engagement element of said third engagement structure being selected such that said second optical component aligns optically with said first optical component;
  said second sub-carrier carrying an array of optical elements on one of said third and fourth principal surfaces on which said third optical component is to be provided as said second optical component,
  wherein said array includes said optical elements with a pitch different from a pitch of said periodical grating on said first sub-carrier.

22. An optical coupling structure as claimed in claim 21, wherein said array is provided on said second sub-carrier in a state that a side of said array away from a side where a p-n junction is formed engages with said second sub-carrier.

23. An optical coupling structure as claimed in claim 1, wherein said first sub-carrier carries a plurality of optical components on one of said first and second principal surfaces monolithically as said first optical component, such that each of said optical components corresponds to one of said plurality of engagement elements.

24. An optical coupling structure as claimed in claim 23, wherein said first optical component is an optical waveguide array formed monolithically to said first sub-carrier.

25. An optical coupling structure as claimed in claim 24, wherein said optical waveguide includes a lower cladding layer, a plurality of core patterns formed on said lower cladding layer in the form of an array and an upper cladding layer formed on said core patterns,
  said first sub-carrier further including: a depression formed on said principal surface of said first sub-carrier on which said first optical component is provided, and a buffer layer formed of an optically transparent material and filling said depression, said buffer layer having a refractive index equal to or smaller than a refractive index of said lower cladding layer and having a principal surface flush with said principal surface on which said depression is formed.

26. An optical coupling structure as claimed in claim 1, wherein said first sub-carrier is formed on one of said first and second principal surfaces on which said first optical component is to be mounted, with a plurality of sites for carrying said first optical component, with a first pitch, and wherein said engagement elements forming said second engagement structure are formed on said second principal surface of said first sub-carrier with a second pitch equal to or an integer multiple fraction of said first pitch.

27. An optical coupling structure as claimed in claim 26, wherein said second pitch is equal to said first pitch.

28. An optical coupling structure as claimed in claim 26, wherein said second pitch is smaller than said first pitch.

29. An optical coupling structure as claimed in claim 1, wherein one of said first and second principal surfaces of said first sub-carrier is provided with a bonding pad structure, and a laser diode is flip-chip mounted on the bonding pad structure as said first optical component.

30. An optical coupling structure as claimed in claim 29, wherein said principal surface of said first sub-carrier on which said bonding pad structure is provided, is formed with a positioning depression, and wherein said laser diode is mounted on said bonding pad structure in a state that a positioning projection provided on said laser diode is engaged with said positioning depression.

31. An optical coupling structure as claimed in claim 1, wherein said third engagement structure includes a plurality of engagement elements on said fourth principal surface such that one of said engagement elements engages with said first engagement structure when said second sub-carrier is mounted on said common substrate, said engagement elements forming said third engagement structure having respective, mutually different sizes different from each other, such that a distance between said principal surface of said common substrate and said fourth principal surface is changed by selecting said engagement element from said third engagement structure for engagement with said first engagement structure;

said optical coupling structure further including a third sub-carrier having fifth and sixth principal surfaces and mounted on said common substrate in such a state that said sixth principal surface faces said common substrate said third sub-carrier carrying on said sixth principal surface a fourth engagement structure including a plurality of engagement elements, such that a selected one of said engagement elements of said fourth engagement structure engages said first engagement structure when said third sub-carrier is mounted on said common substrate, said engagement elements forming said fourth engagement structure having respective, mutually different sizes different from each other, such that a distance between said principal surface of said common substrate and said sixth principal surface is changed by selecting said engagement element from said fourth engagement structure for engagement with said first engagement structure;

said third sub-carrier carrying a third optical component on one of said fifth and sixth principal surfaces;

said second sub-carrier being disposed at a first side of said first sub-carrier and said third sub-carrier being disposed at a second, opposite side of said first sub-carrier;

said engagement element of said second engagement structure engaging said first engagement structure, said engagement element of said third engagement structure engaging said first engagement structure and said engagement element of said fourth engagement structure engaging said first engagement structure being selected such that said first optical component, said second optical component and said third optical component are aligned optically;

said first optical component comprising an optical waveguide extending between a first end and a second end, said second end being branched into a first branch and a second branch;

said second optical component comprising a photodiode coupled optically to said first branch;

said third optical component comprising an optical fiber coupled optically to said first end of said optical waveguide;

said first sub-carrier further carrying a light emitting device on said principal surface on which said optical waveguide is provided, in an optical alignment with said second branch.

32. An optical coupling structure as claimed in claim 31, wherein said first sub-carrier further carries, on said principal surface on which said optical waveguide is provided, an optical interconnection member such that a first end of said optical interconnection member is coupled to said first branch and a second end of said optical interconnection member is coupled to said photodiode.

33. An optical coupling structure as claimed in claim 1, wherein said second engagement structure includes a plurality of grooves having a V-shaped cross-section, said grooves having respective widths different from each other on said second principal surface, said plurality of grooves forming a plurality of groove pairs each including a pair of grooves with a predetermined mutual separation, said groove pairs forming said engagement elements.

34. An optical coupling structure as claimed in claim 33, wherein said grooves forming said groove pairs are formed with a predetermined pitch, and wherein there is provided a further groove between a groove forming a pair with another corresponding groove and an adjacent groove forming another pair with another corresponding groove.

35. An optical coupling structure as claimed in claim 1, wherein said third engagement structure includes a plurality of engagement elements on said fourth principal surface such that one of said engagement elements engages with said first engagement structure when said second sub-carrier is mounted on said common substrate, said plurality of engagement elements forming said third engagement structure having respective, mutually different sizes, such that a distance between said principal surface of said common substrate and said fourth principal surface is changed by selecting said engagement element from said third engagement structure for engagement with said first engagement structure, said engagement element of said third engagement structure being selected such that said second optical component aligns optically with said first optical component.

36. An optical coupling structure as claimed in claim 1, wherein said third engagement structure includes a plurality of engagement elements on said fourth principal surface such that one of said engagement elements engages with said first engagement structure when said second sub-carrier is mounted on said common substrate, said plurality of engagement elements forming said third engagement structure having a predetermined, common size throughout, such that a distance between said principal surface of said common substrate and said fourth principal surface is held constant irrespective of what engagement element is selected from said third engagement structure for engagement with said first engagement structure.

37. An optical coupling structure as claimed in claim 1, wherein said first sub-carrier carries a plurality of mounting structures on one of said first and second principal surfaces in correspondence to said engagement elements, and wherein a single optical component is mounted on one of said mounting structures corresponding to said engagement element in engagement with said first engagement structure.

38. An optical coupling structure as claimed in claim 1, wherein said first sub-carrier carries a plurality of mounting structures on one of said first and second principal surfaces in correspondence to said engagement elements, and wherein an optical component is mounted on each of said mounting structures.

39. An optical coupling structure as claimed in claim 1, wherein said first sub-carrier carries a plurality of mounting structures on one of said first and second principal surfaces in the form of depressions having mutually different sizes, and wherein a single optical element is mounted selectively on one of said depressions as said first optical component.

40. An optical coupling structure as claimed in claim 1, wherein said first sub-carrier carries a plurality of mounting structures on one of said first and second principal surfaces in the form of depressions having mutually different sizes, and wherein an optical element is mounted on each of said depressions as said first optical component.

41. An optical coupling structure as claimed in claim 1, wherein said first sub-carrier carries a mounting structure on one of said first and second principal surfaces in the form of a V-shaped groove, and wherein a cylindrical member is engaged with said V-shaped groove as said first optical component.

42. An optical coupling structure as claimed in claim 1, wherein said first sub-carrier includes, on one of said first and second principal surfaces on which said first optical component is provided, a groove having a reflection surface, and said first optical component comprises a planar photoreception device mounted on said principal surface on which said groove is provided, said reflection surface reflecting an optical beam traveling along said groove in a direction toward said planar photoreception device.

43. An optical coupling structure as claimed in claim 1, wherein said first optical component comprises an optical waveguide including a lower cladding layer, a core layer provided on said lower cladding layer and an upper cladding layer provided on said core layer, said first sub-carrier being provided with a depression filled with a transparent buffer layer having a refractive index equal to or smaller than a refractive index of said lower cladding layer, said optical waveguide being provided on said buffer layer, said buffer layer having a surface substantially flush to said principal surface of said first sub-carrier on which said first optical component is provided, and wherein said buffer layer comprises an inorganic material, and wherein said lower cladding layer, said core layer and said upper cladding layer are formed respectively of organic materials.

44. An optical coupling structure as claimed in claim 1, wherein said first engagement structure includes a ridge having a trapezoidal cross-section.

45. An optical coupling structure as claimed in claim 1, wherein said first engagement structure includes a pair of grooves formed on said principal surface of said common substrate and a pair of rods in engagement with said grooves, each of said rods having a circular cross-section.

46. An optical coupling structure as claimed in claim 1, wherein said first engagement structure includes a pair of grooves formed on said principal surface of said common substrate, a first pair of rods in engagement with said grooves, each of said rods of said first pair having a circular cross-section, and a second pair of rods in engagement with said grooves, each of said rods of said second pair having a circular cross section and being in alignment with a corresponding rod of said first pair in said groove, wherein said rods of said second pair have a diameter different from a diameter of said rods forming said first pair.

47. An optical coupling structure as claimed in claim 1, wherein said first engagement structure includes a first groove pair and a second groove pair formed on said principal surface of said common substrate; and a first rod pair and a second rod pair respectively in engagement with said first groove pair and said second groove pair, said first groove pair and said second groove pair including grooves extending parallel in such a relationship that the grooves forming said second groove pair are located behind the grooves forming said first groove pair.

48. An optical coupling structure as claimed in claim 1, wherein said first engagement structure includes a plurality of depressions formed on said principal surface of said common substrate and a spherical member engaged with a depression selected from said plurality of depressions.

49. An optical coupling structure as claimed in claim 1, wherein one of said first and second principal surfaces is provided with an optical modulator as said first optical component.

50. An optical coupling structure as claimed in claim 1, wherein one of said first and second principal surfaces is provided with an optical amplifier as said first optical component.

51. An optical coupling structure as claimed in claim 1, wherein said first optical component is a spherical lens, and wherein said principal surface of said first sub-carrier carrying said first optical component is provided with a groove for holding said spherical lens.

52. An optical coupling structure as claimed in claim 1, wherein said first optical component comprises an optical waveguide including a lower cladding layer, a core layer provided on said lower cladding layer and an upper cladding layer provided on said core layer, said lower cladding layer, said core layer and said upper cladding layer being formed respectively of organic materials; an inorganic layer being interposed between said principal surface of said first sub-carrier on which said first optical component is mounted and said lower cladding layer.

53. An optical coupling structure as claimed in claim 1, wherein said first optical component comprises an optical waveguide including a lower cladding layer, a core layer provided on said lower cladding layer and an upper cladding layer provided on said core layer, and wherein said lower cladding layer fills a depression formed on one of said first and second principal surfaces on which said first optical component is provided, said lower cladding surface having a surface substantially flush with said principal surface of said first sub-carrier carrying said first optical component.

54. An optical coupling structure as claimed in claim 1, wherein said first sub-carrier and said second sub-carrier have respective, different thicknesses.

55. An optical coupling structure as claimed in claim 1, wherein said first sub-carrier and said second sub-carrier have a common, identical thickness.

56. An optical coupling structure as claimed in claim 1, wherein said first optical component comprises a device substrate and a junction region formed on said device substrate, said first optical component being provided on said first sub-carrier such that a side of said device substrate on which said junction region is formed faces one of said first and second principal surfaces on which said first optical component is provided.

57. An optical coupling structure as claimed in claim 1, wherein said first optical component comprises a device substrate and a junction region formed on said device substrate, said first optical component being provided on said first sub-carrier such that a side of said device substrate on which said junction region is formed faces away from one of said first and second principal surfaces on which said first optical component is provided.

58. An optical coupling structure as claimed in claim 1, wherein said first optical component is provided on said second principal surface.

59. An optical coupling structure as claimed in claim 1, wherein said first optical component is a cylindrical lens having a cylindrical refractive index profile, and wherein said principal surface of said first sub-carrier carrying said first optical component is provided with a groove for holding said cylindrical lens.

60. An optical coupling structure as claimed in claim 1, wherein said first sub-carrier is formed with, on one of said first and second principal surfaces on which said first optical component is to be mounted, a groove generally in alignment with an optical axis of said first optical components.

61. An optical coupling structure, comprising:

a substrate carrying a first engagement structure on a principal surface thereof; and a sub-carrier having a first principal surface and a second, opposing principal surface and mounted on said substrate in a state that said second principal surface faces said principal surface of said substrate, said sub-carrier carrying a second engagement structure including a plurality of engagement elements on said second principal surface such that one of said engagement elements engages with said first engagement structure when said sub-carrier is mounted on said substrate, said sub-carrier carrying an optical component on one of said first and second principal surfaces;

said plurality of engagement elements forming said second engagement structure having respective mutually different sizes, such that a distance between said principal surface of said common substrate and said second principal surface is changed by selecting said engagement element from said second engagement structure for engagement with said first engagement structure.

62. An optical coupling structure, comprising:

a substrate carrying a first engagement structure on a principal surface thereof;

a sub-carrier having a first principal surface and a second, opposing principal surface and mounted on said substrate in a state that said second principal surface faces said principal surfaces of said substrate, said sub-carrier carrying a second engagement structure for engagement with said first engagement structure when said sub-carrier is mounted on said substrate, said second engagement structure including a plurality of grooves extending parallel with each other, with a uniform pitch and with a substantially identical size; and a mounting structure provided on one of said first and second principal surfaces of said sub-carrier in the form of depressions having mutually different sizes; and an optical component mounted on one of said depressions.

63. A method of fabricating an optical coupling structure including: a common substrate carrying a pair of parallel ridges on a principal surface thereof as a first engagement structure; a first sub-carrier having a first principal surface and a second, opposing principal surface and mounted on said common substrate in a state that said second principal surface faces said principal surface of said common substrate, said first sub-carrier carrying a second engagement structure including a plurality of groove pairs each formed of a pair of parallel grooves on said second principal surface, such that one of said groove pairs forming said second engagement structure engages with said ridges forming said first engagement structure when said first sub-carrier is mounted on said common substrate, said first sub-carrier carrying a first optical component on one of said first and second principal surfaces; and a second sub-carrier having a third principal surface and a fourth, opposing principal surface and mounted on said common substrate in a state that said fourth principal surface faces said principal surface of said common substrate, said second sub-carrier carrying a third engagement structure including a plurality of groove pairs each formed of a pair of parallel grooves on said fourth principal surface such that said one of said groove pairs forming said third engagement structure engages with said ridges forming said first engagement structure when said second sub-carrier is mounted on said common substrate, said second sub-carrier carrying a second optical component on one of said third and fourth principal surfaces; said grooves forming said groove pairs of said second engagement structure having respective sizes different in each groove pair, such that a distance between said principal surface of said common substrate and said second principal surface is changed by selecting said groove pair from said second engagement structure for engagement with said first engagement structure;

said method comprising the steps of:

defining a plurality of first blocks and a plurality of second blocks on a mother substrate having an area larger than a sum of an area of said first sub-carrier and an area of said second sub-carrier, such that each of said first blocks includes a plurality of groove pairs constituting said second engagement structure and such that each of said second blocks includes a plurality of groove pairs constituting said third engagement structure; and dicing said mother substrate to form said first sub-carrier and said second sub-carrier, such that said first sub-carrier includes a selected groove pair for said second engagement structure and such that said second sub-carrier includes a selected groove pair for said third engagement structure, said selected groove pair of said first sub-carrier and said selected groove pair of said second sub-carrier being selected such that said first optical component aligns optically to said second optical component.

64. A method of fabricating an optical coupling structure including a substrate carrying a first engagement structure on a principal surface thereof and a sub-carrier having a first principal surface and a second, opposing principal surface, said sub-carrier being mounted on said substrate in a state that said second principal surface faces said principal surface of said substrate, said sub-carrier carrying a plurality of groove pairs each formed of a pair of parallel grooves on said second principal surface as a second engagement structure for engagement with said first engagement structure, said grooves of different pairs having mutually different widths, said method comprising the steps of:

defining a plurality of blocks on a mother substrate, each of said blocks including groove pairs corresponding to said groove pairs forming said second engagement structure, said blocks being defined in a mutually overlapping relationship such that a groove constituting a groove pair of an adjacent block is formed between a groove constituting a groove pair in a block under consideration and an adjacent groove also constituting an adjacent groove pair in said block under consideration;

measuring a thickness of said mother substrate; and dicing said mother substrate to form a sub-carrier such that a selected groove pair is included in said sub-carrier thus obtained, said selected groove pair being selected as a result of measurement of said thickness of said mother substrate.

65. A method of fabricating an optical coupling structure including: a common substrate carrying a pair of parallel ridges on a principal surface thereof as a first engagement structure; a first sub-carrier having a first principal surface and a second, opposing principal surface and mounted on said common substrate in a state that said second principal surface faces said principal surface of said common substrate, said first sub-carrier carrying a second engagement structure including a plurality of groove pairs each formed of a pair of parallel grooves on said second principal surface, such that one of said groove pairs forming said second engagement structure engages with said ridges forming said first engagement structure when said first sub-carrier is mounted on said common substrate, said first sub-carrier carrying a first optical component on one of said first and second principal surfaces; and a second sub-carrier having a third principal surface and a fourth, opposing principal surface and mounted on said common substrate in a state that said fourth principal surface faces said principal surface of said common substrate, said second sub-carrier carrying a third engagement structure including a plurality of groove pairs each formed of a pair of parallel grooves on said fourth principal surface such that one of said groove pairs forming said third engagement structure engages with said ridges forming said first engagement structure when said second sub-carrier is mounted on said common substrate, said second sub-carrier carrying a second optical component on one of said third and fourth principal surfaces; said grooves forming said groove pairs of said second engagement structure having respective sizes different in each groove pair, such that a distance between said principal surface of said common substrate and said second principal surface is changed by selecting said groove pair from said second engagement structure for engagement with said first engagement structure;

said method comprising the steps of:

defining a plurality of blocks on a first mother substrate such that each of said blocks includes said plurality of groove pairs forming said second engagement structure;

defining a plurality of blocks on a second mother substrate such that each of said blocks includes said plurality of groove pairs forming said third engagement structure;

measuring a thickness of said first mother substrate;

measuring a thickness of said second mother substrate;

dicing said first mother substrate to form said first sub-carrier, such that said first sub-carrier includes a selected groove pair as said second engagement structure;

dicing said second mother substrate to form said second sub-carrier, such that said second sub-carrier includes a selected groove pair as said third engagement structure;

said selected groove pair forming said second engagement structure and said selected groove pair forming said third engagement structure being selected based upon a result of measurement of said thickness of said first mother substrate and a result of measurement of said thickness of said second mother substrate, such that said first optical component aligns optically to said second optical component.

* * * * *

UNITED STATES PATENT AND TRADEMARK OFFICE
CERTIFICATE OF CORRECTION

PATENT NO.: 5,909,524
DATED : June 1, 1999
INVENTOR(S): Haruhiko TABUCHI

It is certified that error appears in the above-identified patent and that said Letters Patent is hereby corrected as shown below:

Col. 64, line 11, after "respective" insert --,--.

Col. 65, line 16, change "layers" to --layer--;
line 48, after "1" insert --,--.

Col. 71, line 26, change "components" to --component--.

Signed and Sealed this

Twenty-sixth Day of October, 1999

Attest:

Q. TODD DICKINSON

Attesting Officer

Acting Commissioner of Patents and Trademarks